United States Patent
Livesey et al.

(10) Patent No.: US 12,527,864 B2
(45) Date of Patent: Jan. 20, 2026

(54) ANTIBODIES AGAINST TAU EPITOPES

(71) Applicant: Gen2 Neuroscience Limited, Manchester (GB)

(72) Inventors: Frederick John Livesey, Manchester (GB); Clare Jones, Cambridge (GB)

(73) Assignee: Gen2 Neuroscience Limited, Manchester (GB)

(*) Notice: Subject to any disclaimer, the term of this patent is extended or adjusted under 35 U.S.C. 154(b) by 1022 days.

(21) Appl. No.: 17/625,076

(22) PCT Filed: Jul. 6, 2020

(86) PCT No.: PCT/EP2020/069039
§ 371 (c)(1),
(2) Date: Jan. 5, 2022

(87) PCT Pub. No.: WO2021/005019
PCT Pub. Date: Jan. 14, 2021

(65) Prior Publication Data
US 2022/0265819 A1 Aug. 25, 2022

(30) Foreign Application Priority Data

Jul. 5, 2019 (GB) .................................. 1909721

(51) Int. Cl.
*A61K 39/395* (2006.01)
*A61K 39/00* (2006.01)
*A61P 25/28* (2006.01)
*C07K 16/18* (2006.01)
*G01N 33/68* (2006.01)

(52) U.S. Cl.
CPC ...... *A61K 39/3955* (2013.01); *A61K 39/0005* (2013.01); *A61P 25/28* (2018.01); *C07K 16/18* (2013.01); *G01N 33/6896* (2013.01); *G01N 2800/2821* (2013.01)

(58) Field of Classification Search
CPC .......... A61K 38/0005; A61K 2036/505; C07K 4/12; C07K 16/18; C07K 2317/70; C07K 2319/40
See application file for complete search history.

(56) References Cited

U.S. PATENT DOCUMENTS

| | | | |
|---|---|---|---|
| 8,697,076 | B2 | 4/2014 | Binder et al. |
| 9,139,643 | B2 | 9/2015 | Sigurdsson et al. |
| 9,777,056 | B2 | 10/2017 | Sigurdsson et al. |
| 2008/0050383 | A1 | 2/2008 | Sigurdsson et al. |
| 2010/0316564 | A1 | 12/2010 | Sigurdsson |
| 2012/0087861 | A1 | 4/2012 | Nitsch et al. |
| 2012/0244174 | A1 | 9/2012 | Chain |
| 2014/0056901 | A1 | 2/2014 | Agadjanyan et al. |
| 2014/0294831 | A1 | 10/2014 | Griswold-Prenner et al. |

FOREIGN PATENT DOCUMENTS

| | | | | |
|---|---|---|---|---|
| WO | 9620218 | A1 | 7/1996 | |
| WO | 02062851 | A1 | 8/2002 | |
| WO | 2010115843 | A2 | 10/2010 | |
| WO | 2010142423 | A2 | 12/2010 | |
| WO | 2010144711 | A2 | 12/2010 | |
| WO | WO2011013034 | * | 2/2011 | ............ A61K 39/00 |
| WO | 2012049570 | A1 | 4/2012 | |
| WO | 2013151762 | A1 | 10/2013 | |
| WO | 2013180238 | A1 | 12/2013 | |
| WO | 2014016737 | A1 | 1/2014 | |
| WO | WO2014031697 | * | 2/2014 | ............ A61K 39/00 |
| WO | 2014134685 | A1 | 9/2014 | |
| WO | 2014165271 | A2 | 10/2014 | |
| WO | 2015197823 | A3 | 2/2016 | |
| WO | 2018152359 | A1 | 8/2018 | |
| WO | 2019084488 | A1 | 5/2019 | |

OTHER PUBLICATIONS

Townsend et al., Significant differences in physicochemical properties of human immunoglobulin Kappa and Lambda CDR3 regions, Frontiers in Immunology, 7, 388 2016. (Year: 2016).*
Janeway et al. Chapter 4—The generation of diversity in immunoglobulins in Immunobiology: The Immune system in health and disease, 5th edition, New York, Garland Science, 2001. (Year: 2001).*
Rabia et al. Understanding and overcoming trade-offs between antibody affinity, specificity, stability and solubility, Biochem. Engin. J. 137, 365-374, 2018. (Year: 2018).*
Altschul et al. "Basic local alignment search tool" (1990) J. Mol. Biol. 215:25, 405-410.
Altshul et al, (1997) "Gapped BLAST and PSI-BLAST: a new generation of protein database search programs." Nucl. Acids Res. 25 3389-3402.
Animal Welfare Act, 1966 (US Animal and Plant Health Inspection Service).
Brownjohn et al, "Functional studies of missense TREM2 mutations in human stem cell-derived microglia". (2018) Stem Cell Rep 10(4): 1294-1307.
Delacourte et al., "The Trigger and Bullet in Alzheimer Disease Pathogenesis" 1990 Acta Neuropathol 80(2):111-7.
Edgar RC. 2004a. "MUSCLE: multiple sequence alignment with high accuracy and high throughput." Nucleic Acids Res 32:1792-7.
Edgar RC. 2004b. "MUSCLE: a multiple sequence alignment method with reduced time and space complexity." BMC Bioinformatics 5:113.

(Continued)

*Primary Examiner* — Elly-Gerald Stoica
(74) *Attorney, Agent, or Firm* — Koren Anderson

(57) ABSTRACT

The invention relates to isolated synthetic or recombinant peptides comprising an epitope of human tau 2N4R, wherein the tau peptide sequence comprising the epitope is not phosphorylated. The invention also relates to use of such peptides to generate binding molecules, such as antibodies, specific for the non-phosphorylated tau epitopes and to such peptides and binding molecules, such as antibodies, for use in investigation, diagnosis and treatment of tauopathies, such as Alzheimer's disease.

12 Claims, 31 Drawing Sheets

Figure 4:
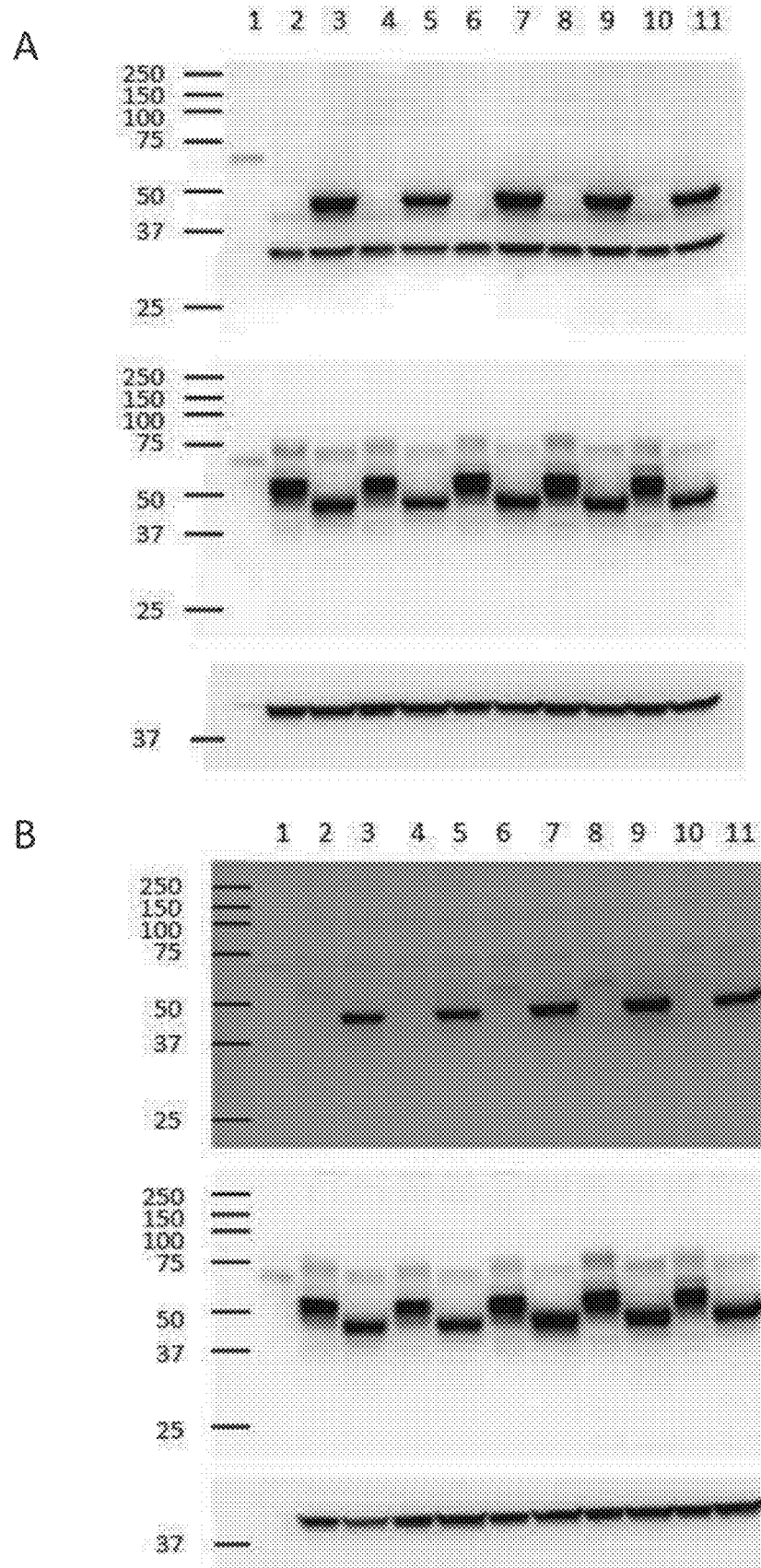

Specification includes a Sequence Listing.

(56) References Cited

OTHER PUBLICATIONS

Evans et al, "Extracellular monomeric and aggregated tau efficiently enter human neurons through overlapping but distinct pathways." (2018) Cell Rep 22(13): 3612-3624.
Guex N & Peitsch MC (1997) SWISS-MODEL and the Swiss-PdbViewer: An environment for comparative protein modelling. Electrophoresis 18, 2714-2723.
Hancock DC, O'Reilly NJ (2005) Production of polyclonal antibodies in rabbits. Methods Mol Biol 295: 27-40.
Hu et al., "Minibody: A novel engineered anti-carcinoembryonic antigen antibody fragment (single-chain Fv-CH3) which exhibits rapid, high-level targeting of xenografts" (1996) Cancer Res56(13): 3055-61.
Kabat EA & Wu TT (1991) Identical V region amino acid sequences and segments of sequences in antibodies of different specificities. Relative contributions of VH and VL genes, minigenes, and complementarity-determining regions to binding of antibody-combining sites. J Immunol 147(5): 1709-19.
Kontermann et al, (2012) "Dual targeting strategies with bispecific antibodies." Mabs 4(2): 182-97.
Lefranc MP, Pommié C, Kaas Q, Duprat E, Bosc N, Guiraudou D, Jean C, Ruiz M, Da Piédade I, Rouard M, Foulquier E, Thouvenin V, Lefranc G (2005) IMGT unique numbering for immunoglobulin and T cell receptor constant domains and Ig superfamily C-like domains. Dev Comp Immunol 29(3): 185-203.
Lo MC, Aulabaugh A, Jin G, Cowling R, Bard J, Malamas M, Ellestad G (2004) Evaluation of fluorescence-based thermal shift assays for hit identification in drug discovery. Analytical Biochem 332(1): 153-9.
Martini-Stoica et al., "TFEB enhances astroglial uptake of extracellular species and reduces tau spreading." (2018) J Exp Med 215(9): 2355-2377.
Moore et al, "APP metabolism regulates tau proteostasis in human cerebral cortex neurons." (2015) Cell Reports 11(5): 689-96.
Morris et al "Tau post-translational modifications in wild type and human amyloid precursor transgenic mice" (2015) Nature Neuroscience 18:1183-1189.
Narat et al, "Production of antibodies in chickens." (2003) Food Technol Biotechnol 41(3): 259-267.
Pearson WR & Lipman DJ (1988) Improved tools for biological sequence comparison. Proc Natl Acad Sci USA 85: 2444-2448.
Pederson et al., "Tau immunotherapy for Alzheimer's disease" (2015) Trends Mol Med 21(6): 394-402.
Perry LC, Jones TD, Baker MP (2008) New approaches to prediction of immune responses to therapeutic proteins during preclinical development. Drugs R D 9(6): 385-96.
Rauch et al, (2020) "LRP1 is a master regulator of tau uptake and spread." Nature 580(7803): 381-385.
Roberts et al., 2020, "Pre-clinical characterisation of E2814, a high-affinity antibody targeting the microtubule-binding repeat domain of tau for passive immunotherapy in Alzheimer's disease" Acta Neuropathologica Comms 8:13.
Sandusky-Beltran et al., "Tau immunotherapies: Lessons learned, current status and future considerations" 2020, Neuropharmacol. 175:108104.
Shi et al, (2012a) "Human cerebral cortex development from pluripotent stem cells to functional excitatory synapses." Nature Neurosci 15(3): 477-86.
Shi et al, (2012c) "A human stem cell model of early Alzheimer's disease pathology in Down Syndrome." Science Trans Med 4(124): 124ra29.
Shi Y, Kirwan P, Livesey FJ (2012b) Directed differentiation of human pluripotent stem cells to cerebral cortex neurons and neural networks. Nature Protocols 7(10): 1836-46.
Sidoryk-Wegrzynowicz M & Struzynska L "Astroglial contribution to tau-dependent neurodegeneration." (2019) Biochem J 476(22):3493-3504.
Smith TF & Waterman MS "Identification of common molecular subsequences." (1981) J. Mol Biol. 147: 195-197.
Spiess et al, "Alternative molecular formats and therapeutic applications for bispecific antibodies.". (2015) Mol Immunol 67 (2 Pt A): 95-106.
Sposito, et al T, "Developmental regulation of tau splicing is disrupted in stem cell derived neurons from frontotemporal dementia patients with the 10+16 splice-site mutation in MAPT". (2015) Hum Mol Genet 24(18): 5260-5269.

\* cited by examiner

Fig 1
A
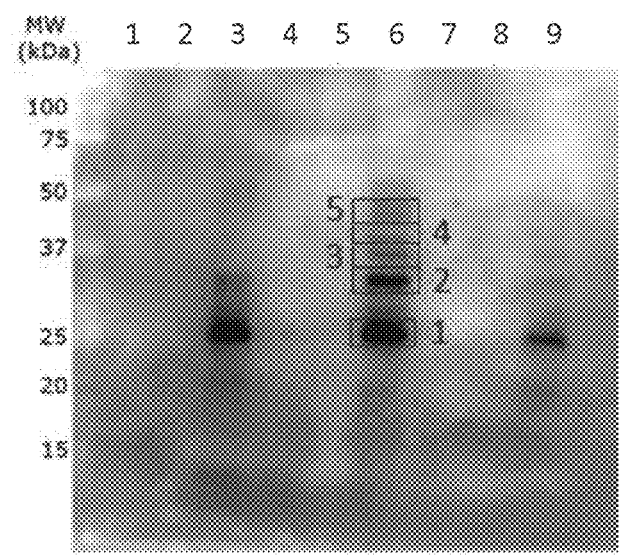
B
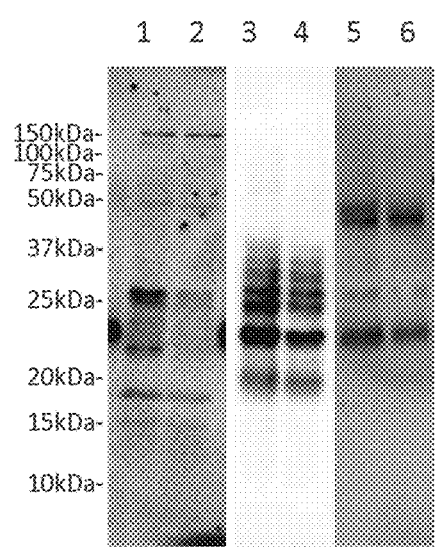

Fig 2
A
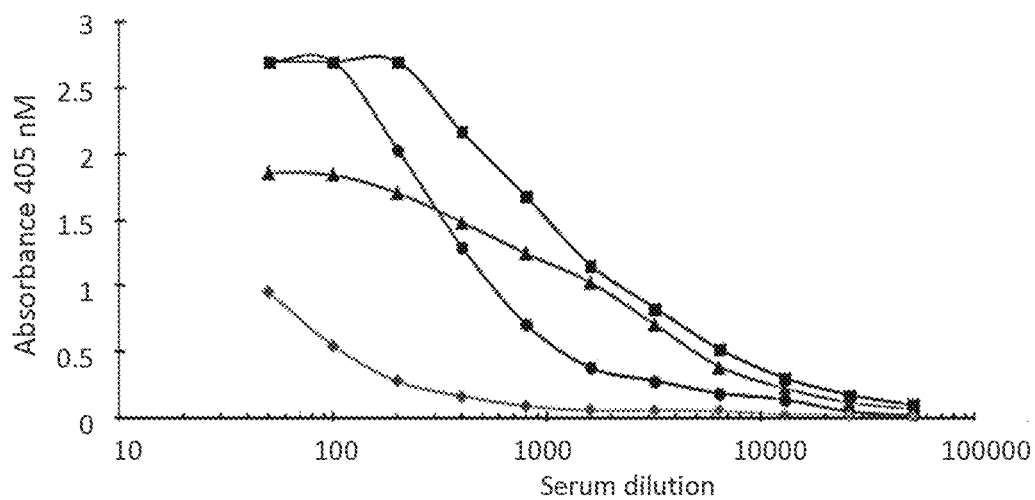
B
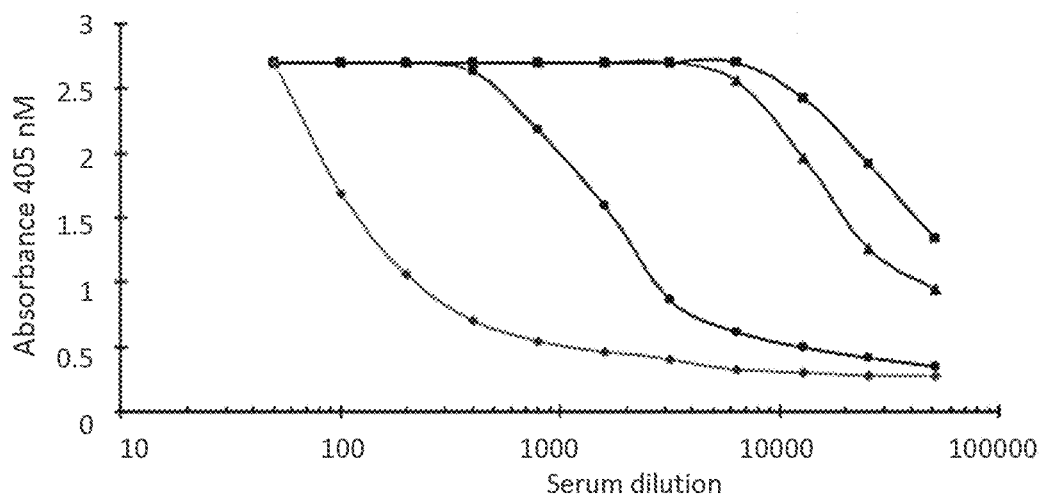

Fig 3
A
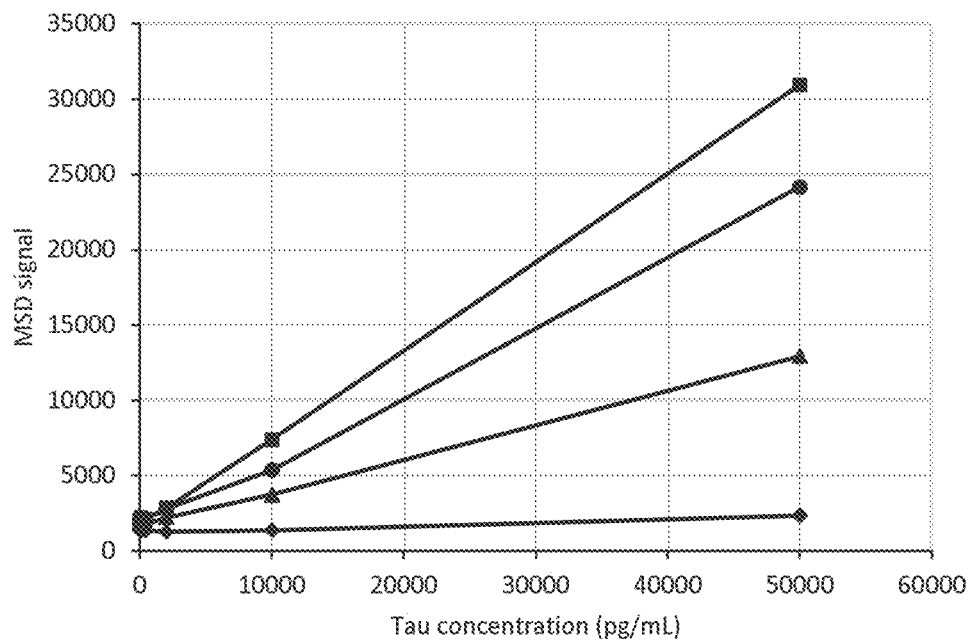
B
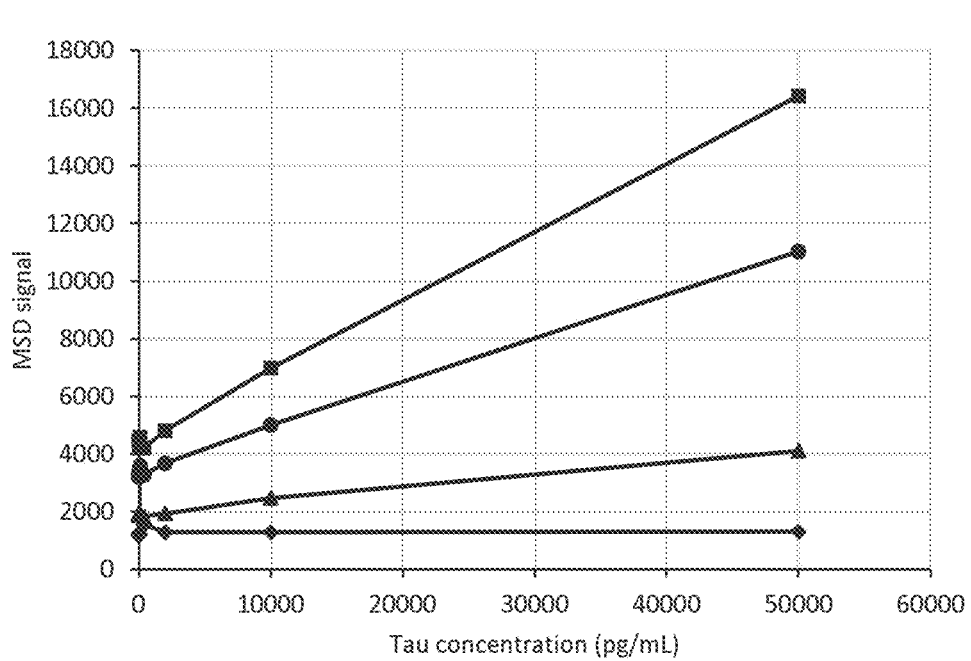

Fig 7
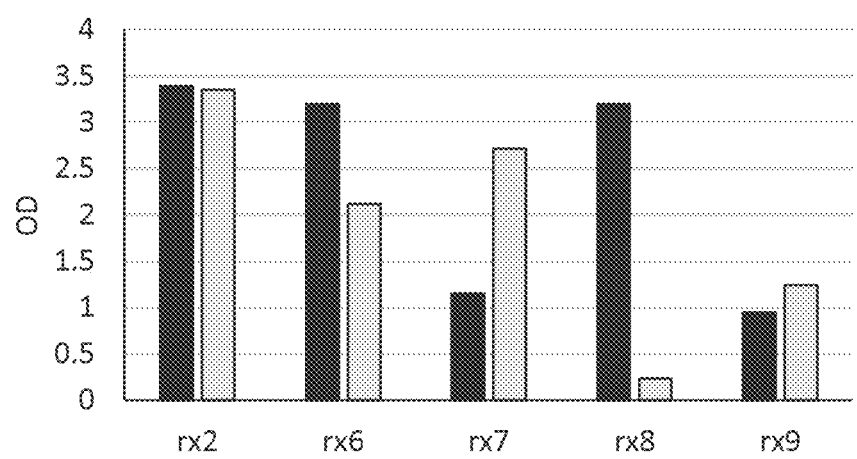
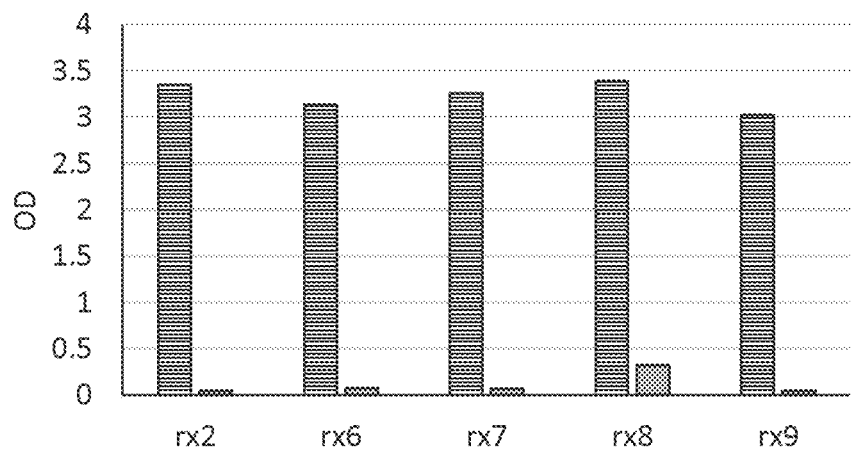

Fig 10
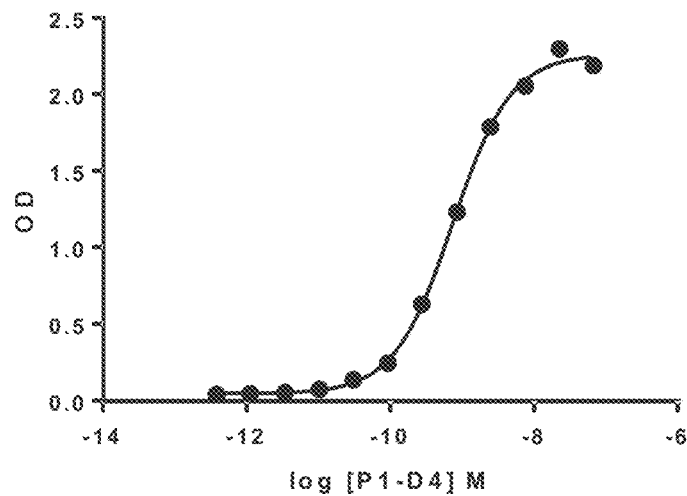
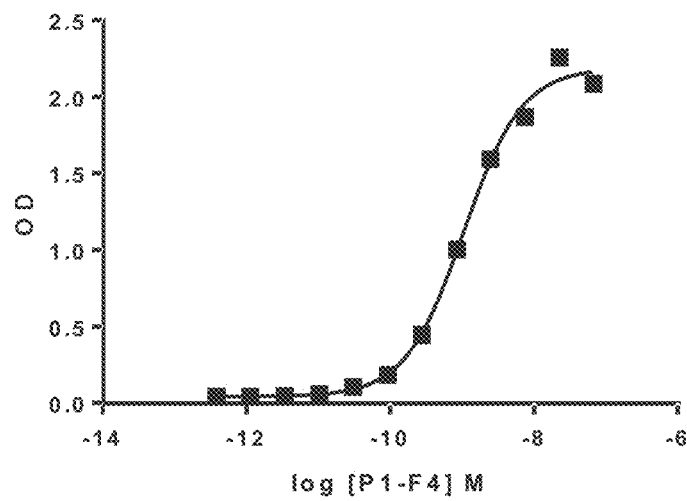

Fig 11
A
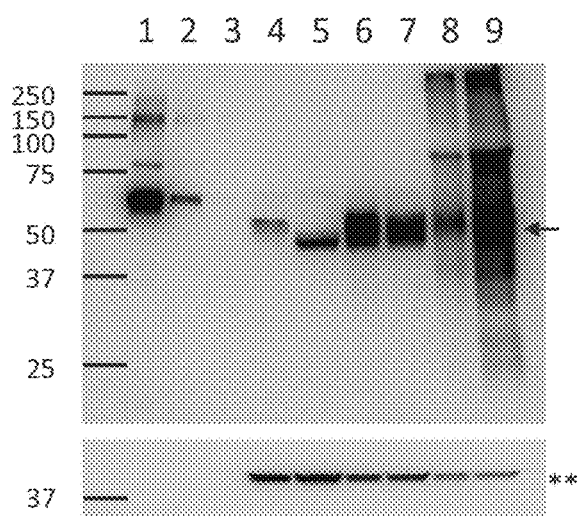
B
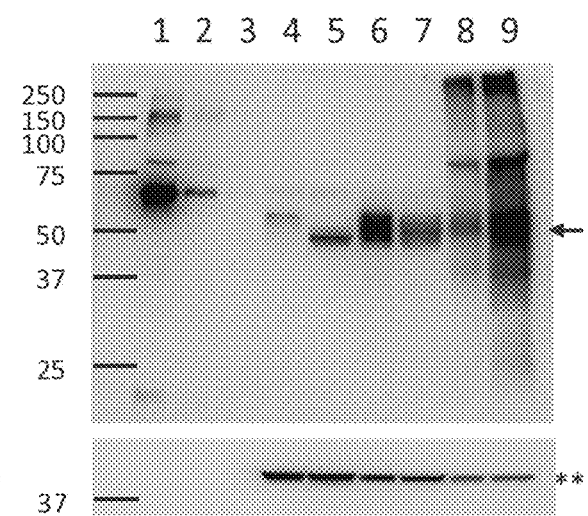
C
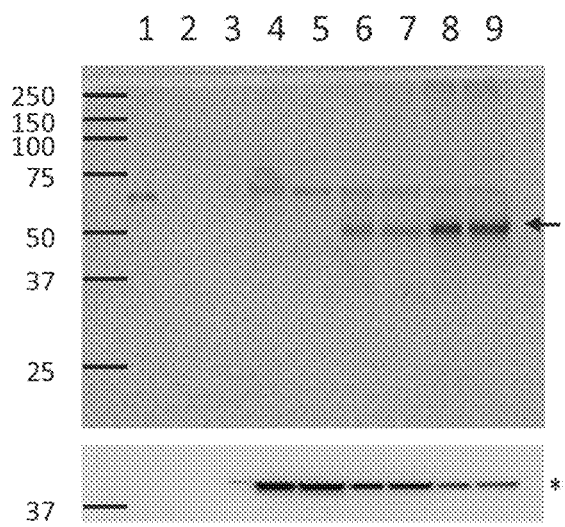
D
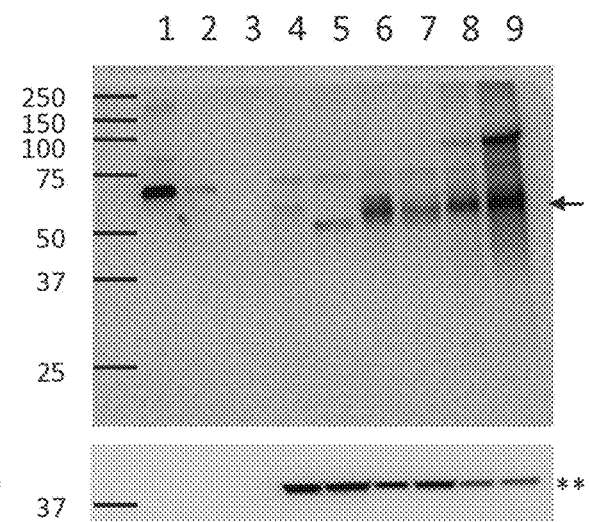

Fig 13
A
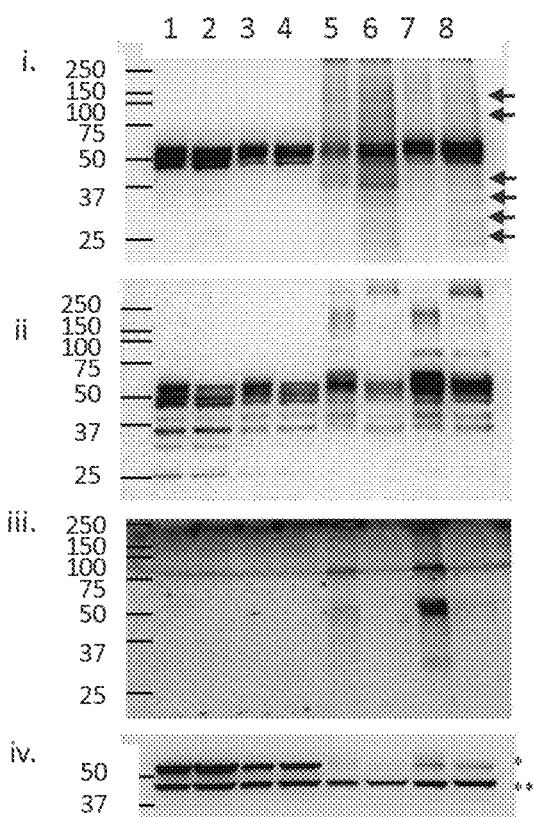
B
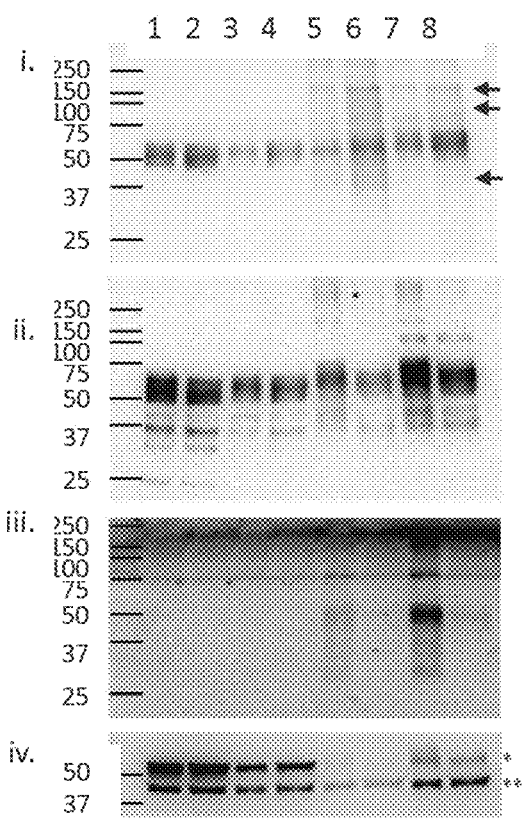

Fig 14
A							B
i.
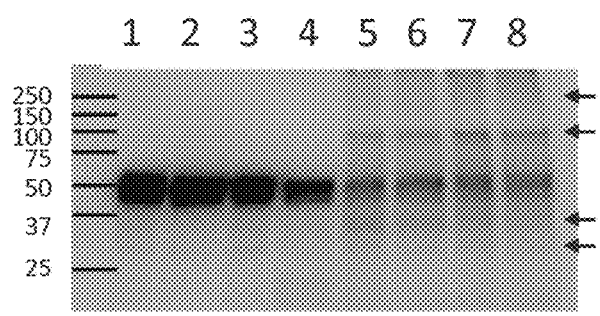 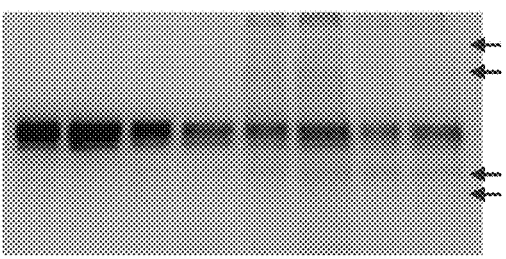
ii.
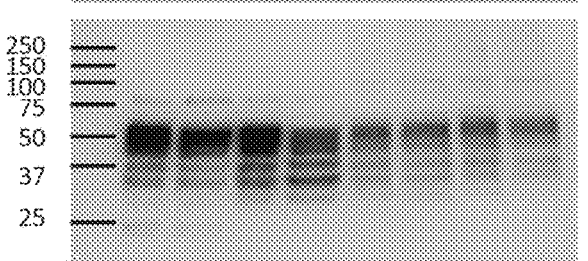 
iii.
 

Fig 16
A
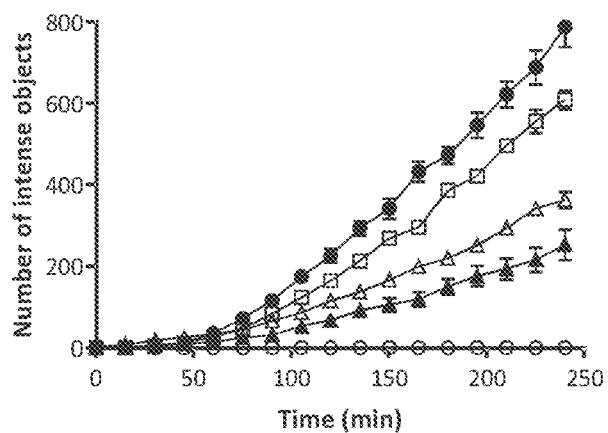
B
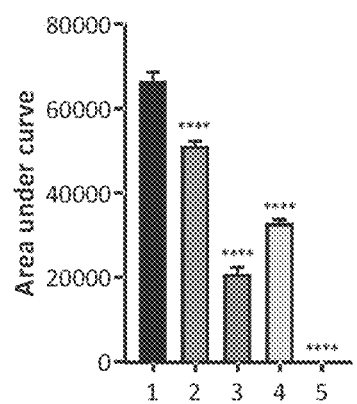

Fig 18
A
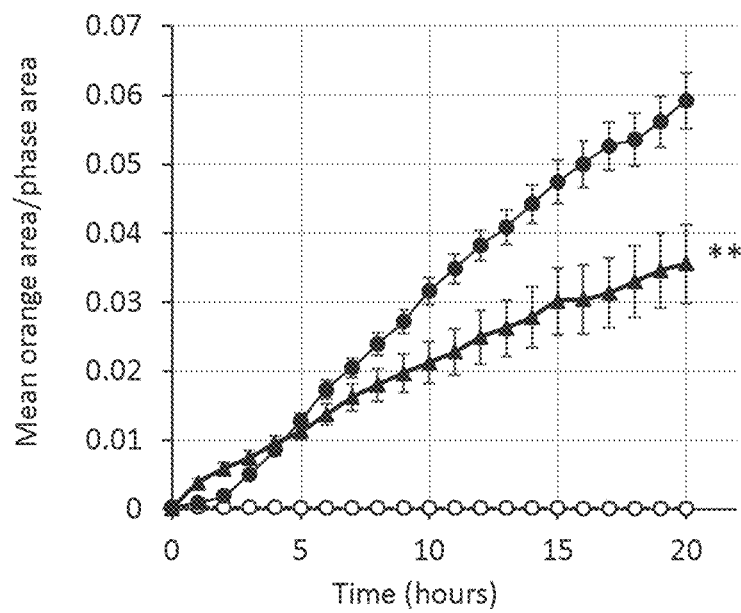
B
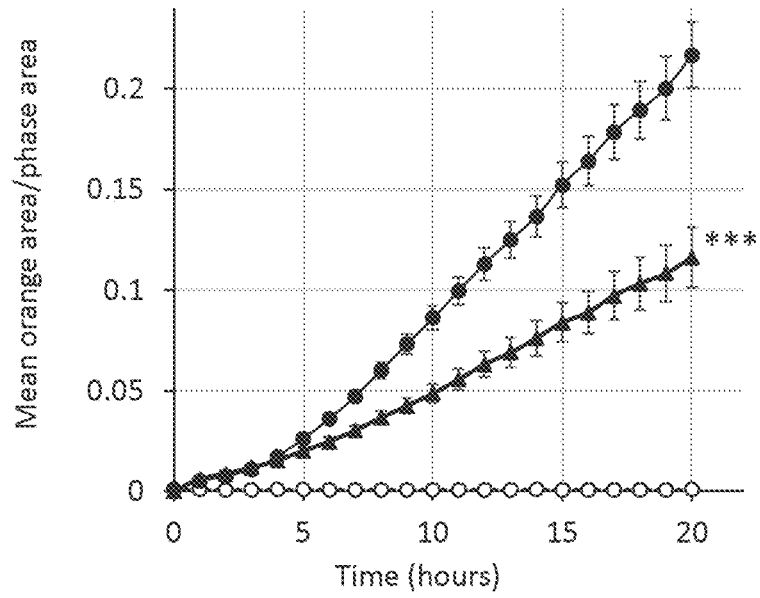

Fig 19
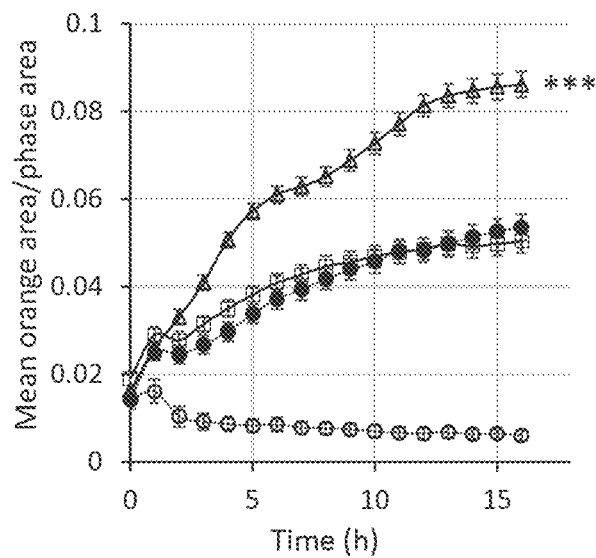
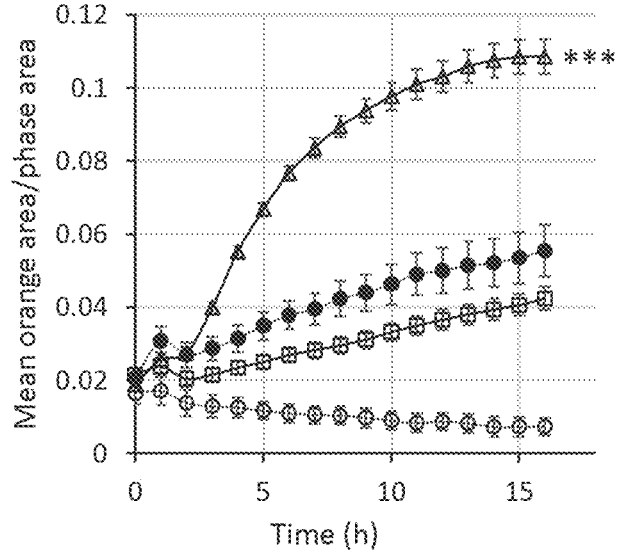

Fig 20
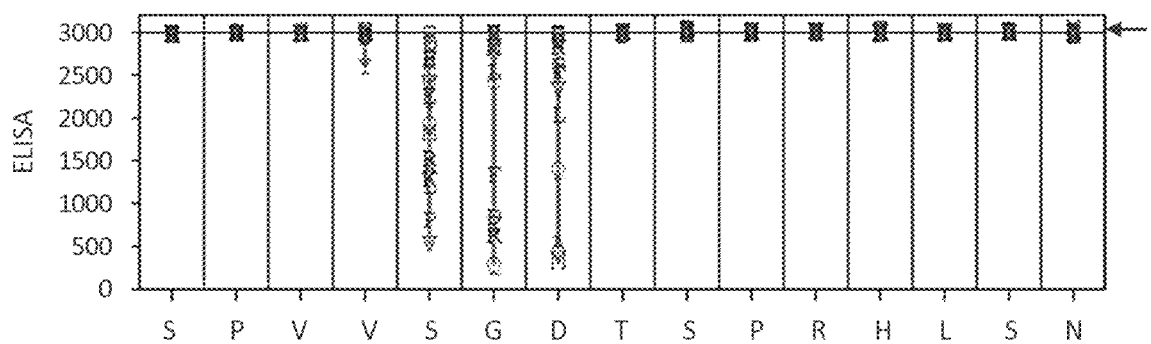
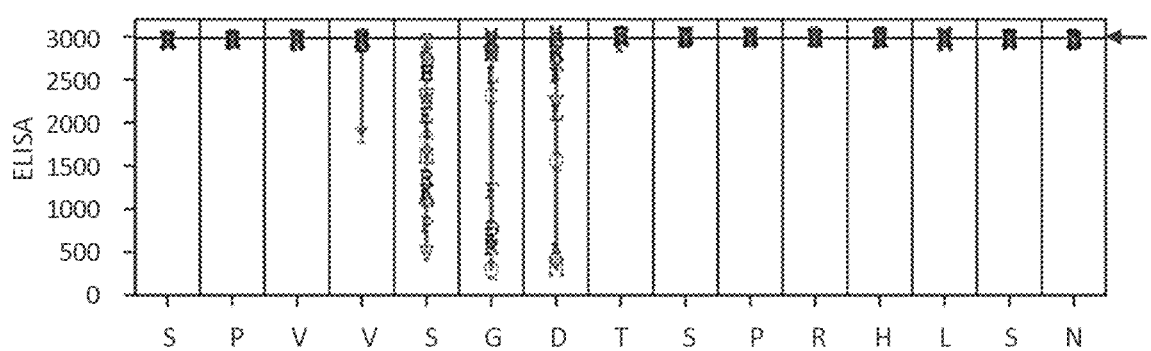
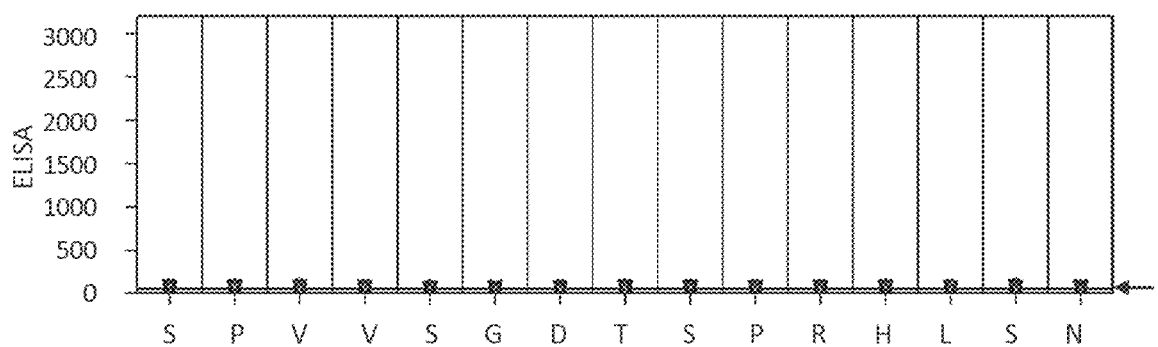

Fig 21

A
```
                         10        20        30         40        50        60
                                                 ┌────┐                ┌──────┐
                                                 │  1 │                │  2   │
#28_Parent_VH    Q SLEESGGGLVKPGGTLTLTCTVSGFSLNNYDMSWVRQAPGKGLEWIGTVSTTYRRYYA
#28_VH1          Q SL ESGGGLVKP  TL  LTCTVSGFSLNNYDMSWVRQAPGKGLEWIGTVSTTYRRYYA
#28_VH2          Q SL ESG GLVKP  TL  LTCTVSGFSLNNYDMSWVRQAPGKGLEWIGTVSTTYRRYYA
#28_VH3          Q  L ES G LVKP  TL  LTCTVSGFSLNNYDMSWVRQAPGKGLEWIGTVSTTYRRYYA
#28_VH4          Q  L ES G LVKP  TL  LTCTVSGFSLNNYDMSWVRQAPGKGLEWIGTVSTTYRRYYA
#28_VH5          Q  L ES G LVKP  TL  LTCTVSGFSLNNYDMSWVRQAPGKGLEWIGTVSTTYRRYYA
28_VH6          Q  L ES G LVKP  TL  LTCTVSGFSLNNYDMSWVRQAPGKGLEWIGTVSTTYRRYYA 70        80  82ABC     90      95 101      110   113
                 ┌────┐                                  ┌──────┐
                 │  2 │                                  │   3  │
#28_Parent_VH    SWAKGRFTISK TSSTTVDLKMTSLTTEDTATYFCAASGIWGPGTLVTVSL
#28_VH1          SWAKGRFTISK TSSTTVDL MTSLT EDTATYFCAASGIWG GTLVTVS
#28_VH2          SWAKGRFTISK TSSTTVDL MTSLT EDTATYFCAASGIWG GTLVTVS
#28_VH3          SWAKGRFTISK TSSTTVDL MTSLT EDTATYFCAASGIWG GTLVTVS
#28_VH4          SWAKGRFTISK TSSTTVDL MTSLT EDTATYFCAASGIWG GTLVTVS
#28_VH5          SWAKGRFTIS  NS  T DL MTSLT EDTATYFCAASGIWG GTLVTVS
#28_VH6             KGRFTIS  NS  T DL MTSLT EDTATYFCAASGIWG GTLVTVS
```

B
```
                         10        20    27A  30       40        50
                                          ┌──────┐              ┌────┐
                                          │   1  │              │ 2  │
#28_Parent_VK    AQVLTQTTSPVSAAVGGTVTINCQSSQRVYSNYLAWYQQKPGQPPKRLIFLASTLESGVP
#28_VK1          AQVLTQ TSP SA VG  VTI CQSSQRVYSNYLAWYQQKPGQPPKRLIFLASTLESGVP
#28_VK2          AQVLTQ T   SA VG RVTI CQSSQRVYSNYLAWYQQKPGQPPKRLIFLASTLESGVP
#28_VK4             TQ  T   SA VG RVTI CQSSQRVYSNYLAWYQQKPGQPPKRLIFLASTLESGVP
28_VK5             TQ  T   SA VG RVTI CQSSQRV  NYLAWYQQKPGQPPKRLIFLASTLESGVP 60        70        80        90   95A      100   106A
                                                 ┌──────┐
                                                 │   3  │
#28_Parent_VK    SRFSGSGSGTQFTLTISDLECDDAATYYCAGTYTGSIWAFGGGTEVVVK
#28_VK1          SRFSGSGSGT FTLTIS L CDD ATYYCAGTYTGSIWAFGGGTEVV K
#28_VK2          SRFSGSGSGT FTLTIS L  DD ATYYCAGTYTGSIWAFGGGT V  K
#28_VK4          SRFSGSGSGT FTLTIS L  DD ATYYCAGTYTGSIWAFGGGT V  K
#28_VK5          SRFSGSGSGT FTLTIS L  DD ATYYCAGTYTGSIWAFGGGT V  K
```

Fig 25
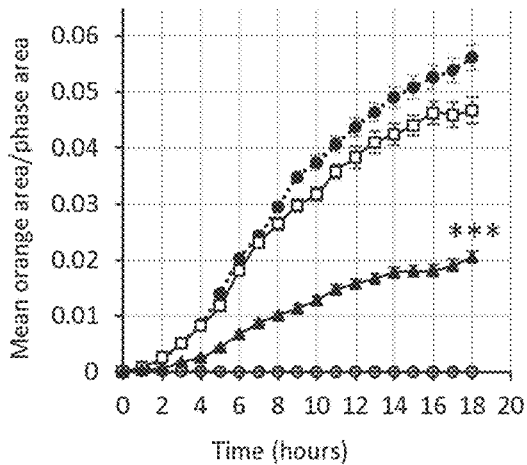
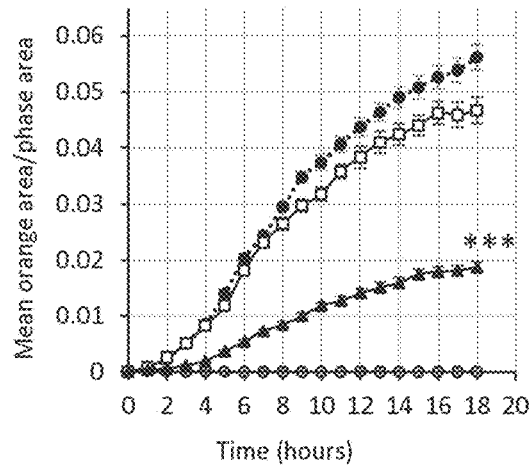
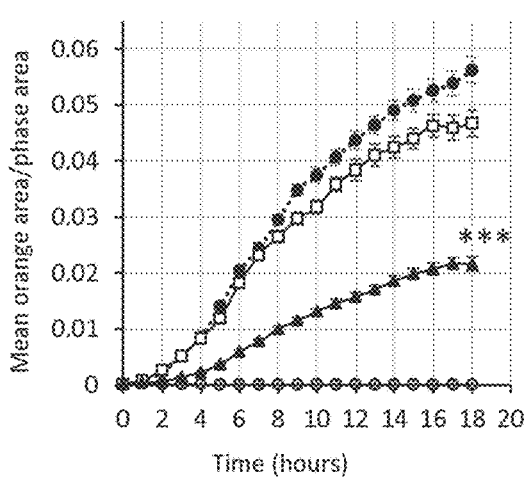
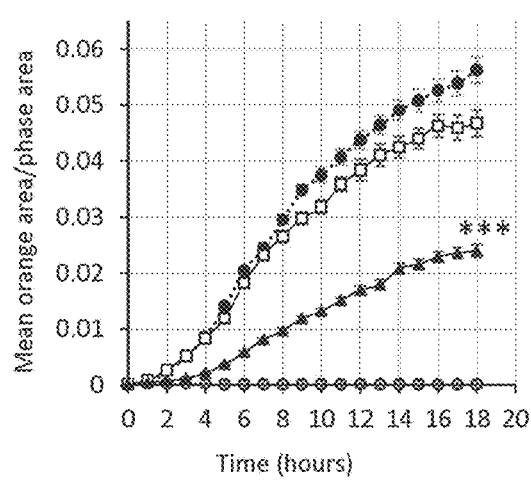
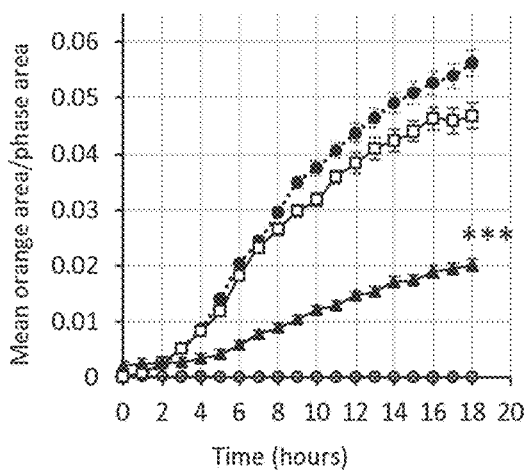
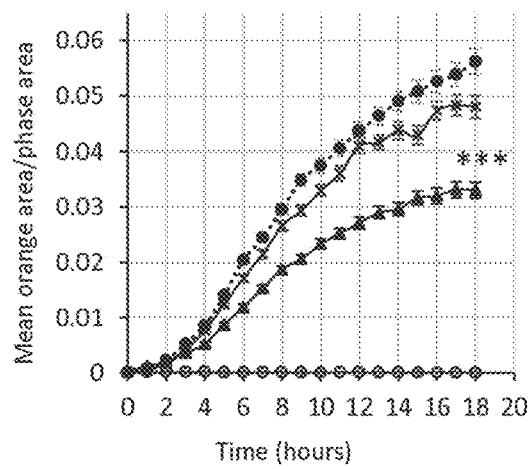

Fig 26
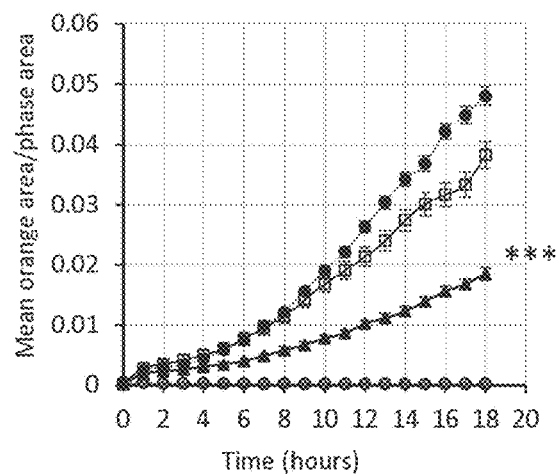
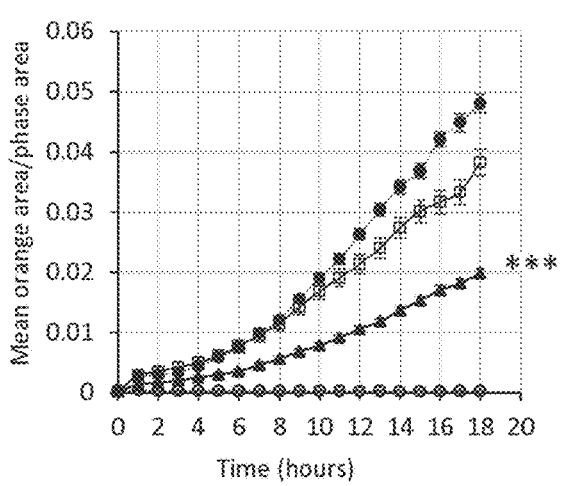
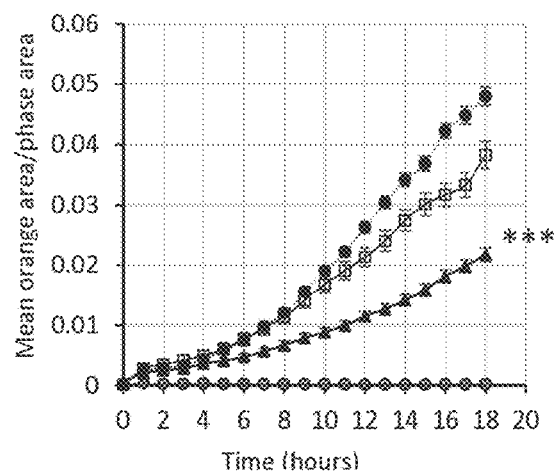
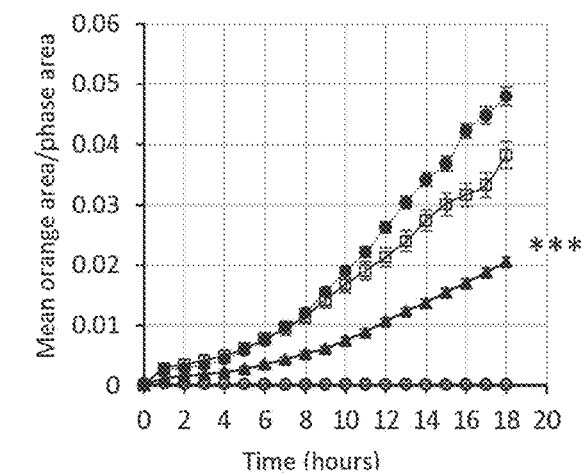
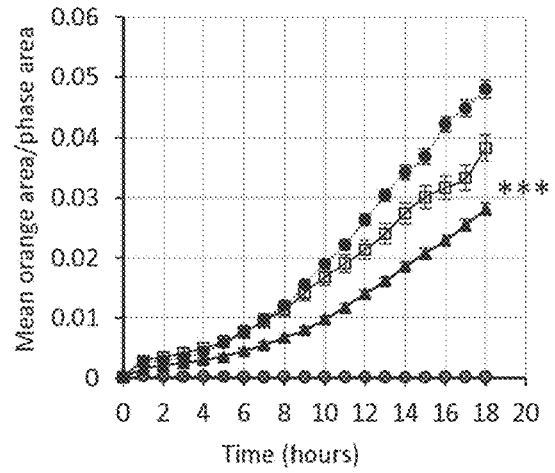
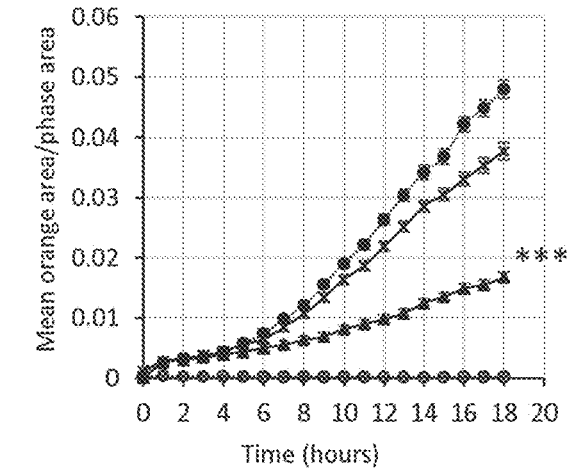

Fig 27
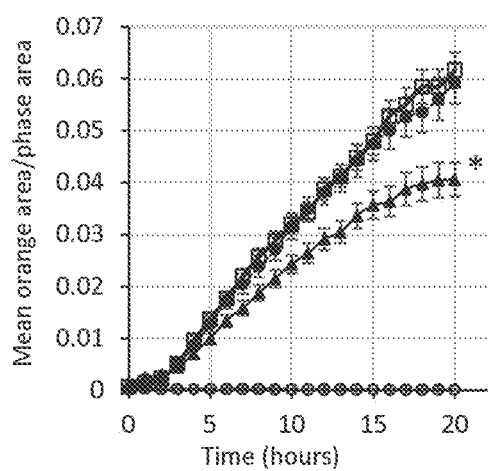
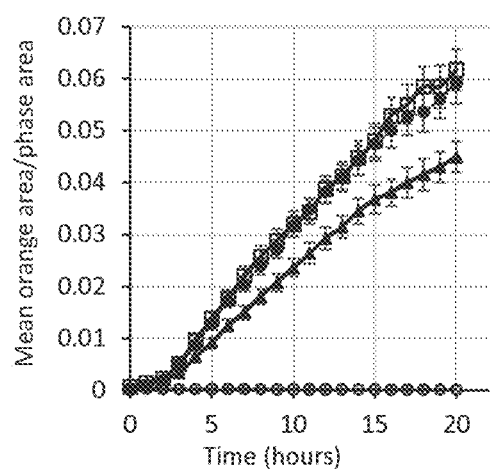
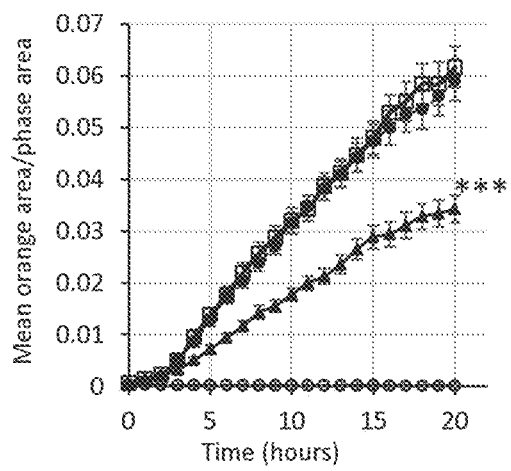
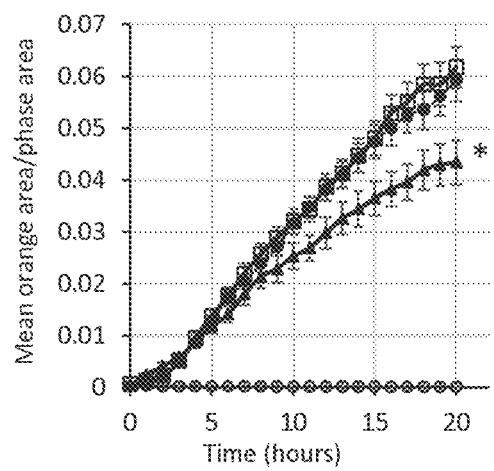
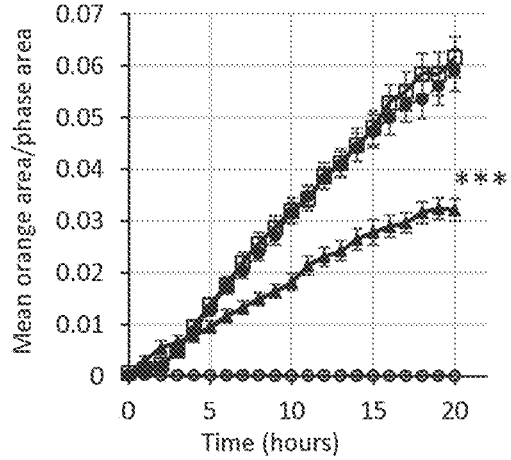

Fig 28
A
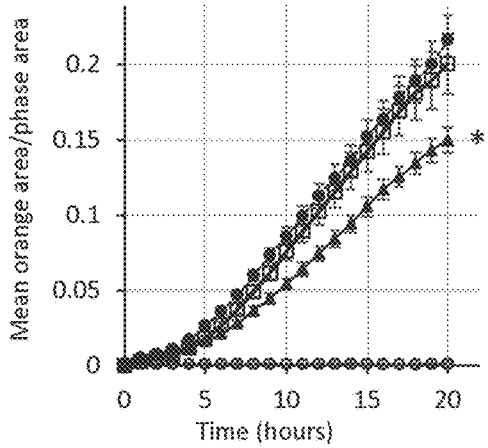
B
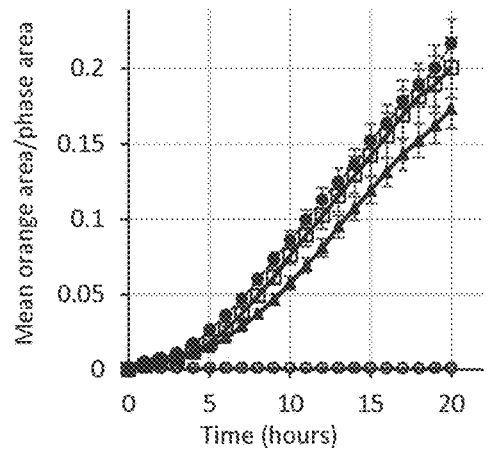
C
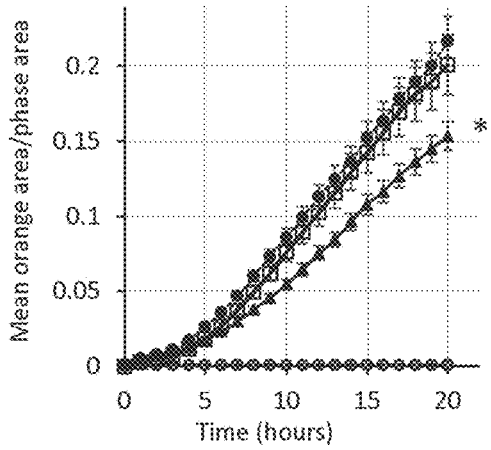
D
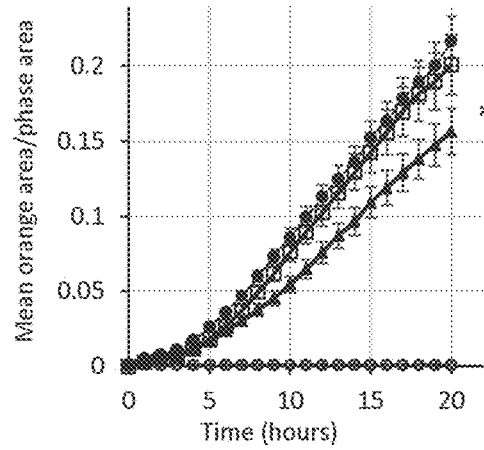
E
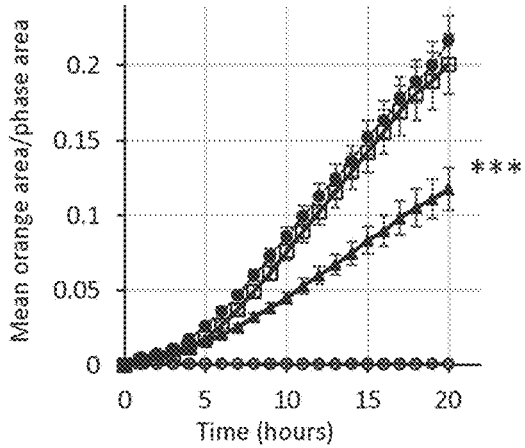

```
SEQUENCE LISTING

<160> NUMBER OF SEQ ID NOS: 136

<210> SEQ ID NO 1
<211> LENGTH: 15
<212> TYPE: PRT
<213> ORGANISM: Artificial Sequence
<220> FEATURE:
<223> OTHER INFORMATION: Residues 396-410 of human tau (Tau1-441)

<400> SEQUENCE: 1

Ser Pro Val Val Ser Gly Asp Thr Ser Pro Arg His Leu Ser Asn
1               5                   10                  15

<210> SEQ ID NO 2
<211> LENGTH: 441
<212> TYPE: PRT
<213> ORGANISM: Homo sapiens

<400> SEQUENCE: 2

Met Ala Glu Pro Arg Gln Glu Phe Glu Val Met Glu Asp His Ala Gly
1               5                   10                  15

Thr Tyr Gly Leu Gly Asp Arg Lys Asp Gln Gly Gly Tyr Thr Met His
                20                  25                  30

Gln Asp Gln Glu Gly Asp Thr Asp Ala Gly Leu Lys Glu Ser Pro Leu
            35                  40                  45

Gln Thr Pro Thr Glu Asp Gly Ser Glu Glu Pro Gly Ser Glu Thr Ser
        50                  55                  60

Asp Ala Lys Ser Thr Pro Thr Ala Glu Asp Val Thr Ala Pro Leu Val
65                  70                  75                  80

Asp Glu Gly Ala Pro Gly Lys Gln Ala Ala Ala Gln Pro His Thr Glu
                85                  90                  95
```

Ile Pro Glu Gly Thr Thr Ala Glu Glu Ala Gly Ile Gly Asp Thr Pro
            100                 105                 110

Ser Leu Glu Asp Glu Ala Ala Gly His Val Thr Gln Ala Arg Met Val
            115                 120                 125

Ser Lys Ser Lys Asp Gly Thr Gly Ser Asp Asp Lys Lys Ala Lys Gly
            130                 135                 140

Ala Asp Gly Lys Thr Lys Ile Ala Thr Pro Arg Gly Ala Ala Pro Pro
145                 150                 155                 160

Gly Gln Lys Gly Gln Ala Asn Ala Thr Arg Ile Pro Ala Lys Thr Pro
                165                 170                 175

Pro Ala Pro Lys Thr Pro Pro Ser Ser Gly Glu Pro Pro Lys Ser Gly
            180                 185                 190

Asp Arg Ser Gly Tyr Ser Ser Pro Gly Ser Pro Gly Thr Pro Gly Ser
            195                 200                 205

Arg Ser Arg Thr Pro Ser Leu Pro Thr Pro Pro Thr Arg Glu Pro Lys
            210                 215                 220

Lys Val Ala Val Val Arg Thr Pro Pro Lys Ser Pro Ser Ser Ala Lys
225                 230                 235                 240

Ser Arg Leu Gln Thr Ala Pro Val Pro Met Pro Asp Leu Lys Asn Val
                245                 250                 255

Lys Ser Lys Ile Gly Ser Thr Glu Asn Leu Lys His Gln Pro Gly Gly
            260                 265                 270

Gly Lys Val Gln Ile Ile Asn Lys Lys Leu Asp Leu Ser Asn Val Gln
            275                 280                 285

Ser Lys Cys Gly Ser Lys Asp Asn Ile Lys His Val Pro Gly Gly Gly
            290                 295                 300

Ser Val Gln Ile Val Tyr Lys Pro Val Asp Leu Ser Lys Val Thr Ser
305                 310                 315                 320

Lys Cys Gly Ser Leu Gly Asn Ile His His Lys Pro Gly Gly Gly Gln
                325                 330                 335

Val Glu Val Lys Ser Glu Lys Leu Asp Phe Lys Asp Arg Val Gln Ser
            340                 345                 350

Lys Ile Gly Ser Leu Asp Asn Ile Thr His Val Pro Gly Gly Gly Asn
            355                 360                 365

Lys Lys Ile Glu Thr His Lys Leu Thr Phe Arg Glu Asn Ala Lys Ala
            370                 375                 380

Lys Thr Asp His Gly Ala Glu Ile Val Tyr Lys Ser Pro Val Val Ser
385                 390                 395                 400

Gly Asp Thr Ser Pro Arg His Leu Ser Asn Val Ser Ser Thr Gly Ser
                405                 410                 415

Ile Asp Met Val Asp Ser Pro Gln Leu Ala Thr Leu Ala Asp Glu Val
            420                 425                 430

Ser Ala Ser Leu Ala Lys Gln Gly Leu
            435                 440

<210> SEQ ID NO 3
<211> LENGTH: 18
<212> TYPE: PRT
<213> ORGANISM: Artificial Sequence
<220> FEATURE:
<223> OTHER INFORMATION: Amino acid residues 6-23 of 2N4R tau sequence
      1-441 (SEQ ID NO: 2)

<400> SEQUENCE: 3

Gln Glu Phe Glu Val Met Glu Asp His Ala Gly Thr Tyr Gly Leu Gly

```
1               5                   10                  15

Asp Arg

<210> SEQ ID NO 4
<211> LENGTH: 10
<212> TYPE: PRT
<213> ORGANISM: Artificial Sequence
<220> FEATURE:
<223> OTHER INFORMATION: Amino acid residues 181-190 of 2N4R tau
      sequence 1-441 (SEQ ID NO: 2)

<400> SEQUENCE: 4

Thr Pro Pro Ser Ser Gly Glu Pro Pro Lys
1               5                   10

<210> SEQ ID NO 5
<211> LENGTH: 15
<212> TYPE: PRT
<213> ORGANISM: Artificial Sequence
<220> FEATURE:
<223> OTHER INFORMATION: Amino acid reidues 195-209 of 2N4R tau sequence
      1-441 (SEQ ID NO: 2)

<400> SEQUENCE: 5

Ser Gly Tyr Ser Ser Pro Gly Ser Pro Gly Thr Pro Gly Ser Arg
1               5                   10                  15

<210> SEQ ID NO 6
<211> LENGTH: 15
<212> TYPE: PRT
<213> ORGANISM: Artificial Sequence
<220> FEATURE:
<223> OTHER INFORMATION: Amino acids 210-224 of full length 2N4R tau
      sequence 1-441 (SEQ ID NO: 2)

<400> SEQUENCE: 6

Ser Arg Thr Pro Ser Leu Pro Thr Pro Pro Thr Arg Glu Pro Lys
1               5                   10                  15

<210> SEQ ID NO 7
<211> LENGTH: 13
<212> TYPE: PRT
<213> ORGANISM: Artificial Sequence
<220> FEATURE:
<223> OTHER INFORMATION: Amino acids 212-224 of full length 2N4R tau
      sequence 1-441 (SEQ ID NO: 2)

<400> SEQUENCE: 7

Thr Pro Ser Leu Pro Thr Pro Pro Thr Arg Glu Pro Lys
1               5                   10

<210> SEQ ID NO 8
<211> LENGTH: 12
<212> TYPE: PRT
<213> ORGANISM: Artificial Sequence
<220> FEATURE:
<223> OTHER INFORMATION: Amino acids 243-254 of full length 2N4R tau
      1-441 sequence (SEQ ID NO: 2)

<400> SEQUENCE: 8

Leu Gln Thr Ala Pro Val Pro Met Pro Asp Leu Lys
1               5                   10

<210> SEQ ID NO 9
<211> LENGTH: 8
<212> TYPE: PRT
<213> ORGANISM: Artificial Sequence
```

```
<220> FEATURE:
<223> OTHER INFORMATION: Amino acids 260-267 of the full length 2N4R tau
      sequence 1-441 (SEQ ID NO: 2)

<400> SEQUENCE: 9

Ile Gly Ser Thr Glu Asn Leu Lys
1               5

<210> SEQ ID NO 10
<211> LENGTH: 12
<212> TYPE: PRT
<213> ORGANISM: Artificial Sequence
<220> FEATURE:
<223> OTHER INFORMATION: Amino acids 306-317 of full length 2N4R tau
      sequence 1-441 (SEQ ID NO: 2)

<400> SEQUENCE: 10

Val Gln Ile Val Tyr Lys Pro Val Asp Leu Ser Lys
1               5                   10

<210> SEQ ID NO 11
<211> LENGTH: 16
<212> TYPE: PRT
<213> ORGANISM: Artificial Sequence
<220> FEATURE:
<223> OTHER INFORMATION: Amino acids 354-369 of the full length 2N4R tau
      sequence (SEQ ID NO: 2)

<400> SEQUENCE: 11

Ile Gly Ser Leu Asp Asn Ile Thr His Val Pro Gly Gly Gly Asn Lys
1               5                   10                  15

<210> SEQ ID NO 12
<211> LENGTH: 11
<212> TYPE: PRT
<213> ORGANISM: Artificial Sequence
<220> FEATURE:
<223> OTHER INFORMATION: Amino acids 396-406 of the full length 2N4R tau
      sequence 1-441 (SEQ ID NO: 2)

<400> SEQUENCE: 12

Ser Pro Val Val Ser Gly Asp Thr Ser Pro Arg
1               5                   10

<210> SEQ ID NO 13
<211> LENGTH: 16
<212> TYPE: PRT
<213> ORGANISM: Artificial Sequence
<220> FEATURE:
<223> OTHER INFORMATION: Amino acids 396-410 of the full length 2N4R tau
      sequence (SEQ ID NO: 2), with N-terminal cysteine.

<400> SEQUENCE: 13

Cys Ser Pro Val Val Ser Gly Asp Thr Ser Pro Arg His Leu Ser Asn
1               5                   10                  15

<210> SEQ ID NO 14
<211> LENGTH: 5
<212> TYPE: PRT
<213> ORGANISM: Artificial Sequence
<220> FEATURE:
<223> OTHER INFORMATION: Clone 1 HCDR1

<400> SEQUENCE: 14

Asn Tyr Asp Met Ser
1               5
```

```
<210> SEQ ID NO 15
<211> LENGTH: 16
<212> TYPE: PRT
<213> ORGANISM: Artificial Sequence
<220> FEATURE:
<223> OTHER INFORMATION: Clone 1 HCDR2

<400> SEQUENCE: 15

Thr Val Ser Thr Thr Tyr Arg Arg Tyr Tyr Ala Ser Trp Ala Lys Gly
1               5                   10                  15

<210> SEQ ID NO 16
<211> LENGTH: 3
<212> TYPE: PRT
<213> ORGANISM: Artificial Sequence
<220> FEATURE:
<223> OTHER INFORMATION: Clone 1 HCDR3

<400> SEQUENCE: 16

Ser Gly Ile
1

<210> SEQ ID NO 17
<211> LENGTH: 12
<212> TYPE: PRT
<213> ORGANISM: Artificial Sequence
<220> FEATURE:
<223> OTHER INFORMATION: Clone 1 LCDR1

<400> SEQUENCE: 17

Gln Ser Ser Gln Arg Val Tyr Ser Asn Tyr Leu Ala
1               5                   10

<210> SEQ ID NO 18
<211> LENGTH: 7
<212> TYPE: PRT
<213> ORGANISM: Artificial Sequence
<220> FEATURE:
<223> OTHER INFORMATION: Clone 1 LCDR2

<400> SEQUENCE: 18

Leu Ala Ser Thr Leu Glu Ser
1               5

<210> SEQ ID NO 19
<211> LENGTH: 10
<212> TYPE: PRT
<213> ORGANISM: Artificial Sequence
<220> FEATURE:
<223> OTHER INFORMATION: Clone 1 LCDR3

<400> SEQUENCE: 19

Ala Gly Thr Tyr Thr Gly Ser Ile Trp Ala
1               5                   10

<210> SEQ ID NO 20
<211> LENGTH: 5
<212> TYPE: PRT
<213> ORGANISM: Artificial Sequence
<220> FEATURE:
<223> OTHER INFORMATION: Clone 2 HCDR1

<400> SEQUENCE: 20

Asn Tyr Asp Met Ser
1               5

<210> SEQ ID NO 21
```

```
<211> LENGTH: 16
<212> TYPE: PRT
<213> ORGANISM: Artificial Sequence
<220> FEATURE:
<223> OTHER INFORMATION: Clone 2 HCDR2

<400> SEQUENCE: 21

Thr Val Ser Thr Thr Tyr Arg Arg Tyr Tyr Ala Ser Trp Ala Lys Gly
1               5                   10                  15

<210> SEQ ID NO 22
<211> LENGTH: 3
<212> TYPE: PRT
<213> ORGANISM: Artificial Sequence
<220> FEATURE:
<223> OTHER INFORMATION: Clone 2 HCDR3

<400> SEQUENCE: 22

Ser Gly Ile
1

<210> SEQ ID NO 23
<211> LENGTH: 12
<212> TYPE: PRT
<213> ORGANISM: Artificial Sequence
<220> FEATURE:
<223> OTHER INFORMATION: Clone 2 LCDR1

<400> SEQUENCE: 23

Gln Ser Ser Gln Arg Val Tyr Ser Asn Tyr Leu Ala
1               5                   10

<210> SEQ ID NO 24
<211> LENGTH: 7
<212> TYPE: PRT
<213> ORGANISM: Artificial Sequence
<220> FEATURE:
<223> OTHER INFORMATION: Clone 2 LCDR2

<400> SEQUENCE: 24

Leu Ala Ser Thr Leu Glu Ser
1               5

<210> SEQ ID NO 25
<211> LENGTH: 10
<212> TYPE: PRT
<213> ORGANISM: Artificial Sequence
<220> FEATURE:
<223> OTHER INFORMATION: Clone 2 LCDR3

<400> SEQUENCE: 25

Ala Gly Thr Tyr Thr Gly Ser Ile Trp Ala
1               5                   10

<210> SEQ ID NO 26
<211> LENGTH: 5
<212> TYPE: PRT
<213> ORGANISM: Artificial Sequence
<220> FEATURE:
<223> OTHER INFORMATION: Clone 3 HCDR1

<400> SEQUENCE: 26

Arg Tyr Asp Met Ser
1               5

<210> SEQ ID NO 27
<211> LENGTH: 16
```

```
<212> TYPE: PRT
<213> ORGANISM: Artificial Sequence
<220> FEATURE:
<223> OTHER INFORMATION: Clone 3 HCDR2

<400> SEQUENCE: 27

Thr Ile Ser Gly Ser Tyr Asn Thr Tyr Tyr Met Ser Trp Ala Lys Gly
1               5                   10                  15

<210> SEQ ID NO 28
<211> LENGTH: 3
<212> TYPE: PRT
<213> ORGANISM: Artificial Sequence
<220> FEATURE:
<223> OTHER INFORMATION: Clone 3 HCDR3

<400> SEQUENCE: 28

Ser Gly Ile
1

<210> SEQ ID NO 29
<211> LENGTH: 12
<212> TYPE: PRT
<213> ORGANISM: Artificial Sequence
<220> FEATURE:
<223> OTHER INFORMATION: Clone 3 LCDR1

<400> SEQUENCE: 29

Gln Ser Ser Gln Arg Val Tyr Ser Asn Tyr Leu Ser
1               5                   10

<210> SEQ ID NO 30
<211> LENGTH: 7
<212> TYPE: PRT
<213> ORGANISM: Artificial Sequence
<220> FEATURE:
<223> OTHER INFORMATION: Clone 3 LCDR2

<400> SEQUENCE: 30

Leu Ala Ser Thr Leu Glu Ser
1               5

<210> SEQ ID NO 31
<211> LENGTH: 10
<212> TYPE: PRT
<213> ORGANISM: Artificial Sequence
<220> FEATURE:
<223> OTHER INFORMATION: Clone 3 LCDR3

<400> SEQUENCE: 31

Ala Gly Thr Tyr Ser Gly Ser Ile Trp Ala
1               5                   10

<210> SEQ ID NO 32
<211> LENGTH: 5
<212> TYPE: PRT
<213> ORGANISM: Artificial Sequence
<220> FEATURE:
<223> OTHER INFORMATION: Clone 4 HCDR1

<400> SEQUENCE: 32

Ser Tyr Asp Met Ser
1               5

<210> SEQ ID NO 33
<211> LENGTH: 16
<212> TYPE: PRT
```

```
<213> ORGANISM: Artificial Sequence
<220> FEATURE:
<223> OTHER INFORMATION: Clone 4 HCDR2

<400> SEQUENCE: 33

Thr Ile Gly Arg Tyr Tyr Asn Thr Tyr Tyr Ala Thr Trp Ala Lys Gly
1               5                   10                  15

<210> SEQ ID NO 34
<211> LENGTH: 3
<212> TYPE: PRT
<213> ORGANISM: Artificial Sequence
<220> FEATURE:
<223> OTHER INFORMATION: Clone 4 HCDR3

<400> SEQUENCE: 34

Ser Gly Ile
1

<210> SEQ ID NO 35
<211> LENGTH: 13
<212> TYPE: PRT
<213> ORGANISM: Artificial Sequence
<220> FEATURE:
<223> OTHER INFORMATION: Clone 4 LCDR1

<400> SEQUENCE: 35

Gln Ser Ser Gln Thr Val Tyr Asn Asn Asn Tyr Leu Ser
1               5                   10

<210> SEQ ID NO 36
<211> LENGTH: 7
<212> TYPE: PRT
<213> ORGANISM: Artificial Sequence
<220> FEATURE:
<223> OTHER INFORMATION: Clone 4 LCDR2

<400> SEQUENCE: 36

Leu Ala Ser Thr Leu Glu Ser
1               5

<210> SEQ ID NO 37
<211> LENGTH: 10
<212> TYPE: PRT
<213> ORGANISM: Artificial Sequence
<220> FEATURE:
<223> OTHER INFORMATION: Clone 4 LCDR3

<400> SEQUENCE: 37

Ala Gly Thr Tyr Ser Gly Ser Ile Trp Ala
1               5                   10

<210> SEQ ID NO 38
<211> LENGTH: 5
<212> TYPE: PRT
<213> ORGANISM: Artificial Sequence
<220> FEATURE:
<223> OTHER INFORMATION: Clone 5 HCDR1

<400> SEQUENCE: 38

Ser Tyr Asp Met Ser
1               5

<210> SEQ ID NO 39
<211> LENGTH: 16
<212> TYPE: PRT
<213> ORGANISM: Artificial Sequence
```

```
<220> FEATURE:
<223> OTHER INFORMATION: Clone 5 HCDR2

<400> SEQUENCE: 39

Thr Ile Ser Ser Ser Tyr Arg Thr Tyr Tyr Ala Ser Trp Ala Lys Gly
1               5                   10                  15

<210> SEQ ID NO 40
<211> LENGTH: 3
<212> TYPE: PRT
<213> ORGANISM: Artificial Sequence
<220> FEATURE:
<223> OTHER INFORMATION: Clone 5 HCDR3

<400> SEQUENCE: 40

Ser Gly Ile
1

<210> SEQ ID NO 41
<211> LENGTH: 12
<212> TYPE: PRT
<213> ORGANISM: Artificial Sequence
<220> FEATURE:
<223> OTHER INFORMATION: Clone 5 LCDR1

<400> SEQUENCE: 41

Gln Ser Ser Gln Arg Val Tyr Asn Asn Tyr Leu Ala
1               5                   10

<210> SEQ ID NO 42
<211> LENGTH: 7
<212> TYPE: PRT
<213> ORGANISM: Artificial Sequence
<220> FEATURE:
<223> OTHER INFORMATION: Clone 5 LCDR2

<400> SEQUENCE: 42

Leu Ala Ser Thr Leu Glu Ser
1               5

<210> SEQ ID NO 43
<211> LENGTH: 10
<212> TYPE: PRT
<213> ORGANISM: Artificial Sequence
<220> FEATURE:
<223> OTHER INFORMATION: Clone 5 LCDR3

<400> SEQUENCE: 43

Ala Gly Thr Tyr Ser Gly Ser Ile Trp Ala
1               5                   10

<210> SEQ ID NO 44
<211> LENGTH: 5
<212> TYPE: PRT
<213> ORGANISM: Artificial Sequence
<220> FEATURE:
<223> OTHER INFORMATION: Clone 6 HCDR1

<400> SEQUENCE: 44

Ser Tyr Asp Met Ser
1               5

<210> SEQ ID NO 45
<211> LENGTH: 16
<212> TYPE: PRT
<213> ORGANISM: Artificial Sequence
<220> FEATURE:
```

```
<223> OTHER INFORMATION: Clone 6 HCDR2

<400> SEQUENCE: 45

Thr Ile Gly Arg Tyr Tyr Asn Thr Tyr Tyr Ala Thr Trp Ala Lys Gly
1               5                   10                  15

<210> SEQ ID NO 46
<211> LENGTH: 3
<212> TYPE: PRT
<213> ORGANISM: Artificial Sequence
<220> FEATURE:
<223> OTHER INFORMATION: Clone 6 HCDR3

<400> SEQUENCE: 46

Ser Gly Ile
1

<210> SEQ ID NO 47
<211> LENGTH: 13
<212> TYPE: PRT
<213> ORGANISM: Artificial Sequence
<220> FEATURE:
<223> OTHER INFORMATION: Clone 6 LCDR1

<400> SEQUENCE: 47

Gln Ser Ser Gln Thr Val Tyr Asn Asn Asn Tyr Leu Ser
1               5                   10

<210> SEQ ID NO 48
<211> LENGTH: 7
<212> TYPE: PRT
<213> ORGANISM: Artificial Sequence
<220> FEATURE:
<223> OTHER INFORMATION: Clone 6 LCDR2

<400> SEQUENCE: 48

Leu Ala Ser Thr Leu Glu Ser
1               5

<210> SEQ ID NO 49
<211> LENGTH: 10
<212> TYPE: PRT
<213> ORGANISM: Artificial Sequence
<220> FEATURE:
<223> OTHER INFORMATION: Clone 6 LCDR3

<400> SEQUENCE: 49

Ala Gly Thr Tyr Ser Gly Ser Ile Trp Ala
1               5                   10

<210> SEQ ID NO 50
<211> LENGTH: 5
<212> TYPE: PRT
<213> ORGANISM: Artificial Sequence
<220> FEATURE:
<223> OTHER INFORMATION: Clone 7 HCDR1

<400> SEQUENCE: 50

Ser Tyr Asp Met Ser
1               5

<210> SEQ ID NO 51
<211> LENGTH: 16
<212> TYPE: PRT
<213> ORGANISM: Artificial Sequence
<220> FEATURE:
<223> OTHER INFORMATION: Clone 7 HDR2
```

```
<400> SEQUENCE: 51

Thr Ile Gly Arg Tyr Tyr Asn Thr Tyr Tyr Ala Thr Trp Ala Lys Gly
1               5                   10                  15

<210> SEQ ID NO 52
<211> LENGTH: 3
<212> TYPE: PRT
<213> ORGANISM: Artificial Sequence
<220> FEATURE:
<223> OTHER INFORMATION: Clone 7 HCDR3

<400> SEQUENCE: 52

Ser Gly Ile
1

<210> SEQ ID NO 53
<211> LENGTH: 13
<212> TYPE: PRT
<213> ORGANISM: Artificial Sequence
<220> FEATURE:
<223> OTHER INFORMATION: Clone 7 LCDR1

<400> SEQUENCE: 53

Gln Ser Ser Gln Thr Val Tyr Asn Asn Asn Tyr Leu Ser
1               5                   10

<210> SEQ ID NO 54
<211> LENGTH: 7
<212> TYPE: PRT
<213> ORGANISM: Artificial Sequence
<220> FEATURE:
<223> OTHER INFORMATION: Clone 7 LCDR2

<400> SEQUENCE: 54

Leu Ala Ser Thr Leu Glu Ser
1               5

<210> SEQ ID NO 55
<211> LENGTH: 10
<212> TYPE: PRT
<213> ORGANISM: Artificial Sequence
<220> FEATURE:
<223> OTHER INFORMATION: Clone 7 LCDR3

<400> SEQUENCE: 55

Ala Gly Thr Tyr Ser Gly Ser Ile Trp Ala
1               5                   10

<210> SEQ ID NO 56
<211> LENGTH: 5
<212> TYPE: PRT
<213> ORGANISM: Artificial Sequence
<220> FEATURE:
<223> OTHER INFORMATION: Clone 8 HCDR1

<400> SEQUENCE: 56

Ser Tyr Asp Met Ser
1               5

<210> SEQ ID NO 57
<211> LENGTH: 16
<212> TYPE: PRT
<213> ORGANISM: Artificial Sequence
<220> FEATURE:
<223> OTHER INFORMATION: Clone 8 HCDR2
```

<400> SEQUENCE: 57

Thr Ile Ser Ser Ser Tyr Arg Thr Tyr Tyr Ala Ser Trp Ala Lys Gly
1               5                   10                  15

<210> SEQ ID NO 58
<211> LENGTH: 3
<212> TYPE: PRT
<213> ORGANISM: Artificial Sequence
<220> FEATURE:
<223> OTHER INFORMATION: Clone 8 HCDR3

<400> SEQUENCE: 58

Ser Gly Ile
1

<210> SEQ ID NO 59
<211> LENGTH: 12
<212> TYPE: PRT
<213> ORGANISM: Artificial Sequence
<220> FEATURE:
<223> OTHER INFORMATION: Clone 8 LCDR1

<400> SEQUENCE: 59

Gln Ser Ser Gln Arg Val Tyr Asn Asn Tyr Leu Ala
1               5                   10

<210> SEQ ID NO 60
<211> LENGTH: 7
<212> TYPE: PRT
<213> ORGANISM: Artificial Sequence
<220> FEATURE:
<223> OTHER INFORMATION: Clone 8 LCDR2

<400> SEQUENCE: 60

Leu Ala Ser Thr Leu Glu Ser
1               5

<210> SEQ ID NO 61
<211> LENGTH: 10
<212> TYPE: PRT
<213> ORGANISM: Artificial Sequence
<220> FEATURE:
<223> OTHER INFORMATION: Clone 8 LCDR3

<400> SEQUENCE: 61

Ala Gly Thr Tyr Ser Gly Ser Ile Trp Ala
1               5                   10

<210> SEQ ID NO 62
<211> LENGTH: 5
<212> TYPE: PRT
<213> ORGANISM: Artificial Sequence
<220> FEATURE:
<223> OTHER INFORMATION: Clone 9 HCDR1

<400> SEQUENCE: 62

Asp Tyr Gly Ile His
1               5

<210> SEQ ID NO 63
<211> LENGTH: 17
<212> TYPE: PRT
<213> ORGANISM: Artificial Sequence
<220> FEATURE:
<223> OTHER INFORMATION: Clone 9 HCDR2

<400> SEQUENCE: 63

Val Ile Ser His Asp Gly Ser His Lys Tyr Tyr Ser Asp Ser Val Lys
1               5                   10                  15

Gly

<210> SEQ ID NO 64
<211> LENGTH: 12
<212> TYPE: PRT
<213> ORGANISM: Artificial Sequence
<220> FEATURE:
<223> OTHER INFORMATION: Clone 9 HCDR3

<400> SEQUENCE: 64

Ala Lys Asp Leu Pro Gln Thr Gly Ala Leu Asp Phe
1               5                   10

<210> SEQ ID NO 65
<211> LENGTH: 11
<212> TYPE: PRT
<213> ORGANISM: Artificial Sequence
<220> FEATURE:
<223> OTHER INFORMATION: Clone 9 LCDR1

<400> SEQUENCE: 65

Gln Ala Ser Gln Asp Ile Ser Asn Tyr Leu Asn
1               5                   10

<210> SEQ ID NO 66
<211> LENGTH: 7
<212> TYPE: PRT
<213> ORGANISM: Artificial Sequence
<220> FEATURE:
<223> OTHER INFORMATION: Clone 9 LCDR2

<400> SEQUENCE: 66

Asp Ala Ser Asn Leu Glu Thr
1               5

<210> SEQ ID NO 67
<211> LENGTH: 9
<212> TYPE: PRT
<213> ORGANISM: Artificial Sequence
<220> FEATURE:
<223> OTHER INFORMATION: Clone 9 LCDR3

<400> SEQUENCE: 67

Gln Gln Ala Asn Ser Phe Pro Ile Thr
1               5

<210> SEQ ID NO 68
<211> LENGTH: 5
<212> TYPE: PRT
<213> ORGANISM: Artificial Sequence
<220> FEATURE:
<223> OTHER INFORMATION: Clone 10 HCDR1

<400> SEQUENCE: 68

Gly Tyr Tyr Met His
1               5

<210> SEQ ID NO 69
<211> LENGTH: 17
<212> TYPE: PRT
<213> ORGANISM: Artificial Sequence
<220> FEATURE:
<223> OTHER INFORMATION: Clone 10 HCDR2

<400> SEQUENCE: 69

Trp Ile Asn Pro Asn Ser Gly Gly Thr Asn Tyr Ala Gln Lys Phe Gln
1               5                   10                  15
Gly

<210> SEQ ID NO 70
<211> LENGTH: 7
<212> TYPE: PRT
<213> ORGANISM: Artificial Sequence
<220> FEATURE:
<223> OTHER INFORMATION: Clone 10 HCDR3

<400> SEQUENCE: 70

Ala Thr Glu Ser Leu Asp Tyr
1               5

<210> SEQ ID NO 71
<211> LENGTH: 11
<212> TYPE: PRT
<213> ORGANISM: Artificial Sequence
<220> FEATURE:
<223> OTHER INFORMATION: Clone 10 LCDR1

<400> SEQUENCE: 71

Gln Ala Ser Gln Asp Ile Ser Asn Tyr Leu Asn
1               5                   10

<210> SEQ ID NO 72
<211> LENGTH: 7
<212> TYPE: PRT
<213> ORGANISM: Artificial Sequence
<220> FEATURE:
<223> OTHER INFORMATION: Clone 10 LCDR2

<400> SEQUENCE: 72

Asp Ala Ser Asn Leu Glu Thr
1               5

<210> SEQ ID NO 73
<211> LENGTH: 9
<212> TYPE: PRT
<213> ORGANISM: Artificial Sequence
<220> FEATURE:
<223> OTHER INFORMATION: Clone 10 LCDR3

<400> SEQUENCE: 73

Gln Gln Tyr Asp Asn Leu Pro Leu Thr
1               5

<210> SEQ ID NO 74
<211> LENGTH: 5
<212> TYPE: PRT
<213> ORGANISM: Artificial Sequence
<220> FEATURE:
<223> OTHER INFORMATION: Clone 11 HCDR1

<400> SEQUENCE: 74

Asp Tyr Tyr Trp Thr
1               5

<210> SEQ ID NO 75
<211> LENGTH: 16
<212> TYPE: PRT
<213> ORGANISM: Artificial Sequence
<220> FEATURE:
<223> OTHER INFORMATION: Clone 11 HCDR2

```
<400> SEQUENCE: 75

Glu Ile Asn His Val Gly Ser Ser Arg Tyr Asn Pro Ser Leu Gly Ser
1               5                   10                  15

<210> SEQ ID NO 76
<211> LENGTH: 22
<212> TYPE: PRT
<213> ORGANISM: Artificial Sequence
<220> FEATURE:
<223> OTHER INFORMATION: Clone 11 HCDR3

<400> SEQUENCE: 76

Thr Arg Gly Arg Lys Thr Arg Arg Val Lys Phe Phe Ser Arg Tyr Ser
1               5                   10                  15

Arg Asp Trp Phe Asp Pro
            20

<210> SEQ ID NO 77
<211> LENGTH: 11
<212> TYPE: PRT
<213> ORGANISM: Artificial Sequence
<220> FEATURE:
<223> OTHER INFORMATION: Clone 11 LCDR1

<400> SEQUENCE: 77

Arg Ala Ser Gln Ser Val Ser Ser Asn Leu Ala
1               5                   10

<210> SEQ ID NO 78
<211> LENGTH: 7
<212> TYPE: PRT
<213> ORGANISM: Artificial Sequence
<220> FEATURE:
<223> OTHER INFORMATION: Clone 11 LCDR2

<400> SEQUENCE: 78

Gly Ala Ser Ser Arg Ala Thr
1               5

<210> SEQ ID NO 79
<211> LENGTH: 9
<212> TYPE: PRT
<213> ORGANISM: Artificial Sequence
<220> FEATURE:
<223> OTHER INFORMATION: Clone 11 LCDR3

<400> SEQUENCE: 79

Gln Gln Leu Asn Ser Tyr Pro Phe Thr
1               5

<210> SEQ ID NO 80
<211> LENGTH: 5
<212> TYPE: PRT
<213> ORGANISM: Artificial Sequence
<220> FEATURE:
<223> OTHER INFORMATION: Clone 12 HCDR1

<400> SEQUENCE: 80

Asp Tyr Tyr Trp Thr
1               5

<210> SEQ ID NO 81
<211> LENGTH: 16
<212> TYPE: PRT
<213> ORGANISM: Artificial Sequence
```

```
<220> FEATURE:
<223> OTHER INFORMATION: Clone 12 HCDR2

<400> SEQUENCE: 81

Glu Ile Asn His Val Gly Ser Ser Arg Tyr Asn Pro Ser Leu Gly Ser
1               5                   10                  15

<210> SEQ ID NO 82
<211> LENGTH: 22
<212> TYPE: PRT
<213> ORGANISM: Artificial Sequence
<220> FEATURE:
<223> OTHER INFORMATION: Clone 12 HCDR3

<400> SEQUENCE: 82

Thr Arg Gly Arg Lys Thr Arg Arg Val Lys Phe Phe Ser Arg Tyr Ser
1               5                   10                  15

Arg Asp Trp Phe Asp Pro
            20

<210> SEQ ID NO 83
<211> LENGTH: 11
<212> TYPE: PRT
<213> ORGANISM: Artificial Sequence
<220> FEATURE:
<223> OTHER INFORMATION: Clone 12 LCDR1

<400> SEQUENCE: 83

Arg Ala Ser Gln Gly Ile Ser Asn Tyr Leu Ala
1               5                   10

<210> SEQ ID NO 84
<211> LENGTH: 7
<212> TYPE: PRT
<213> ORGANISM: Artificial Sequence
<220> FEATURE:
<223> OTHER INFORMATION: Clone 12 LCDR2

<400> SEQUENCE: 84

Ala Ala Ser Thr Leu Gln Ser
1               5

<210> SEQ ID NO 85
<211> LENGTH: 9
<212> TYPE: PRT
<213> ORGANISM: Artificial Sequence
<220> FEATURE:
<223> OTHER INFORMATION: Clone 12 LCDR3

<400> SEQUENCE: 85

Gln Lys Tyr Asn Ser Ala Pro Phe Thr
1               5

<210> SEQ ID NO 86
<211> LENGTH: 5
<212> TYPE: PRT
<213> ORGANISM: Artificial Sequence
<220> FEATURE:
<223> OTHER INFORMATION: Clone 13 HCDR1

<400> SEQUENCE: 86

Lys Tyr Ala Met Ser
1               5

<210> SEQ ID NO 87
<211> LENGTH: 17
```

```
<212> TYPE: PRT
<213> ORGANISM: Artificial Sequence
<220> FEATURE:
<223> OTHER INFORMATION: Clone 13 HCDR2

<400> SEQUENCE: 87

Gly Asn Ser Gly Ser Gly Asn Ser Thr Tyr Tyr Ala Asp Ser Val Lys
1               5                   10                  15

Gly

<210> SEQ ID NO 88
<211> LENGTH: 16
<212> TYPE: PRT
<213> ORGANISM: Artificial Sequence
<220> FEATURE:
<223> OTHER INFORMATION: Clone 13 HCDR3

<400> SEQUENCE: 88

Ala Lys Thr Arg Gly Ala Gly Arg Arg Lys Pro Tyr Gly Met Asp Val
1               5                   10                  15

<210> SEQ ID NO 89
<211> LENGTH: 12
<212> TYPE: PRT
<213> ORGANISM: Artificial Sequence
<220> FEATURE:
<223> OTHER INFORMATION: Clone 13 LCDR1

<400> SEQUENCE: 89

Arg Ala Ser Gln Ser Val Ala Asn Asn Tyr Leu Ala
1               5                   10

<210> SEQ ID NO 90
<211> LENGTH: 7
<212> TYPE: PRT
<213> ORGANISM: Artificial Sequence
<220> FEATURE:
<223> OTHER INFORMATION: Clone 13 LCDR2

<400> SEQUENCE: 90

Gly Ala Ser Ser Arg Ala Thr
1               5

<210> SEQ ID NO 91
<211> LENGTH: 9
<212> TYPE: PRT
<213> ORGANISM: Artificial Sequence
<220> FEATURE:
<223> OTHER INFORMATION: Clone 15 LCDR3

<400> SEQUENCE: 91

Gln Gln Tyr Gly Ser Ser Pro Arg Thr
1               5

<210> SEQ ID NO 92
<211> LENGTH: 132
<212> TYPE: PRT
<213> ORGANISM: Artificial Sequence
<220> FEATURE:
<223> OTHER INFORMATION: Clone 1 VH sequence

<400> SEQUENCE: 92

Leu Lys Gly Val Gln Cys Gln Ser Leu Glu Glu Ser Gly Gly Gly Leu
1               5                   10                  15

Val Lys Pro Gly Gly Thr Leu Thr Leu Thr Cys Thr Val Ser Gly Phe
            20                  25                  30
```

```
Ser Leu Asn Asn Tyr Asp Met Ser Trp Val Arg Gln Ala Pro Gly Lys
        35                  40                  45

Gly Leu Glu Trp Ile Gly Thr Val Ser Thr Thr Tyr Arg Arg Tyr Tyr
 50                  55                  60

Ala Ser Trp Ala Lys Gly Arg Phe Thr Ile Ser Lys Thr Ser Ser Thr
 65                  70                  75                  80

Thr Val Asp Leu Lys Met Thr Ser Leu Thr Thr Glu Asp Thr Ala Thr
                 85                  90                  95

Tyr Phe Cys Ala Ala Ser Gly Ile Trp Gly Pro Gly Thr Leu Val Thr
                100                 105                 110

Val Ser Leu Gly Gln Pro Lys Ala Pro Ser Val Phe Pro Leu Ala Pro
            115                 120                 125

Cys Cys Gly Asp
        130

<210> SEQ ID NO 93
<211> LENGTH: 122
<212> TYPE: PRT
<213> ORGANISM: Artificial Sequence
<220> FEATURE:
<223> OTHER INFORMATION: Clone 1 VL sequence

<400> SEQUENCE: 93

Trp Leu Pro Gly Ala Thr Phe Ala Gln Val Leu Thr Gln Thr Thr Ser
  1               5                  10                  15

Pro Val Ser Ala Ala Val Gly Gly Thr Val Thr Ile Asn Cys Gln Ser
             20                  25                  30

Ser Gln Arg Val Tyr Ser Asn Tyr Leu Ala Trp Tyr Gln Gln Lys Pro
        35                  40                  45

Gly Gln Pro Pro Lys Arg Leu Ile Phe Leu Ala Ser Thr Leu Glu Ser
 50                  55                  60

Gly Val Pro Ser Arg Phe Ser Gly Ser Gly Thr Gln Phe Thr
 65                  70                  75                  80

Leu Thr Ile Ser Asp Leu Glu Cys Asp Asp Ala Ala Thr Tyr Tyr Cys
                 85                  90                  95

Ala Gly Thr Tyr Thr Gly Ser Ile Trp Ala Phe Gly Gly Thr Glu
                100                 105                 110

Val Val Val Lys Gly Asp Pro Val Ala Pro
            115                 120

<210> SEQ ID NO 94
<211> LENGTH: 132
<212> TYPE: PRT
<213> ORGANISM: Artificial Sequence
<220> FEATURE:
<223> OTHER INFORMATION: Clone 2 VH sequence
<220> FEATURE:
<221> NAME/KEY: misc_feature
<222> LOCATION: (7)..(7)
<223> OTHER INFORMATION: Xaa can be any naturally occurring amino acid

<400> SEQUENCE: 94

Leu Lys Gly Val Gln Cys Xaa Ser Leu Glu Glu Ser Gly Gly Gly Leu
  1               5                  10                  15

Val Lys Pro Gly Gly Thr Leu Thr Leu Thr Cys Thr Val Ser Gly Phe
             20                  25                  30

Ser Leu Asn Asn Tyr Asp Met Ser Trp Val Arg Gln Ala Pro Gly Lys
        35                  40                  45
```

Gly Leu Glu Trp Ile Gly Thr Val Ser Thr Thr Tyr Arg Arg Tyr Tyr
            50                  55                  60

Ala Ser Trp Ala Lys Gly Arg Phe Thr Ile Ser Lys Thr Ser Ser Thr
 65                  70                  75                  80

Thr Val Asp Leu Lys Met Thr Ser Leu Thr Thr Glu Asp Thr Ala Thr
                     85                  90                  95

Tyr Phe Cys Ala Val Ser Gly Ile Trp Gly Pro Gly Thr Leu Val Thr
                100                 105                 110

Val Ser Leu Gly Gln Pro Lys Ala Pro Ser Val Phe Pro Leu Ala Pro
                115                 120                 125

Cys Cys Gly Asp
    130

<210> SEQ ID NO 95
<211> LENGTH: 122
<212> TYPE: PRT
<213> ORGANISM: Artificial Sequence
<220> FEATURE:
<223> OTHER INFORMATION: Clone 2 VL sequence

<400> SEQUENCE: 95

Trp Leu Pro Gly Ala Thr Phe Ala Gln Val Leu Thr Gln Thr Thr Ser
 1               5                  10                  15

Pro Val Ser Ala Ala Val Gly Gly Thr Val Thr Ile Asn Cys Gln Ser
                20                  25                  30

Ser Gln Arg Val Tyr Ser Asn Tyr Leu Ala Trp Tyr Gln Gln Lys Pro
            35                  40                  45

Gly Gln Pro Pro Lys Arg Leu Ile Phe Leu Ala Ser Thr Leu Glu Ser
    50                  55                  60

Gly Val Pro Ser Arg Phe Ser Gly Ser Gly Ser Gly Thr Gln Phe Thr
 65                  70                  75                  80

Leu Thr Ile Ser Asp Leu Glu Cys Asp Asp Ala Ala Thr Tyr Tyr Cys
                 85                  90                  95

Ala Gly Thr Tyr Thr Gly Ser Ile Trp Ala Phe Gly Gly Thr Glu
                100                 105                 110

Val Val Val Lys Gly Asp Pro Val Ala Pro
            115                 120

<210> SEQ ID NO 96
<211> LENGTH: 115
<212> TYPE: PRT
<213> ORGANISM: Artificial Sequence
<220> FEATURE:
<223> OTHER INFORMATION: Clone 3 VH sequence

<400> SEQUENCE: 96

Leu Lys Gly Val Gln Cys Gln Ser Val Glu Glu Ser Gly Gly Arg Leu
 1               5                  10                  15

Val Thr Pro Gly Thr Pro Leu Thr Leu Thr Cys Thr Ala Ser Gly Phe
                20                  25                  30

Ser Leu Ser Arg Tyr Asp Met Ser Trp Val Arg Gln Ala Pro Gly Lys
            35                  40                  45

Gly Leu Glu Trp Ile Gly Thr Ile Ser Gly Ser Tyr Asn Thr Tyr Tyr
    50                  55                  60

Met Ser Trp Ala Lys Gly Arg Phe Thr Ile Ser Lys Thr Ser Ser Thr
 65                  70                  75                  80

Thr Val Asp Leu Lys Met Thr Ser Leu Thr Thr Glu Asp Thr Ala Thr
                 85                  90                  95

```
Tyr Phe Cys Ala Ser Ser Gly Ile Trp Gly Pro Gly Thr Leu Val Thr
                100                 105                 110

Val Ser Leu
        115

<210> SEQ ID NO 97
<211> LENGTH: 122
<212> TYPE: PRT
<213> ORGANISM: Artificial Sequence
<220> FEATURE:
<223> OTHER INFORMATION: Clone 3 VL sequence

<400> SEQUENCE: 97

Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Arg Val Tyr Ser Asn Tyr Leu Ser Trp Tyr Gln Gln Lys Pro
        35                  40                  45

Gly Gln Pro Pro Arg Arg Leu Ile Trp Leu Ala Ser Thr Leu Glu Ser
    50                  55                  60

Gly Val Pro Ser Arg Phe Ser Gly Ser Gly Ser Gly Thr Gln Phe Thr
65                  70                  75                  80

Leu Thr Ile Ser Gly Val Val Cys Asp Asp Ala Ala Thr Tyr Tyr Cys
                85                  90                  95

Ala Gly Thr Tyr Ser Gly Ser Ile Trp Ala Phe Gly Gly Gly Thr Glu
                100                 105                 110

Val Val Val Lys Gly Asp Pro Val Ala Pro
        115                 120

<210> SEQ ID NO 98
<211> LENGTH: 132
<212> TYPE: PRT
<213> ORGANISM: Artificial Sequence
<220> FEATURE:
<223> OTHER INFORMATION: Clone 4 VH sequence

<400> SEQUENCE: 98

Leu Lys Gly Val Gln Cys Gln Ser Val Glu Glu Ser Gly Gly Arg Leu
1               5                   10                  15

Val Thr Pro Gly Thr Pro Leu Thr Leu Thr Cys Thr Val Ser Gly Phe
            20                  25                  30

Ser Leu Ser Ser Tyr Asp Met Ser Trp Val Arg Gln Ala Pro Gly Lys
        35                  40                  45

Gly Leu Glu Trp Ile Gly Thr Ile Gly Arg Tyr Tyr Asn Thr Tyr Tyr
    50                  55                  60

Ala Thr Trp Ala Lys Gly Arg Phe Thr Ile Ser Lys Thr Ser Ser Thr
65                  70                  75                  80

Thr Val Asp Leu Lys Met Thr Ser Leu Thr Thr Glu Asp Thr Ala Thr
                85                  90                  95

Tyr Phe Cys Ala Ser Ser Gly Ile Trp Gly Pro Gly Thr Leu Val Thr
                100                 105                 110

Val Ser Leu Gly Gln Pro Lys Ala Pro Ser Val Phe Pro Leu Ala Pro
        115                 120                 125

Cys Cys Gly Asp
    130
```

-continued

```
<210> SEQ ID NO 99
<211> LENGTH: 123
<212> TYPE: PRT
<213> ORGANISM: Artificial Sequence
<220> FEATURE:
<223> OTHER INFORMATION: Clone 4 VL sequence

<400> SEQUENCE: 99

Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Thr Val Tyr Asn Asn Asn Tyr Leu Ser Trp Tyr Gln Gln Lys
        35                  40                  45

Pro Gly Gln Pro Pro Lys Arg Leu Ile Tyr Leu Ala Ser Thr Leu Glu
    50                  55                  60

Ser Gly Val Pro Ser Arg Phe Ser Gly Ser Gly Ser Gly Thr Gln Phe
65                  70                  75                  80

Thr Leu Thr Ile Ser Gly Val Val Cys Asp Asp Ala Ala Thr Tyr Tyr
                85                  90                  95

Cys Ala Gly Thr Tyr Ser Gly Ser Ile Trp Ala Phe Gly Gly Gly Thr
            100                 105                 110

Glu Val Val Val Lys Gly Asp Pro Val Ala Pro
        115                 120

<210> SEQ ID NO 100
<211> LENGTH: 132
<212> TYPE: PRT
<213> ORGANISM: Artificial Sequence
<220> FEATURE:
<223> OTHER INFORMATION: Clone 5 VH sequence

<400> SEQUENCE: 100

Leu Lys Gly Val Gln Cys Gln Ser Leu Glu Glu Ser Gly Gly Arg Leu
1               5                   10                  15

Val Ala Pro Gly Thr Pro Leu Thr Leu Thr Cys Thr Val Ser Gly Phe
            20                  25                  30

Ser Leu Ser Ser Tyr Asp Met Ser Trp Val Arg Gln Ala Pro Gly Arg
        35                  40                  45

Gly Leu Glu Trp Ile Gly Thr Ile Ser Ser Ser Tyr Arg Thr Tyr Tyr
    50                  55                  60

Ala Ser Trp Ala Lys Gly Arg Phe Thr Ile Ser Lys Thr Ser Ser Thr
65                  70                  75                  80

Thr Val Asp Leu Lys Met Thr Ser Leu Thr Thr Glu Asp Thr Ala Thr
                85                  90                  95

Tyr Phe Cys Ala Ser Ser Gly Ile Trp Gly Pro Gly Thr Leu Val Thr
            100                 105                 110

Val Ser Leu Gly Gln Pro Lys Ala Pro Ser Val Phe Pro Leu Ala Pro
        115                 120                 125

Cys Cys Gly Asp
    130

<210> SEQ ID NO 101
<211> LENGTH: 122
<212> TYPE: PRT
<213> ORGANISM: Artificial Sequence
<220> FEATURE:
<223> OTHER INFORMATION: Clone 5 VL sequence

<400> SEQUENCE: 101
```

```
Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Arg Val Tyr Asn Asn Tyr Leu Ala Trp Tyr Gln Gln Lys Pro
        35                  40                  45

Gly Gln Pro Pro Lys Arg Leu Ile Tyr Leu Ala Ser Thr Leu Glu Ser
    50                  55                  60

Gly Val Pro Ser Arg Phe Ser Gly Ser Gly Ser Gly Thr Gln Phe Thr
65                  70                  75                  80

Leu Thr Ile Ser Gly Val Val Cys Asp Asp Ala Ala Thr Tyr Tyr Cys
                85                  90                  95

Ala Gly Thr Tyr Ser Gly Ser Ile Trp Ala Phe Gly Gly Gly Thr Glu
            100                 105                 110

Val Val Val Lys Gly Asp Pro Val Ala Pro
            115                 120

<210> SEQ ID NO 102
<211> LENGTH: 132
<212> TYPE: PRT
<213> ORGANISM: Artificial Sequence
<220> FEATURE:
<223> OTHER INFORMATION: Clone 6 VH sequence

<400> SEQUENCE: 102

Leu Lys Gly Val Gln Cys Gln Ser Val Glu Glu Ser Gly Gly Arg Leu
1               5                   10                  15

Val Thr Pro Gly Thr Pro Leu Thr Leu Thr Cys Thr Val Ser Gly Phe
            20                  25                  30

Ser Leu Ser Ser Tyr Asp Met Ser Trp Val Arg Gln Ala Pro Gly Lys
        35                  40                  45

Gly Leu Glu Trp Ile Gly Thr Ile Gly Arg Tyr Tyr Asn Thr Tyr Tyr
    50                  55                  60

Ala Thr Trp Ala Lys Gly Arg Phe Thr Ile Ser Lys Thr Ser Ser Thr
65                  70                  75                  80

Thr Val Asp Leu Lys Met Thr Ser Leu Thr Thr Glu Asp Thr Ala Thr
                85                  90                  95

Tyr Phe Cys Ala Ser Ser Gly Ile Trp Gly Pro Gly Thr Leu Val Thr
            100                 105                 110

Val Ser Leu Gly Gln Pro Lys Ala Pro Ser Val Phe Pro Leu Ala Pro
            115                 120                 125

Cys Cys Gly Asp
    130

<210> SEQ ID NO 103
<211> LENGTH: 123
<212> TYPE: PRT
<213> ORGANISM: Artificial Sequence
<220> FEATURE:
<223> OTHER INFORMATION: Clone 6 VL sequence

<400> SEQUENCE: 103

Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Thr Val Tyr Asn Asn Asn Tyr Leu Ser Trp Tyr Gln Gln Lys
```

```
                35                  40                  45

Pro Gly Gln Pro Pro Lys Arg Leu Ile Tyr Leu Ala Ser Thr Leu Glu
        50                  55                  60

Ser Gly Val Pro Ser Arg Phe Ser Gly Ser Gly Ser Gly Thr Gln Phe
65                  70                  75                  80

Thr Leu Thr Ile Ser Gly Val Val Cys Asp Ala Ala Thr Tyr Tyr
                85                  90                  95

Cys Ala Gly Thr Tyr Ser Gly Ser Ile Trp Ala Phe Gly Gly Gly Thr
                100                 105                 110

Glu Val Val Val Lys Gly Asp Pro Val Ala Pro
            115                 120

<210> SEQ ID NO 104
<211> LENGTH: 132
<212> TYPE: PRT
<213> ORGANISM: Artificial Sequence
<220> FEATURE:
<223> OTHER INFORMATION: Clone 7 VH sequence

<400> SEQUENCE: 104

Leu Lys Gly Val Gln Cys Gln Ser Val Glu Glu Ser Gly Gly Arg Leu
1               5                   10                  15

Val Thr Pro Gly Thr Pro Leu Thr Leu Thr Cys Thr Val Ser Gly Phe
            20                  25                  30

Ser Leu Ser Ser Tyr Asp Met Ser Trp Val Arg Gln Ala Pro Gly Lys
        35                  40                  45

Gly Leu Glu Trp Ile Gly Thr Ile Gly Arg Tyr Tyr Asn Thr Tyr Tyr
    50                  55                  60

Ala Thr Trp Ala Lys Gly Arg Phe Thr Ile Ser Lys Thr Ser Ser Thr
65                  70                  75                  80

Thr Val Asp Leu Lys Met Thr Ser Leu Thr Thr Glu Asp Thr Ala Thr
                85                  90                  95

Tyr Phe Cys Ala Ser Ser Gly Ile Trp Gly Pro Gly Thr Leu Val Thr
            100                 105                 110

Val Ser Leu Gly Gln Pro Lys Ala Pro Ser Val Phe Pro Leu Ala Pro
        115                 120                 125

Cys Cys Gly Asp
    130

<210> SEQ ID NO 105
<211> LENGTH: 123
<212> TYPE: PRT
<213> ORGANISM: Artificial Sequence
<220> FEATURE:
<223> OTHER INFORMATION: Clone 7 VL sequence

<400> SEQUENCE: 105

Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Thr Val Tyr Asn Asn Asn Tyr Leu Ser Trp Tyr Gln Gln Lys
        35                  40                  45

Pro Gly Gln Pro Pro Lys Arg Leu Ile Tyr Leu Ala Ser Thr Leu Glu
    50                  55                  60

Ser Gly Val Pro Ser Arg Phe Ser Gly Ser Gly Ser Gly Thr Gln Phe
65                  70                  75                  80
```

```
Thr Leu Thr Ile Ser Gly Val Val Cys Asp Asp Ala Ala Thr Tyr Tyr
                 85                  90                  95

Cys Ala Gly Thr Tyr Ser Gly Ser Ile Trp Ala Phe Gly Gly Gly Thr
            100                 105                 110

Glu Val Val Val Lys Gly Asp Pro Val Ala Pro
        115                 120

<210> SEQ ID NO 106
<211> LENGTH: 132
<212> TYPE: PRT
<213> ORGANISM: Artificial Sequence
<220> FEATURE:
<223> OTHER INFORMATION: Clone 8 VH sequence

<400> SEQUENCE: 106

Leu Lys Gly Val Gln Cys Gln Ser Leu Glu Glu Ser Gly Gly Arg Leu
1               5                   10                  15

Val Ala Pro Gly Thr Pro Leu Thr Leu Thr Cys Thr Val Ser Gly Phe
            20                  25                  30

Ser Leu Ser Ser Tyr Asp Met Ser Trp Val Arg Gln Ala Pro Gly Arg
        35                  40                  45

Gly Leu Glu Trp Ile Gly Thr Ile Ser Ser Tyr Arg Thr Tyr Tyr
    50                  55                  60

Ala Ser Trp Ala Lys Gly Arg Phe Thr Ile Ser Lys Thr Ser Ser Thr
65                  70                  75                  80

Thr Val Asp Leu Lys Met Thr Ser Leu Thr Thr Glu Asp Thr Ala Thr
                85                  90                  95

Tyr Phe Cys Ala Ser Ser Gly Ile Trp Gly Pro Gly Thr Leu Val Thr
            100                 105                 110

Val Ser Leu Gly Gln Pro Lys Ala Pro Ser Val Phe Pro Leu Ala Pro
        115                 120                 125

Cys Cys Gly Asp
    130

<210> SEQ ID NO 107
<211> LENGTH: 122
<212> TYPE: PRT
<213> ORGANISM: Artificial Sequence
<220> FEATURE:
<223> OTHER INFORMATION: Clone 8 VL sequence

<400> SEQUENCE: 107

Trp Leu Pro Gly Ala Thr Phe Ala Gln Val Leu Thr Gln Thr Ala Ser
1               5                   10                  15

Pro Val Ser Ala Ala Val Gly Gly Thr Val Thr Ile Asn Cys Gln Ser
            20                  25                  30

Ser Gln Arg Val Tyr Asn Asn Tyr Leu Ala Trp Tyr Gln Gln Lys Pro
        35                  40                  45

Gly Gln Pro Pro Lys Arg Leu Ile Tyr Leu Ala Ser Thr Leu Glu Ser
    50                  55                  60

Gly Val Pro Ser Arg Phe Ser Gly Ser Gly Ser Gly Thr Gln Phe Thr
65                  70                  75                  80

Leu Thr Ile Ser Gly Val Val Cys Asp Asp Ala Ala Thr Tyr Tyr Cys
                85                  90                  95

Ala Gly Thr Tyr Ser Gly Ser Ile Trp Ala Phe Gly Gly Gly Thr Glu
            100                 105                 110

Val Val Val Lys Gly Asp Pro Val Ala Pro
        115                 120
```

<210> SEQ ID NO 108
<211> LENGTH: 118
<212> TYPE: PRT
<213> ORGANISM: Artificial Sequence
<220> FEATURE:
<223> OTHER INFORMATION: Clone 9 VH sequence

<400> SEQUENCE: 108

Val Gln Leu Val Glu Ser Gly Gly Gly Phe Val Gln Pro Gly Gly Ser
1               5                   10                  15

Leu Arg Leu Ser Cys Ala Ala Ser Gly Phe Thr Phe Thr Asp Tyr Gly
            20                  25                  30

Ile His Trp Val Arg Gln Ala Pro Gly Lys Gly Leu Glu Trp Val Ala
        35                  40                  45

Val Ile Ser His Asp Gly Ser His Lys Tyr Tyr Ser Asp Ser Val Lys
    50                  55                  60

Gly Arg Ser Thr Ile Ser Arg Asp Ser Ser Asp Asn Thr Val Ser Leu
65                  70                  75                  80

Gln Leu Asp Gly Leu Arg Ala Asp Asp Thr Ala Leu Tyr Tyr Cys Ala
                85                  90                  95

Lys Asp Leu Pro Gln Thr Gly Ala Leu Asp Phe Trp Gly Arg Gly Thr
            100                 105                 110

Leu Ile Thr Val Ser Ser
        115

<210> SEQ ID NO 109
<211> LENGTH: 104
<212> TYPE: PRT
<213> ORGANISM: Artificial Sequence
<220> FEATURE:
<223> OTHER INFORMATION: Clone 9 VL sequence

<400> SEQUENCE: 109

Met Thr Gln Ser Pro Ser Ser Leu Ser Ala Ser Val Gly Asp Arg Val
1               5                   10                  15

Thr Ile Thr Cys Gln Ala Ser Gln Asp Ile Ser Asn Tyr Leu Asn Trp
            20                  25                  30

Tyr Gln Gln Lys Pro Gly Lys Ala Pro Lys Leu Leu Ile Tyr Asp Ala
        35                  40                  45

Ser Asn Leu Glu Thr Gly Val Pro Ser Arg Phe Ser Gly Ser Gly Ser
    50                  55                  60

Gly Thr Asp Phe Thr Phe Thr Ile Ser Ser Leu Gln Pro Glu Asp Phe
65                  70                  75                  80

Ala Thr Tyr Tyr Cys Gln Gln Ala Asn Ser Phe Pro Ile Thr Phe Gly
                85                  90                  95

Gln Gly Thr Arg Leu Glu Ile Lys
            100

<210> SEQ ID NO 110
<211> LENGTH: 113
<212> TYPE: PRT
<213> ORGANISM: Artificial Sequence
<220> FEATURE:
<223> OTHER INFORMATION: Clone 10 VH sequence

<400> SEQUENCE: 110

Val Gln Leu Val Glu Ser Gly Ala Glu Val Lys Lys Pro Gly Ala Ser
1               5                   10                  15

```
Val Lys Val Ser Cys Lys Ala Ser Gly Tyr Thr Phe Thr Gly Tyr Tyr
            20                  25                  30

Met His Trp Val Arg Gln Ala Pro Gly Gln Gly Leu Glu Trp Met Gly
         35                  40                  45

Trp Ile Asn Pro Asn Ser Gly Gly Thr Asn Tyr Ala Gln Lys Phe Gln
     50                  55                  60

Gly Arg Val Thr Met Thr Arg Asp Thr Ser Ile Ser Thr Ala Tyr Met
65                  70                  75                  80

Glu Leu Ser Arg Leu Arg Ser Asp Asp Thr Ala Val Tyr Tyr Cys Ala
                 85                  90                  95

Thr Glu Ser Leu Asp Tyr Trp Gly Gln Gly Thr Leu Val Thr Val Ser
             100                 105                 110

Ser
```

```
<210> SEQ ID NO 111
<211> LENGTH: 105
<212> TYPE: PRT
<213> ORGANISM: Artificial Sequence
<220> FEATURE:
<223> OTHER INFORMATION: Clone 10 VL sequence

<400> SEQUENCE: 111

Gln Met Thr Gln Ser Pro Ser Ser Leu Ser Ala Ser Val Gly Asp Arg
1               5                   10                  15

Val Thr Ile Thr Cys Gln Ala Ser Gln Asp Ile Ser Asn Tyr Leu Asn
             20                  25                  30

Trp Tyr Gln Gln Lys Pro Gly Lys Ala Pro Lys Leu Leu Ile Tyr Asp
         35                  40                  45

Ala Ser Asn Leu Glu Thr Gly Val Pro Ser Arg Phe Ser Gly Ser Gly
     50                  55                  60

Ser Gly Thr Asp Phe Thr Phe Thr Ile Ser Ser Leu Gln Pro Glu Asp
65                  70                  75                  80

Ile Ala Thr Tyr Tyr Cys Gln Gln Tyr Asp Asn Leu Pro Leu Thr Phe
                 85                  90                  95

Gly Gly Gly Thr Lys Leu Glu Ile Lys
             100                 105
```

```
<210> SEQ ID NO 112
<211> LENGTH: 128
<212> TYPE: PRT
<213> ORGANISM: Artificial Sequence
<220> FEATURE:
<223> OTHER INFORMATION: Clone 11 VH sequence

<400> SEQUENCE: 112

Gln Val Gln Leu Gln Gln Trp Gly Gly Gly Leu Val Lys Pro Ser Glu
1               5                   10                  15

Thr Leu Ser Leu Thr Cys Gly Val Ser Gly Gly Ser Phe Asn Asp Tyr
             20                  25                  30

Tyr Trp Thr Trp Ile Arg Gln Pro Gln Lys Gly Leu Glu Trp Ile
         35                  40                  45

Gly Glu Ile Asn His Val Gly Ser Ser Arg Tyr Asn Pro Ser Leu Gly
     50                  55                  60

Ser Arg Val Thr Met Ser Val Asp Thr Ser Lys Ser Gln Phe Ser Leu
65                  70                  75                  80

Thr Leu Thr Ala Val Thr Ala Ala Asp Thr Ala Ile Tyr Tyr Cys Thr
                 85                  90                  95
```

```
Arg Gly Arg Lys Thr Arg Val Lys Phe Phe Ser Arg Tyr Ser Arg
                100                 105                 110

Asp Trp Phe Asp Pro Trp Gly Gln Gly Ser Arg Val Thr Val Ser Ser
            115                 120                 125
```

<210> SEQ ID NO 113
<211> LENGTH: 105
<212> TYPE: PRT
<213> ORGANISM: Artificial Sequence
<220> FEATURE:
<223> OTHER INFORMATION: Clone 11 VL sequence

<400> SEQUENCE: 113

```
Val Met Thr Gln Ser Pro Ala Thr Leu Ser Val Ser Pro Gly Glu Arg
1               5                   10                  15

Ala Thr Leu Ser Cys Arg Ala Ser Gln Ser Val Ser Ser Asn Leu Ala
            20                  25                  30

Trp Tyr Gln Gln Lys Pro Gly Gln Ala Pro Arg Leu Leu Ile Tyr Gly
        35                  40                  45

Ala Ser Ser Arg Ala Thr Gly Ile Pro Asp Arg Phe Ser Gly Ser Gly
    50                  55                  60

Ser Gly Thr Asp Phe Thr Leu Thr Ile Ser Arg Leu Glu Pro Glu Asp
65                  70                  75                  80

Phe Ala Thr Tyr Tyr Cys Gln Gln Leu Asn Ser Tyr Pro Phe Thr Phe
                85                  90                  95

Gly Pro Gly Thr Lys Val Asp Ile Lys
            100                 105
```

<210> SEQ ID NO 114
<211> LENGTH: 128
<212> TYPE: PRT
<213> ORGANISM: Artificial Sequence
<220> FEATURE:
<223> OTHER INFORMATION: Clone 12 VH sequence

<400> SEQUENCE: 114

```
Gln Val Gln Leu Gln Gln Trp Gly Gly Gly Leu Val Lys Pro Ser Glu
1               5                   10                  15

Thr Leu Ser Leu Thr Cys Gly Val Ser Gly Gly Ser Phe Asn Asp Tyr
            20                  25                  30

Tyr Trp Thr Trp Ile Arg Gln Pro Gln Gly Lys Gly Leu Glu Trp Ile
        35                  40                  45

Gly Glu Ile Asn His Val Gly Ser Ser Arg Tyr Asn Pro Ser Leu Gly
    50                  55                  60

Ser Arg Val Thr Met Ser Val Asp Thr Ser Lys Ser Gln Phe Ser Leu
65                  70                  75                  80

Thr Leu Thr Ala Val Thr Ala Ala Asp Thr Ala Ile Tyr Tyr Cys Thr
                85                  90                  95

Arg Gly Arg Lys Thr Arg Val Lys Phe Phe Ser Arg Tyr Ser Arg
                100                 105                 110

Asp Trp Phe Asp Pro Trp Gly Gln Gly Ser Arg Val Thr Val Ser Ser
            115                 120                 125
```

<210> SEQ ID NO 115
<211> LENGTH: 104
<212> TYPE: PRT
<213> ORGANISM: Artificial Sequence
<220> FEATURE:
<223> OTHER INFORMATION: Clone 12 VL sequence

```
<400> SEQUENCE: 115

Met Thr Gln Ser Pro Ser Ser Leu Ser Ala Ser Val Gly Asp Arg Val
1               5                   10                  15

Thr Ile Thr Cys Arg Ala Ser Gln Gly Ile Ser Asn Tyr Leu Ala Trp
            20                  25                  30

Tyr Gln Gln Lys Pro Gly Lys Val Pro Lys Leu Leu Ile Tyr Ala Ala
                35                  40                  45

Ser Thr Leu Gln Ser Gly Val Pro Ser Arg Phe Ser Gly Ser Gly Ser
    50                  55                  60

Gly Thr Asp Phe Thr Leu Thr Ile Ser Ser Leu Gln Pro Glu Asp Val
65                  70                  75                  80

Ala Thr Tyr Tyr Cys Gln Lys Tyr Asn Ser Ala Pro Phe Thr Phe Gly
                85                  90                  95

Pro Gly Thr Lys Val Asp Ile Lys
            100

<210> SEQ ID NO 116
<211> LENGTH: 118
<212> TYPE: PRT
<213> ORGANISM: Artificial Sequence
<220> FEATURE:
<223> OTHER INFORMATION: Clone 13 VH sequence

<400> SEQUENCE: 116

Glu Ser Gly Gly Gly Val Val Lys Pro Gly Gly Ser Leu Arg Leu Ala
1               5                   10                  15

Cys Glu Ala Ser Gly Phe Thr Phe Asn Lys Tyr Ala Met Ser Trp Val
            20                  25                  30

Arg Gln Ala Pro Gly Lys Gly Leu Glu Trp Val Ser Gly Asn Ser Gly
                35                  40                  45

Ser Gly Asn Ser Thr Tyr Tyr Ala Asp Ser Val Lys Gly Arg Phe Thr
    50                  55                  60

Ile Ser Arg Asp Asn Ser Lys Asn Ile Leu Tyr Leu Asp Met Asn Asn
65                  70                  75                  80

Leu Arg Ala Glu Asp Thr Ala Leu Tyr Tyr Cys Ala Lys Thr Arg Gly
                85                  90                  95

Ala Gly Arg Arg Lys Pro Tyr Gly Met Asp Val Trp Gly His Gly Thr
            100                 105                 110

Thr Val Thr Val Ser Ser
            115

<210> SEQ ID NO 117
<211> LENGTH: 106
<212> TYPE: PRT
<213> ORGANISM: Artificial Sequence
<220> FEATURE:
<223> OTHER INFORMATION: Clone 13 VL sequence

<400> SEQUENCE: 117

Val Met Thr Gln Ser Pro Ser Thr Leu Ser Leu Ser Pro Gly Glu Arg
1               5                   10                  15

Ala Thr Leu Ser Cys Arg Ala Ser Gln Ser Val Ala Asn Asn Tyr Leu
            20                  25                  30

Ala Trp Tyr Gln His Lys Pro Gly Gln Ala Pro Arg Val Leu Ile Tyr
                35                  40                  45

Gly Ala Ser Ser Arg Ala Thr Gly Ile Pro Asp Arg Phe Ser Gly Ser
    50                  55                  60
```

```
Gly Ser Gly Thr Asp Phe Thr Leu Thr Ile Ser Arg Leu Glu Pro Glu
65                  70                  75                  80

Asp Phe Ala Val Tyr Tyr Cys Gln Gln Tyr Gly Ser Ser Pro Arg Thr
                85                  90                  95

Phe Gly Gly Gly Thr Lys Leu Glu Ile Lys
            100                 105
```

<210> SEQ ID NO 118
<211> LENGTH: 15
<212> TYPE: PRT
<213> ORGANISM: Artificial Sequence
<220> FEATURE:
<223> OTHER INFORMATION: Tau fragment 407 to 421, SEQ ID NO: 101 OF
      WO2010144711

<400> SEQUENCE: 118

```
His Leu Ser Asn Val Ser Ser Thr Gly Ser Ile Asp Met Val Asp
1               5                   10                  15
```

<210> SEQ ID NO 119
<211> LENGTH: 13
<212> TYPE: PRT
<213> ORGANISM: Artificial Sequence
<220> FEATURE:
<223> OTHER INFORMATION: Tau fragment 379 to 391, SEQ ID NO: 102 OF
      WO2010144711

<400> SEQUENCE: 119

```
Arg Glu Asn Ala Lys Ala Lys Thr Asp His Gly Ala Glu
1               5                   10
```

<210> SEQ ID NO 120
<211> LENGTH: 135
<212> TYPE: PRT
<213> ORGANISM: Artificial Sequence
<220> FEATURE:
<223> OTHER INFORMATION: Clone #44 VH sequence

<400> SEQUENCE: 120

```
Leu Lys Gly Val Gln Cys Gln Ser Val Glu Glu Ser Gly Gly Arg Leu
1               5                   10                  15

Val Thr Pro Gly Thr Pro Leu Thr Leu Thr Cys Thr Val Ser Gly Ile
            20                  25                  30

Asp Leu Ser Ser Tyr Ala Met Ala Trp Val Arg Gln Ala Pro Gly Lys
        35                  40                  45

Gly Leu Glu Trp Ile Gly Cys Ile Asp Arg Arg Gly Gly Thr Phe Tyr
    50                  55                  60

Ala Ser Trp Val Lys Gly Arg Phe Thr Ile Ser Lys Thr Ser Thr Thr
65                  70                  75                  80

Val Asp Leu Lys Met Thr Ser Leu Thr Thr Glu Asp Thr Ala Thr Tyr
                85                  90                  95

Phe Cys Ala Arg Asp Ser Gly Ala Phe Asp Pro Trp Gly Pro Gly Thr
            100                 105                 110

Leu Val Thr Val Ser Ser Gly Gln Pro Lys Ala Pro Ser Val Phe Pro
        115                 120                 125

Leu Ala Pro Cys Cys Gly Asp
    130                 135
```

<210> SEQ ID NO 121
<211> LENGTH: 126
<212> TYPE: PRT
<213> ORGANISM: Artificial Sequence
<220> FEATURE:
<223> OTHER INFORMATION: Clone #44 VL sequence

<400> SEQUENCE: 121

Trp Leu Pro Gly Ala Thr Phe Ala Gln Ile Val Met Thr Gln Thr Pro
1               5                   10                  15

Ser Ser Val Ser Ala Ala Val Gly Gly Thr Val Thr Ile Lys Cys Gln
            20                  25                  30

Ala Ser Gln Ser Val Tyr Asp Asn Tyr Leu Ala Trp Tyr Gln Gln Lys
        35                  40                  45

Pro Gly Gln Pro Pro Lys Leu Leu Ile His Ala Ala Ser Asn Leu Ala
    50                  55                  60

Ser Arg Val Pro Ser Arg Phe Lys Gly Ser Gly Ser Gly Thr Gln Phe
65                  70                  75                  80

Thr Leu Thr Ile Ser Asp Val Gln Cys Asp Asp Ala Ala Thr Tyr Tyr
                85                  90                  95

Cys Leu Gly Glu Phe Ser Cys Thr Thr Thr Asp Cys Asn Val Phe Gly
            100                 105                 110

Gly Gly Thr Glu Val Val Val Lys Gly Asp Pro Val Ala Pro
        115                 120                 125

<210> SEQ ID NO 122
<211> LENGTH: 13
<212> TYPE: PRT
<213> ORGANISM: Artificial Sequence
<220> FEATURE:
<223> OTHER INFORMATION: Tau fragment, residues 369 to 381 of 2N4R Tau
      (Human Tau (1-441))

<400> SEQUENCE: 122

Lys Lys Ile Glu Thr His Lys Leu Thr Phe Arg Glu Asn
1               5                   10

<210> SEQ ID NO 123
<211> LENGTH: 3
<212> TYPE: PRT
<213> ORGANISM: Artificial Sequence
<220> FEATURE:
<223> OTHER INFORMATION: Residues 400 to 402 of human 2N4R (1-441) tau
      of SEQ ID NO: 2 (non-phosphorylated)

<400> SEQUENCE: 123

Ser Gly Asp
1

<210> SEQ ID NO 124
<211> LENGTH: 4
<212> TYPE: PRT
<213> ORGANISM: Artificial Sequence
<220> FEATURE:
<223> OTHER INFORMATION: Residues 399 to 402 of human 2N4R (1-441) tau
      of SEQ ID NO: 2 (non-phosphorylated)

<400> SEQUENCE: 124

Val Ser Gly Asp
1

<210> SEQ ID NO 125
<211> LENGTH: 12
<212> TYPE: PRT
<213> ORGANISM: Artificial Sequence
<220> FEATURE:
<223> OTHER INFORMATION: #28_VK5_CDR1, Vk5 humanised variant CDR1

```
<400> SEQUENCE: 125

Gln Ser Ser Gln Arg Val Ser Ser Ser Tyr Leu Ala
1               5                   10

<210> SEQ ID NO 126
<211> LENGTH: 16
<212> TYPE: PRT
<213> ORGANISM: Artificial Sequence
<220> FEATURE:
<223> OTHER INFORMATION: >#28_VH6_CDR2, VH6 humanised variant CDR2

<400> SEQUENCE: 126

Thr Val Ser Thr Thr Tyr Arg Arg Tyr Tyr Ala Asp Ser Val Lys Gly
1               5                   10                  15

<210> SEQ ID NO 127
<211> LENGTH: 109
<212> TYPE: PRT
<213> ORGANISM: Artificial Sequence
<220> FEATURE:
<223> OTHER INFORMATION: #28_VH1, humanised VH1

<400> SEQUENCE: 127

Gln Ser Leu Gln Glu Ser Gly Gly Gly Leu Val Lys Pro Ser Glu Thr
1               5                   10                  15

Leu Ser Leu Thr Cys Thr Val Ser Gly Phe Ser Leu Asn Asn Tyr Asp
                20                  25                  30

Met Ser Trp Val Arg Gln Ala Pro Gly Lys Gly Leu Glu Trp Ile Gly
            35                  40                  45

Thr Val Ser Thr Thr Tyr Arg Arg Tyr Tyr Ala Ser Trp Ala Lys Gly
        50                  55                  60

Arg Phe Thr Ile Ser Lys Thr Ser Ser Thr Thr Val Asp Leu Lys Met
65                  70                  75                  80

Thr Ser Leu Thr Ala Glu Asp Thr Ala Thr Tyr Phe Cys Ala Ala Ser
                85                  90                  95

Gly Ile Trp Gly Arg Gly Thr Leu Val Thr Val Ser Ser
            100                 105

<210> SEQ ID NO 128
<211> LENGTH: 109
<212> TYPE: PRT
<213> ORGANISM: Artificial Sequence
<220> FEATURE:
<223> OTHER INFORMATION: #28_VH2, humanised VH2

<400> SEQUENCE: 128

Gln Ser Leu Gln Glu Ser Gly Pro Gly Leu Val Lys Pro Ser Glu Thr
1               5                   10                  15

Leu Ser Leu Thr Cys Thr Val Ser Gly Phe Ser Leu Asn Asn Tyr Asp
                20                  25                  30

Met Ser Trp Val Arg Gln Ala Pro Gly Lys Gly Leu Glu Trp Ile Gly
            35                  40                  45

Thr Val Ser Thr Thr Tyr Arg Arg Tyr Tyr Ala Ser Trp Ala Lys Gly
        50                  55                  60

Arg Phe Thr Ile Ser Lys Thr Ser Ser Thr Thr Val Asp Leu Gln Met
65                  70                  75                  80

Thr Ser Leu Thr Ala Glu Asp Thr Ala Thr Tyr Phe Cys Ala Ala Ser
                85                  90                  95

Gly Ile Trp Gly Arg Gly Thr Leu Val Thr Val Ser Ser
            100                 105
```

<210> SEQ ID NO 129
<211> LENGTH: 110
<212> TYPE: PRT
<213> ORGANISM: Artificial Sequence
<220> FEATURE:
<223> OTHER INFORMATION: #28_VH3, humanised VH3

<400> SEQUENCE: 129

Gln Val Gln Leu Gln Glu Ser Gly Pro Gly Leu Val Lys Pro Ser Glu
1               5                   10                  15

Thr Leu Ser Leu Thr Cys Thr Val Ser Gly Phe Ser Leu Asn Asn Tyr
            20                  25                  30

Asp Met Ser Trp Val Arg Gln Ala Pro Gly Lys Gly Leu Glu Trp Ile
        35                  40                  45

Gly Thr Val Ser Thr Thr Tyr Arg Arg Tyr Tyr Ala Ser Trp Ala Lys
    50                  55                  60

Gly Arg Phe Thr Ile Ser Lys Thr Ser Ser Thr Val Asp Leu Gln
65                  70                  75                  80

Met Thr Ser Leu Thr Ala Glu Asp Thr Ala Thr Tyr Phe Cys Ala Ala
                85                  90                  95

Ser Gly Ile Trp Gly Arg Gly Thr Leu Val Thr Val Ser Ser
            100                 105                 110

<210> SEQ ID NO 130
<211> LENGTH: 111
<212> TYPE: PRT
<213> ORGANISM: Artificial Sequence
<220> FEATURE:
<223> OTHER INFORMATION: #28_VH4, humanised VH4

<400> SEQUENCE: 130

Gln Val Gln Leu Gln Glu Ser Gly Pro Gly Leu Val Lys Pro Ser Glu
1               5                   10                  15

Thr Leu Ser Leu Thr Cys Thr Val Ser Gly Phe Ser Leu Asn Asn Tyr
            20                  25                  30

Asp Met Ser Trp Val Arg Gln Ala Pro Gly Lys Gly Leu Glu Trp Ile
        35                  40                  45

Gly Thr Val Ser Thr Thr Tyr Arg Arg Tyr Tyr Ala Ser Trp Ala Lys
    50                  55                  60

Gly Arg Phe Thr Ile Ser Lys Asp Thr Ser Ser Thr Val Asp Leu
65                  70                  75                  80

Gln Met Thr Ser Leu Thr Ala Glu Asp Thr Ala Thr Tyr Phe Cys Ala
                85                  90                  95

Ala Ser Gly Ile Trp Gly Arg Gly Thr Leu Val Thr Val Ser Ser
            100                 105                 110

<210> SEQ ID NO 131
<211> LENGTH: 111
<212> TYPE: PRT
<213> ORGANISM: Artificial Sequence
<220> FEATURE:
<223> OTHER INFORMATION: #28_VH5, humanised VH5

<400> SEQUENCE: 131

Gln Val Gln Leu Gln Glu Ser Gly Pro Gly Leu Val Lys Pro Ser Glu
1               5                   10                  15

Thr Leu Ser Leu Thr Cys Thr Val Ser Gly Phe Ser Leu Asn Asn Tyr
            20                  25                  30

Asp Met Ser Trp Val Arg Gln Ala Pro Gly Lys Gly Leu Glu Trp Ile
                35                  40                  45

Gly Thr Val Ser Thr Thr Tyr Arg Arg Tyr Tyr Ala Ser Trp Ala Lys
 50                  55                  60

Gly Arg Phe Thr Ile Ser Arg Asp Asn Ser Lys Asn Thr Leu Asp Leu
 65                  70                  75                  80

Gln Met Thr Ser Leu Thr Ala Glu Asp Thr Ala Thr Tyr Phe Cys Ala
                85                  90                  95

Ala Ser Gly Ile Trp Gly Arg Gly Thr Leu Val Thr Val Ser Ser
               100                 105                 110

<210> SEQ ID NO 132
<211> LENGTH: 111
<212> TYPE: PRT
<213> ORGANISM: Artificial Sequence
<220> FEATURE:
<223> OTHER INFORMATION: #28_VH6, humanised VH6

<400> SEQUENCE: 132

Gln Val Gln Leu Gln Glu Ser Gly Pro Gly Leu Val Lys Pro Ser Glu
 1               5                  10                  15

Thr Leu Ser Leu Thr Cys Thr Val Ser Gly Phe Ser Leu Asn Asn Tyr
                20                  25                  30

Asp Met Ser Trp Val Arg Gln Ala Pro Gly Lys Gly Leu Glu Trp Ile
                35                  40                  45

Gly Thr Val Ser Thr Thr Tyr Arg Arg Tyr Tyr Ala Asp Ser Val Lys
 50                  55                  60

Gly Arg Phe Thr Ile Ser Arg Asp Asn Ser Lys Asn Thr Leu Asp Leu
 65                  70                  75                  80

Gln Met Thr Ser Leu Thr Ala Glu Asp Thr Ala Thr Tyr Phe Cys Ala
                85                  90                  95

Ala Ser Gly Ile Trp Gly Arg Gly Thr Leu Val Thr Val Ser Ser
               100                 105                 110

<210> SEQ ID NO 133
<211> LENGTH: 109
<212> TYPE: PRT
<213> ORGANISM: Artificial Sequence
<220> FEATURE:
<223> OTHER INFORMATION: >#28_VK1, humanised Vk1

<400> SEQUENCE: 133

Ala Gln Val Leu Thr Gln Ser Thr Ser Pro Leu Ser Ala Ser Val Gly
 1               5                  10                  15

Asp Arg Val Thr Ile Thr Cys Gln Ser Ser Gln Arg Val Tyr Ser Asn
                20                  25                  30

Tyr Leu Ala Trp Tyr Gln Gln Lys Pro Gly Gln Pro Lys Arg Leu
                35                  40                  45

Ile Phe Leu Ala Ser Thr Leu Glu Ser Gly Val Pro Ser Arg Phe Ser
            50                  55                  60

Gly Ser Gly Ser Gly Thr Glu Phe Thr Leu Thr Ile Ser Ser Leu Gln
 65                  70                  75                  80

Cys Asp Asp Phe Ala Thr Tyr Tyr Cys Ala Gly Thr Tyr Thr Gly Ser
                85                  90                  95

Ile Trp Ala Phe Gly Gly Gly Thr Glu Val Val Ile Lys
               100                 105

<210> SEQ ID NO 134

```
<211> LENGTH: 109
<212> TYPE: PRT
<213> ORGANISM: Artificial Sequence
<220> FEATURE:
<223> OTHER INFORMATION: #28_VK2, humanised Vk2

<400> SEQUENCE: 134

Ala Gln Val Leu Thr Gln Ser Pro Ser Thr Leu Ser Ala Ser Val Gly
1               5                   10                  15

Asp Arg Val Thr Ile Thr Cys Gln Ser Ser Gln Arg Val Tyr Ser Asn
            20                  25                  30

Tyr Leu Ala Trp Tyr Gln Gln Lys Pro Gly Gln Pro Pro Lys Arg Leu
        35                  40                  45

Ile Phe Leu Ala Ser Thr Leu Glu Ser Gly Val Pro Ser Arg Phe Ser
    50                  55                  60

Gly Ser Gly Ser Gly Thr Glu Phe Thr Leu Thr Ile Ser Ser Leu Gln
65                  70                  75                  80

Pro Asp Asp Phe Ala Thr Tyr Tyr Cys Ala Gly Thr Tyr Thr Gly Ser
                85                  90                  95

Ile Trp Ala Phe Gly Gly Gly Thr Lys Val Glu Ile Lys
            100                 105

<210> SEQ ID NO 135
<211> LENGTH: 109
<212> TYPE: PRT
<213> ORGANISM: Artificial Sequence
<220> FEATURE:
<223> OTHER INFORMATION: #28_VK4, humanised VK4

<400> SEQUENCE: 135

Asp Ile Gln Met Thr Gln Ser Pro Ser Thr Leu Ser Ala Ser Val Gly
1               5                   10                  15

Asp Arg Val Thr Ile Thr Cys Gln Ser Ser Gln Arg Val Tyr Ser Asn
            20                  25                  30

Tyr Leu Ala Trp Tyr Gln Gln Lys Pro Gly Gln Pro Pro Lys Arg Leu
        35                  40                  45

Ile Phe Leu Ala Ser Thr Leu Glu Ser Gly Val Pro Ser Arg Phe Ser
    50                  55                  60

Gly Ser Gly Ser Gly Thr Glu Phe Thr Leu Thr Ile Ser Ser Leu Gln
65                  70                  75                  80

Pro Asp Asp Phe Ala Thr Tyr Tyr Cys Ala Gly Thr Tyr Thr Gly Ser
                85                  90                  95

Ile Trp Ala Phe Gly Gly Gly Thr Lys Val Glu Ile Lys
            100                 105

<210> SEQ ID NO 136
<211> LENGTH: 109
<212> TYPE: PRT
<213> ORGANISM: Artificial Sequence
<220> FEATURE:
<223> OTHER INFORMATION: #28_VK5, humanised VK5

<400> SEQUENCE: 136

Asp Ile Gln Met Thr Gln Ser Pro Ser Thr Leu Ser Ala Ser Val Gly
1               5                   10                  15

Asp Arg Val Thr Ile Thr Cys Gln Ser Ser Gln Arg Val Ser Ser Ser
            20                  25                  30

Tyr Leu Ala Trp Tyr Gln Gln Lys Pro Gly Gln Pro Pro Lys Arg Leu
        35                  40                  45
```

```
Ile Phe Leu Ala Ser Thr Leu Glu Ser Gly Val Pro Ser Arg Phe Ser
    50                  55                  60

Gly Ser Gly Ser Gly Thr Glu Phe Thr Leu Thr Ile Ser Ser Leu Gln
65              70                  75                  80

Pro Asp Asp Phe Ala Thr Tyr Tyr Cys Ala Gly Thr Tyr Thr Gly Ser
            85                  90                  95

Ile Trp Ala Phe Gly Gly Thr Lys Val Glu Ile Lys
            100             105
```

ANTIBODIES AGAINST TAU EPITOPES

FIELD OF THE INVENTION

The invention relates to novel tau epitopes and to binding molecules, such as antibodies, capable of binding specifically to such epitopes. The invention relates to anti-tau binding molecules, such as antibodies, and compositions thereof, for use in the treatment or diagnosis of a tauopathy. The invention further relates to methods of treating a tauopathy, involving administering an anti-tau binding molecule, e.g., antibody.

BACKGROUND TO THE INVENTION

The microtubule-associated protein (MAP) tau plays a critical role in the pathogenesis of Alzheimer's disease (AD) and related tauopathies. Development of tau pathology is associated with progressive neuronal loss and cognitive decline. In patients with dementias that involve tau, including Alzheimer's disease (AD), tau pathology spreads through the brain in a predictable spatial order, which correlates with disease burden. Recent evidence suggests the involvement of extracellular tau species in the propagation between neurons of neurofibrillary lesions and the spread of tau toxicity throughout different brain regions. The mechanism underlying tau propagation is not fully characterised, but suggests a role for extracellular tau in both cognitive decline and in the spreading of tau pathology, through synaptic and non-synaptic mechanisms.

Tau proteins are produced by alternative splicing from a single gene, MAPT (microtubule-associated protein tau): in humans the MAPT gene is located on chromosome 17q21.

Tau proteins are abundant in neurons of the central nervous system and are also expressed at very low levels in CNS astrocytes and oligodendrocytes. Within neurons, tau is found predominantly in axons as a highly soluble phosphoprotein. Tau is post-translationally modified, with both physiological and pathophysiological consequences. Acetylation, ubiquitination, O-linked N-acetylglucosamine modification, methylation and phosphorylation of tau have all been described to regulate the function of tau (Morris et al (2015) Nature Neuroscience 18:1183-1189). In addition, tau may be cleaved to form peptides with enhanced ability to form aggregates and/or with neurotoxic properties.

Tau has 79 potential Serine (Ser) and Threonine (Thr) phosphorylation sites on the longest tau isoform. Phosphorylation has been reported on approximately 30 of these sites in normal tau proteins. Phosphorylation of tau is regulated by several kinases, including PKN, a serine/threonine kinase. When PKN is activated, it phosphorylates tau, resulting in disruption of microtubule organization.

The microtubule-associated protein tau and its hyperphosphorylated version form the main constituent of intracellular neurofibrillary tangles, a hallmark of several dementias, including AD and frontotemporal dementia. This evidence forms the basis of a hypothesis for AD, wherein the intracellular accumulation of tau leads to microtubule disassembly, dendritic spinal collapse, and degeneration of axons: malfunction in communication between neurons and cell death. Accordingly, tau, particularly in phosphorylated form, has been the target for development of passive and active immunotherapies for AD and other tauopathies.

Immunotherapies in clinical development that target various epitopes of tau were summarized by Pedersen et al., (2015) Trends Mol Med 21(6): 394-402:

TABLE 1

Immunotherapies in clinical development

| Antibody program | Antibody | Species | Epitope | IP |
| --- | --- | --- | --- | --- |
| ACImmune, Janssen, KU Leuven, and Fred van Leuven | ACI-35 | Active vaccine | pS396/pS404 peptide liposome formulation | WO2010115843 |
| ACImmune, Genentech, KU Leuven, and Fred van Leuven | hACI-36-2B6-Ab1 and hACI-38-3A8-Ab1 | Humanized mouse monoclonal | pS409 | WO2013151762 |
| Axon Neuroscience and Michal Novak | AADvac1 | Active vaccine | 294-305 peptide 294KDNIKHVPGGGS305 | WO02062851 |
| Axon Neuroscience and Michal Novak | DC8E8 | Humanized antibody | Generated from immunizations with 294-305 peptide | WO02062851 |
| Biogen Idec, Panima Pharmaceuticals AG, and Roger Nitsch | NI-105.4E4, 24B2, and 4A3 | Human autoantibodies | V339, E342, D387, E391, K395 | WO2012049570 US2012087861 |
| C2N Diagnostics, David Holtzman, and Marc Diamond | HJ9.3, HJ9.4, and HJ8.5 | Mouse monoclonal | 306-320, 7-13, and 25-30 | |
| Eli Lilly and Peter Davies | PHF1, MC1 | Mouse monoclonal | pS396/pS404, conformational | WO9820218 |
| Hoffman-La Roche | 2.10.2, 2.20.4, and 5.6.11 MAP86 | Rabbit monoclonal | pS422 | WO2010142423 |
| iPierian/BMS | IPN001, IPN002, IPN007 | Humanized mouse monoclonal | 9-18 | US2014294831 |

TABLE 1-continued

Immunotherapies in clinical development

| Antibody program | Antibody | Species | Epitope | IP |
|---|---|---|---|---|
| Intellect Neurosciences Inc. and Lester Binder | TOC-1 and TauC3 | Mouse monoclonal | Tau-dimers and caspase-cleaved Tau421 | U.S. Pat. No. 8,697,076 US2012244174 |
| Lundbeck, NYU, and Einar Sigurdsson | 4E6, 6B2, and scFv235 | Mouse monoclonal | pS396/pS404, total tau. other hyperphosphorylation, conformational, and truncation sites | US2008050383 US2010316564 |
| Pfizer | | Chicken monoclonal | pT212/pS214, pT231/pS235, and pS396/pS404 | WO2014016737 |
| Prothena Corporation, Lars Ittner, and Jurgen Gotz | pS404-Ab1/Ab2 pan-tau | Mouse monoclonal | pS404 and total tau | WO2014134885 |
| Prothena Corporation | h16B5 | Humanized mouse monoclonal | 23-46 peptide | WO2014165271 |
| Teijin Pharma Ltd and Hitoshi Mori | Ta1505 | Mouse monoclonal | pSer413 | WO2013130238 |

In addition to therapies listed in Table 1, Janssen are progressing antibodies specifically targeting pT217 (JNJ63733657) and UCB are in the clinic with antibodies targeting a mid-region tau sequence (amino acids 235-246 of 2N4R tau; UCB0107) (reviewed in Sandusky-Beltran et al., 2020, Neuropharmnacol. 75:108104). Pinteon Therapeutics are in Phase 1 trials with a monoclonal antibody therapeutic, PTN001, targeting the cis isomer of tau phosphorylated at threonine 231. Eisai are also preparing for clinical trials with an antibody targeting sequences in the microtubule binding region (amino acids 299-303 and 362-366; E2814; Roberts et al., 2020, Acta Neuropathologica Comms 8:13).

U.S. Pat. No. 9,139,643B2 describes an antibody, specific for misfolded and/or aggregated tau protein that does not bind to normal tau protein and which binds an epitope within amino acid residues 379-408 of full length human 2N4R (amino acids 1-441) tau (SEQ ID NO:2 of U.S. Pat. No. 9,139,643B2), it is preferred that the tau protein is fully phosphorylated.

U.S. Pat. No. 9,777,056B2 describes an antibody, capable of binding specifically to a misfolded and/or aggregate form of tau protein, raised against a tau epitope within amino acid residues 379-408 that possesses phosphoserine residues at tau position 396 and at tau position 404.

WO2010144711 describes recombinantly-produced antibodies capable of preferentially binding to pathological tau protein, relative to normal tau protein, elicited by immunization with an isolated tau peptide selected from:
(a) the amino acid sequence of tau 379-408 [S396X, S404X; Asp396, 404], (SEQ ID NO: 57 of WO2010144711);
(b) an amino acid sequence selected from the group consisting of tau386-408 [P-Ser396, Ser404] (SEQ ID NO: 13 of WO2010144711) and tau386-408 [S396X. S404X], (SEQ ID NO: 42 of WO2010144711);
(c) an amino acid sequence selected from the group consisting of: tau390-420 [Y394X, S396X, S400X, T403X, T404X, S409X, S412X, S413X] (SEQ ID NO: 74 of WO2010144711) and tau390-420 [Tyr394, Ser396, 400, 404, 409, 412, 413, Thr403] (SEQ ID NO: 99 of WO2010144711);
(d) an amino acid sequence selected from the group consisting of tau394-406 [PSer396, 404] (SEQ ID NO: 5 of WO2010144711) and tau394-406 [S396X. S202X] (SEQ ID NO: 34 of WO2010144711);
(e) an amino acid sequence selected from the group consisting of tau398-416 [P-S400, 409, 412, 413, Thr403, 414] (SEQ ID NO:23 of WO2010144711) and tau398-416 [S400X, S409X, S412X, S413X, T403X, S414X] (SEQ ID NO:52 of WO2010144711); and
(f) an amino acid sequence selected from the group consisting of: tau411-441 [P-Ser412, 413, 422] (SEQ ID NO: 100 of WO2010144711), HLSNVSSTGSIDMVD (SEQ ID NO: 101 of WO2010144711, SEQ ID NO: 118 herein); RENAKAKTDHGAE (SEQ ID NO: 102 of WO2010144711, SEQ ID NO: 119 herein) and amino acids 45-230 of tau (SEQ ID NO: 103 of WO2010144711).

WO2015197823 describes antibodies that are phospho-dependent and bind to tau peptides ptau 194-212, ptau 200-217, ptau 59-78 (SEQ ID NO:323 of WO2015197823) or ptau 406-429 (SEQ ID NO:326 of WO2015197823); antibodies that are predominantly phospho-independent and bind to tau peptide tau 204-221, and tau 221-253 and antibodies that are phospho-dependent and bind to phosphorylated tau peptide ptau 406-429, but do not bind to unphosphorylated tau peptide tau 389-441.

WO2019/084488A focusses on tau peptide linked to Th cell epitopes to enhance immunogenicity. WO2019/084488A discloses SEQ ID NO:21, a peptide consisting of residues 393-425 of tau in which none of the serine residues are phosphorylated, a phosphorylated version of the same peptide is shown in SEQ ID NO: 20; also disclosed is SEQ ID NO: 71, a peptide immunoconjugate comprising non-phosphorylated tau 393-425.

US2014/0056901 focusses on antibodies recognising the N-terminus of tau (tau2-18). It discloses SEQ ID NO: 17: tau 382-418 which is preferably non-phosphorylated and use of this peptide as an immunogen, in which tau 382-418 was fused with a synthetic foreign promiscuous Th fragment (PADRE), to generate tau 382-418-PADRE, which was then used to immunize rats to raise polyclonal antibodies.

WO2018/152359 discloses SEQ ID NO: 130 (peptide 080), tau 396-410, in table 12, which relates to a series of short peptides spanning the tau sequence, used in epitope mapping for antibody clones disclosed in the application, none the antibody clones disclosed bound to peptide 080.

Recent studies suggest a toxic role for non-phosphorylated, disease-specific tau species located in the brain extracellular space.

There is a need to identify novel therapeutic approaches intended to interfere early in the process of tau-mediated synaptic dysfunction and the propagation of tau pathology; accordingly, there is a need to identify epitopes of tau that occur specifically on extracellular pathological species of the tau protein and to generate therapeutics, such as antibodies, that seek to halt disease progression by binding specifically to extracellular pathological species of the tau protein. Such epitopes and molecules that bind thereto may also be useful for diagnosis of tauopathies.

STATEMENTS OF INVENTION

The invention provides:
1. An isolated synthetic or recombinant peptide comprising an epitope, the peptide consisting of residues 396-410 (SEQ ID NO: 1) of human 2N4R (amino acids 1-441) tau (SEQ ID NO: 2) and an N-terminal cysteine residue (SEQ ID NO: 13) or C-terminal cysteine residue, wherein the peptide is not phosphorylated (serine residues 396, 400, 404 and 409 are not phosphorylated).
2. An isolated peptide according to clause 1, further comprising a carrier protein attached to the peptide via the N- or C-terminal cysteine residue.
3. An isolated peptide according to clause 2, wherein the carrier protein is selected from Keyhole limpet hemocyanin (KLH), Concholepas concholepas hemocyanin ("Blue Carrier"), Bovine serum albumin (BSA), Cationized BSA (cBSA) and Ovalbumin (OVA).
4. An isolated peptide according to any one of clauses 1 to 3, wherein the epitope is formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated; preferably the epitope is formed and defined by residues of the amino acid sequence $_{399}VSGD_{402}$ (SEQ ID NO: 124) of human 2N4R (amino acids 1-441) tau (SEQ ID NO: 2) wherein $S_{400}$ is not phosphorylated.
5. A binding molecule capable of binding specifically to an isolated peptide or an epitope of any one of clauses 1 to 4.
6. A binding molecule of clause 5, wherein the binding molecule is an antigen-binding protein, selected from an antibody or an antigen-binding fragment thereof, a domain antibody, a protein scaffold, an affimer, a bicyclic peptide or a peptide aptamer, or an oligonucleotide aptamer.
7. An antigen-binding protein, such as an antibody or antigen-binding fragment thereof, according to clause 6 comprising an antigen-binding site comprising the CDRs (HCDR1, HCRD2, HCDR3, LCDR1, LCDR2 and LCDR3, respectively) of:
(a) Clone 1 of SEQ ID NO: 14, SEQ ID NO: 15, SEQ ID NO: 16, SEQ ID NO: 17, SEQ ID NO: 18 and SEQ ID NO: 19;
(b) Clone 2 of SEQ ID NO: 20, SEQ ID NO: 21, SEQ ID NO: 22, SEQ ID NO: 23, SEQ ID NO: 24 and SEQ ID NO: 25;
(c) Clone 3 of SEQ ID NO: 26, SEQ ID NO: 27. SEQ ID NO: 28, SEQ ID NO: 29, SEQ ID NO: 30 and SEQ ID NO: 31;
(d) Clone 4 of SEQ ID NO: 32, SEQ ID NO: 33, SEQ ID NO: 34, SEQ ID NO: 35, SEQ ID NO: 36 and SEQ ID NO: 37;
(e) Clone 5 of SEQ ID NO: 38, SEQ ID NO: 39, SEQ ID NO: 40, SEQ ID NO: 41, SEQ ID NO: 42 and SEQ ID NO: 43;
(f) Clone 6 of SEQ ID NO: 44, SEQ ID NO: 45. SEQ ID NO: 46, SEQ ID NO: 47, SEQ ID NO: 48 and SEQ ID NO: 49;
(g) Clone 7 of SEQ ID NO: 50, SEQ ID NO: 51, SEQ ID NO: 52, SEQ ID NO: 53, SEQ ID NO: 54 and SEQ ID NO: 55;
(h) Clone 8 of SEQ ID NO: 56, SEQ ID NO: 57, SEQ ID NO: 58, SEQ ID NO: 59, SEQ ID NO: 60 and SEQ ID NO: 61;
(i) Clone 9 of SEQ ID NO: 62, SEQ ID NO: 63, SEQ ID NO: 64, SEQ ID NO: 65, SEQ ID NO: 66 and SEQ ID NO: 67;
(j) Clone 10 of SEQ ID NO: 68, SEQ ID NO: 69, SEQ ID NO: 70, SEQ ID NO: 71, SEQ ID NO: 72 and SEQ ID NO: 73;
(k) Clone 11 of SEQ ID NO: 74, SEQ ID NO: 75, SEQ ID NO: 76, SEQ ID NO. 77, SEQ ID NO: 78 and SEQ ID NO: 79;
(l) Clone 12 of SEQ ID NO: 80, SEQ ID NO: 81, SEQ ID NO: 82, SEQ ID NO: 83, SEQ ID NO: 84 and SEQ ID NO: 85; or
(m) Clone 13 of SEQ ID NO: 86. SEQ ID NO: 87, SEQ ID NO: 88, SEQ ID NO: 89, SEQ ID NO: 90 and SEQ ID NO: 91;
(n) SEQ ID NO: 14, SEQ ID NO: 126 (VH6 HCDR2), SEQ ID NO: 16, SEQ ID NO: 17, SEQ ID NO: 18 and SEQ ID NO: 19;
(o) SEQ ID NO: 14, SEQ ID NO: 15, SEQ ID NO: 16, SEQ ID NO: 125 (Vk5 CDR1), SEQ ID NO: 18 and SEQ ID NO: 19; or.
(p) SEQ ID NO: 14, SEQ ID NO: 126 (VH6 HCDR2), SEQ ID NO: 16, SEQ ID NO: 125 (Vk5 CDR1), SEQ ID NO: 18 and SEQ ID NO: 19:
wherein the sequences are defined according to Kabat nomenclature.
8. An antigen-binding protein, such as an antibody or antigen-binding fragment thereof, according to clause 6 or clause 7 comprising an antigen-binding site comprising human framework sequences hFW1, hFW2, hFW3, hFW4 and the CDRs (HCDR1, HCRD2. HCDR3, LCDR1, LCDR2 and LCDR3, respectively) of:
(a) Clone 1 of SEQ ID NO: 14, SEQ ID NO: 15, SEQ ID NO: 16, SEQ ID NO: 17, SEQ ID NO: 18 and SEQ ID NO: 19;
(b) SEQ ID NO: 14, SEQ ID NO: 126 (VH6 HCDR2), SEQ ID NO: 16, SEQ ID NO: 17, SEQ ID NO: 18 and SEQ ID NO: 19:
(c) SEQ ID NO: 14, SEQ ID NO: 15, SEQ ID NO: 16, SEQ ID NO: 125 (Vk5 CDR1), SEQ ID NO: 18 and SEQ ID NO: 19; or,
(d) SEQ ID NO: 14, SEQ ID NO: 126 (VH6 HCDR2), SEQ ID NO: 16, SEQ ID NO: 125 (Vk5 CDR1), SEQ ID NO: 18 and SEQ ID NO: 19;
wherein the sequences are defined according to Kabat nomenclature.
9. An antigen-binding protein, such as an antibody or antigen-binding fragment thereof, according to clause any one of clauses 6 to 8, wherein the antigen-binding site comprises:

(a) a VH and/or VL domain sequence of, or
(b) a VH and/or VL domain sequence with at least 70, 75, 76, 77, 78, 79, 80, 81, 82, 83, 84, 85, 86, 87, 88, 89, 90, 91, 92, 93, 94, 95, 96, 97, 98 or 99% identity to,
a clone selected from:
(i) Clone 32 (VH5Vκ4) of SEQ ID NO: 131 and SEQ ID NO: 135, respectively;
(ii) Clone 1 of SEQ ID NO: 92 and SEQ ID NO: 93, respectively;
(iii) Clone 2 of SEQ ID NO: 94 and SEQ ID NO: 95, respectively;
(iv) Clone 3 of SEQ ID NO: 96 and SEQ ID NO: 97, respectively;
(v) Clone 4 of SEQ ID NO: 98 and SEQ ID NO: 99, respectively;
(vi) Clone 5 of SEQ ID NO: 100 and SEQ ID NO: 101, respectively;
(vii) Clone 6 of SEQ ID NO: 102 and SEQ ID NO: 103, respectively;
(viii) Clone 7 of SEQ ID NO: 104 and SEQ ID NO: 105, respectively;
(ix) Clone 8 of SEQ ID NO: 106 and SEQ ID NO: 107, respectively;
(x) Clone 9 of SEQ ID NO: 108 and SEQ ID NO: 109, respectively;
(xi) Clone 10 of SEQ ID NO: 110 and SEQ ID NO: 111 respectively;
(xii) Clone 11 of SEQ ID NO: 112 and SEQ ID NO: 113, respectively.
(xiii) Clone 12 of SEQ ID NO: 114 and SEQ ID NO: 115, respectively; or
(xiv) Clone 13 of SEQ ID NO: 116 and SEQ ID NO; 117, respectively.
(xv) Clone 28 (VH4Vκ4) of SEQ ID NO: 130 and SEQ ID NO: 135, respectively;
(xvi) Clone 24 (VH3Vκ4) of SEQ ID NO: 129 and SEQ ID NO: 135, respectively;
(xvii) Clone 31 (VH5Vκ2) of SEQ ID NO: 131 and SEQ ID NO: 134, respectively;
(xviii) Clone 27 (VH4Vκ2) of SEQ ID NO: 130 and SEQ ID NO: 134, respectively;
(xix) Clone 14 (VH1Vκ1) of SEQ ID NO: 127 and SEQ ID NO: 133, respectively;
(xx) Clone 15 (VH1Vκ2) of SEQ ID NO: 127 and SEQ ID NO: 134, respectively;
(xxi) Clone 16 (VH1Vκ4) of SEQ ID NO: 127 and SEQ ID NO: 135, respectively;
(xxii) Clone 18 (VH2Vκ1) of SEQ ID NO: 128 and SEQ ID NO: 133, respectively;
(xxiii) Clone 19 (VH2Vκ2) of SEQ ID NO: 128 and SEQ ID NO: 134 respectively;
(xxiv) Clone 20 (VH2Vκ4) of SEQ ID NO: 128 and SEQ ID NO: 135, respectively;
(xxv) Clone 22 (VH3Vκ1) of SEQ ID NO: 129 and SEQ ID NO: 133, respectively;
(xxvi) Clone 23 (VH3Vκ2) of SEQ ID NO: 129 and SEQ ID NO: 134, respectively;
(xxvii) Clone 26 (VH4Vκ1) of SEQ ID NO: 130 and SEQ ID NO: 133, respectively;
(xxviii) Clone 29 (VH4Vκ5) of SEQ ID NO: 130 and SEQ ID NO: 136, respectively;
(xxix) Clone 30 (VH5Vκ1) of SEQ ID NO: 131 and SEQ ID NO: 133, respectively;
(xxx) Clone 33 (VH5Vκ5) of SEQ ID NO: 131 and SEQ ID NO: 136, respectively;
(xxxi) Clone 34 (VH6Vκ1) of SEQ ID NO: 132 and SEQ ID NO: 133, respectively;
(xxxii) Clone 35 (VH6Vκ2) of SEQ ID NO: 132 and SEQ ID NO: 134, respectively;
(xxxiii) Clone 36 (VH6Vκ4) of SEQ ID NO: 132 and SEQ ID NO: 135, respectively;
(xxxiv) Clone 37 (VH6Vκ5) of SEQ ID NO: 132 and SEQ ID NO: 136, respectively;
(xxxv) Clone 17 (VH1Vκ5) of SEQ ID NO: 127 and SEQ ID NO: 136, respectively;
(xxxvi) Clone 21 (VH2Vκ5) of SEQ ID NO: 128 and SEQ ID NO: 136, respectively; or
(xxxvii) Clone 25 (VH3Vκ5) of SEQ ID NO: 129 and SEQ ID NO: 136, respectively;
wherein the sequences are defined according to Kabat nomenclature.

10. An antigen-binding protein, such as an antibody or antigen-binding fragment thereof, according to any one of clauses 6 to 9 wherein the antibody comprises the VH and VL domain of
(a) Clone 32 (VH5Vκ4) of SEQ ID NO: 131 and SEQ ID NO: 135, respectively;
(b) Clone 1 (#28, P1-D4) of SEQ ID NO: 92 and SEQ ID NO: 93, respectively;
(c) Clone 24 (VH3Vκ4) of SEQ ID NO: 129 and SEQ ID NO: 135, respectively;
(d) Clone 31 (VH5Vκ2) of SEQ ID NO: 131 and SEQ ID NO: 134, respectively;
(e) Clone 27 (VH4Vκ2) of SEQ ID NO: 130 and SEQ ID NO: 134, respectively;
(f) Clone 28 (VH4Vκ4) of SEQ ID NO: 130 and SEQ ID NO: 135, respectively; or
(g) Clone 2 (#30, P1-F4) of SEQ ID NO: 94 and SEQ ID NO: 95, respectively,
wherein the sequences are defined according to Kabat nomenclature.

11. An antigen-binding protein, such as an antibody or antigen-binding fragment thereof, according to any one of clauses 6 to 10, wherein the antibody is a monoclonal antibody.

12. An antigen-binding protein, such as an antibody or antigen-binding fragment thereof, according to any one of clauses 6 to 11, wherein the antibody is a humanised, chimeric or human antibody comprising a human Ig Fc region, preferably a human IgG1 Fc region, or a rabbit antibody.

13. An antigen-binding protein, such as an antibody or antigen-binding fragment thereof, according to any one of clauses 7 to 12, wherein the antibody comprises an Ig Fc region with effector function or with enhanced effector function.

14. An antigen-binding protein, such as an antibody or antigen-binding fragment thereof capable of competing with an antibody according to any one of clauses 7 to 13 for binding to an isolated synthetic or recombinant peptide comprising an epitope according to any one of claims 1 to 4 when assessed in a competition assay.

15 An antigen-binding protein, such as an antibody or antigen-binding fragment thereof capable of competing with an antibody according to any one of clauses 7 to 14 for binding to an epitope formed and defined by residues of the amino acid sequence $4_{400}SGD_{402}$ (SEQ ID NO 123) of human 2N4R (amino acids 1-441) tau (SEQ ID NO: 2), wherein $S_{400}$ is not phosphorylated; preferably an epitope formed and defined by residues of the amino acid sequence $_{399}VSGD_{402}$ (SEQ ID NO: 124) of human 2N4R (amino acids 1-441) tau (SEQ ID NO: 2) wherein $S_{400}$ is not phosphorylated.

16. An isolated peptide, binding molecule, or antigen-binding protein or fragment thereof, of any preceding clause which is the product of expression of a recombinant DNA or RNA sequence.
17. An isolated recombinant DNA or RNA sequence comprising a sequence encoding an isolated peptide, binding molecule, antigen-binding protein or fragment thereof, according to any one of clauses 1 to 16.
18. An isolated recombinant DNA sequence of clause 17 which is a vector.
19. An isolated recombinant DNA sequence of clause 18 which is an expression vector.
20. An isolated recombinant DNA sequence of clause 18 or 19 encoding an isolated peptide, binding molecule, antigen-binding protein or fragment thereof, according to any one of clauses 1 to 16 under control of a promoter.
21. A host cell comprising a DNA or RNA sequence according to any one of clauses 16 to 20.
22. A host cell of clause 21 capable of expressing an isolated peptide, binding molecule, antigen-binding protein or fragment thereof, of any one of clauses 1 to 16.
23. A method of making an isolated peptide, binding molecule, antigen-binding protein or fragment thereof, of any one of clauses 1 to 16 comprising culturing a host cell according to clause 21 or 22 in conditions suitable for expression of the isolated peptide, binding molecule, antigen-binding protein or fragment thereof, and isolating the isolated peptide, binding molecule, antigen-binding protein or fragment thereof.
24. A composition comprising an isolated peptide, binding molecule, antigen-binding protein or fragment thereof, according to any one of clauses 1 to 16 and a diluent, preferably a pharmaceutically-acceptable diluent.
25. An immunogenic composition capable of inducing an immunological response in a subject inoculated with said composition, the composition comprising an isolated peptide according to any one of clauses 1 to 4 together with a pharmaceutically acceptable diluent, adjuvant and/or carrier.
26. An isolated peptide of one of clauses 1 to 4, or an immunogenic composition of clause 25, for use as a peptide vaccine.
27. An isolated peptide, binding molecule, antigen-binding protein or fragment thereof of any one of clauses 1 to 16, or composition of clause 24 or 25, for use as a medicament or for use in diagnosis.
28. An isolated peptide, binding molecule, antigen-binding protein or fragment thereof of any one of clauses 1 to 16, or composition of clause 24 or 25, for use as a medicament for the prophylactic or therapeutic treatment of a tauopathy, or for the manufacture of a medicament for the prophylactic or therapeutic treatment of a tauopathy, preferably the tauopathy is selected from Alzheimer's disease, amyotrophic lateral sclerosis/parkinsonism-dementia complex, argyrophilic grains disease, beta-propeller protein associated neurodegeneration (BPAN), British type amyloid angiopathy, cerebral amyloid angiopathy. Creutzfeldt-Jakob disease, dementia pugilistica, diffuse neurofibrillary tangles with calcification, Down's syndrome, chronic traumatic encephalopathy (CTE), corticobasal degeneration (CBD), frontotemporal dementia (FTD), frontotemporal dementia and parkinsonism linked to chromosome 17 (FTDP-17), frontotemporal lobar degeneration. Gerstmann-Straussler-Scheinker disease. Hallervorden-Spatz disease, inclusion body myositis, multiple system atrophy, myotonic dystrophy, Niemann-pick disease type C, non-guamanian motor neuron disease with neurofibrillary tangles, Pick's disease, post-encephalitic parkinsonism, primary age-related tauopathy (PART), prion protein cerebral amyloid angiopathy, progressive subcortical gliosis, progressive supranuclear palsy (PSP), subacute sclerosing panencephalitis, tangle-dominant dementia, globular glial tauopathy, parkinsonism dementia complex of Guam, progressive non-fluent aphasia, multi-infarct dementia, ischemic stroke, traumatic brain injury (TBI) and stroke.
29. An isolated peptide, binding molecule, antigen-binding protein or fragment thereof of any one of clauses 1 to 16, or composition of clause 24 or 25, for use in preventing tau-mediated inhibition of long term potentiation in rodent models and/or increasing phagocytosis or uptake of tau species by human microglia and/or reducing uptake of tau species by human neurons and/or promoting uptake of tau species by human astrocytes and/or preventing uptake of tau species by human astrocytes.
30. An isolated peptide, binding molecule, antigen-binding protein or fragment thereof of any one of clauses 1 to 16, or composition of clause 24 or 25, for use to identify human tau proteins comprising an epitope comprised within residues 396-410 (SEQ ID NO: 1) of human 2N4R (amino acids 1-441) tau (SEQ ID NO: 2), wherein the epitope is not phosphorylated.
31. An isolated peptide, binding molecule, antigen-binding protein or fragment thereof of any one of clauses 1 to 16, or composition of clause 24 or 25, for use to identify human tau proteins comprising an epitope formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated; preferably for use to identify human tau proteins comprising an epitope formed and defined by residues of the amino acid sequence $_{399}VSGD_{402}$ (SEQ ID NO: 124), of human 2N4R (amino acids 1-441) tau (SEQ ID NO: 2), wherein $S_{400}$ is not phosphorylated.
32. An isolated peptide, binding molecule, antigen-binding protein or fragment thereof of any one of clauses 1 to 16, or composition of clause 24 or 25, for use in a diagnostic test for a tauopathy.
33. A diagnostic kit comprising an isolated peptide, binding molecule, antigen-binding protein or fragment thereof of any one of clauses 1 to 16, or composition of clause 24 or 25 and a reagent capable of detecting an immunological (antigen-antibody) complex which contains said isolated peptide, binding molecule, antigen-binding protein or fragment thereof, wherein optionally said isolated peptide and/or binding molecule, antigen-binding protein or fragment thereof is immobilized on a solid support (e.g., microplate well), and/or wherein optionally said immunological complex which contains said isolated peptide, binding molecule, antigen-binding protein or fragment thereof is detectable by ELISA or an alternative immunoassay method or by lateral flow.
34. A diagnostic kit according to clause 33, further comprising one or more control standards and/or specimen diluent and/or washing buffer.

Surprisingly the inventors have identified a unique non-phosphorylated epitope present on extracellular soluble and/or insoluble tau and have raised antibodies capable of binding specifically to the epitope of the invention, comprised within residues 396-410 (SEQ ID NO: 1) of human 2N4R (amino acids 1-441) tau (SEQ ID NO: 2), which antibodies do not bind to forms of tau that are phosphorylated at the epitope, thus which preferentially bind to extracellular 'toxic' forms of tau rather than physiological tau. The epitope is formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated; preferably the epitope is formed and defined by residues of the amino acid sequence $_{399}VSGD_{402}$ (SEQ ID NO: 124) of human 2N4R (amino acids 1-441) tau (SEQ ID NO: 2) wherein $S_{400}$ is not phosphorylated.

Without wishing to be bound by theory, it is thought that such antibodies will have a reduced risk of adverse events related to disruption of physiological extracellular tau function, when compared to antibodies targeting the N-terminus of tau. Antibodies of the invention may be useful in detection of tau in tauopathies such as Alzheimer's disease or other dementias, e.g., in CSF or blood (plasma or serum), for diagnosis, monitoring progression, prognosing disease, etc. Prevention of tau-mediated toxicity can be demonstrated based on evidence from immunodepletion experiments, such as in vivo LTP as a model of tau-mediated synaptotoxicity, and in vitro tests: e.g., reduction in neuronal tau uptake as a model of pathological tau spreading. Amelioration of tau-mediated synaptotoxicity and a reduction in neuronal uptake of tau may be beneficial in reducing cognitive decline and neurodegeneration respectively, in in patients with, suspected of having, or predisposed towards developing a tauopathy, such as Alzheimer's disease.

DETAILED DESCRIPTION

The invention relates to an isolated synthetic or recombinant peptide comprising an epitope said peptide comprising or consisting of residues 396-410 (SEQ ID NO: 1) of human 2N4R (amino acids 1-441) tau (SEQ ID NO: 2), wherein the epitope is not phosphorylated.

The invention relates to an isolated synthetic or recombinant peptide comprising an epitope, said peptide comprising or consisting of residues 396-410 (SPWSGDT-SPRHLSN, SEQ ID NO: 1) of human tau (tau1-441, SEQ ID NO: 2), wherein the peptide is not phosphorylated (at serine residues (396, 400, 404, 409)).

Isolated synthetic or recombinant immunogenic peptides of the invention comprising or consisting of residues 396-410 (SEQ ID NO: 1) of human 2N4R (amino acids 1-441) tau (SEQ ID NO: 2), comprise an epitope of the invention, wherein the epitope is not phosphorylated.

The invention further relates to binding molecules, e.g., antigen-binding proteins, such as antibodies and antigen-binding fragments thereof that comprise a CDR-based antigen-binding site, specific for an epitope comprised within residues 396-410 (SPWSGDTSPRHLSN, SEQ ID NO: 1) of human tau (tau1-441 SEQ ID NO: 2), wherein the serine residues (396, 400, 404, 409) are not phosphorylated.

Binding molecules. e.g., antigen-binding proteins, such as antibodies and antigen-binding fragments thereof of the invention bind to extracellular tau species that include the epitope formed by residues 396-410 (SPWSGDT-SPRHLSN, SEQ ID NO: 1) of human tau (tau1-441 SEQ ID NO: 2), wherein the serine residues (396, 400, 404 and 409) are not phosphorylated.

An isolated synthetic or recombinant peptide of the invention may consist of residues 396-410 (SPWSGDT-SPRHLSN, SEQ ID NO: 1) of human tau (tau1-441 SEQ ID NO: 2), wherein the serine residues (396, 400, 404 and 409) are not phosphorylated.

An isolated synthetic or recombinant peptide of the invention may comprise a fragment of human tau (tau1-441 SEQ ID NO: 2) comprising residues 396-410 (SPWSGDT-SPRHLSN, SEQ ID NO: 1) that is preferably less than 20 amino acids in length, most preferably 15, 16, 17, 18, 19 or 20 amino acids in length.

An isolated synthetic or recombinant peptide of the invention may comprise or consist of a N-terminal cysteine (CSPWSGDTSPRHLSN, SEQ ID NO: 13) or a C-terminal cysteine for conjugation of a carrier protein or detectable label. Carrier proteins or detectable labels may be conjugated directly to the N- or C-terminal cysteine, or indirectly, e.g., with a spacer or linker molecule, to the N- or C-terminal cysteine. In preferred embodiments an isolated synthetic or recombinant peptide of the invention comprises and N-terminal cysteine and the carrier protein or detectable label is conjugated thereto via a linker.

Carrier proteins that may be conjugated to an isolated synthetic or recombinant peptide of the invention may be selected from Keyhole limpet hemocyanin (KLH), *Concholepas concholepas* hemocyanin ("Blue Carrier"), Bovine serum albumin (BSA). Cationized BSA (cBSA) and Ovalbumin (OVA).

An isolated synthetic or recombinant peptide of the invention is an immunogenic peptide, comprising an epitope against which antibody can be raised.

In preferred embodiments, an epitope of the invention is formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated; preferably an epitope of the invention is formed and defined by residues of the amino acid sequence $_{399}VSGD_{402}$ (SEQ ID NO: 124) of human 2N4R (amino acids 1-441) tau (SEQ ID NO: 2) wherein S400 is not phosphorylated.

The epitope is present on peptides of the invention, said peptides comprising or consisting of residues 396-410 (SPWSGDTSPRHLSN, SEQ ID NO: 1) of human tau (tau1-441 SEQ ID NO: 2), wherein the serine residues (396, 400, 404, 409) are not phosphorylated.

A binding molecule of the invention may be an antigen-binding protein, such as an antibody or an antigen-binding fragment thereof, a domain antibody, a protein scaffold, an aptamer, an affimer, or a bicyclic peptide, or a peptide or oligonucleotide aptamer.

An antibody or antigen-binding fragment thereof of the invention may be produced by recombinant means. A "recombinant antibody" is an antibody which has been produced by a recombinantly engineered host cell. An antibody or antigen-binding fragment thereof in accordance with the invention is optionally isolated or purified.

The term "antibody" or "antibody molecule" describes an immunoglobulin whether natural or partly or wholly synthetically produced. An antigen-binding protein of the invention may be an antibody, preferably a monoclonal antibody, and may be human or non-human, chimeric or humanised.

The antibody molecule is preferably a monoclonal antibody molecule. Examples of antibodies are the immunoglobulin isotypes, such as immunoglobulin G, and their isotypic subclasses, such as IgG1, IgG2. IgG3 and IgG4, as well as fragments thereof. The four human subclasses (IgG1, IgG2, IgG3 and IgG4) each contain a different heavy chain;

but they are highly homologous and differ mainly in the hinge region and the extent to which they activate the host immune system. IgG1 and IgG4 contain two inter-chain disulphide bonds in the hinge region, IgG2 has 4 and IgG3 has 11 inter-chain disulphide bonds.

The terms "antibody" and "antibody molecule", as used herein, includes antibody fragments, such as Fab and scFv fragments, provided that said fragments comprise a CDR-based antigen binding site for an epitope of the invention comprised within residues 396-410 of human tau, wherein the serine residues (396, 400, 404 and 409) are not phosphorylated. Examples of antibody fragments include but are not limited to Fv, Fab, Fab', Fab'-SH. F(ab')2; diabodies; linear antibodies; single-chain antibody molecules (e.g., scFv) and domain antibodies (sdAbs). Unless the context requires otherwise, the terms "antigen-binding protein". Unless the context requires otherwise, the terms "antigen-binding protein", "antibody" or "antibody molecule", as used herein, is thus equivalent to "antibody or antigen-binding fragment thereof".

Antibodies are immunoglobulins, which have the same basic structure consisting of two heavy and two light chains forming two Fab arms containing identical domains that are attached by a flexible hinge region to the stem of the antibody, the Fc domain, giving the classical 'Y' shape. The Fab domains consist of two variable and two constant domains, with a variable heavy (VH) and constant heavy 1 (CH1) domain on the heavy chain and a variable light (VL) and constant light (CL) domain on the light chain. The two variable domains (VH and VL) form the variable fragment (Fv), which provides the CDR-based antigen specificity of the antibody, with the constant domains (CH1 and VL) acting as a structural framework. Each variable domain contains three hypervariable loops, known as complementarity determining regions (CDRs). On each of the VH and VL the three CDRs (CDR1, CDR2, and CDR3) are flanked by four less-variable framework (FR) regions (FR1, FW2, FW3 and FW4) to give a structure FW1-CDR1-FW2-CDR2-FW3-CDR3-FW4. In humanised VH and VL, the three CDRs (CDR1, CDR2, and CDR3) are flanked by four human framework (FR) regions (hFR1, hFW2, hFW3 and hFW4) to give a structure hFW1-CDR1-hFW2-CDR2-hFW3-CDR3-hFW4. The CDRs provide a specific antigen recognition site on the surface of the antibody.

Both Kabat and ImMunoGeneTics (IMGT) numbering nomenclature may be used herein. Generally, unless otherwise indicated (explicitly or by context) amino acid residues are numbered herein according to the Kabat numbering scheme (Kabat & Wu, 1991, J Immunol 147(5): 1709-19). For those instances when the IMGT numbering scheme is used, amino acid residues are numbered herein according to the ImMunoGeneTics (IMGT) numbering scheme described in Lefranc et al., 2005, Dev Comp Immunol 29(3): 185-203.

It is possible to take monoclonal and other antibodies and use techniques of recombinant DNA technology to produce other antibodies or chimeric molecules which generally retain the specificity of the original antibody. Such techniques may involve introducing the CDRs into a different immunoglobulin framework, or grafting variable regions onto a different immunoglobulin constant region. Introduction of the CDRs of one immunoglobulin into another immunoglobulin is described for example in EP-A-184187, GB2188638A or EP-A-239400. Alternatively, a hybridoma or other cell producing an antibody molecule may be subject to genetic mutation or other changes, which may or may not alter the binding specificity of antibodies produced.

As antibodies can be modified in a number of ways, the term "antigen-binding protein" or "antibody" should be construed as covering antibody fragments, derivatives, functional equivalents and homologues of antibodies, including any polypeptide comprising an immunoglobulin binding domain, an aptamer, affimer or bicyclic peptide, whether natural or wholly or partially synthetic. Chimeric molecules comprising an immunoglobulin binding domain, or equivalent, fused to another polypeptide are therefore included. Cloning and expression of chimeric antibodies are described in EP-A-0120694 and EP-A-0125023.

An example of an antibody fragment comprising both CDR sequences and CH3 domain is a minibody, which comprises a scFv joined to a CH3 domain (Hu et al., (1996) Cancer Res 56(13): 3055-61).

A domain (single-domain) antibody is a peptide, usually about 110 amino acids long, comprising one variable domain (VH) of a heavy-chain antibody, or of an IgG. A single-domain antibody (sdAb), (e.g., nanobody), is an antibody fragment consisting of a single monomeric variable antibody domain. Like a whole antibody (comprising two heavy and two light chains), it is an antigen-binding protein able to bind selectively to a specific antigen. Domain antibodies have a molecular weight of only 12-15 kDa and are thus much smaller than antibodies composed of two heavy protein chains and two light chains (150-160 kDa), and domain antibodies are even smaller than Fab fragments (~50 kDa, one light chain and half a heavy chain) and single-chain variable fragments (~25 kDa, two variable domains, one from a light and one from a heavy chain). Single-domain antibodies have been engineered from heavy-chain antibodies found in camelids; these are termed VHH fragments. Cartilaginous fish also have heavy-chain antibodies (Ig-NAR, 'immunoglobulin new antigen receptor'), from which single-domain antibodies called VNAR fragments can be obtained. A domain (single-domain) antibody may be a VH or VL. A domain antibody may be a VH or VL of human or murine origin. Although most single-domain antibodies are heavy chain variable domains, light chain single-domain antibodies (VL) have also been shown to bind specifically to target epitopes.

Protein scaffolds have relatively defined three-dimensional structures and typically contain one or more regions which are amenable to specific or random amino acid sequence variation, to produce antigen-binding regions within the scaffold that are capable of binding to an antigen.

An aptamer is a short peptide or oligonucleotide (DNA, RNA or XNA) that is capable of binding to a specific target antigen.

An affimer is a small, highly stable protein that binds a target antigen with similar specificity and affinity to that of an antibody. Affimers are engineered non-antibody binding proteins, designed to mimic the molecular recognition characteristics of monoclonal antibodies.

Bicyclic peptides are synthetic, highly constrained peptides, usually between 9 and 15 amino acids in size. Conformational rigidity of bicyclic peptides is achieved by tethering the peptides on molecular scaffolds, providing bicyclic peptides molecules with a high target specificity and an affinity that resembles that of antibodies or small proteins.

An antibody or antigen-binding fragment of the invention binds to an epitope comprised within residues 396-410 of human tau, wherein the serine residues (396, 400, 404 and 409) are not phosphorylated. Binding in this context may refer to specific binding. The term "specific" may refer to the situation in which the antibody molecule will not show any significant binding to molecules other than its specific binding partner(s), here an epitope within residues 396-410 of human tau, wherein the serine residues (396, 400, 404 and 409) are not phosphorylated. The term "specific" is also applicable where the antibody molecule is specific for particular epitopes of the invention, such as an epitope comprised within residues 396-410 of human tau, wherein the serine residues (396, 400, 404 and 409) are not phosphorylated, that are carried by a number of antigens in which case the antibody molecule will be able to bind to the various antigens carrying the epitope. The epitope may be present in tau species that are monomeric, oligomeric or aggregates. Tau species may be full-length or truncated in regions outside of residues 396-410. The epitope may be present in fragments of tau that comprise residues 396-410 (SEQ ID NO: 1) of human tau1-441 (SEQ ID NO: 2), wherein the serine residues (396, 400, 404 and 409) are not phosphorylated. An antibody or antigen-binding fragment of the invention binds to an epitope formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated; preferably an epitope of the invention is formed and defined by residues of the amino acid sequence $_{399}VSGD_{402}$ (SEQ ID NO: 124) of human 2N4R (amino acids 1-441) tau (SEQ ID NO: 2) wherein $S_{400}$ is not phosphorylated. The epitope is present on peptides of the invention, said peptides comprising or consisting of residues 396-410 (SPWSGDTSPRHLSN, SEQ ID NO: 1) of human tau (tau1-441 SEQ ID NO: 2), wherein the serine residues (396, 400, 404, 409) are not phosphorylated.

Amino acids may be referred to by their one letter or three letter codes, or by their full name. The one and three letter codes, as well as the full names, of each of the twenty standard amino acids are set out below.

TABLE 2

Amino acids, one and three-letter codes.

| Amino acid | One letter code | Three letter code |
|---|---|---|
| alanine | A | Ala |
| arginine | R | Arg |
| asparagine | N | Asn |
| aspartic acid | D | Asp |
| cysteine | C | Cys |
| glutamic acid | E | Glu |
| glutamine | Q | Gln |
| glycine | G | Gly |
| histidine | H | His |
| isoleucine | I | Ile |
| leucine | L | Leu |
| lysine | K | Lys |
| methionine | M | Met |
| phenylalanine | F | Phe |
| proline | P | Pro |
| serine | S | Ser |
| threonine | T | Thr |
| tryptophan | W | Trp |
| tyrosine | Y | Tyr |
| valine | V | Val |

In preferred embodiments, an antibody of the invention or an antigen-binding fragment thereof may comprise the set of six CDRs (HCDR1, HCDR2, HCDR3, LCDR1, LCDR2, and LCDR3) of any of clones 1 to 37 (e.g., as set forth in Table 6, or Table 7, when defined by Kabat nomenclature)

An antibody or an antigen-binding fragment thereof of the invention may comprise a VH and/or VL amino acid sequence of any one of clones 1 to 37.

An antibody or an antigen-binding fragment thereof of the invention may comprise one or more, e.g. 1, 2, 3, 4, 5, 6, 7, 8, 9 or 10 further amino acid modifications in the VH and/or VL sequences, provided that functional properties of the antibody are retained.

A modification may be an amino acid substitution, deletion or insertion. Preferably, the modification is a substitution.

In preferred embodiments in which one or more amino acids are substituted with another amino acid, the substitutions may be conservative substitutions, for example according to the following table. In some embodiments, amino acids in the same category in the middle column are substituted for one another, i.e., a non-polar amino acid is substituted with another non-polar amino acid, for example. In some embodiments, amino acids in the same line in the rightmost column are substituted for one another.

TABLE 3

| | Amino acids | |
|---|---|---|
| ALIPHATIC | Non-polar | G A P |
| | | I L V |
| | Polar - uncharged | C S T M |
| | | N Q |
| | Polar - charged | D E |
| | | K R |
| AROMATIC | | H F W Y |

In some embodiments, substitution(s) may be functionally conservative. That is, in some embodiments the substitution may not affect (or may not substantially affect) one or more functional properties (e.g. binding affinity) of the antibody molecule comprising the substitution as compared to the equivalent unsubstituted antibody molecule.

In a preferred embodiment, an antibody of the invention or an antigen-binding fragment thereof may comprise a VH and/or VL domain sequence with one or more amino acid sequence alterations (addition, deletion, substitution and/or insertion of an amino acid residue), preferably 20 alterations or fewer, 15 alterations or fewer, 10 alterations or fewer, 5 alterations or fewer, 4 alterations or fewer. 3 alterations or fewer, 2 alterations or fewer, or 1 alteration compared with the VH and/or VL sequences of the invention set forth herein.

In preferred embodiments, an antibody or antigen-binding fragment thereof of the invention may comprise a VH domain amino acid sequence of any one of clones 1 to 37 set forth in SEQ ID NO: 92, 94, 96, 98, 100, 102, 104, 106, 108, 110, 112, 114, 116, 127, 128, 129, 130, 131, or 132; or a VH domain with an amino acid sequence which has at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the VH domain sequence of any one of clones 1 to 37 set forth in SEQ ID NO: 92, 94, 96, 98, 100, 102, 104, 106, 108, 110, 112, 114, 116, 127, 128, 129, 130, 131, or 132.

In a preferred embodiment, an antibody or antigen-binding fragment thereof of the invention comprises a VH domain amino acid sequence comprising the set of HCDRs: HCDR1, HCDR2, and HCDR3 of any of clones 1 to 37 respectively, e.g., as set forth in Table 6 and 7, and described herein, when defined by Kabat nomenclature, and the VH domain has an amino acid sequence with at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the VH domain amino acid sequence of any one of clones 1 to 37 set forth in SEQ ID NO: 92, 94, 96, 98, 100, 102, 104, 106, 108, 110, 112, 114, 116, 127, 128, 129, 130, 131, or 132.

In preferred embodiments, an antibody or antigen-binding fragment thereof of the invention or an antigen-binding fragment thereof may comprise a VL domain amino acid sequence of any of clones 1 to 37 set forth in SEQ ID NO: 93, 95, 97, 99, 101, 103, 105, 107, 109, 111, 113, 115, 117, 133, 134, 135, or 136; or a VL domain with an amino acid sequence which has at least 70%. At least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the VL domain amino acid sequence of any one of clones 1 to 37 set forth in SEQ ID NO: 93, 95, 97, 99, 101, 103, 105, 107, 109, 111, 113, 115, 117, 133, 134, 135, or 136.

In a preferred embodiment, an antibody or antigen-binding fragment thereof of the invention comprises a VL domain amino acid sequence comprising the set of LCDRs: LCDR1, LCDR2 and LCDR3 of any one of clones 1 to 37 respectively. e.g., as set forth in Tables 6 and 7 and described herein, when defined by Kabat nomenclature, and the VL domain has an amino acid sequence with at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the VL domain amino acid sequence of any one of clones 1 to 37 set forth in SEQ ID NO: 93, 95, 97, 99, 101, 103, 105, 107, 109, 111, 113, 115, or 117.

In a preferred embodiment, an antibody or antigen-binding fragment thereof of the invention comprises a VH and a VL domain amino acid sequence comprising the set of HCDRs: HCDR1, HCDR2, and HCDR3 and a set of LCDRs: LCDR1, LCDR2, LCDR3, of any one of clones 1 to 37 respectively when defined by Kabat nomenclature. Preferably the CDRs are interspersed between immunoglobulin framework sequences FW1-4: FW1-CDR1-FW2-CDR2-FW3-CDR3-FW4. In humanised antibody or antigen-binding fragment thereof of the invention the CDRs are interspersed between human immunoglobulin framework sequences hFW1-4: hFW1-CDR1-hFW2-CDR2-hFW3-CDR3-hFW4.

In particular preferred embodiments, an antibody or antigen-binding fragment thereof of the invention comprises a VH and a VL of any of clones 1 to 37 respectively when defined by Kabat nomenclature.

Preferably an antigen-binding protein, such as an antibody or antigen-binding fragment thereof, of the invention comprises an antigen-binding site comprising a VH and VL domain sequence of a clone selected from:

Clone 32 (VH5Vκ4) of SEQ ID NO: 131 and SEQ ID NO: 135, respectively;
Clone 1 of SEQ ID NO: 92 and SEQ ID NO: 93, respectively;
Clone 2 of SEQ ID NO: 94 and SEQ ID NO: 95, respectively;
Clone 3 of SEQ ID NO: 96 and SEQ ID NO: 97, respectively;
Clone 4 of SEQ ID NO: 98 and SEQ ID NO: 99, respectively:
Clone 5 of SEQ ID NO: 100 and SEQ ID NO: 101, respectively:
Clone 6 of SEQ ID NO: 102 and SEQ ID NO: 103, respectively;
Clone 7 of SEQ ID NO: 104 and SEQ ID NO: 105, respectively;
Clone 8 of SEQ ID NO: 106 and SEQ ID NO: 107, respectively;
Clone 9 of SEQ ID NO: 108 and SEQ ID NO: 109, respectively:
Clone 10 of SEQ ID NO: 110 and SEQ ID NO: 111 respectively;
Clone 11 of SEQ ID NO: 112 and SEQ ID NO: 113, respectively;
Clone 12 of SEQ ID NO: 114 and SEQ ID NO: 115, respectively; or
Clone 13 of SEQ ID NO: 116 and SEQ ID NO: 117, respectively:
Clone 28 (VH4Vκ4) of SEQ ID NO: 130 and SEQ ID NO: 135, respectively;
Clone 24 (VH3Vκ4) of SEQ ID NO: 129 and SEQ ID NO: 135, respectively;
Clone 31 (VH5Vκ2) of SEQ ID NO: 131 and SEQ ID NO: 134, respectively;
Clone 27 (VH4Vκ2) of SEQ ID NO: 130 and SEQ ID NO: 134, respectively;
Clone 14 (VH1Vκ1) of SEQ ID NO: 127 and SEQ ID NO: 133, respectively;
Clone 15 (VH1Vκ2) of SEQ ID NO: 127 and SEQ ID NO: 134, respectively;
Clone 16 (VH1Vκ4) of SEQ ID NO: 127 and SEQ ID NO: 135, respectively;
Clone 18 (VH2Vκ1) of SEQ ID NO: 128 and SEQ ID NO: 133, respectively;
Clone 19 (VH2Vκ2) of SEQ ID NO: 128 and SEQ ID NO: 134 respectively;
Clone 20 (VH2Vκ4) of SEQ ID NO: 128 and SEQ ID NO: 135, respectively;
Clone 22 (VH3Vκ1) of SEQ ID NO: 129 and SEQ ID NO: 133, respectively;
Clone 23 (VH3Vκ2) of SEQ ID NO: 129 and SEQ ID NO: 134, respectively;
Clone 26 (VH4Vκ1) of SEQ ID NO: 130 and SEQ ID NO: 133, respectively;
Clone 29 (VH4Vκ5) of SEQ ID NO: 130 and SEQ ID NO: 136, respectively;
Clone 30 (VH5Vκ1) of SEQ ID NO: 131 and SEQ ID NO: 133, respectively;
Clone 33 (VH5Vκ5) of SEQ ID NO: 131 and SEQ ID NO: 136, respectively;
Clone 34 (VH6Vκ1) of SEQ ID NO: 132 and SEQ ID NO: 133, respectively;
Clone 35 (VH6Vκ2) of SEQ ID NO: 132 and SEQ ID NO: 134, respectively;
Clone 36 (VH6Vκ4) of SEQ ID NO: 132 and SEQ ID NO: 135, respectively;
Clone 37 (VH6Vκ5) of SEQ ID NO: 132 and SEQ ID NO: 136, respectively;
Clone 17 (VH1Vκ5) of SEQ ID NO: 127 and SEQ ID NO: 136, respectively;
Clone 21 (VH2Vκ5) of SEQ ID NO: 128 and SEQ ID NO: 136, respectively; or
Clone 25 (VH3Vκ5) of SEQ ID NO: 129 and SEQ ID NO: 136, respectively;
wherein the sequences are defined according to Kabat nomenclature.

In preferred embodiments, an antibody or antigen-binding fragment thereof of the invention has an affinity $K_D$ of <250 nM, <200 nM, <100 nM, or <50 nM for binding to full length recombinant 2N4R tau (SEQ ID NO: 2) when measured by BiacoreT200.

Sequence identity is commonly defined with reference to the algorithm GAP (Wisconsin GCG package, Accelerys Inc, San Diego USA). GAP uses the Needleman and Wunsch algorithm to align two complete sequences, maximising the number of matches and minimising the number of gaps. Generally, default parameters are used, with a gap creation penalty equaling 12 and a gap extension penalty equaling 4. Use of GAP may be preferred but other algorithms may be used, e.g. BLAST (which uses the method of Altschul et al. (1990) J. Mol. Biol. 215: 405-410), FASTA (which uses the method of Pearson and Lipman (1988) PNAS USA 85: 2444-2448), or the Smith-Waterman algorithm (Smith and Waterman (1981) J. Mol Biol. 147: 195-197), or the TBLASTN program, of Altschul et al. (1990) supra, generally employing default parameters. In particular, the psi-Blast algorithm (Altschul et al (1997) Nucl. Acids Res. 25 3389-3402) may be used. Sequence identity may be defined using the Bioedit, ClustalW algorithm.

Alignments were performed using Snapgene and based on MUSCLE (Multiple Sequence Comparison by Log-Expectation) algorithms (Edgar (2004a) Nucleic Acids Res 32:1792-7; Edgar (2004b) BMC Bioinformatics 5:113).

The antibody may comprise a CH2 domain. The CH2 domain is preferably located at the N-terminus of the CH3 domain, as in the case in a human IgG molecule. The CH2 domain of the antibody is preferably the CH2 domain of human IgG1, IgG2, IgG3, or IgG4, more preferably the CH2 domain of human IgG1. The sequences of human IgG domains are known in the art.

The antibody may comprise an immunoglobulin hinge region, or part thereof, at the N-terminus of the CH2 domain. The immunoglobulin hinge region allows the two CH2-CH3 domain sequences to associate and form a dimer. Preferably, the hinge region, or part thereof, is a human IgG1, IgG2, IgG3 or IgG4 hinge region, or part thereof. More preferably, the hinge region, or part thereof, is an IgG1 hinge region, or part thereof.

The sequence of the CH3 domain is not particularly limited. Preferably, the CH3 domain is a human immunoglobulin G domain, such as a human IgG1, IgG2, IgG3, or IgG4 CH3 domain, most preferably a human IgG1 CH3 domain.

An antibody of the invention may comprise a human IgG1, IgG2, IgG3, or IgG4 constant region. The sequences of human IgG1, IgG2, IgG3, or IgG4 CH3 domains are known in the art. An antibody of the invention may comprise a non-human IgG constant region, e.g., a rabbit IgG1 constant region.

An antibody of the invention may comprise a human IgG Fc with effector function.

Fc receptors (FcRs) are key immune regulatory receptors connecting the antibody mediated (humoral) immune response to cellular effector functions. Receptors for all classes of immunoglobulins have been identified, including FcγR (IgG), FcεRI (IgE), FcαRI (IgA), FcμR (IgM) and FcδR (IgD). There are three classes of receptors for human IgG found on leukocytes: CD64 (FcγRI), CD32 (FcγRIIa, FcγRIIb and FcγRIIc) and CD16 (FcγRIIIa and FcγRIIIb). FcγRI is classed as a high affinity receptor (nanomolar range KD) while FcγRII and FcγRIII are low to intermediate affinity (micromolar range KD).

In antibody dependent cellular cytotoxicity (ADCC), FcvRs on the surface of effector cells (natural killer cells, macrophages, monocytes and eosinophils) bind to the Fc region of an IgG which itself is bound to a target cell. Upon binding a signalling pathway is triggered which results in the secretion of various substances, such as lytic enzymes, perforin, granzymes and tumour necrosis factor, which mediate in the destruction of the target cell. The level of ADCC effector function various for IgG subtypes. Although this is dependent on the allotype and specific FcvR in simple terms ADCC effector function is high for human IgG1 and IgG3, and low for IgG2 and IgG4. See below for IgG subtype variation in effector functions, ranked in decreasing potency.

| Effector Function | Species | IgG Subtype Potency |
| --- | --- | --- |
| ADCC | Human | IgG1 ≥ IgG3 >> IgG4 > IgG2 |
|  | Mouse | IgG2b ≥ IgG2a > IgG1 >> IgG3 |
| Gig Binding | Human | IgG3 > IgG1 >> IgG2 > IgG4 |
|  | Mouse | IgG2a ≥ IgG2b > IgG3 > IgG1 |

FcγRs bind to IgG asymmetrically across the hinge and upper CH2 region. Knowledge of the binding site has resulted in engineering efforts to modulate IgG effector functions Antibodies of the invention may have an Fc with effector function, with enhanced effector function or with reduced effector function.

The potency of antibodies can be increased by enhancement of the ability to mediate cellular cytotoxicity functions, such as antibody-dependent cell-mediated cytotoxicity (ADCC) and antibody-dependent cell-mediated phagocytosis (ADCP). A number of mutations within the Fc domain have been identified that either directly or indirectly enhance binding of Fc receptors and significantly enhance cellular cytotoxicity: the mutations S239D/A330L/I332E ("3M"), F243L or G236A. Alternatively enhancement of effector function can be achieved by modifying the glycosylation of the Fc domain, FcγRs interact with the carbohydrates on the CH2 domain and the glycan composition has a substantial effect on effector function activity. Afucosylated (non-fucosylated) antibodies, exhibit greatly enhanced ADCC activity through increased binding to FcγRIIIa.

Activation of ADCC and CDC may be desirable for some therapeutic antibodies, however, in some embodiments, an antibody that does not activate effector functions is preferred.

Due to their lack of effector functions, IgG4 antibodies are the preferred IgG subclass for receptor blocking without cell depletion. However IgG4 molecules can exchange half-molecules in a dynamic process termed Fab-arm exchange. This phenomenon can occur between therapeutic antibodies and endogenous IgG4. The S228P mutation has been shown to prevent this recombination process allowing the design of IgG4 antibodies with a reduced propensity for Fab-arm exchange.

Fc engineering approaches have been used to determine the key interaction sites for the IgG1 Fc domain with Fcγ receptors and C1q and then mutate these positions to reduce or abolish binding. Through alanine scanning the binding site of C1q to a region covering the hinge and upper CH2 of the Fc domain was identified. The CH2 domain of an antibody or fragment of the invention may comprise one or more mutations to decrease or abrogate binding of the CH2 domain to one or more Fcγ receptors, such as FcγRI, FcγRIIa, FcγRIIb, FcγRIII and/or to complement. CH2 domains of human IgG domains normally bind to Fcγ receptors and complement, decreased binding to Fcγ receptors is expected to decrease antibody-dependent cell-mediated cytotoxicity (ADCC) and decreased binding to complement is expected to decrease the complement-dependent cytotoxicity (CDC) activity of the antibody molecule. Mutations to decrease or abrogate binding of the CH2 domain to one or more Fcγ receptors and/or complement are known in the art. An antibody molecule of the invention may comprise an Fc with modifications K322A/L234A/L235A or L234F/L235E/P331S ("TM"), which almost completely abolish FcγR and C1q binding. An antibody molecule of the invention may comprise a CH2 domain, wherein the CH2 domain comprises alanine residues at EU positions 234 and 235 (positions 1.3 and 1.2 by IMGT numbering) ("LALA mutation"). Furthermore, complement activation and ADCC can be decreased by mutation of Pro329 (position according to EU numbering), e.g., to either P329A or P329G. The antibody molecule of the invention may comprise a CH2 domain, wherein the CH2 domain comprises alanine residues at EU positions 234 and 235 (positions 1.3 and 1.2 by IMGT numbering) and an alanine (LALA-PA) or glycine (LALA-PG) at EU position 329 (position 114 by IMGT numbering). Additionally or alternatively an antibody molecule of the invention may comprise an alanine, glutamine or glycine at EU position 297 (position 84.4 by IMGT numbering).

Modification of glycosylation on asparagine 297 of the Fc domain, which is known to be required for optimal FcR interaction may confer a loss of binding to FcRs; a loss of binding to FcRs has been observed in N297 point mutations. An antibody molecule of the invention may comprise an Fc with an N297A, N297G or N297Q mutation. An antibody molecule of the invention with an aglycosyl Fc domain may be obtained by enzymatic deglycosylation, by recombinant expression in the presence of a glycosylation inhibitor, or following the expression of Fc domains in bacteria.

IgG naturally persists for a prolonged period in the serum due to FcRn-mediated recycling, giving it a typical half-life of approximately 21 days. Half-life can be extended by engineering the pH-dependent interaction of the Fc domain with FcRn to increase affinity at pH 6.0 while retaining minimal binding at pH 7.4. The T250Q/M428L variant, conferred an approximately 2-fold increase in IgG half-life (assessed in rhesus monkeys), while the M252Y/S254T/T256E variant ("YTE"), gave an approximately 4-fold increase in IgG half-life (assessed in cynomolgus monkeys). Extending half-life may allow the possibility of decreasing administration frequency, while maintaining or improving efficacy.

Immunoglobulins are known to have a modular architecture comprising discrete domains, which can be combined in a multitude of different ways to create multispecific, e.g. bispecific, trispecific, or tetraspecific antibody formats. Exemplary multispecific antibody formats are described in Spiess et al., (2015) Mol Immunol 67: 95-106 and Kontermann (2012) Mabs 4(2): 182-97, for example. The antibodies of the invention may be employed in such multispecific formats.

The invention provides an antigen-binding protein, such as an antibody or antigen binding fragment thereof, capable of competing with an antibody of the invention described herein (e.g., comprising a set of HCDR and LCDRs, defined by Kabat nomenclature, and/or VH and VL amino acid sequence of any one of clones 1 to 13) for binding to an epitope within an isolated peptide comprising or consisting of residues 396-410 (SEQ ID NO: 1) of human 2N4R (amino acids 1-441) tau (SEQ ID NO: 2), wherein the serine residues within the peptide sequence 396-410 (SEQ ID NO: 1) are not phosphorylated, when assessed in a competition assay. Preferably said epitope is formed and defined by residues of the amino acid sequence 400 to 402 ($_{400}$SGD$_{402}$), of human 2N4R (amino acids 1-441) tau (SEQ ID NO: 2) wherein S400 is not phosphorylated (e.g., the epitope bound by Clone 1, #28).

Competition assays include cell-based and cell-free binding assays including an immunoassay such as ELISA, HTRF; flow cytometry; fluorescent microvolume assay technology (FMAT) assay, Mirrorball, high content imaging based fluorescent immunoassays, radioligand binding assays, bio-layer interferometry (BLI), surface plasmon resonance (SPR) and thermal shift assays.

An antibody that binds to the same epitope as, or an epitope overlapping with, a reference antibody refers to an antibody that blocks binding of the reference antibody to its binding partner (e.g., an antigen or "target") in a competition assay by 50% or more, and/or conversely, the reference antibody blocks binding of the antibody to its binding partner in a competition assay by 50% or more. Such antibodies are said to compete for binding to an epitope of interest.

An antigen-binding protein, such as an antibody or antigen-binding fragment thereof, of the invention may be conjugated to a detectable label (for example, a radioisotope); or to a bioactive molecule (e.g., selected from a small molecule, peptide, protein, oligonucleotide, antigen-binding protein, antibody or antigen-binding fragment thereof, affimer, aptamer, bicyclic peptide and nanoparticle). In this case, the antigen-binding protein, such as an antibody or antigen-binding fragment thereof, of the invention may be referred to as a conjugate. Such conjugates may find application in the treatment and/or diagnosis of diseases as described herein. Such conjugates may find application for the detection (e.g., in vitro detection) of an epitope comprised within residues 396-410 (SEQ ID NO: 1) of human 2N4R (amino acids 1-441) tau (SEQ ID NO: 2), wherein the epitope is not phosphorylated.

Preferably said epitope is formed by residues of the amino acid sequence 400 to 402 ($_{400}$SGD$_{402}$) of human 2N4R (amino acids 1-441) tau (SEQ ID NO: 2) wherein S400 is not phosphorylated (e.g., the epitope bound by Clone 1, #28).

The antigen-binding proteins of the invention (including conjugates) may be useful in the detection (e.g., in vitro detection) of an epitope of the invention (an epitope present on an isolated peptide comprising or consisting of residues 396-410 (SEQ ID NO: 1) of human 2N4R (amino acids 1-441) tau (SEQ ID NO: 2), wherein the serine residues of the sequence of SEQ ID NO: 1 are not phosphorylated): preferably said epitope is formed and defined by residues of the amino acid sequence 400 to 402 ($_{400}$SGD$_{402}$) (SEQ ID NO: 123) or the amino acid sequence 399 to 402 ($_{399}$VSGD$_{402}$) (SEQ ID NO: 124) of human 2N4R (amino acids 1-441) tau (SEQ ID NO: 2) wherein S$_{400}$ is not phosphorylated (e.g., the epitope bound by Clone 1, #28 and Clone 2, #30). Pepscan analysis showed that Clones 28 and 30 both bind to the same amino acid sequence, these clones have only 1 amino acid difference between them (the residue immediately before HC CDR3 is A (#28) or V (#30) thus it is likely that they bind identical or very similar epitopes defined by 400 to 402 ($_{400}$SGD$_{402}$) (SEQ ID NO: 123) or 399 to 402 ($_{399}$VSGD$_{402}$) (SEQ ID NO: 124) of the peptide 396-410 (SEQ ID NO:1), which correspond to residues 400 to 402 and 399 to 402 of human 2N4R (amino acids 1-441) tau (SEQ ID NO: 2). Thus, the present invention relates to the use of an antigen-binding protein of the invention for detecting the presence of an epitope of the invention in a sample. The antigen-binding protein may be conjugated to a detectable label as described elsewhere herein.

In a preferred embodiment, the present invention relates to an in vitro method of detecting an epitope of the invention in a sample, wherein the method comprises incubating an antigen-binding protein of the invention with a sample of interest, and determining binding of the antigen-binding protein to an epitope of the invention present in the sample, wherein binding of the antigen-binding protein indicates the presence of an epitope of the invention in the sample. Methods for detecting binding of an antigen-binding protein to its target antigen are known in the art and include ELISA, ICC, IHC, immunofluorescence, western blot, IP, SPR and flow cytometry.

The sample of interest may be a sample obtained from an individual. The individual may be human. Samples include, but are not limited to, tissue such as brain tissue, cerebrospinal fluid (CSF), primary or cultured cells or cell lines, cell supernatants, cell lysates, platelets, serum, plasma, vitreous fluid, lymph fluid, synovial fluid, follicular fluid, seminal fluid, amniotic fluid, milk, whole blood, plasma, serum, blood-derived cells, urine, saliva, sputum, tears, perspiration, mucus, tumour lysates, and tissue culture medium, tissue extracts such as homogenized tissue, tumour tissue, cellular extracts, and combinations thereof.

Following incubation, antigen-binding protein to antigen binding, e.g., antibody to antigen binding, is detected using an appropriate detection system. The method of detection can be direct or indirect, and may generate a fluorescent or chromogenic signal. Direct detection involves the use of primary antibodies that are directly conjugated to a label. Indirect detection methods employ a labelled secondary antibody raised against the primary antigen-binding protein, e.g., antibody, host species. Indirect methods may include amplification steps to increase signal intensity. Commonly used labels for the visualization (i.e., detection) of antigen-binding protein—antigen (e.g., antibody—epitope) interactions include fluorophores and enzymes that convert soluble substrates into insoluble, chromogenic end products.

The term "detecting" is used herein in the broadest sense to include both qualitative and quantitative measurements of a target molecule. Detecting includes identifying the mere presence of the target molecule in a sample as well as determining whether the target molecule is present in the sample at detectable levels. Detecting may be direct or indirect.

Suitable detectable labels which may be conjugated to antigen-binding proteins, such as antibodies are known in the art and include radioisotopes such as iodine-125, iodine-131, yttrium-90, indium-111 and technetium-99; fluorochromes, such as fluorescein, rhodamine, phycoerythrin, Texas Red and cyanine dye derivatives for example, Cy7, Alexa750 and Alexa Fluor 647; chromogenic dyes, such as diaminobenzidine; latex beads; enzyme labels such as horseradish peroxidase; phospho or laser dyes with spectrally isolated absorption or emission characteristics; electrochemiluminescent labels, such as SULFO-TAG which may be detected via stimulation with electricity in an appropriate chemical environment; and chemical moieties, such as biotin, which may be detected via binding to a specific cognate detectable moiety, e.g. labelled avidin or streptavidin.

An antigen-binding protein, such as an antibody or fragment thereof, of the invention may be conjugated to the detectable label (or bioactive molecule) by means of any suitable covalent or non-covalent linkage, such as a disulphide or peptide bond. Suitable peptide linkers are known in the art and may be 5 to 25, 5 to 20, 5 to 15, 10 to 25, 10 to 20, or 10 to 15 amino acids in length.

The invention also provides a nucleic acid or set of nucleic acids encoding an antibody or antigen-binding fragment of the invention, as well as a vector comprising such a nucleic acid or set of nucleic acids.

Where the nucleic acid encodes the VH and VL domain, or heavy and light chain, of an antibody molecule of the invention, the two domains or chains may be encoded on the same or on two separate nucleic acid molecules.

An isolated nucleic acid molecule may be used to express an antibody molecule of the invention. The nucleic acid will generally be provided in the form of a recombinant vector for expression. Another aspect of the invention thus provides a vector comprising a nucleic acid as described above. Suitable vectors can be chosen or constructed, containing appropriate regulatory sequences, including promoter sequences, terminator fragments, polyadenylation sequences, enhancer sequences, marker genes and other sequences as appropriate. Preferably, the vector contains appropriate regulatory sequences to drive the expression of the nucleic acid in a host cell. Vectors may be plasmids, viral (e.g., phage, or phagemid), as appropriate.

A nucleic acid molecule or vector as described herein may be introduced into a host cell. Techniques for the introduction of nucleic acid or vectors into host cells are established in the art and any suitable technique may be employed. A range of host cells suitable for the production of recombinant antibody molecules are known in the art, and include bacterial, yeast, insect or mammalian host cells. A preferred host cell is a mammalian cell, such as a CHO, NS0, or HEK cell, for example a HEK293 cell.

A recombinant host cell comprising a nucleic acid or the vector of the invention is also provided. Such a recombinant host cell may be used to produce an antigen-binding protein (e.g., antibody) of the invention. Thus, also provided is a method of producing an antigen-binding protein, e.g., antibody, of the invention, the method comprising culturing the recombinant host cell under conditions suitable for production of the antigen-binding protein, e.g., antibody. The method may further comprise a step of isolating and/or purifying the antigen-binding protein, e.g., antibody.

Thus the invention provides a method of producing an antigen-binding protein, e.g., antibody, of the invention comprising expressing a nucleic acid encoding the antigen-binding protein, e.g., antibody, in a host cell and optionally isolating and/or purifying the antigen-binding protein, e.g., antibody, thus produced. Methods for culturing host cells are well-known in the art. Techniques for the purification of recombinant antigen-binding protein, e.g., antibodies, are well-known in the art and include, for example HPLC, FPLC or affinity chromatography, e.g., using Protein A or Protein L. In some embodiments, purification may be performed using an affinity tag on an antigen-binding protein, e.g., antibody. The method may also comprise formulating the antigen-binding protein, e.g., antibody, into a pharmaceutical composition, optionally with a pharmaceutically acceptable excipient or other substance as described below.

Antigen-binding proteins, e.g., antibodies, of the invention are expected to find application in therapeutic applications, in particular therapeutic applications in humans, for example in the treatment of a tauopathy, including but not limited to, a tauopathy selected from Alzheimer's disease, amyotrophic lateral sclerosis/parkinsonism-dementia complex, argyrophilic grains disease, beta-propeller protein associated neurodegeneration (BPAN), British type amyloid angiopathy, cerebral amyloid angiopathy, Creutzfeldt-Jakob disease, dementia pugilistica, diffuse neurofibrillary tangles with calcification, Down's syndrome, chronic traumatic encephalopathy (CTE), corticobasal degeneration (CBD), frontotemporal dementia (FTD), frontotemporal dementia and parkinsonism linked to chromosome 17 (FTDP-17), frontotemporal lobar degeneration, Gerstmann-Straussler-Scheinker disease, Hallervorden-Spatz disease, inclusion body myositis, multiple system atrophy, myotonic dystrophy, Niemann-pick disease type C, non-guamanian motor neuron disease with neurofibrillary tangles, Pick's disease, post-encephalitic parkinsonism, primary age-related tauopathy (PART), prion protein cerebral amyloid angiopathy, progressive subcortical gliosis, progressive supranuclear palsy (PSP), subacute sclerosing panencephalitis, tangle-dominant dementia, globular glial tauopathy, parkinsonism dementia complex of Guam, progressive non-fluent aphasia, multi-infarct dementia, ischemic stroke, traumatic brain injury (TBI) and stroke.

Also provided is a composition, such as a pharmaceutical composition, comprising an antigen-binding protein, e.g., antibody, according to the invention and an excipient, such as a pharmaceutically acceptable excipient.

The invention further provides an antigen-binding protein, e.g., antibody, of the invention, for use in a method of treatment. Also provided is a method of treating a patient, wherein the method comprises administering to the patient a therapeutically-effective amount of an antigen-binding protein, e.g., antibody, according to the invention. Further provided is the use of an antigen-binding protein, e.g., antibody, according to the invention for use in the manufacture of a medicament. A patient, as referred to herein, is preferably a human patient.

The invention also provides an antigen-binding protein, e.g., antibody, of the invention, for use in a method of treating a tauopathy, such as Alzheimer's disease, in a patient. Also provided is a method of treating a tauopathy, such as Alzheimer's disease, in a patient, wherein the method comprises administering to the patient a therapeutically-effective amount of an antigen-binding protein, e.g., antibody, according to the invention. Further provided is the use of an antigen-binding protein, e.g., antibody, according to the invention for use in the manufacture of a medicament for the treatment of a tauopathy, such as Alzheimer's disease, in a patient. The treatment may further comprise administering to the patient a second therapy, such as an FDA-approved AD medication, e.g., acetylcholinesterase inhibitors (e.g. donepezil), acetylcholine receptor positive modulators (e.g., Galantamine), NMDA receptor antagonists (e.g., memantine), or Parkinson's disease medications e.g. carbidopa-levodopa, dopamine receptor antagonists (e.g. pramipexole), monoamine oxidase B inhibitors (e.g., selegiline), catechol O-methyltransferase (COMT) inhibitors, amantadine, or anticholinergics (e.g., benztropine). The second therapy may be administered to the patient simultaneously, separately, or sequentially to the antigen-binding protein, e.g., antibody, of the invention.

In another aspect, the invention relates to an antigen-binding protein, e.g., antibody, of the invention for use in: a) treating a tauopathy, b) delaying progression of a tauopathy, c) preserving cognitive function of a patient suffering from a tauopathy, d) prolonging the survival of a patient suffering from a tauopathy e) reducing levels of free C-terminal tau in the CSF and/or serum, f) reducing levels of total tau in the CSF and/or serum, g) reducing the ratio of free C-terminal tau:total tau in the CSF and/or serum, h) reducing levels of neurofilament light chain protein (NfL) in CSF and/or serum, i) reducing total intracellular tau levels in neurons and/or astrocytes and/or microglia, j) reducing the rate of decline of whole brain volume and/or regional brain volume, k) reducing the rate of decline of functional connectivity of brain, l) improving functional connectivity of the brain, or m) reducing the brain tau burden based on PET or other imaging methodology.

The antigen-binding protein, e.g., antibody, as described herein may thus be for use for therapeutic applications, in particular for the treatment of a tauopathy, such as Alzheimer's disease.

An antigen-binding protein, e.g., antibody, as described herein may be used in a method of treatment of the human or animal body. Related aspects of the invention provide;
(i) an antigen-binding protein, e.g., antibody, described herein for use as a medicament,
(ii) an antigen-binding protein, e.g., antibody, described herein for use in a method of treatment of a disease or disorder.
(iii) the use of an antigen-binding protein, e.g., antibody, described herein in the manufacture of a medicament for use in the treatment of a disease or disorder; and,
(iv) a method of treating a disease or disorder in an individual, wherein the method comprises administering to the individual a therapeutically effective amount of an antigen-binding protein, e.g., antibody, as described herein.

The individual may be a patient, preferably a human patient.

Treatment may be any treatment or therapy in which some desired therapeutic effect is achieved, for example, the inhibition or delay of the progress of the condition, and includes a reduction in the rate of progress, a halt in the rate of progress, amelioration of the condition, cure or remission (whether partial or total) of the condition, preventing, ameliorating, delaying, abating or arresting one or more symptoms and/or signs of the condition or prolonging survival of an individual or patient beyond that expected in the absence of treatment.

Treatment as a prophylactic measure (i.e., prophylaxis) is also included. For example, an individual susceptible to or at risk of the occurrence of a tauopathy, such as AD, may be treated as described herein. Such treatment may prevent or delay the occurrence of the disease in the individual.

A method of treatment as described may comprise administering at least one further treatment to the individual in addition to the antigen-binding protein, e.g., antibody. The antigen-binding protein, e.g., antibody, described herein may thus be administered to an individual alone or in combination with one or more other treatments. Where the antigen-binding protein, e.g., antibody, is administered to the individual in combination with another treatment, the additional treatment may be administered to the individual concurrently with, sequentially to, or separately from the administration of the antigen-binding protein. e.g., antibody. When the additional treatment is administered concurrently with the antigen-binding protein, e.g., antibody, the, antigen-binding protein, e.g., antibody, and additional treatment may be administered to the individual as a combined preparation. For example, the additional therapy may be a known therapy or therapeutic agent for the disease to be treated.

Whilst an antigen-binding protein, e.g., antibody, may be administered alone, antigen-binding proteins, e.g., antibodies, will usually be administered in the form of a pharmaceutical composition, which may comprise at least one component in addition to the antigen-binding protein, e.g., antibody. Another aspect of the invention therefore provides a pharmaceutical composition comprising an antigen-binding protein, e.g., antibody, as described herein. A method comprising formulating an antigen-binding protein, e.g., antibody, into a pharmaceutical composition is also provided.

Pharmaceutical compositions may comprise, in addition to the antigen-binding protein, e.g., antibody, a pharmaceutically acceptable excipient, carrier, buffer, stabilizer or other materials well known to those skilled in the art. The term "pharmaceutically acceptable" as used herein pertains to compounds, materials, compositions, and/or dosage forms which are, within the scope of sound medical judgement, suitable for use in contact with the tissues of a subject (e.g., human) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation. The precise nature of the carrier or other material will depend on the route of administration, which may be by infusion, injection or any other suitable route, as discussed below.

For parenteral, for example subcutaneous or intravenous administration, e.g., by injection, the pharmaceutical composition comprising the antigen-binding protein, e.g., antibody, may be in the form of a parenterally acceptable aqueous solution which is pyrogen-free and has suitable pH, isotonicity and stability. Those of relevant skill in the art are able to prepare suitable solutions using, for example, isotonic vehicles, such as Sodium Chloride Injection, Ringer's Injection, or Lactated Ringer's Injection. Preservatives, stabilizers, buffers, antioxidants and/or other additives may be employed as required including buffers such as phosphate, citrate and other organic acids; antioxidants, such as ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens, such as methyl or propyl paraben; catechol; resorcinol; cyclohexanol; 3'-pentanol; and m-cresol); low molecular weight polypeptides: proteins, such as serum albumin, gelatin or immunoglobulins; hydrophilic polymers, such as polyvinylpyrrolidone; amino acids, such as glycine, glutamine, asparagines, histidine, arginine, or lysine; monosaccharides, disaccharides and other carbohydrates including glucose, mannose or dextrins; chelating agents, such as EDTA; sugars, such as sucrose, mannitol, trehalose or sorbitol; salt-forming counter-ions, such as sodium; metal complexes (e.g., Zn-protein complexes); and/or non-ionic surfactants, such as TWEEN™. PLURONICS™ or polyethylene glycol (PEG).

In some embodiments, antigen-binding proteins, e.g., antibodies, may be provided in a lyophilised form for reconstitution prior to administration. For example, lyophilised antigen-binding proteins, e.g., antibodies, may be reconstituted in sterile water or saline prior to administration to an individual.

Administration may be in a "therapeutically effective amount", this being sufficient to show benefit to an individual. The actual amount administered, and rate and time-course of administration, will depend on the nature and severity of what is being treated, the particular individual being treated, the clinical condition of the individual, the cause of the disorder, the site of delivery of the composition, the type of antigen-binding protein, e.g., antibody. The method of administration, the scheduling of administration and other factors known to medical practitioners. Prescription of treatment, e.g., decisions on dosage etc., is within the responsibility of general practitioners and other medical doctors, and may depend on the severity of the symptoms and/or progression of a disease being treated. Appropriate doses of antigen-binding protein, e.g., antibodies, are well known in the art. A therapeutically effective amount or suitable dose of an antigen-binding protein, e.g., antibody, can be determined by comparing in vitro activity and in vivo activity in an animal model. Methods for extrapolation of effective dosages in mice and other test animals to humans are known. The precise dose will depend upon a number of factors, including whether the size and location of the area to be treated, and the precise nature of the antigen-binding protein, e.g., antibody.

A typical antibody dose is in the range 100 μg to 1 g for systemic applications, and 1 μg to 1 mg for topical applications. An initial higher loading dose, followed by one or more lower doses, may be administered. This is a dose for a single treatment of an adult individual, which may be proportionally adjusted for children and infants, and also adjusted for other antibody formats in proportion to molecular weight.

Treatments may be repeated at daily, twice-weekly, weekly or monthly intervals, at the discretion of the physician. The treatment schedule for an individual may be dependent on the pharmacokinetic and pharmacodynamic properties of the antibody composition, the route of administration and the nature of the condition being treated.

Treatment may be periodic, and the period between administrations may be about two weeks or more, e.g. about three weeks or more, about four weeks or more, about once a month or more, about five weeks or more, or about six weeks or more. For example, treatment may be every two to four weeks or every four to eight weeks. Suitable formulations and routes of administration are described above.

In a preferred embodiment, an antibody molecule as described herein may be for use in a method of treating Alzheimer's disease.

In preferred embodiments, an antigen-binding protein, such as an antibody of the invention or an antigen-binding fragment thereof is not an antibody or an antigen-binding fragment thereof disclosed in Table 1 or the following (a) to (g) and is not a peptide or epitope of Table 1 or of the following (a) to (g):

(a) U.S. Pat. No. 9,139,643B2, which describes an antibody, specific for misfolded and/or aggregated tau protein that does not bind to normal tau protein and which binds an epitope within amino acid residues 379-408 (SEQ ID NO:2 of U.S. Pat. No. 9,139,643B2), it is preferred that the tau protein is fully phosphorylated;

(b) U.S. Pat. No. 9,777,056B2, which describes an antibody, capable of binding specifically to a misfolded and/or aggregated form of tau protein, raised against a tau epitope within 379-408 that possesses phosphoserine residues at tau position 396 and at tau position 404;

(c) WO2010144711, which describes recombinantly-produced antibodies capable of preferentially binding to pathological tau protein, relative to normal tau protein, elicited by immunization with an isolated tau peptide selected from:

(i) the amino acid sequence of tau 379-408 [S396X, S404X; Asp396, 404], (SEQ ID NO: 57 of WO2010144711);

(ii) an amino acid sequence selected from the group consisting of tau386-408 [P-Ser396, Ser404] (SEQ ID NO: 13 of WO2010144711) and tau386-408 [S396X, S404X], (SEQ ID NO: 42 of WO2010144711);
(iii) an amino acid sequence selected from the group consisting of: tau390-420 [Y394X, S396X, S400X, T403X, T404X, S409X, S412X, S413X] (SEQ ID NO: 74 of WO2010144711) and tau390-420 [Tyr394, Ser396, 400, 404, 409, 412, 413, Thr403] (SEQ ID NO: 99 of WO2010144711);
(iv) an amino acid sequence selected from the group consisting of (tau394-406 [PSer396, 404](SEQ ID NO: 5 of WO2010144711) and; tau394-406 [S396X, S202X] YKXPVVSGDTXPR (SEQ ID NO: 34 of WO2010144711);
(v) an amino acid sequence selected from the group consisting of (tau398-416 [P-S400, 409, 412, 413. Thr403, 414] (SEQ ID NO: 23 of WO2010144711) and (tau398-416[S400X, S409X, S412X, S413X, T403X, S414X]) (SEQ ID NO: 52 of WO2010144711; and
(vi) an amino acid sequence selected from the group consisting of: tau411-441 [P-Ser412, 413, 422] (SEQ ID NO: 100 of WO2010144711), SEQ ID NO: 101 (HLSNVSSTGSIDMVD (SEQ ID NO: 101 of WO2010144711, SEQ ID NO: 118 herein): (RENAKAKTDHGAE (SEQ ID NO: 102 of WO2010144711, SEQ ID NO: 119 herein) and amino acids 45-230 of tau (SEQ ID NO: 103 of WO2010144711);
(d) WO2015197823, which describes antibodies that are phospho-dependent and bind to tau peptides ptau 194-212, ptau 200-217, ptau 59-78 (SEQ ID NO:323 of WO2015197823) or ptau 406-429 (SEQ ID NO:326 of WO2015197823); antibodies that are predominantly phospho-independent and bind to tau peptide tau 204-221, and tau 221-253 and antibodies that are phospho-dependent and bind to phosphorylated tau peptide ptau 406-429, but do not bind to unphosphorylated tau peptide tau 389-441.
(e) WO2019/084488A which describes tau peptide linked to Th cell epitopes to enhance immunogenicity and discloses SEQ ID NO: 21, a peptide consisting of residues 393-425 of tau in which none of the serine residues are phosphorylated, a phosphorylated version of the same peptide is shown in SEQ ID NO: 20; also disclosed is SEQ ID NO: 71, a peptide immunoconjugate comprising non-phosphorylated tau 393-425.
(f) US2014/0056901 focusses on antibodies recognising the N-terminus of tau (tau2-18). It discloses SEQ ID NO: 17: tau 382-418 which is preferably non-phosphorylated and use of this peptide as an immunogen, in which tau 382-418 was fused with a synthetic foreign promiscuous Th fragment (PADRE), to generate tau 382-418-PADRE, which was then used to immunize rats to raise polyclonal antibodies.
(g) WO2018/152359 which describes SEQ ID NO: 130 (peptide 080), tau 396-410, in table 12, as one of a series of short peptides spanning the tau sequence, used in epitope mapping for antibody clones disclosed in the application, tau 396-410 was not used as an immunogen and none of the antibody clones disclosed bound to peptide 080, thus no epitope was identified in this peptide tau 396-410.

FIGURES

FIG. 1. Multiple species of tau released from familial Alzheimer's disease neuronal cultures were not found in control culture supernatants. Tau was immunoprecipitated (IP) from culture supernatants from non-disease control (NDC: lanes 1-3), familial Alzheimer's disease (fAD)-associated mutation, PSEN1 Y115C (PSEN: lanes 4-6) and frontotemporal dementia (FTD; lanes 7-9) associated mutation. MAPT IVS10+16 (MAPT) using commercial antibody. HT7 (lanes 3, 6, 9) or Tau13 (lanes 2, 5, 8) and compared to an IgG control (1, 4.7). Western blots show detection of tau species following each IP using anti-tau antibody (K9JA) (A). Bands highlighted and numbered 1-5 were excised and analysed by mass spectrometry. The higher molecular weight species present in familial AD (PSEN1 mutation; lanes 3, 4) and TS21 (lanes 5, 6) but not control neurons (lanes 1, 2) were not altered by incubation with I-phosphatase (lanes 2, 4, 6) (B), suggesting that they are not phosphorylated.

FIG. 2. Affinity purified antibodies bound to the isolated peptide immunogen. Crude antisera from immunised rabbit (A) and chicken (B) were purified by affinity chromatography and eluted in glycine and TEA. Binding of all samples to immobilised peptide used for immunisation is shown. In each case, the glycine eluate showed higher specific binding and was prioritised for future studies. Symbols represent crude antisera (square), unbound antisera (triangle), glycine eluate (circle) and TEA eluate (diamond).

FIG. 3. Polyclonal anti-tau antibodies detected full length recombinant tau in an MSD assay. Rabbit pAb (A) and Chicken pAb (B) were used as capture antibodies at the concentrations shown (0, 2, 4, 6 µg/mL), in combination with the commercial antibody, HT7 (1 µg/mL) as detection antibody. In this format, both antibody combinations were able to detect recombinant tau at concentrations above 2 ng/mL. Data are single replicates from a representative experiment. Symbols represent data generated using a range of concentrations of capture antibody: 6 µg/mL (square), 4 µg/mL (circle), 2 µg/mL (triangle) and zero (diamond).

FIG. 4. Polyclonal anti-tau antibodies detected tau in human IPSC-derived neuronal cultures only when dephosphorylated. Western blots of iPSC-derived neuronal lysates (day 80) before (lanes 2, 4, 6, 8, 10) and after (lanes 3, 5, 7, 9, 11) lambda-phosphatase (l-PP) are shown. Full length (2N4R) recombinant tau is shown as a comparator (lane 1). Chicken (A) and rabbit (B) antibodies detected a dominant band at ~50 kD representing full length tau, only in samples treated with I-PP. Middle panel shows the same blots re-probed using the commercially available antibody, K9JA which shows no selectivity for dephosphorylated tau. Phosphorylation of tau in all neuronal lysates was evidenced by the shift in mobility of bands observed following I-PP treatment. b-actin was included as a loading control (bottom panel). Cells from non-disease controls (NDC; lanes 2, 3), familial Alzheimer's disease associated, PSEN Y115C (PSEN: lanes 4, 5) and trisomy 21 (TS21; lanes 6, 7, 8, 9) and frontotemporal dementia associated mutation, MAPT (IVS10+16) (MAPT; lanes 10, 11) are shown.

Figure 5:
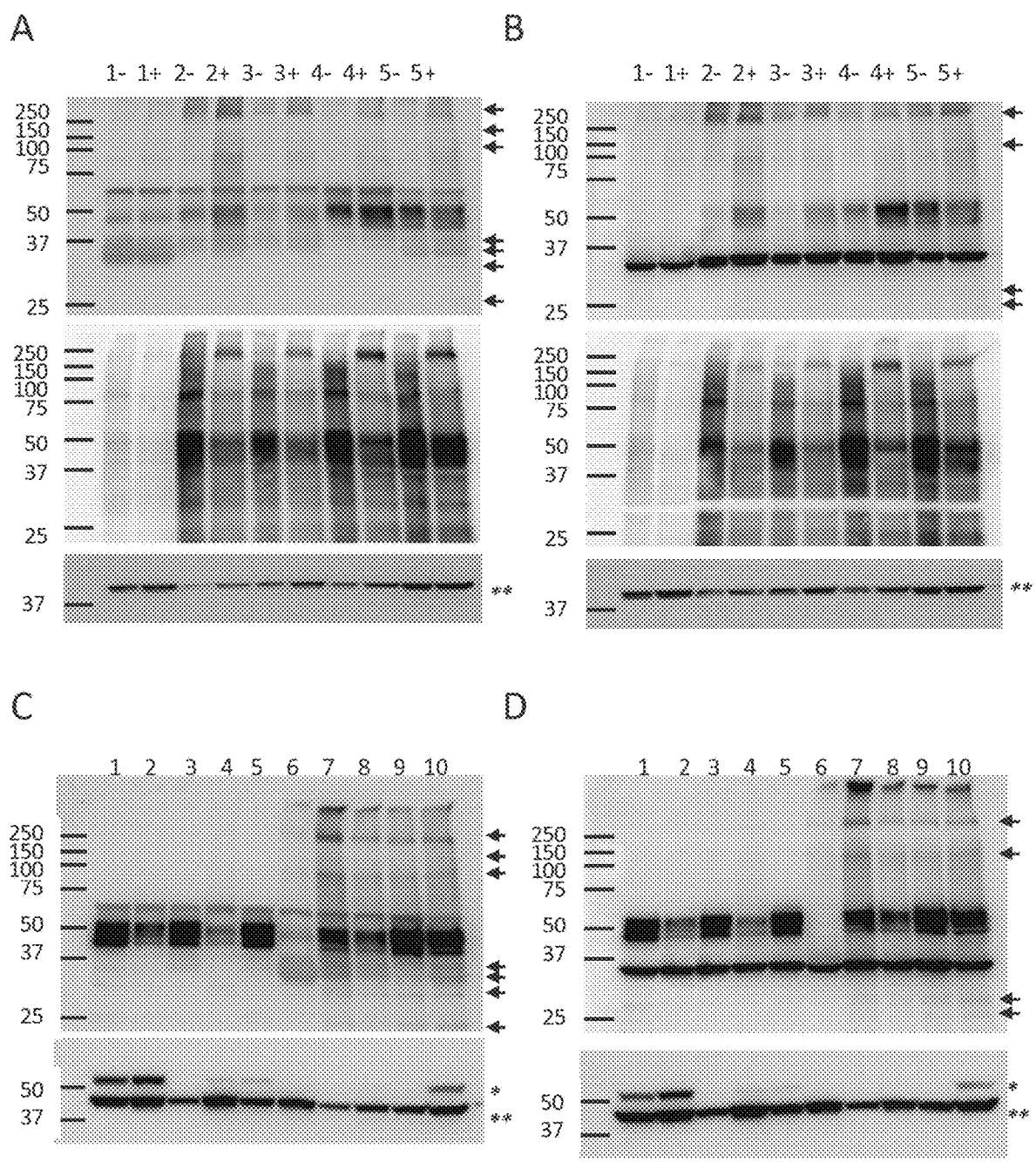

FIG. 5. Polyclonal anti-tau antibodies detected increased levels of tau in Alzheimer's disease (AD) compared to non-demented control post-mortem brain. Western blots of brain lysates from AD patients (1-5) before (−) and after (+) I-PP treatment (A, B) demonstrated increased detection of tau species in dephosphorylated samples by rabbit (A) and chicken (B) polyclonal antibodies. Lower panels show the same blots re-probed with commercially available polyclonal antibody, K9JA which shows a slight preference for phosphorylated tau species. Comparison of non-demented controls (C, D; lanes 1-5) and Alzheimer's disease patients (C. D; lanes 6-10) treated with I-PP demonstrated increased detection of multiple species corresponding to different forms of tau with rabbit (C) and chicken (D) polyclonal antibodies, with increased detection of both high and low MW species in Alzheimer's samples (top panel). Arrows indicate species detected at higher levels in AD samples. Actin (*) and neuronal tubulin (*) are shown on the lower blot and were included to control for loading and post-mortem protein degradation respectively.

Figure 6:
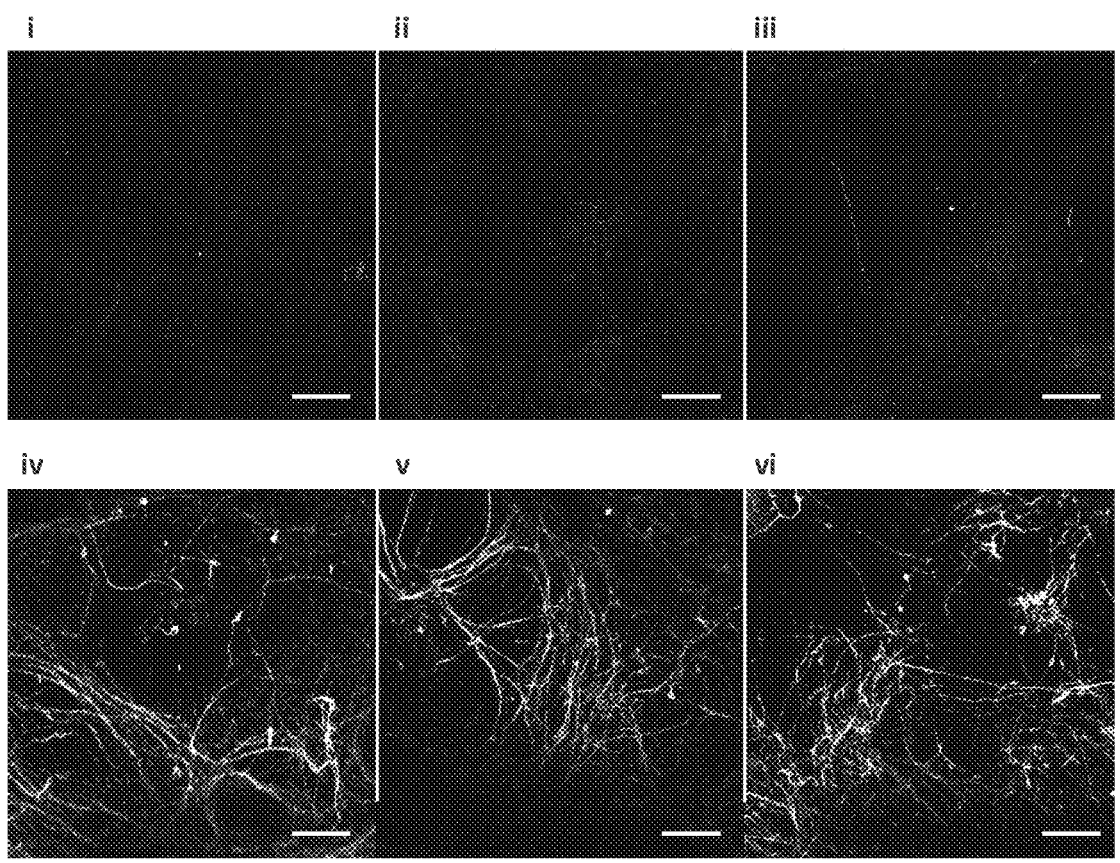

FIG. 6. Polyclonal rabbit anti-tau IgG detects dephosphorylated tau in human iPSC-derived neurons by immunocytochemistry. Non-demented control (NDC; images i, iv), APP V717I (familial Alzheimer's disease associated; images ii, v) and MAPT IVS10+16 (frontotemporal dementia associated; image iii, vi) iPSC-derived neurons (day 50+) were stained with rabbit anti-tau IgG. Immunofluorescence was substantially increased in samples treated with I-phosphatase (I-PP; images iv, v, vi) compared to untreated samples (images i, ii, iii). Scale bar represents 100 μm in all images.

FIG. 7. A panel of phage display-derived anti-tau scFv bind to linear immunogen peptide and full length 2N4R tau in phage ELISA. Phage expressing scFv clones bind to the short linear peptide (SEQ ID NO: 13) (A) conjugated to BSA (black bars) or transferrin (white bars) and to full length recombinant 2N4R tau (B). Prioritised clones displayed robust binding to full length tau (striped bars) with low levels of binding to empty wells (grey bars). Binding of phage was detected using an HRP-conjugated anti-alpha-M13 antibody and data shown are from a representative experiment (n=1).

Figure 8:
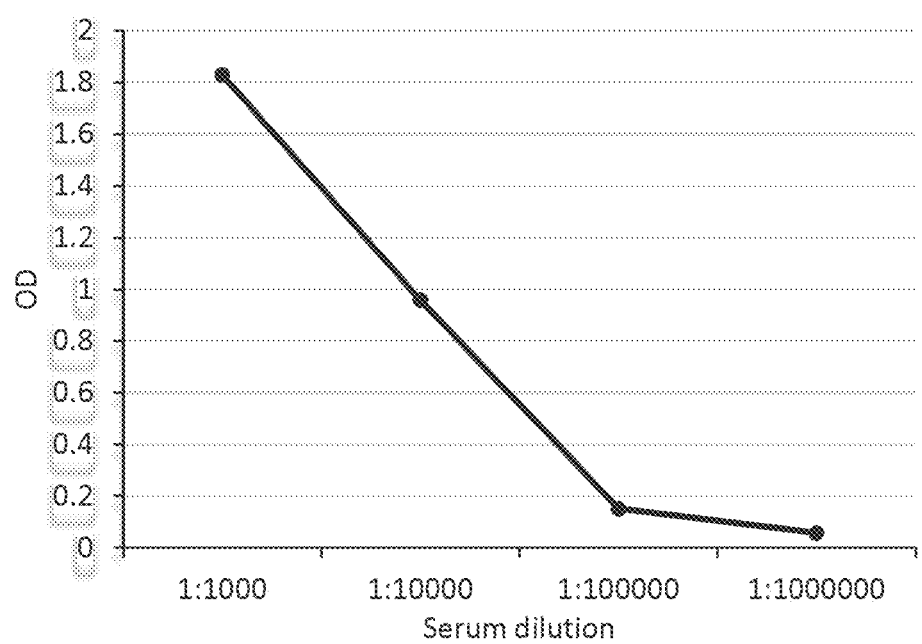

FIG. 8. A robust immune response was mounted following immunisation of a rabbit with KLH-conjugated target immunogen. Serum was taken at day 104 post-immunisation and tested for binding to immobilised target immunogen by ELISA. Binding of polyclonal IgG was observed at dilutions of 1:10000 and below based on detection with an anti-rabbit IgG-HRP antibody. Data are shown as raw OD values from a single experiment. This rabbit was used for isolation of plasma cells and screening for target-specific monoclonal IgG.

Figure 9:
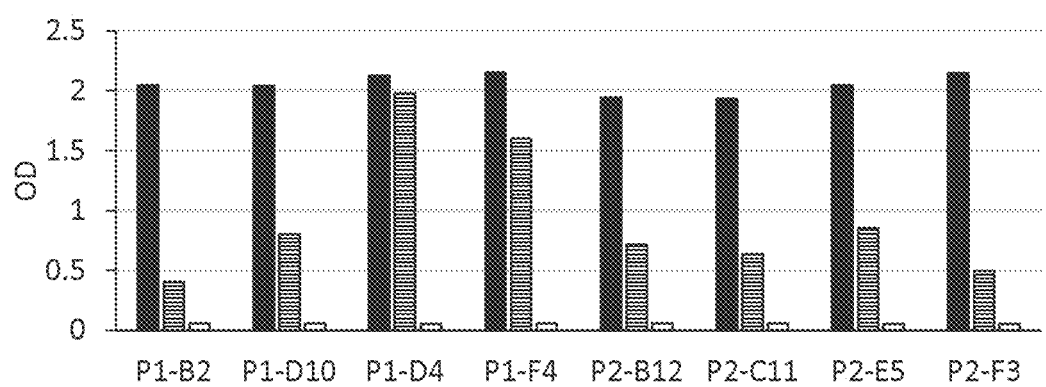

FIG. 9. A panel of anti-tau IgG bind to linear immunogen peptide and full length recombinant 2N4R tau in ELISA format. Supernatants from HEK293F cells transiently transfected with individual IgG clones were tested at 1:50 and showed binding to the short linear peptide (SEQ ID NO: 13) (black bars) and to full length recombinant 2N4R tau (striped bars) with low non-specific binding to BSA (white bars). Binding of anti-tau IgG was detected using an HRP-conjugated anti-rabbit secondary antibody and data shown are from a representative experiment (n=1).

FIG. 10. Monoclonal antibodies detect full length recombinant 2N4R tau by ELISA in a concentration-dependent manner. Purified IgG generated in HEK293F cells were tested at concentrations from 0.1 ng/mL (0.67 pM) to 10 μg/mL (67 nM) for binding to full length recombinant 2N4R tau. Binding of anti-tau IgG, clone P1-D4 (A) and clone P1-F4 (B) was detected using an HRP-conjugated anti-rabbit secondary antibody and data shown are mean+/−SEM from a representative experiment based on n=2 wells per condition.

FIG. 11. Supernatants containing monoclonal anti-tau antibodies detect recombinant and natively expressed tau with a preference for non-phosphorylated species. Western blots of full length recombinant 2N4R tau (lanes 1-3; 100 ng, 50 ng, 25 ng), neuronal lysates from untreated (lane 4) PSEN1 mutation iPSC-derived neuronal cultures and cultures treated with lambda phosphatase (I-PP; lane 5), brain lysates from non-demented controls without (lanes 6) and with I-PP treatment (lane 7) and Alzheimer's disease brain lysate without (lane 8) and with I-PP treatment (lane 9) are shown. Supernatants from HEK cells transiently expressing clone P1-D4 (A), clone P1-F4 (B), clone P2-E5 (C) and clone P2-B12 (D) IgG detected recombinant and natively-expressed tau. Multiple species corresponding to different forms of tau, with increased detection of both high and low MW species were detected in the Alzheimer's brain lysate, with increased levels in the dephosphorylated sample. The arrow indicates a band corresponding to the expected size for full length tau. Actin (**) is shown on the lower blot as a loading control.

Figure 12:
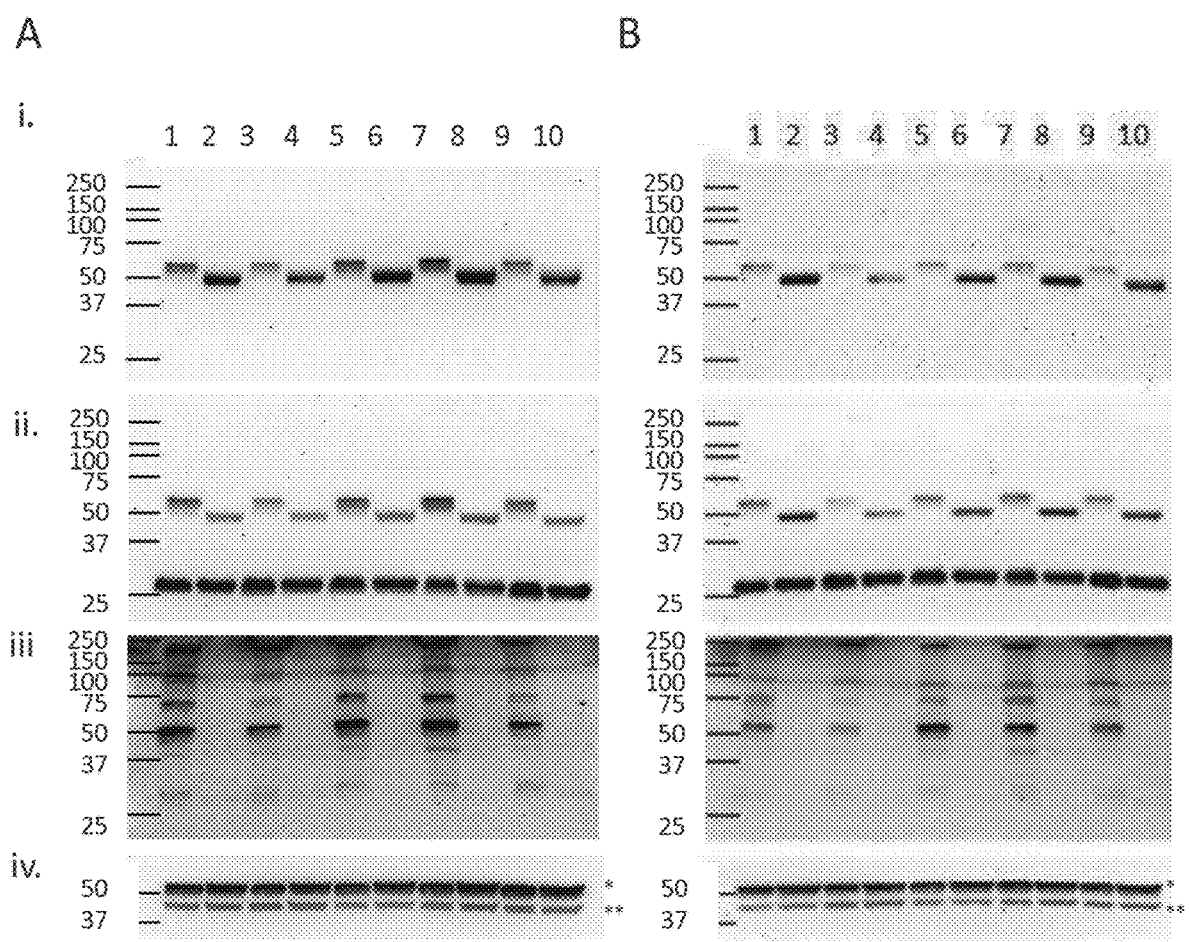

FIG. 12. Monoclonal anti-tau antibodies detect tau in human iPSC-derived neuronal cultures preferentially when dephosphorylated. Western blots of iPSC-derived neuronal lysates (day 80) before (lanes 1, 3, 5, 7, 9) and after (lanes 2, 4, 6, 8, 10) I-PP treatment are shown. Clone P1-D4 (A) and Clone P1-F4 (B) antibodies detected a dominant band at ~50 kD representing full length tau, to a greater extent in samples treated with I-PP (i). Lower panels show blots probed using the commercially available antibody. HT7 (ii). which shows no selectivity for dephosphorylated tau. The same samples were run again and probed with the phospho-specific antibody, AT8 (iii). Neuronal tubulin (*) and beta actin (**) are shown as a loading controls (iv). Cells from non-disease controls (NDC; lanes 1, 2), familial Alzheimer's disease associated, PSEN Y115C (PSEN; lanes 3, 4) and trisomy 21 (TS21; lanes 5, 6, 7, 8) and frontotemporal dementia associated, MAPT(IVS10+16) (MAPT: lanes 9, 10) are shown.

FIG. 13. Monoclonal anti-tau antibodies detect increased levels of tau in Alzheimer's disease (AD) compared to non-demented control (NDC) post-mortem brain. Western blots of brain lysates from NDC (lanes 1-4) and Alzheimer's disease patients (lanes 5-8) before (lanes 1, 3, 5, 7) and after (lanes 2, 4, 6, 8) I-PP treatment are shown. Clone (P1-D4 (Ai) and Clone P1-F4 (Bi) antibodies detected multiple species corresponding to different forms of tau, with increased detection of both high and low MW species in Alzheimer's samples treated with I-PP compared to NDC. Arrows highlight species detected by clones but not by HT7. Blots were probed with commercially available antibodies, HT7 (ii) and AT8 (iii). Actin (**; iii, v) and neuronal tubulin (*, iv) are shown lower blots and were included to control for loading and post-mortem protein degradation respectively.

FIG. 14. Purified monoclonal anti-tau antibodies detect increased levels of tau in sporadic Alzheimer's disease (AD) and Dementia with Lewy Bodies (DLB) compared to non-demented control post-mortem brain. Western blots of brain lysates from non-demented controls (A, B; lanes 1-4); sporadic Alzheimers disease patients (A; lanes 5-8); and DLB patients (B; lanes 5-8) are shown. Clone P1-D4 (Clone 1) detected multiple species corresponding to different forms of tau, with increased detection of both high and low MW species in Alzheimer's and DLB samples (top panel). The middle panel shows the same blots re-probed using the commercially available mid-region anti-tau antibody. HT7, and highlights the differences in tau species detected with mid-region compared to C-terminally directed antibodies. Arrows indicate tau species detected by C-terminal antibodies but not by HT7. Actin (**) and neuronal tubulin (*) are shown on the lower blot and were included to control for loading and post-mortem protein degradation respectively FIG. 15. Rabbit anti-tau monoclonal IgG detect dephosphorylated tau aberrantly located in soma and dendrites in disease-associated neurons. Non-disease control (NDC;

image i, iii) and MAPT IVS10+16 (frontotemporal dementia associated; image ii, iv) iPSC-derived neurons (day 50+) were stained with clone P1-D4 (A, B) or clone P1-F4 (C, D). Immunofluorescence was increased in samples treated with I-phosphatase (I-PP; images iii, iv) compared to untreated samples (images i, ii) (A, C). MAPT IVS10+16 mutation neurons treated with I-PP show an increased colocalization of MAP2 (dendritic protein) and tau immunofluorescence, compared to controls, as calculated using Pearson's correlation coefficient (B, D), reflecting increased detection of tau mislocalised to the somatodendritic compartment in FTD-associated neurons (P<0.05; t-test). Bar graph represents NDC −I-PP (1), NDC +I-PP (2), MAPT mutation −I-PP (3) and MAPT mutation +I-PP (4). Scale bar represents 100 μm in all images.

FIG. 16. Monoclonal anti-tau rabbit IgG inhibit uptake of aggregated tau by human iPSC-derived neurons. Antibody clones P1-D4 (solid triangles, solid line) or P1-F4 (open triangles, solid line) or an isotype control rabbit IgG (open squares, solid line) were incubated with pHrodo-labelled aggregated 2N4R tau before imaging on the OPERA-Phenix. (A). Number of intense fluorescent objects quantified every 15 mins increased steadily over time in isotype control (open squares, solid line) and no antibody (solid circles, dashed line) treatments, but was significantly reduced in cells treated with anti-tau antibody clones. Negative control wells including no pHrodo-labelled tau are also shown (open circles, dashed line). Data are given as mean+/−SEM of n=4 wells from one representative experiment. Bar chart (B) represents mean+/−SEM of area under curve calculated for no antibody (1), isotype control (2), clone P1-D4 (3), clone P1-F4 (4) and no pHrodo-labelled tau (5)(B). **, p<0.0001: *, p<0.001; one-way ANOVA with Dunnett's multiple comparison test versus no antibody control (1).

Figure 17:
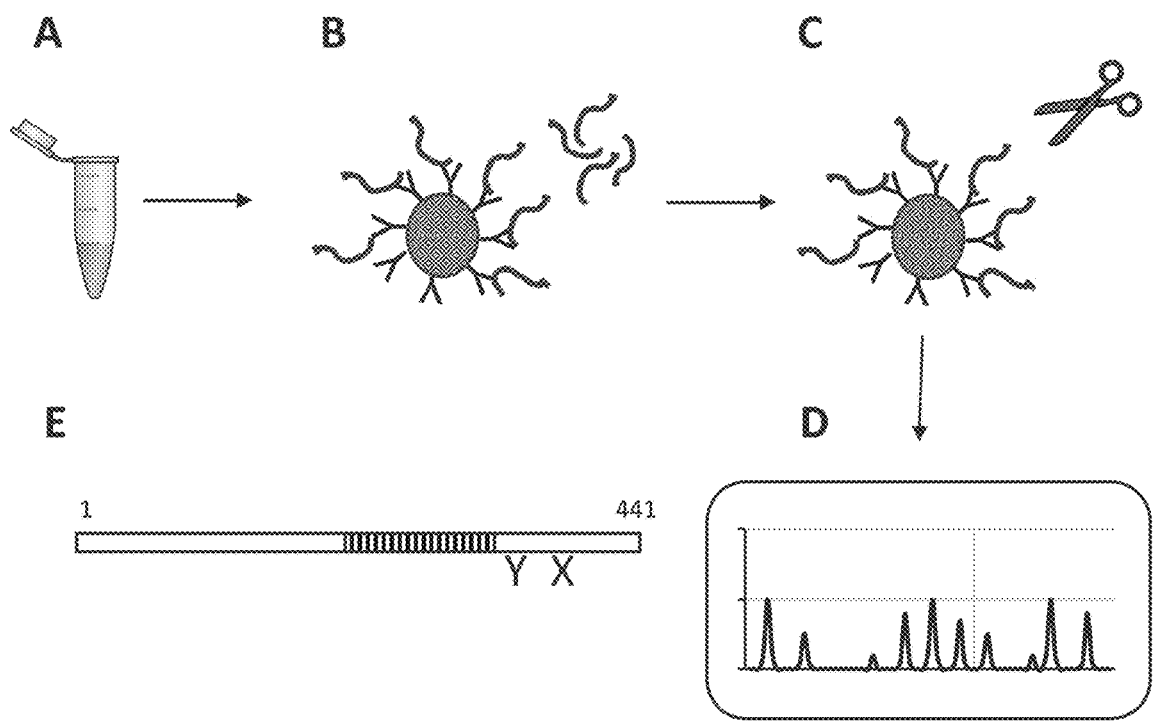

FIG. 17. Human AD CSF contains C-terminal tau. CSF samples from 16 individuals with clinically confirmed Alzheimer's disease were pooled (final volume 8.5 mL; A). 150 ng of clone #44 (VH of SEQ ID NO: 120 and VL of SEQ ID NO: 121 with rabbit IgG Fc) IgG was bound and cross-linked to protein A-coated beads, and the beads used to immunopurify tau present in the pooled AD CSF, which contained the antibody epitope (B). Proteins were digested on the beads with trypsin (C), and eluted peptides resolved by mass spectrometry (D). A C-terminal tau peptide was identified in the pooled AD CSF (E, shown as 'X'), adjacent to the clone #44 epitope (shown as Y), confirming the presence of C-terminal tau fragments in AD CSF.

FIG. 18. Anti-tau rabbit IgG inhibits uptake of monomeric and aggregated tau by human iPSC-derived astrocytes. Antibody clone #28 (Clone 1) (closed triangles, solid line) was incubated with full length pHrodo-labelled monomeric (P301S) 2N4R tau (A) or aggregated (P301S) tau (B) before imaging on the Incucyte S3. Mean orange (pHrodo) area per astrocyte (phase) area quantified every 60 mins for 20 h increased over time in no antibody (solid circles, solid line) treatments, but was significantly reduced in cells treated with anti-tau antibody clone #28. Negative control wells including no pHrodo-labelled tau are also shown (open circles, dashed line). Data are given as mean+/−SEM of n=4 wells from one representative experiment (A, B). *, p<0.001; , p<0.01; one-way ANOVA with Tukey's multiple comparison test versus no antibody control.

FIG. 19. Anti-tau rabbit antibody expressed as a chimeric human IgG1 increase uptake of monomeric and aggregated tau by human iPSC-derived microglia. Antibody clone #28 (Clone 1) (open triangles, solid line) or an isotype control hIgG1 (open squares, solid line) were incubated with full length pHrodo-labelled monomeric (P301S) 2N4R tau (A) or aggregated (P301S) tau (B) before imaging on the Incucyte S3. Mean orange (pHrodo) area per microglial (phase) area quantified every 60 mins for 16 h increased moderately over time in isotype and no antibody (solid circles, dashed line) treatments, but was significantly increased in cells treated with anti-tau hIgG1. Negative control wells including no pHrodo-labelled tau are also shown (open circles, dashed line). Data are given as mean+/−SEM of n=4 wells from one representative experiment (A, B). ***, p<0.001: one-way ANOVA with Tukey's multiple comparison test versus no antibody control.

FIG. 20. Anti-tau rabbit IgG bind to distinct epitopes within the immunogen sequence. Letter plot representations of epitope substitution scan analysis for antibody clones #28 (Clone 1; A) and #30 (Clone 2, B) highlight key residues required for binding to tau. Low level of binding of isotype control rabbit IgG to the peptide array (C) demonstrates that anti-tau antibody binding is CDR-specific. The linear peptides were generated bearing single amino acid substitutions at each position of the native lead peptide sequence, shown below the plot. Values obtained for replacements are indicated by the letter code for each replacement residue plotted at the height of the recorded value. Arrow indicates median value for the lead sequence.

FIG. 21. Humanised heavy chain (VH) and light chain (VK) sequences based on rabbit antibody clone #28 (Clone 1) were designed using Composite Human Antibody Technology (Abzena). Alignments of the 6 VH chain (A) and 4 VK chain (B) sequences are shown, aligned to the original rabbit sequences (Parent, clone #28 (Clone 1)). CDR definitions and protein sequence are numbered according to Kabat. Changes from the rabbit parental sequence are shaded.

Figure 22:
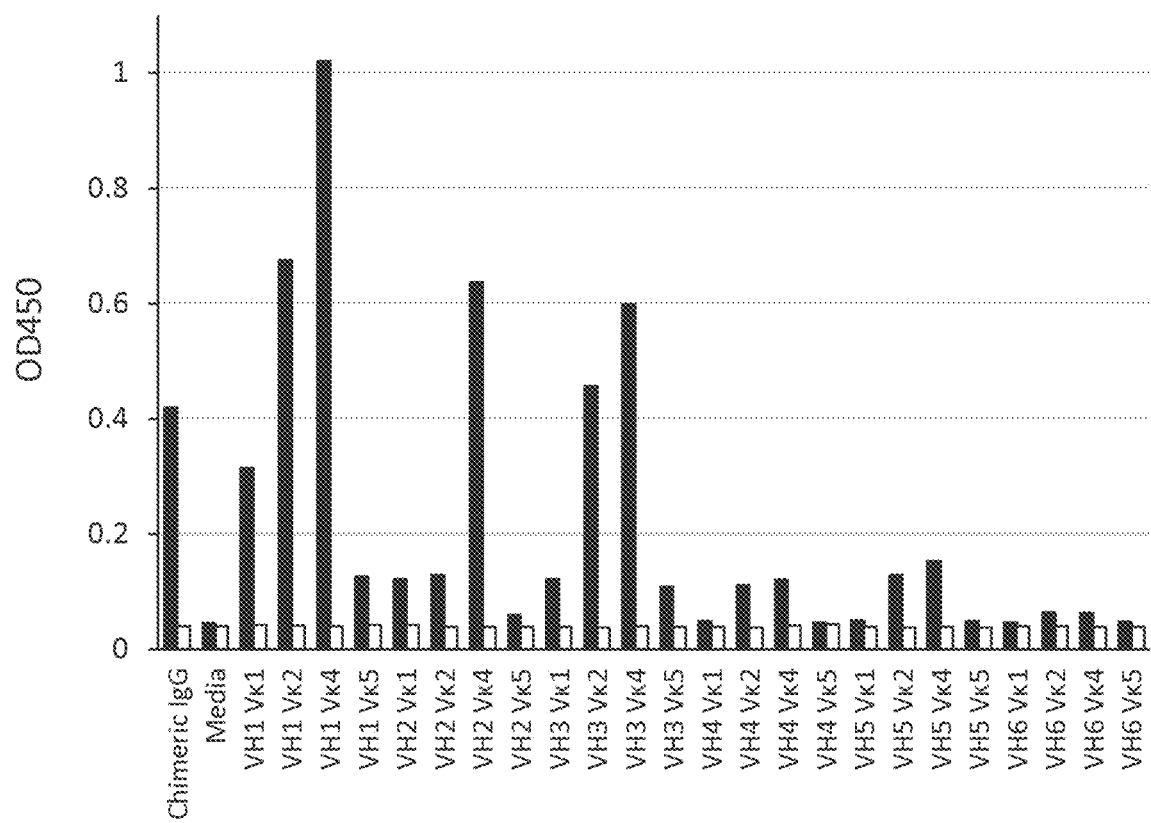

FIG. 22. A panel of humanised anti-tau IgG bind to full length recombinant 2N4R tau in an ELISA format. Supernatants from HEK cells transiently transfected with each IgG clone were tested at 1:100 for binding to full length recombinant 2N4R tau (solid bars). No detectable binding to BSA was observed for any of the variants tested (empty bars). Binding of anti-tau hIgG1 was detected using an HRP-conjugated anti-human secondary antibody and data are shown from a representative experiment (n=1 replicate).

Figure 23:
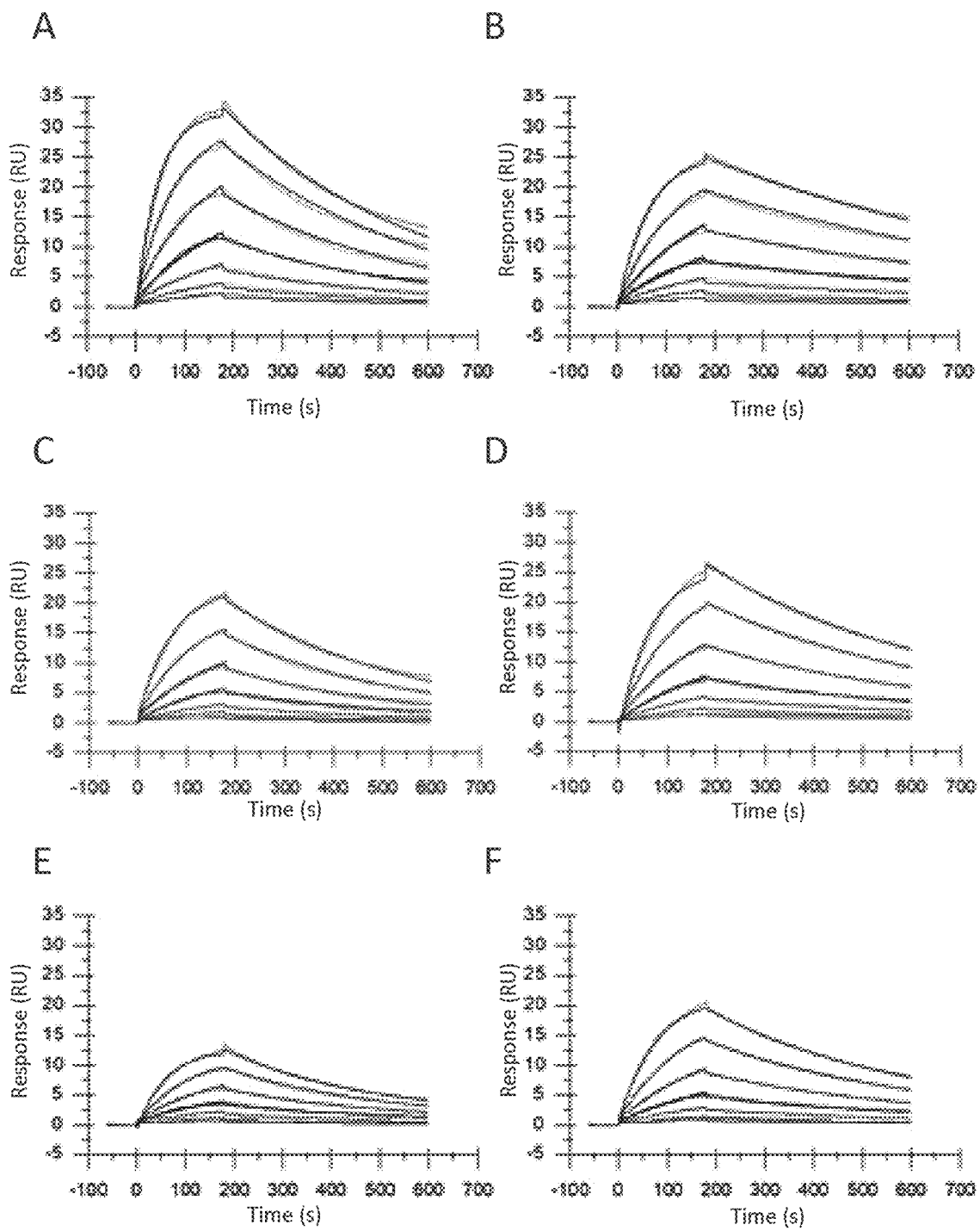

FIG. 23. Anti-tau IgG bind to tau with high affinity. Representative surface plasmon resonance (Biacore) binding curves show parental rabbit clone #28 VH0Vκ0 (A), and humanised variants VH3Vκ4 (B), VH4Vκ2 (C), VH4Vκ4 (D), VH5Vκ2 (E) and VH5Vκ4 (F) binding to full length recombinant 2N4R tau (3.12 nM to 200 nM applied at 2-fold dilutions). Experiments were run using a Biacore T200 with an association time of 180 s and a dissociation time of 420 s.

Figure 24:
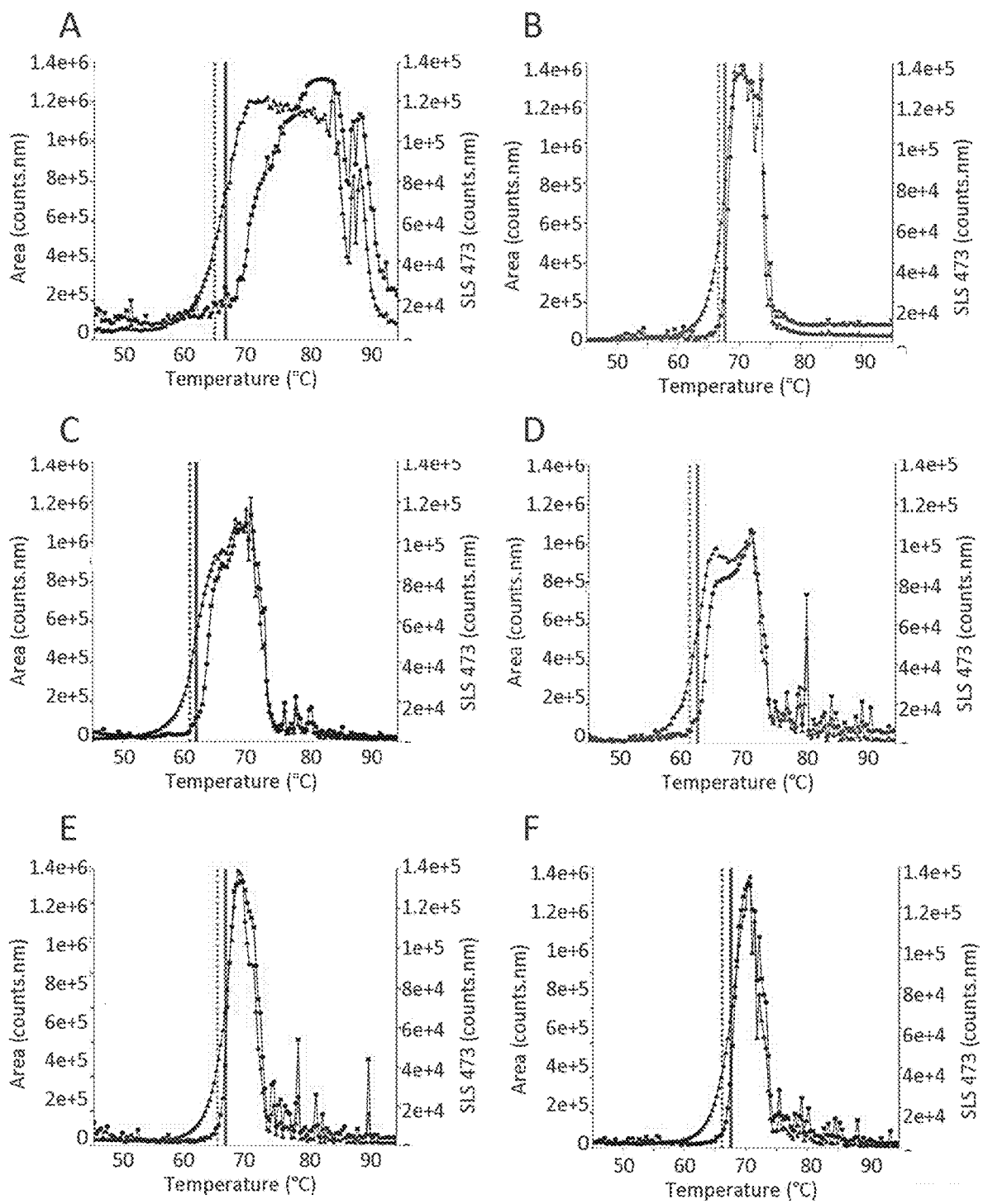

FIG. 24. Humanised antibody variants of clone #28 (Clone 1) have melting temperatures (Tm) over 60° C. SYPRO orange fluorescence (triangles) and static light scattering (SLS; squares) signals from single replicates are shown, for the parental rabbit antibody (clone #28 (Clone 1)) VH0VK0 (A), and its humanised variants: VH3VK4 (B), VH4VK2 (C), VH4VK4 (D), VH5VK2 (E), and VH5VK4 (F).

FIG. 25. Humanised monoclonal anti-tau antibodies inhibit monomeric tau uptake by human iPSC-derived neurons. Humanised variants of antibody clone #28, VH3VK4 (A), VH4VK2 (B), VH4VK4 (C), VH5VK2 (D), VH5VK4 (E) (solid triangles, solid line) or an isotype control human IgG1 (open squares, solid line), or the parental rabbit IgG clone #28 (F; solid triangles, solid line) or an isotype control rabbit IgG (crosses, solid line) were incubated with full length pHrodo-labelled P301S 2N4R tau (25 nM) before imaging on the Incucyte S3. Mean orange (pHrodo) area per neuron (phase) area quantified every 60 mins for 18 h increased steadily over time in isotype and no antibody (solid circles, dashed line) treatments, but was significantly reduced in cells treated with anti-tau antibody variants. *, p<0.001; one-way ANOVA with Tukey's multiple comparison test versus no antibody control. Negative control wells including no pHrodo-labelled tau are also shown (open circles, dashed line). Data are shown as mean+/−SEM of n=4 wells from one representative experiment.

FIG. 26. Humanised monoclonal anti-tau antibodies inhibit aggregated tau uptake by human iPSC-derived neurons. Humanised variants of antibody clone #28, VH3VK4 (A), VH4VK2 (B), VH4VK4 (C), VH5VK2 (D), VH5VK4 (E) (solid triangles, solid line) or an isotype control human IgG1 (open squares, solid line), or the parental rabbit IgG clone #28 (F; solid triangles, solid line) or an isotype control rabbit IgG (crosses, solid line), were incubated with full length pHrodo-labelled aggregated (P301S) 2N4R tau (50 nM) before imaging on the Incucyte S3. Mean orange (pHrodo) area per neuron (phase) area quantified every 60 mins for 18 h increased steadily over time in isotype and no antibody (solid circles, dashed line) treatments, but was significantly reduced in cells treated with anti-tau antibody variants. **, p<0.001; one-way ANOVA with Tukey's multiple comparison test versus no antibody control. Negative control wells including no pHrodo-labelled tau are also shown (open circles, dashed line). Data are shown as mean+/−SEM of n=4 wells from one representative experiment.

FIG. 27. Humanised monoclonal anti-tau antibodies inhibit monomeric tau uptake by human iPSC-derived astrocytes. Humanised variants of antibody clone #28. VH3VK4 (A), VH4VK2 (B). VH4VK4 (C), VH5VK2 (D). VH5VK4 (E) (solid triangles, solid line) or an isotype control human IgG1 (open squares, solid line) were incubated with full length pHrodo-labelled (P301S) 2N4R tau (25 nM) before imaging on the Incucyte S3. Mean orange (pHrodo) area per astrocyte (phase) area quantified every 60 mins for 20 h increased steadily over time in isotype and no antibody (solid circles, dashed line) treatments, but was reduced in cells treated with anti-tau antibody variants. ***, p<0.001; *, p<0.05: one-way ANOVA with Tukey's multiple comparison test versus no antibody control. Negative control wells including no pHrodo-labelled tau are also shown (open circles, dashed line). Data are shown as mean+/−SEM of n=4 wells from one representative experiment.

FIG. 28. Humanised monoclonal anti-tau antibodies inhibit aggregated tau uptake by human iPSC-derived astrocytes. Humanised variants of antibody clone #28, VH3VK4 (A), VH4VK2 (B), VH4VK4 (C), VH5VK2 (D), VH5VK4 (E) (solid triangles, solid line) or an isotype control human IgG1 (open squares, solid line) were incubated with full length pHrodo-labelled aggregated (P301S) 2N4R tau (50 nM) before imaging on the Incucyte S3. Mean orange (pHrodo) area per astrocyte (phase) area quantified every 60 mins for 20 h increased steadily over time in isotype and no antibody (solid circles, dashed line) treatments, but was reduced in cells treated with anti-tau antibody variants. ***, p<0.001; *, p<0.05; one-way ANOVA with Tukey's multiple comparison test versus no antibody control. Negative control wells including no pHrodo-labelled tau are also shown (open circles, dashed line). Data are shown as mean+/−SEM of n=4 wells from one representative experiment.

Figure 29:
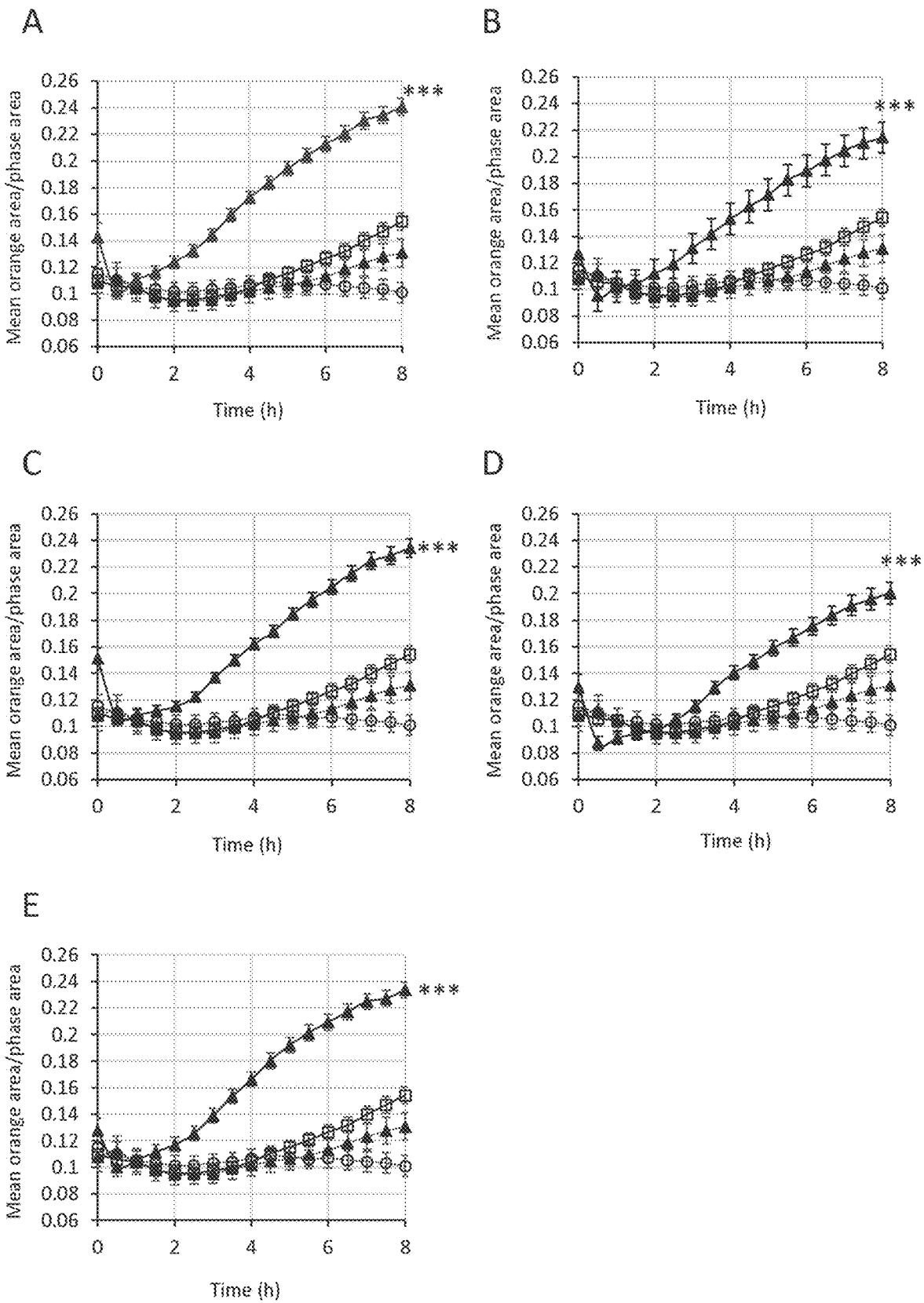

FIG. 29. Humanised anti-tau human IgG1 increase uptake of aggregated tau by human iPSC-derived microglia. Humanised variants of antibody clone #28. VH3VK4 (A). VH4VK2 (B), VH4VK4 (C), VH5VK2 (D). VH5VK4 (E) (solid triangles, solid line) or an isotype control human IgG1 (open squares, solid line) were incubated with full length pHrodo-labelled (P301S) aggregated 2N4R tau before imaging on the Incucyte S3. Mean orange (pHrodo) area per microglial (phase) area quantified every 30 mins for 8 h increased moderately over time in isotype and no antibody (solid triangles, dashed line) treatments, but was significantly increased in cells treated with anti-tau antibody clones. Negative control wells including no pHrodo-labelled tau are also shown (open circles, dashed line). Data are given as mean+/−SEM of n=4 wells from one representative experiment. ***, p<0.001; one-way ANOVA with Tukey's multiple comparison test versus no antibody control.

Figure 30:
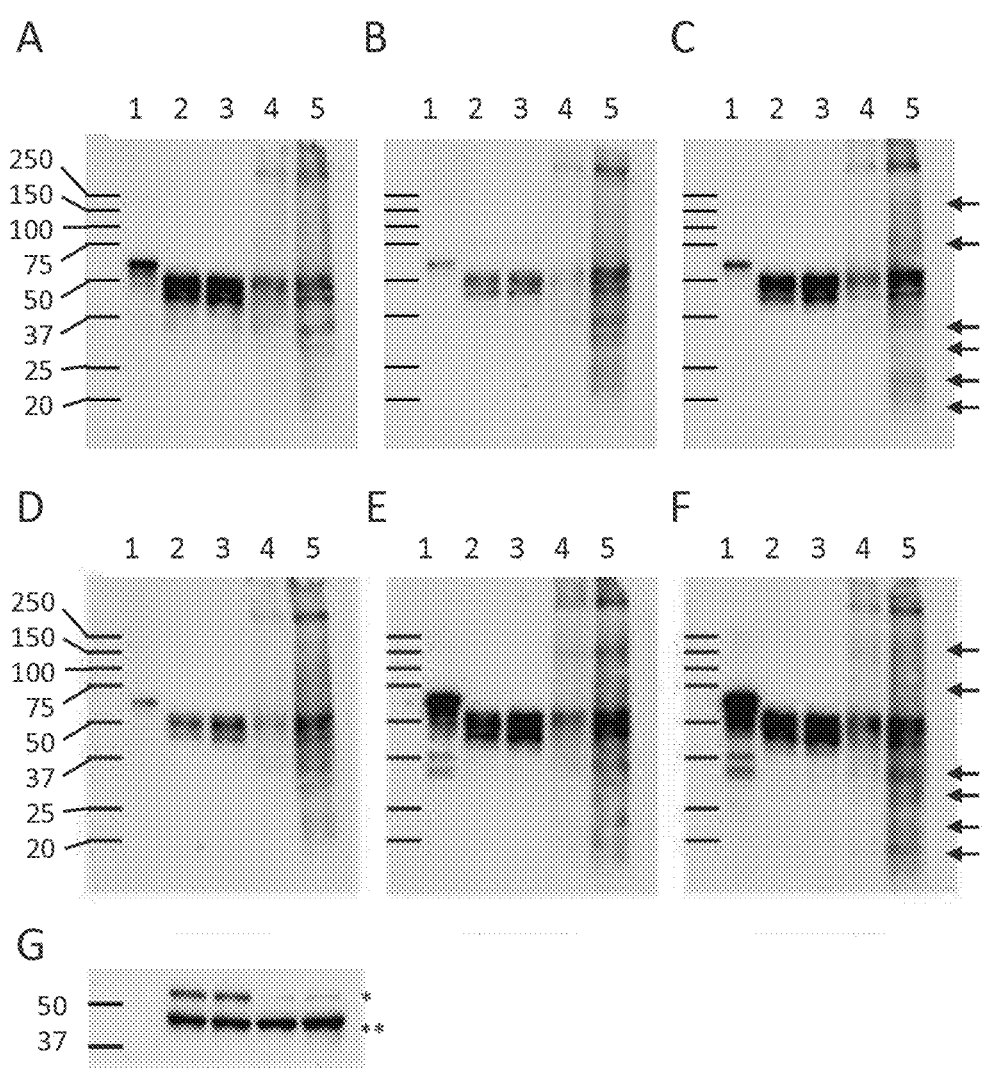

FIG. 30. Purified humanised monoclonal anti-tau antibodies detect increased levels of different forms of tau in familial Alzheimer's disease (AD; Presenilin 1 mutation) compared to non-demented control (NDC) post-mortem cerebral cortex. Western blots of recombinant 2N4R tau (lane 1) compared to brain lysates from an NDC (lanes 2, 3) and a familial AD patient (lane 4, 5), before (lanes 2, 4) and after (lanes 3, 5) λ-phosphatase (A-PP) treatment are shown. Clone #28 variants, VH3VK4 (A), VH4VK2 (B), VH4VK4 (C), VH5VK2 (D), VH5VK4 (E) and the parental VH0VK0 clone #28 (F) antibodies detect multiple species corresponding to different forms of tau, with increased detection of both high and low MW species in the AD sample. Dephosphorylation of samples with λ-PP increases detection of tau species, particularly in AD brain. Arrows indicate disease-specific tau species not detected in NDC brain. Actin (**) and neuronal tubulin (*) are shown (G) and were included to control for loading and post-mortem protein degradation respectively (iii).

Figure 31:
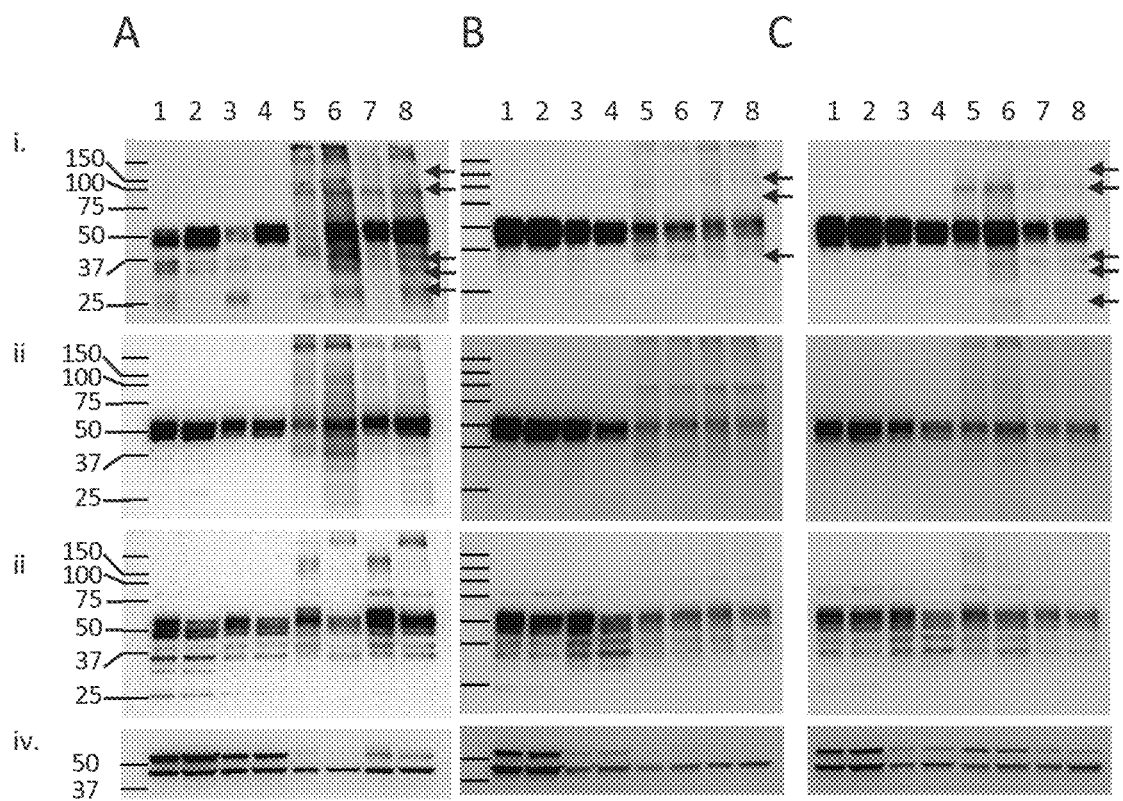

FIG. 31. Humanised anti-tau antibody clone VH5Vκ4 detects increased levels of different forms of tau in familial Alzheimer's disease (AD; Presenilin 1 mutation), sporadic AD and dementia with Lewy bodies (DLB) compared to non-demented control (NDC) post-mortem cerebral cortex. Western blots of cerebral cortex lysates from NDC (lanes 1-4); familial AD patients (A; lanes 5-8); sporadic AD patients (B, lanes 5-8) and DLB patients (C; lanes 5-8), before (lanes 1, 3, 5, 7) and after (lanes 2, 4, 6, 8) λ-phosphatase treatment are shown. Humanised variant VH5VK4 (i) and parental rabbit IgG clone #28 (ii) behave similarly and detect multiple species corresponding to different forms of tau, with increased detection of both high and low MW species in Alzheimer's and DLB samples compared to NDC, and increased detection of tau species in dephosphorylated samples. Panel iii shows the same blots re-probed using commercially available anti-tau antibody. HT7 (targeting mid-region tau sequence amino acids 159-163) and highlights the clear disease specificity of tau species detected with antibodies targeting SEQ ID NO: 1, compared to mid-region tau antibodies. Arrows indicate tau species detected in disease samples, but not NDC, by antibodies targeting SEQ ID NO: 1 but not by the commercially available mid-region tau antibody. Actin (*) and neuronal tubulin (*) are shown (iv.) and were included to control for loading and post-mortem protein degradation respectively.

EXAMPLES

Example 1: Multiple Species of Tau Released from Familial Alzheimer's Disease Neuronal Cultures are not Found in Control Culture Supernatants Multiple species of tau released from familial Alzheimer's disease neuronal cultures are not found in control culture supernatants. Tau was immunoprecipitated (IP) from culture supernatants from non-demented disease control (NDC, familial Alzheimer's disease (fAD)-associated mutation, PSEN1 Y115C (PSEN) and frontotemporal dementia (FTD) associated mutation, MAPT IVS10+16 (MAPT) using commercial antibody. HT7 (Invitrogen, Carlsbad, CA, USA) or Tau13 (Santa-Cruz. Dallas, TX, USA), and compared to an IgG control. Western blots (FIG. 1A) show detection of tau species following each immunoprecipitation, using anti-tau antibody (K9JA; Agilent, Santa Clara, CA, USA). Bands (highlighted in boxes 1-5, FIG. 1A) were excised and analysed by mass spectrometry to identify the tau peptides that are enriched in disease-related secretomes. This analysis reveals an increase in the number of peptides from the microtubule binding domain (corresponding to amino acids 260-267 (SEQ ID NO: 9), 306-317 (SEQ ID NO: 10) and 354-369 (SEQ ID NO: 11) of 2N4R tau) and C-terminus (corresponding to amino acids 396-406 (SEQ ID NO: 12) of 2N4R tau) in disease-associated secretomes compared to those from non-demented controls (Table 4). Data show that tau species including the microtubule binding domain and neighbouring C-terminal regions are secreted at higher levels from disease-associated neurons compared to NDC and may therefore represent pathological or toxic forms of tau.

The higher molecular weight species present in familial AD (PSEN1 mutation) and TS21, but not control neurons were not altered by incubation with I-phosphatase, suggesting that they are not phosphorylated (FIG. 1B).

1.1 Cell culture of human iPSC-derived neurons: Differentiation of human pluripotent stem cells (iPSC) to projection neuron cultures was carried out as described by Shi et al., Nature Neurosci. 15(3):477-86 (2012). iPSC lines from different genetic backgrounds used: Non-disease controls (NDC; Shi et al., Nature Neurosci. 15(3):477-86 (2012); Shi et al. Nature Protocols 7(10): 1836-46 (2012)); trisomy 21 (TS21; Shi et al. Science Transl Med 4(124):124ra29 (2012)); PSEN1 Y115C mutation (PSEN: Moore et al. Cell Rep 11(5): 689-96 (2015)); APP V717I mutation (APP; Moore et al. Cell Rep 11(5): 689-96 (2015); MAPT IVS10+16 (MAPT; Sposito et al. Hum Mol Genet 24(18):5260-5269 (2015)). Cells were plated out for individual experiments at day 40 in vitro and maintained to day 60+, where days in vitro refers to days post-induction (as detailed later).

1.2 Conditioned media collection: iPSC-derived neurons were cultured in 12 well plates (Corning, New York, USA) and matured to D60. Conditioned media was collected every 48 hours, spun to remove cell debris and stored at −20° C. Conditioned media was defrosted on ice and concentrated ~10 fold using Vivaspin 20, 10 kDa MWCO Polyethersulfone (Sigma, St Louise, MI, USA).

1.3 Antibody conjugation: Dynabeads (Thermo Fisher Scientific, Waltham, MA, USA) were washed prior to incubation with 5 µg specified antibody for 10 mins. IgG antibody bead mix were then added to concentrated conditioned media and incubated overnight on a roller. Dynabeads were removed from the conditioned media and replaced with Tau13 (Abcam, Cambridge, UK) antibody bead mix and incubated for ~8 hours. Dynabeads were removed from the conditioned media and replaced with HT7 (Invitrogen, Carlsbad, CA, USA) antibody bead mix and incubated overnight. All beads were washed three times with 0.05% tween (PBS). 100 µL Laemlli lysis buffer were added to all beads and boiled for 10 mins. The supernatant was kept for running on SDS gel.

1.4 Western blotting: 20 µL of sample were loaded in 12% Mini-Protean TGX precast gel (Bio-Rad, Hercules, CA, USA) and transferred onto 0.2 µm PVDF membranes (GE Healthcare Life science, Chicago, IL, USA) at 200 mA for two hours at 4° C. Membranes were blocked in 5% dried skimmed milk (Marvel, Premier Foods, St Albans, UK), 0.1% Tween in PBS for 1 hour at room temperature (RT). The protein-transferred membranes were probed overnight at RT with the primary antibody (at the concentration specified). Membranes were subsequently incubated with secondary antibody (goat anti-rabbit HRP) for 1 hour at RT.

1.5 Mass spectrometry: 20 µL of sample were loaded in 12% Mini-Protean TGX precast gel (Bio-Rad, Hercules, CA, USA). Gel were then incubated with EZBlue™ Gel Staining Reagent (Sigma. St Louis, MO, USA) for 4 hrs and then destained with ddH$_2$O overnight. Bands that corresponded to tau by western blot analysis were excised from the colloidal blue SDS-PAGE. Excised bands were subjected to 20° C. in 200 µL 100 mM ammonium bicarbonate/50% acetonitrile, followed by, reduction with 5 mM tris(2-carboxyethyl) phosphine. Then alkylation by addition of iodoacetamide (25 mM final concentration; each incubation for 30 min per step) then liquid was removed. Gel pieces were dried in vacuum for 10 min and 25 µL 100 mM ammonium bicarbonate containing 5 µg/mL modified trypsin (Promega, Madison, WI USA) was added (digestion for 17 h at 37° C.). Peptides were recovered and desalted using µC18 ZipTip (Millipore, Burlington, MA, USA) and eluted to a MALDI target plate using 1-2 µL alpha-cyano-4-hydroxycinnamic acid matrix (Sigma, St Louis, MO, USA) in 50% acetonitrile/0.1% trifluoroacetic acid. Peptide masses were determined using a Bruker ultrafleXtreme Maldi mass spectrometer in reflectron mode and ms/ms fragmentation performed in LIFT mode. Data analysis was with FlexAnalysis, BioTools and ProteinScape software (Bruker, Billerica, MA, USA). Database searches of the combined mass fingerprint-ms/ms data were performed using Mascot (http://www.matrixsciene.com). (Table 4)

TABLE 4

Peptide fragments identified by mass spectrometry in samples prepared from excised Bands 1-5 (FIG. 1A) are summarised. The amino acid sequence and position within the full length 2N4R tau sequence (SEQ ID NO: 2) are given, with the number of times each peptide was identified.

| POSITION | SEQUENCE | BAND 1 | BAND 2 | BAND 3 | BAND 4 | BAND 5 |
|---|---|---|---|---|---|---|
| 6-23 | QEFEVMEDHAGTYGLGDR (SEQ ID NO: 3) | 2 | 2 | 2 | 2 | 3 |

TABLE 4-continued

Peptide fragments identified by mass spectrometry in samples prepared from excised Bands 1-5 (FIG. 1A) are summarised. The amino acid sequence and position within the full length 2N4R tau sequence (SEQ ID NO: 2) are given, with the number of times each peptide was identified.

| POSITION | SEQUENCE | BAND 1 | BAND 2 | BAND 3 | BAND 4 | BAND 5 |
|---|---|---|---|---|---|---|
| 181-190 | TPPSSGEPPK (SEQ ID NO: 4) | 0 | 5 | 0 | 4 | 0 |
| 195-209 | SGYSSPGSPGTPGSR (SEQ ID NO: 5) | 4 | 4 | 2 | 4 | 4 |
| 210-224 | SRTPSLPTPPTREPK (SEQ ID NO: 6) | 0 | 0 | 2 | 0 | 0 |
| 212-224 | TPSLPTPPTREPK (SEQ ID NO: 7) | 4 | 4 | 6 | 4 | 4 |
| 243-254 | LQTAPVPMPDLK (SEQ ID NO: 8) | 4 | 8 | 8 | 8 | 6 |
| 260-267 | IGSTENLK (SEQ ID NO: 9) | 0 | 4 | 0 | 0 | 0 |
| 306-317 | VQIVYKPVDLSK (SEQ ID NO: 10) | 2 | 4 | 4 | 3 | 2 |
| 354-369 | IGSLDNITHVPGGGNK (SEQ ID NO: 11) | 0 | 2 | 0 | 0 | 0 |
| 396-406 | SPVVSGDTSPR (SEQ ID NO: 12) | 0 | 4 | 4 | 4 | 4 |

Example 2: Peptide Synthesis

To further investigate the importance of microtubule binding domain/C-terminal containing tau fragments in neurodegenerative disease, novel antibodies targeting this region were generated. Peptide sequence SPWVSGDTSPRHLSN (SEQ ID NO: 1), corresponding to amino acids 396-410 of 2N4R tau was selected as an immunogen to generate rabbit IgG, for a number of reasons. First, the initial 11 amino acids (SEQ ID NO: 12) of this sequence were found to be enriched in secretomes from disease-associated neurons and may therefore be present in pathogenic forms of tau. The peptide was extended by four amino acids to provide a larger immunogen for antibody generation. Second, the sequence adjoins the microtubule binding region (MTBR) but, unlike the MTBR itself, shows low identity with other regions within the tau protein and with microtubule binding protein family members. This increases the probability that antibodies generated bind specifically and selectively to the target region in tau, with low risk of cross-reactivity with other regions/proteins. Antigen peptide, [C]-SPWSGDTSPRHLSN-amide (SEQ ID NO: 13) was synthesised by Cambridge Research Biochemicals (Billingham, UK) using standard techniques and shown to be >95% pure by HPLC. The peptide was assembled on a fully automated peptide synthesiser (Symphony, Protein Technologies, Tucson, AZ, USA) using standard Fmoc solid phase synthesis on Rink amide NovaPEG resin (100 µM). Standard Fmoc protected amino-acids (Novabiochem, San Diego, CA USA) were coupled using PyBOP as activator and Diisopropylethylamine. Following assembly, the peptide was cleaved for 3 h using TFA/TIPS/Water/DODT (94.5/2.5/2.5/0.5). The volatiles were evaporated and the peptide was precipitated with cold ether. The precipitate was washed several times with ether and dried. Following analysis of the crude by RP-HPLC and MALDI (Waters Maldi Micro MX MS System. Milford, MA, USA), the peptide was purified on a C18 HPLC system (Gilson, Middleton, WI, USA) using a gradient of acetonitrile (5-35% over 30 min). Fractions were re-analysed by MALDI and pooled to give 2 mg of material at >95% purity after lyophilisation.

Peptides for immunisation were conjugated to Keyhole Limpet Haemocyanin (KLH) through the free thiol on the N-terminal cysteine, via a maleimidobenzoyl-N-hydroxysuccinimide ester (MBS) linker.

Peptides for use in the Single Plasma cell Interrogation (SPIN) protocol were conjugated to a biotinylated polymer using the free thiol on the N-terminal cysteine, using proprietary methods (Exonbio. San Diego, CA, USA).

Peptides for phage display selections to generate monoclonal Ab were conjugated to transferrin or bovine serum albumin (BSA) by Bio-rad Laboratories Inc. (California, USA) through the free thiol on the N-terminal cysteine, using proprietary methods.

Example 3: Polyclonal Antibody Generation

Two polyclonal antibodies were generated to enable initial validation work. Animal husbandry and the procedures used complied with the Animals (Scientific Procedures) Act, 1986. One New Zealand White rabbit was immunised with 200 µg (prepared at a 1 mg/mL dilution) purified KLH-conjugated peptide (SEQ ID NO: 13) at day 0 (in Freund's complete adjuvant), then every 14 days to day 70 (in Freund's incomplete adjuvant), then every 14 days to day 126 (in T-max). Final bleeds were taken on day 142 and antisera collected using standard methods (Hancock & O'Reilly, Methods Mol Biol 295: 27-40 (2005)).

One chicken was used to generate the chicken polyclonal antibody. The chicken was immunised with 200 µg (prepared at a 1 mg/mL dilution) purified KLH-conjugated peptide (SEQ ID NO: 13) at d0 (in Freund's complete adjuvant) then every 14 days (in Freund's incomplete adjuvant) to day 140. Eggs were collected and IgY purified from eggs lain on days 78-151 using standard methods (Narat, Food Technol Biotechnol 41(3): 259-267 (2003)).

Polyclonal antibodies were affinity purified using a thiopropyl Sepharose affinity column derivatised with the antigen peptide, and glycine eluates prioritised for further work. Eluates were dialysed against PBS.

Example 4: Affinity Purified Polyclonal Antibodies Bind to the Isolated Peptide Immunogen Crude antiserum from the immunised rabbit and IgY precipitated from the immunised chicken eggs were purified by affinity chromatography and eluted in glycine and TEA. The ability to bind to the immobilised peptide used for immunisation is demonstrated by peptide ELISA (FIG. 2). In both cases, glycine eluates give higher specific binding than TEA eluates and are used in all subsequent experiments. Half maximal ELISA signals are obtained at dilutions of 1:381 for rabbit IgG (0.04 mg/mL) and 1:2022 for chicken IgY (0.2 mg/mL) glycine eluates. Data demonstrate that both rabbit and chicken immunisations successfully generated antibodies able to bind the target immunogen.
- 4.1 Peptide ELISA: ELISA plates were coated with non-conjugated antigen peptide (Antigen peptide ([C]-SPWSGDTSPRHLSN-amide (SEQ ID NO: 13) (50 µL/well of 10 µg/mL solution in PBS), incubated at 37° C. for 1 hour and then washed. Serum/IgY samples were serially diluted across the ELISA plate. All samples were run in duplicate and incubated at 37° C. for 1 hour, then washed. Goat anti-rabbit or anti-chicken immunoglobulin alkaline phosphate secondary antibody (as appropriate; Sigma. St Louis, MO, USA) was applied in a 1/500 dilution (50 µL per well) and incubated at 37° C. for 1 hour. Plates were then washed and 50 µL of alkaline phosphatase substrate was added and incubated at 37° C. for ½ hour. Absorbance was determined at 405 nm.

Example 5: Polyclonal Antibodies Detect Full Length Recombinant Tau in an MSD Assay. (FIG. 3)

Anti-tau polyclonal antibodies (pAb) are able to detect full length recombinant 2N4R tau as part of a sandwich immunoassay antibody pair. Rabbit pAb (A) and chicken pAb (B) were used as capture antibodies at 0, 2, 4, 6 µg/mL, in combination with the commercial antibody, HT7 (1 µg/mL) as detection antibody. In this format, both antibody combinations are able to detect recombinant tau at concentrations above 2 ng/mL. Data demonstrate that pAbs targeting the epitope of interest (SEQ ID NO: 1) have utility for the generation of sandwich immunoassays in combination with commercially available antibodies.
- 5.1 MesoScale Discovery (MSD) analyses (FIG. 3): Custom MSD assays were developed based on standard methods provided by the manufacturer (MesoScale Discovery. Rockville, MD, USA). Plates were coated with either anti-tau pAbs or commercially available mouse monoclonals as capture antibodies, by incubation at 4° C. overnight in PBS (2, 4, 6 µg/mL). Plates were then washed 1× with PBS and blocked with MSD Blocker A for 1 h at room temperature on a plate shaker. Following blocking, the plates were washed 1× with PBS+0.05% Tween (PBS-T), and then a recombinant tau (rPeptide, Watkinsville, GA, USA) 1:5 serial dilution was added covering the range 0-50 ng/mL. The recombinant tau was incubated with the capture antibody in the plate at room temperature on a plate shaker for 2-3 hours or overnight at 4° C. The plate was then washed 3× with PBS-T, and 30 µL of detection antibody (anti-tau pAbs or various commercially available mouse monoclonal antibodies; 0.5, 1, 2 µg/mL; ThermoFisher, Waltham, MA, USA) was added to each well. The detection antibody was incubated on the plates at 4° C. overnight. Plates were washed the following day 3× with 0.05% PBS-T and then labelled with MSD Sulfo-TAG anti-mouse or anti-rabbit secondary antibody depending on the species of the detection antibody at 1:500 in 0.05% PBS-T, 30 µL/well at room temperature on the plate shaker for 1 h. Following this, the plates were washed 3× with PBS-T. 150 µL 2×MSD read buffer was added to each well and incubated for 5 min before imaging on the MSD plate reader using a standard protocol.

Example 6: Polyclonal Anti-Tau Antibodies Detect Tau in Human IPSC-Derived Neuronal Cultures Only when Dephosphorylated (FIG. 4

Extracellular tau species identified in secretomes from human iPSC-derived neuronal cultures are not phosphorylated (FIG. 1). The peptide immunogen used to generate pAbs was entirely non-phosphorylated but includes 4 putative phosphorylation sites (at S396, S400, S404. S409). Western blots were therefore performed to test the ability of anti-tau pAbs to detect recombinant and natively expressed tau and to explore the sensitivity of generated pAbs to the phosphorylation status of tau. Western blots run on iPSC-derived neuronal lysates (day 80) incubated in the presence and absence of dephosphorylating enzyme, lambda-phosphatase (I-PP) demonstrate a marked preference of both polyclonal IgGs for non-phosphorylated tau. Chicken and rabbit polyclonal antibodies detect full length recombinant 2N4R tau at ~60 kD, demonstrating their utility for use in western blot analysis. Both antibodies detect a dominant band at ~50 kD representing full length tau, only in neuronal samples treated with I-PP (FIG. 4). The blots were re-probed using the commercially available antibody, K9JA which shows no selectivity for dephosphorylated tau and confirms the presence of tau in all samples. Actin was included on all blots and demonstrates equal loading of all samples. A non-specific band at ~35 kD is detected by the chicken pAb in all samples. Phosphorylation of tau in all neuronal lysates is demonstrated by the shift in mobility of bands detected with K9JA antibody, observed following I-PP treatment. This shift also confirms successful dephosphorylation of all samples by I-PP.

Cell lysates from disease controls (NDC), familial Alzheimer's disease-associated, PSEN Y115C (PSEN), trisomy 21 (TS21) and frontotemporal dementia associated mutation, MAPT (IVS10+16) all contain tau species that are detected by the rabbit and chicken polyclonal antibodies following dephosphorylation. Data show that the majority of tau present intracellularly in human iPSC-derived neurons in culture is phosphorylated and demonstrate the selectivity of these polyclonal antibodies for non-phosphorylated tau (FIG. 4).
- 6.1 Protein extraction: iPSC-derived neuronal cultures were lysed using RIPA buffer (Sigma, St Louis, MO, USA) supplemented with protease inhibitors (cOmplete Mini, EDTA free, Roche Diagnostics, Rotkreux, Switzerland). Protein concentration was measured with Pierce BCA Protein Assay Kit (Thermo Fisher Scientific, Waltham, MA, USA), and where specified, brain lysates were treated with lambda protein phosphatase (I-PP); (New England Biolabs, Ipswich, MA, USA), according to manufacturer's instructions.

6.2 Western blotting: 40 µg protein in 20 µL total volume (unless otherwise stated) were loaded on a 12% Mini-Protean TGX precast gel (Bio-Rad, Hercules, CA, USA) and transferred onto 0.2 µm PVDF membranes (GE Healthcare Life science. Chicago, IL, USA) at 200 mA for two hours at 4° C. Membranes were incubated in blocking solution (5% dried skimmed milk, 0.1% Tween in PBS) for 1 hour at RT.

6.3 Antibody incubation: The protein-transferred membranes were probed overnight at RT with the primary antibody (at the concentration specified). Membranes were subsequently incubated with secondary antibody (anti-rabbit-HRP (Sigma, St Louis, MO, USA) or anti-chicken (Abcam, Cambridge, UK) both at 1:1000) for 1 hour at RT.

6.4 Membrane visualization: Each membrane was detected using enhanced chemiluminescence (ECL) western blotting detection reagent (GE Healthcare Life Science, Chicago, IL USA) and visualized using ImageQuant LAS 4000 (GE Healthcare Life Science, Chicago, IL, USA).

6.5 Beta-Actin normalization: Beta-actin was included as a loading control. After imaging the first antibody complex was removed from PVDF membranes using Restore PLUS Western Blot Stripping Buffer (Thermo Fisher Scientific, Waltham, MA, USA) for 25 minutes at RT. The membranes were incubated with blocking solution for 1 hour at RT. Each membrane was probed with mouse monoclonal anti-beta-Actin (Sigma, St Louis MO, USA: 1:1000), or TuJ1 primary antibody (R&D Systems, Minneapolis, MN, USA; 1:1000) and then incubated with goat anti-mouse IgG-peroxidase secondary antibody (Sigma, St Louis, MO, USA: 1:2000). Both antibodies were incubated for 1 hour at RT consecutively.

Example 7: Polyclonal Anti-Tau Antibodies Detect Increased Levels of Tau in Familial Alzheimer's Disease (AD) Compared to Non-Demented Control Post-Mortem Brain (FIG. 5)

Western blots of brain lysates from non-demented controls and Alzheimer's disease patients treated with I-PP demonstrate the ability of the polyclonal antibodies to detect tau species in human brain lysates. Rabbit and chicken polyclonal antibodies detect multiple species corresponding to different forms of tau, with increased detection of tau species in samples treated with I-PP, confirming a preference for the antibodies to bind to non-phosphorylated forms of tau. The two antibodies detect higher levels of both high and low molecular weight species in Alzheimer's samples with similar patterns of bands, consistent with detection of the same tau species. Actin and neuronal tubulin were included to control for loading and post-mortem protein degradation respectively. Data confirm the presence and increased abundance of tau species containing the epitope of interest in familial Alzheimer's disease brain compared to controls, with enhanced detection in non-phosphorylated samples by polyclonal antibodies.

7.1 Western blot: See Example 6 for detailed methods.

7.2 Human brain samples: Human postmortem brain samples were obtained from the Kings College London Neurodegenerative Diseases Brain Bank. All work was ethically approved and informed consent was obtained prior to brain donation. Alzheimer's disease brain samples were from the frontal cortex of individuals with familial Alzheimer's disease (PSEN1 mutations; summarised in Table 5). Non-demented control brain samples were from age-matched individuals who showed no clinical signs of dementia. Cause of death for the control individuals was lung carcinoma (1), coronary artery occlusion (2), lung cancer (3), acute hepatic failure (4), metastatic prostate cancer (5); none of which would be predicted to impact tau levels/species detected post-mortem.

TABLE 5

A summary of the known mutations associated with familial Alzheimer's disease present in the fAD brain samples.

| Sample number | Disease-associated mutation |
| --- | --- |
| AD6 | PS1 (E280G) |
| AD7 | PS1 mutation |
| AD8 | PS1 mutation |
| AD9 | PS1 Delta4 truncation |
| AD10 | PS1 mutation |

7.3 Protein extraction: Post-mortem brain samples were provided by the brain bank as homogenised tissue (1 cm$^3$ homogenised in 4 mL). Homogenised PM brain samples were cleared by centrifugation at full speed, for 30 minutes at 4° C. Protein concentration of cleared lysates was measured with Pierce BCA Protein Assay Kit (Thermo Fisher Scientific, Waltham, MA, USA).

Example 8: Rabbit Anti-Tau Polyclonal IgG Detects Dephosphorylated Tau Aberrantly Located in Dendrites in Disease-Associated Neurons. (FIG. 6)

Rabbit polyclonal IgG can be used to visualise tau expression in NDC, APP V717I (familial Alzheimer's disease associated) and MAPT IVS10+16 (frontotemporal dementia associated) iPSC-derived neurons (day 50+) by immunocytochemistry. Immunofluorescence is substantially increased in samples treated with I-PP compared to untreated samples (FIG. 6). Data demonstrate that the rabbit polyclonal antibody is able to detect natively expressed tau, in situ in human neurons when enzymatically dephosphorylated and is a useful tool for histological analyses.

8.1 Neuronal culture: iPSC-derived neurons (obtained as described above in Example 1.1) were plated in 96 well imaging plates (Corning, New York, USA; or Ibidi, Martinsried, Germany).

8.2 Neuronal Fixation: Cultures were washed with 1×HBSS and fixed with 4% paraformaldehyde (PFA) at room temperature for 20 minutes. The 4% PFA was then removed, and cultures were washed 3× with PBS prior to labelling.

8.3 Fluorescent labelling of fixed cultures: Cultures were permeabilised by incubation with 0.1% Triton X-100 in PBS (PBS-T) for 2 h at room temperature. Where specified, samples were dephosphorylated by incubating with 50 µL/100U I-PP (New England Biolabs) for 2 h at 31° C. Cultures were incubated in blocking solution (200 µL/well; PBS/2% BSA/0.1% Triton X-100) at room temperature for 2 h, then with primary antibody (at 1:100 dilution, or as specified) in 2% BSA overnight at 4° C. (see Figure legend for concentrations). The following day, cultures were washed 3× in 0.1% PBS-T followed by incubation with species specific Alexa Fluo-conjugated secondary antibodies (1/500—Life Technologies) with the nuclear stain 4',6-Diamidine-2'-phenylindole dihydrochloride (DAPI; 1:1000; ThermoFisher Scientific, Waltham, MA, USA) for at least 1 hour at RT, protected from light. After secondary antibody labelling, cultures were washed 5× in PBS, and finally stored in PBS at 4° C. prior to confocal imaging.

8.4 Confocal imaging. Fluorescently labelled cultures were imaged on an Olympus FV1000 confocal microscope (Olympus, Tokyo, Japan). Regions of interested were manually selected and imaged using a 20× air objective and a 40× oil objective. Confocal Z-stacks were obtained for all images and processed using the maximum Z-projection function in the ImageJ software (FIJI). Colocalisation analysis of tau and MAP2 staining was performed using Coloc2 (FIJI). The output of the analysis is a Pearson's R value, showing the degree of correlation between the staining for tau and MAP2.

Example 9. Generation of a Panel of Human scFv that Bind to the Target Peptide

Human scFv binding to linear peptide sequence SPWSGDTSPRHLSN (SEQ ID NO: 1) were identified by RxBiosciences (Gaithersburg, MD) using a proprietary human scFv library containing >5×10$^{10}$ clones in phagemid vectors.

9.1 Identification of scFv: Screening (biopanning) of premade libraries×3 using [C]-SPWSGDTSPRHLSN-amide (SEQ ID NO: 13) peptide-coupled to transferrin in both liquid and solid phase were conducted. Biopanning steps were performed using optimized, proprietary protocols developed by RxBiosciences. Lambda and kappa chain specific antibody libraries were panned separately in order to avoid over-population of lambda specific clones. A subtractive screening protocol was applied in which the library was first incubated with transferrin (minus peptide). 3 further rounds of biopannings were then completed with increasing stringency obtained by progressive reduction in antigen concentration and an increase in concentration of non-ionic detergents in the wash buffer. Phage were eluted by competitive displacement and by trypsin.

After the 2$^{nd}$ and 3$^{rd}$ biopannings, phage eluates were mixed with XL-1 Blue competent cells (Agilent Technologies, USA) and spread on Lysogeny broth (LB)-plates with antibiotics. A total of 20×96 clones were picked and then rescued with the help of M13 Helper-phage and precipitated with PEG/NaCl. The phages were then screened for binding by phage ELISA using protein conjugated peptides as target.

9.2 Prioritisation of clones: The top 48 scFv clones showing highest reactivity in ELISA were identified and arrayed in a 96 well plate in duplicate. Clones were reconfirmed by LITMUS ELISA (a proprietary technique developed by RxBiosciences involving performing an ELISA at very high stringency in order to prioritise the highest affinity clones). Five high affinity clones were identified after sequencing. Antibody genes from the five top clones were sub-cloned in a protein expression vector and sequenced in both directions. The heavy-chain CDRs, (HCDR1, HCDR2. HCDR3), light chain CDRs (LCDR1, LCDR2, LCDR3), VH and VL sequences for each antibody clone are given in Table 6 and the sequence listing. Kabat nomenclature was used to define CDRs.

TABLE 6

VH and VL CDR sequences of Clones 1 to 8 (Exonbio) and Clones 9 to 13 (RxBio)

| Clone | Antibody | | VH HC sequence | | | VL LC sequence | |
|---|---|---|---|---|---|---|---|
| | | CDR1 | CDR2 | CDR3 | CDR1 | CDR2 | CDR3 |
| 1 #28 | C1 P1-D4 | NYDMS (SEQ ID NO: 14) | TVSTTYRRYYASWAKG (SEQ ID NO: 15) | SGI (SEQ ID NO: 16) | QSSQRVYSNYLA (SEQ ID NO: 17) | LASTLES (SEQ ID NO: 18) | AGTYTGSIWA (SEQ ID NO: 19) |
| 2 #30 | D1 P1-F4 | NYDMS (SEQ ID NO: 20) | TVSTTYRRYYASWAKG (SEQ ID NO: 21) | SGI (SEQ ID NO: 22) | QSSQRVYSNYLA (SEQ ID NO: 23) | LASTLES (SEQ ID NO: 24) | AGTYTGSIWA (SEQ ID NO: 25) |
| 3 | D4 P2-B12 | RYDMS (SEQ ID NO: 26) | TISGSYNTYYMSWAKG (SEQ ID NO: 27) | SGI (SEQ ID NO: 28) | QSSQRVYSNYLS (SEQ ID NO: 29) | LASTLES (SEQ ID NO: 30) | AGTYSGSIWA (SEQ ID NO: 31) |
| 4 | B3 P2-E5 | SYDMS (SEQ ID NO: 32) | TIGRYYNTYYATWAKG (SEQ ID NO: 33) | SGI (SEQ ID NO: 34) | QSSQTVYNNNYLS (SEQ ID NO: 35) | LASTLES (SEQ ID NO: 36) | AGTYSGSIWA (SEQ ID NO: 37) |
| 5 | A1 P1-B2 | SYDMS (SEC ID NO: 38) | TISSSYRTYYASWAKG (SEQ ID NO: 39) | SGI (SEQ ID NO: 40) | QSSQRVYNNYLA (SEQ ID NO: 41) | LASTLES (SEQ ID NO: 42) | AGTYSGSIWA (SEQ ID NO: 43) |
| 6 | A4 P2-C11 | SYDMS (SEQ ID NO: 44) | TIGRYYNTYYATWAKG (SEQ ID NO: 45) | SGI (SEQ ID NO: 46) | QSSQTVYNNNYLS (SEQ ID NO: 47) | LASTLES (SEQ ID NO: 48) | AGTYSGSIWA (SEQ ID NO: 49) |
| 7 | D2 P1-D10 | SYDMS (SEQ ID NO: 50) | TIGRYYNTYYATWAKG (SEQ ID NO: 51) | SGI (SEQ ID NO: 52) | QSSQTVYNNNYLS (SEQ ID NO: 53) | LASTLES (SEQ ID NO: 54) | AGTYSGSIWA (SEQ ID NO: 55) |

TABLE 6-continued

VH and VL CDR sequences of Clones 1 to 8 (Exonbio) and Clones 9 to 13 (RxBio)

| Clone | Anti-body | VH HC sequence | | | VL LC sequence | | |
|---|---|---|---|---|---|---|---|
| | | CDR1 | CDR2 | CDR3 | CDR1 | CDR2 | CDR3 |
| 8 | H2 P2-F3 | SYDMS (SEQ ID NO: 56) | TISSSYRTYYASWAKG (SEQ ID NO: 57) | SGI (SEQ ID NO: 58) | QSSQRVYNNYLA (SEQ ID NO: 59) | LASTLES (SEQ ID NO: 60) | AGTYSGSIWA (SEQ ID NO: 61) |
| 9 | rx2 E5 E11 s21 | DYGIH (SEQ ID NO: 62) | VISHDGSHKYYSDSVKG (SEQ ID NO: 63) | AKDLPQTGALDF (SEQ ID NO: 64) | QASQDISNYLN (SEQ ID NO: 65) | DASNLET (SEQ ID NO: 66) | QQANSFPIT (SEQ ID NO: 67) |
| 10 | rx6 B5 B11 s18 | GYYMH (SEQ ID NO: 68) | WINPNSGGTNYAQKFQG (SEQ ID NO: 69) | ATESLDY (SEQ ID NO: 70) | QASQDISNYLN (SEQ ID NO: 71) | DASNLET (SEQ ID NO: 72) | QQYDNLPLT (SEQ ID NO: 73) |
| 11 | rx7 C6 C12 s27 | DYYWT (SEG ID NO: 74) | EINHVGSSRYNPSLGS (SEQ ID NO: 75) | TRGRKTRRVKFFSRY SRDWFDP (SEQ ID NO: 76) | RASQSVSSNLA (SEQ ID NO: 77) | GASSRAT (SEQ ID NO: 78) | QQLNSYPFT (SEQ ID NO: 79) |
| 12 | rx8 H11 H5 s24 | DYYWT (SEQ ID NO: 80) | EINHVGSSRYNPSLGS (SEQ ID NO: 81) | TRGRKTRRVKFFSRY SRDWFDP (SEQ ID NO: 82) | RASQGISNYLA (SEQ ID NO: 83) | AASTLQS (SEQ ID NO: 84) | QKYNSAPFT (SEQ ID NO: 85) |
| 13 | rx9 D12 D6 s28 | KYAMS (SEQ ID NO: 86) | GNSGSGNSTYYADSVKG (SEQ ID NO: 87) | AKTRGAGRRKPYGM DV (SEQ ID NO: 88) | RASQSVANNYLA (SEQ ID NO: 89) | GASSRAT (SEQ ID NO: 90) | QQYGSSPRT (SEQ ID NO: 91) |

Example 10. A Panel of Phage Display-Derived Human scFv Bind to the Gen2A Epitope in Phage ELISA (FIG. 7)

Five scFv clones: rx2, rx6, rx7, rx8, rx9 (Clones 9 to 13, respectively) show reproducible binding to full length recombinant 2N4R tau (SEQ ID NO: 2), in addition to target peptide (SEQ ID NO: 13) conjugated to BSA and/or transferrin, with low background binding to BSA alone (FIG. 7). Data demonstrate the feasibility of using phage display to identify human scFv targeting the epitope of interest that also bind full length tau.

10.1 Phage ELISA: Supernatants prepared from bacterial cultures infected with phage displaying scFv were tested for binding to full length recombinant 2N4R tau (100 ng/well), target peptide (SEQ ID NO: 13) conjugated to BSA or transferrin (1 µg/well) or BSA (1% in TBS) using standard methods. Antigen was coated onto ELISA plates, then removed, and plates were blocked for 1 h with 5% dried milk in TBS. Samples were diluted 1:25 in 1% BSA/TBS then added to the ELISA plate for 1 h at room temperature (RT). Plates were then washed ×4 with TBS/0.1% Tween (TBST). Alpha-M13-HRP antibody (Abcam, Cambridge, UK) was added (1:5000 dilution in 5% milk/TBS) and incubated for 1 h at RT before washing ×4. TMB ELISA solution was added to each well for 10 min at RT, followed by 1 M sulphuric acid. OD was then measured at 450 nm.

Example 11: Isolation of Monoclonal IgG Specific for the Target Epitope

A panel of monoclonal rabbit IgG were generated against the peptide immunogen corresponding to amino acids 396-410 of 2N4R tau (SEQ ID NO: 1) by immunisation followed by isolation using the Single Plasma cell Interrogation (SPIN) technique (Exonbio, proprietary methods).

11.1 Immunisation of rabbits with target immunogen: One New Zealand White rabbit was used to generate the rabbit monoclonal antibodies. The rabbit was immunised with 200 µg (prepared at a 1 mg/mL dilution) purified KLH-conjugated peptide ([C]-SPWSGDT-SPRHLSN (SEQ ID NO: 13), corresponding to amino acids 396-410 of 2N4R tau) at day 0 (in Freund's complete adjuvant), then every 19 days to day 114 (in Freund's complete adjuvant). Adjuvant and antigen boosts were given (i.p.) on day 129 and 132 respectively before final bleeds were taken on day 139 and antisera collected using standard methods (Hancock & O'Reilly Methods Mol Biol 295:27-40 (2005)). Animal husbandry and the procedures used complied with the Animal Welfare Act. 1966 (US Animal and Plant Health Inspection Service).

11.2 Peptide ELISA (FIG. 8): In order to confirm the generation of a robust immune response, serum was tested for immunoreactivity to the immobilised target antigen at various time points post-immunisation. Serum taken at day 114 post-immunisation showed immunoreactivity to the linear peptide target at dilutions of 1:1000-1:1000,000, indicative of IgG titres sufficient to proceed to monoclonal antibody isolation (FIG. 8).

ELISA plates were coated with antigen (non-conjugated antigen peptide (Antigen peptide ([C]-SPWSGDT-SPRHLSN-amide (SEQ ID NO: 13); 2 µg/well in 1×PBS) overnight at 4° C. Antigen was removed from wells and the plates were blocked for 1 hour at RT with 5% dried milk in 1×PBS. Blocking solution was removed, 100 µL of diluted serum (diluted in 1% BSA/1×PBS) was added to relevant wells, and plates were incubated for 1 hour at RT with gentle shaking. Plates were then washed four times with PBS/0.1% Tween (PBST). Anti-rabbit IgG-HRP antibody (Sigma, St Louis, MO, USA), diluted 1:10,000 in 1% BSA in PBS, was added to each well and plates were incubated for 30 min at RT with gentle shaking before being washed four times with PBST. 50 µL 3,3',5,5'-tetramethylbenzidine (TMB) ELISA solution was added to each well and plates were incubated for 15 mins at RT, an equal volume of 1 M sulfuric acid was added to each well and OD was measured at 450 nm.

11.3 Isolation of monoclonal IgG specific for the target epitope: 96 individual antigen-specific plasma cells were identified and isolated using the target immunogen by Exonbio using proprietary methods (Exonbio, San Diego, CA, USA).

Splenocytes were isolated from the spleen of the immunised rabbit with Ficoll gradient (1.084) and were stained with plasma cell marker and biotin-conjugated antigen. Antigen-specific plasma cells were isolated and sorted into 96-well plates at one cell per well. Variable regions of antibody heavy and light chains were amplified individually by single cell polymerase chain reaction (PCR). Amplified heavy and light chains were then cloned into pRab293 plasmid and expressed in HEK293F suspension cells in serum-free medium using Invitrogen (Carlsbad, CA, USA) 293fectin transfection reagent, as per the manufacturer's instructions.

Example 12: Transiently Expressed IgG Bind to the Isolated Peptide Immunogen (FIG. 9)

Individual IgG clones were transiently expressed in HEK293F cells in order to generate IgG samples for in vitro testing. Supernatants containing single IgG clones were tested for ability to bind to both the short peptide immunogen ([C]-SPWSGDTSPRHLSN-amide: SEQ ID NO: 13) and full length 2N4R recombinant tau (SEQ ID NO: 2) (FIG. 9). 10 clones were found to bind full length tau with OD>0.3 and were prioritised for sequencing. Eight unique clones were identified and expressed (Table 6, Clones 1 to 8). Data demonstrate the utility of short peptide immunogen ([C]-SPVVSGDTSPRHLSN-amide) for the generation of IgG able to bind to full length recombinant 2N4R tau; and demonstrate the ability of the 8 prioritised clones to bind to both the immunogen and full length 2N4R tau.

12.1 Transient expression of IgG in HEK cells: Individual IgG clones were transiently expressed in HEK293F cells in order to generate IgG samples for in vitro testing. HEK293F cells cultured in suspension were transiently transfected with constructs in pRab293 plasmid using 293fectin transfection reagent (Invitrogen, Carlsbad, CA USA) as per the manufacturer's instructions.

Supernatants were collected 7 days post-transfection. Antibodies were purified using a protein A column (25 mL resin) on an AKTA chromatography system (GE Healthcare, Chicago, IL, USA) and standard methods. Briefly. Protein A column was loaded with supernatant at 5 mL/min, then washed with PBS (5× total column volume). The protein peak was collected and dialysed in PBS overnight at 4° C.

For generation of mg quantities of IgG, 300 mL-1 litre HEK293F cells were transiently transfected and IgG was purified from culture media 7 days post-transfection using a protein A column, as above.

12.2 Peptide ELISA: ELISA plates were coated with antigen (non-conjugated antigen peptide [C]-SPWSGDTSPRHLSN-amide (SEQ ID NO: 13)) or full length 2N4R tau (SEQ ID NO: 2), 100 ng/well; or 1% BSA in 1×TBS) in 1× carbonate-bicarbonate buffer for 1 hour at 37° C. Antigen was removed from wells and the plates were then blocked for 1 hour at RT with 5% dried milk in 1×TBS. Blocking solution was removed. HEK293F cell supernatant (10 µg/mL, to 0.0001 µg/mL in 1% BSA/1×TBS) was added to relevant wells, and plates were incubated for 1 hour at RT with gentle shaking. Plates were then washed four times with TBS/0.1% Tween (TBST). Anti-rabbit IgG-HRP antibody (Sigma. St Louis, MO, USA), diluted 1:5000 in 5% milk/TBS, was added to each well and plates were incubated for 1 hour at RT with gentle shaking before being washed four times with TBST. 3,3',5,5'-tetramethylbenzidine (TMB) ELISA solution was added to each well and plates were incubated for 15 mins at RT. An equal volume of 1 M sulfuric acid was added to each well and OD was measured at 450 nm.

Example 13: Monoclonal Antibodies Detect Full Length Recombinant Tau by ELISA in a Concentration-Dependent Manner. (FIG. 10)

Anti-tau antibody clones 1 (P1-D4) and 2 (P1-F4) bind to full length recombinant 2N4R tau (SEQ ID NO: 2), immobilised on an ELISA plate, in a concentration-dependent manner, with half maximal ELISA signal observed at 0.73 nM [0.86 to 0.81 nM] and 1.04 nM [0.89 to 1.22 nM] respectively (mean and 95% confidence intervals from n=2 wells in a single experiment are given) (FIG. 10). Data demonstrate high affinity binding of both clones to full length recombinant 2N4R tau.

13.1 ELISA analyses: ELISA plates were coated with antigen (full length tau, 100 ng/well; or 1% BSA in 1×TBS) in 1× carbonate-bicarbonate buffer for 1 hour at 37° C. Antigen was removed from wells and the plates were then blocked for 1 hour at RT with 5% dried milk in 1×TBS (200 µl/well). Blocking solution was removed, diluted IgG (10 µg/mL, to 0.0001 µg/mL in 1% BSA/1×TBS) was added to relevant wells, and plates were incubated for 1 hour at RT with gentle shaking. Plates were then washed four times with TBS/0.1% Tween (TBST). Anti-rabbit IgG-HRP antibody (Sigma, St Louis, MO, USA), diluted 1:5000 in 5% milk/TBS, was added to each well and plates were incubated for 1 hour at RT with gentle shaking before being washed four times with TBST. 25 µL 3,3',5,5'-tetramethylbenzidine (TMB) ELISA solution was added to each well and plates were incubated for 15 mins at RT, an equal volume of 1 M sulfuric acid was added to each well and OD was measured at 450 nm.

Data were plotted as log concentration of IgG against ELISA signal (OD) and $EC_{50}$ values were calculated using a four parameter logistic equation with variable slope using GraphPad Prism (GraphPad Software Inc, La Jolla, CA, USA).

Example 14: Monoclonal Anti-Tau Antibodies Detect Tau in Human IPSC-Derived Neuronal Cultures (FIGS. 11, 12)

Western blots were performed to test the ability of anti-tau IgG to detect recombinant and natively expressed tau. HEK293F cell-derived supernatants (generated as per Example 12) containing IgG clones P1-D4 (Clone 1), P1-F4 (Clone 2), P2-E5 (Clone 4) or P2-B12 (Clone 3) detect full length recombinant 2N4R tau (SEQ ID NO: 2) (rPeptide, Watkinsville, GA USA) as a dominant band at ~60 kD (FIG. 11). All clones tested are able to detect 50 ng tau loaded into a single lane (FIG. 11, lane 2). All clones except clone P2-E3 detect a dominant band at ~50 kD in human iPSC-derived neuronal lysates. Treatment of neuronal lysates with I-PP to dephosphorylate proteins, decreases the apparent molecular weight of detected tau species detected in neuronal lysates (consistent with successful dephosphorylation), and enhances the ability of antibodies to detect natively expressed tau. All clones detect multiple tau species in postmortem brain samples, with increased detection of species in AD compared to NDC lysates and increased detection in I-PP treated samples compared to untreated. Data demonstrate that all 4 IgG clones tested bind preferentially to dephosphorylated tau samples and are able to detect both recombinant and natively expressed tau by western blot.

Purified clones P1-D4 (Clone 2) and P1-F4 (Clone 1) IgG detect tau in human iPSC-derived neurons from non-demented control, familial Alzheimer's disease associated (PSEN Y115C, trisomy 21) and fronto-temporal dementia associated (MAPT IVS10+16) genetic backgrounds (FIG. 12). A dominant band is detected at ~50 kD in each neuronal sample. Detection of tau is enhanced in I-PP treated samples, confirming a preference of both antibodies for binding to dephosphorylated tau species. Commercially available antibody, HT7 (raised against an epitope corresponding to amino acids 159-163 of 2N4R tau; Invitrogen, Carlsbad, CA, USA) also detects a dominant band at ~50 kD when used to re-probe the blots, consistent with this representing full length tau. Apparent molecular weight is shifted in I-PP treated samples consistent with successful dephosphorylation with no impact on detection by HT7. Commercially available antibody, AT8 (specific for phosphorylated tau epitope including pSer202 and pThr205; ThermoFisher) detects a band at ~50 kD only in non-I-PP treated samples, confirming successful dephosphorylation. Data show that tau present intracellularly in human iPSC-derived neurons in culture can be detected by antibodies targeting the epitope corresponding to amino acids 396-410 (SEQ ID NO: 1) of 2N4R tau (SEQ ID NO: 2) preferentially when it is not phosphorylated (FIG. 12).

See Example 6 for full methods.

Example 15: Monoclonal Anti-Tau Antibodies Detect Increased Levels of Tau in Familial Alzheimer's Disease (fAD) Compared to Non-Demented Control Post-Mortem Brain (FIG. 13)

Western blots were run using brain lysates from non-demented controls (NDC) and Alzheimer's disease patients. Purified rabbit IgG clones P1-D4 (Clone 1), P1-F4 (Clone 2) detect tau in human post-mortem brain samples (FIG. 13). Both clones detect increased levels of tau in AD compared to NDC brain samples, including multiple high (>75 kD) and low (<40 kD) molecular weight species that are absent in the NDC samples tested. Actin and neuronal tubulin were included to control for loading and post-mortem protein degradation respectively, demonstrate that increased detection of tau in AD samples is not a result of increased protein loading or reduced degradation but rather reflects an increase in the abundance of C-terminal tau containing species in AD brain compared to NDC. Notably, antibodies targeting SEQ ID NO: 1 detected a distinct pattern of tau species in post-mortem brain samples that were not detected by commercially available anti-mid-region tau antibody, HT7. These include both low and high MW species that are clearly increased in abundance in AD compared to NDC brain samples (FIG. 13, arrows). Low molecular weight species detected by the HT7 antibody are relatively unchanged or reduced in disease compared to non-disease brains. This suggests that disease-specific tau species are detected by the novel antibodies described here, in dephosphorylated samples, which are not detected by commercially available mid-region tau antibodies.

Data confirm the presence and increased abundance of tau species containing the epitope of interest in Alzheimer's disease brain compared to controls. Data demonstrate that 2 distinct IgG clones targeting the sequence corresponding to amino acids 396-410 of 2N4R tau (SEQ ID NO: 1) detect a similar pattern of disease-specific high and low molecular weight species of tau in AD brain lysates, in addition to bands at ~50 kD that are present in NDC and disease samples. This detection pattern also resembles the bands detected by both rabbit and chicken pAbs generated independently (FIG. 5; Example 7). This suggests that observations made are generalisable to all antibodies binding to SEQ ID NO: 1.

15.1 Western blot: See Example 6 for detailed methods.

15.2 Human brain samples: Human post-mortem brain samples were obtained from the Kings College London Neurodegenerative Diseases Brain Bank. All work was ethically approved and informed consent was obtained prior to brain donation. Alzheimer's disease brain samples were from the frontal cortex of individuals with familial Alzheimer's disease (PSEN1 mutations; summarised in Table 5 above). Non-demented control brain samples were from age-matched individuals who showed no clinical signs of dementia. Causes of death for the control individuals were: lung carcinoma (1), coronary artery occlusion (2), lung cancer (3), acute hepatic failure (4), metastatic prostate cancer (5); none of which would be predicted to impact tau levels/species detected post-mortem.

15.3 Protein extraction: Post-mortem brain samples were provided by the brain bank as homogenised tissue (1 $cm^3$ homogenised in 4 mL). Homogenised PM brain samples were cleared by centrifugation at full speed, for 30 minutes at 4° C. Protein concentration of cleared lysates was measured with Pierce BCA Protein Assay Kit (Thermo Fisher Scientific. Waltham, MA, USA).

Example 16: Monoclonal Anti-Tau Antibodies Detect Increased Levels of Tau in Sporadic Alzheimer's Disease (AD), and Dementia with Lewy Bodies (DLB) Compared to Non-Demented Control Post-Mortem Brain (FIG. 14)

In order to extend the dataset beyond familial forms of AD, post-mortem brain samples from sporadic AD and DLB patients were assessed by western blot. Clone P1-D4 (Clone 1) IgG detects increased levels of both high and low molecular weight tau species in all disease associated samples when compared to non-demented controls (FIG. 14, arrows). As previously described (Example 15), commercially available mid-region tau antibody, HT7, detects a range of predominantly lower molecular weight (<40 kD) tau species in all samples (in addition to full length tau at ~50 kD), with no detectable disease-associated increases. Actin and neuronal tubulin controls confirm that changes in tau levels are not due to variations in protein and/or neuronal levels in samples shown. Data demonstrate the presence and increased abundance of tau species containing the epitope of interest (SEQ ID NO: 1) in sporadic AD and tauopathy brains, in addition to familial AD. This suggests that these species may be a general feature of AD and tauopathy and that therapeutics targeting this region may have broad utility in treating a range of tauopathies, in addition to both sporadic and familial forms of AD.

16.1 Western blot: See Example 6 for detailed methods.

16.2 Human brain samples: See Example 15 for provenance of human post-mortem brain samples. All samples were from the frontal cortex of individuals with clinically and pathologically confirmed sporadic Alzheimer's disease (Braak stage 6) or DLB. Non-demented control brain samples were from age-matched individuals who showed no clinical signs of dementia or pathological signs of AD/tauopathy (Braak stage 0). Causes of death for the control individuals, where noted, would not be predicted to impact tau levels/species detected post-mortem.

16.3 Protein extraction: Post-mortem brain samples were prepared as described in Example 15.

Example 17. Monoclonal Anti-Tau IgGs Detect Tau in Human IPSC-Derived Neuronal Cultures to a Greater Extent when Dephosphorylated (FIG. 15)

Figure 15:
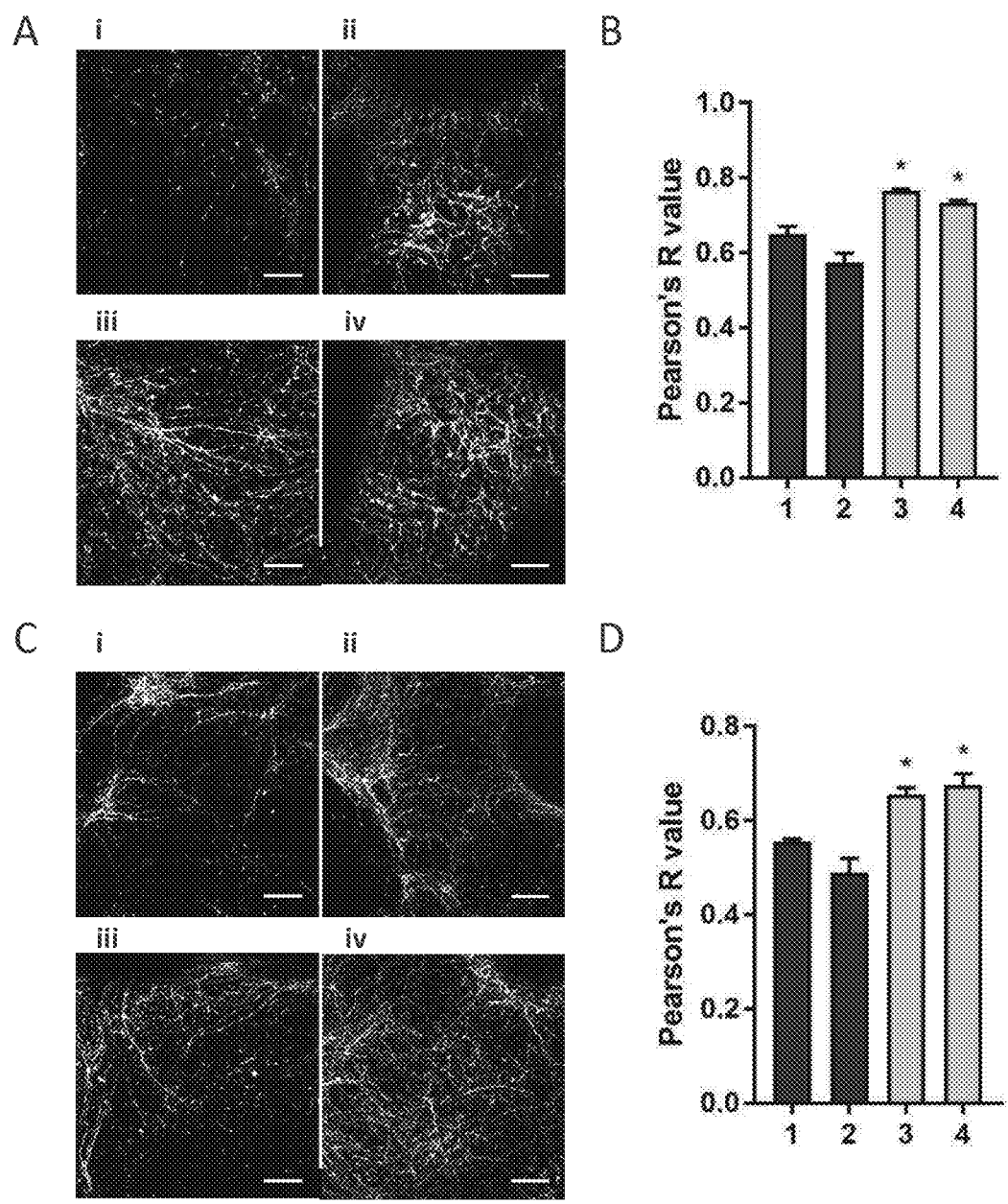

NDC and FTD-associated (MAPT IVS10+16) iPSC-derived neurons (day 50+) were stained with rabbit IgG clones P1-D4 (Clone 1) and P1-F4 (Clone 2) (FIGS. 15A/B and C/D respectively). Immunofluorescence is substantially increased in samples treated with I-PP compared to untreated samples. MAPT IVS10+16 neurons treated with I-PP show an increased colocalisation of MAP2 (dendritic protein) and tau immunofluorescence, compared to controls (FIG. 15). Calculation of Pearson's R value shows a significant ($P<0.05$) increase in colocalisation of tau containing the epitope of interest (SEQ ID NO: 1) with MAP2 immunofluorescence in MAPT IVS10+16 neurons compared to controls (B), reflecting increased detection of tau mislocalised to the somatodendritic compartment in FTD-associated cells. This disease-relevant aberrant localisation of tau is also observed in post-mortem brain samples from Alzheimer's disease and frontotemporal dementia patients (Delacourte et al., 1990 Acta Neuropathol 80(2):111-7).

Data demonstrate that 2 monoclonal antibodies are able to detect natively expressed tau, in situ in human neurons when enzymatically dephosphorylated with similar staining pattern to a polyclonal antibody targeting the same epitope (but generated in different animal). This shows that data generated are not clone specific and are likely to be generalisable to all antibodies targeting this region.

See Example 8 for all details of methods and analysis.

Example 18. Anti-Tau IgGs Inhibit Uptake of Aggregated Tau into Human Neurons (FIG. 16)

Extracellular tau is taken up by human neurons via a combination of endocytosis and macropinocytosis (Evans et al. Cell Rep 22(13): 3612-3624 (2018)). This process occurs physiologically, but is also proposed to play a role in the pathogenic spreading of toxic forms of tau observed in tauopathies, including Alzheimer's disease. Inhibiting uptake of toxic tau species is therefore predicted to be therapeutically beneficial in limiting the spread of tau pathology in the brain. Neuronal uptake of tau can be assessed and quantified by measuring fluorescence associated with tau labelled with the pH-sensitive dye, pHrodo. Increased fluorescence occurs following internalisation of labelled tau into the acidic endosome compartment, thereby providing a dynamic measure of tau uptake/internalisation. Anti-tau IgG clones, P1-D4 (Clone 1) and P1-F4 (Clone 2) inhibit the uptake of pHrodo-labelled aggregated tau (FIG. 16; by 69% and 51% inhibition respectively at 4 h) into human iPSC-derived neurons to a greater extent than isotype control antibody (23% inhibition; monoclonal rabbit IgG: Thermo Fisher Scientific, Waltham, MA, USA).

Data demonstrate that antibodies targeting the epitope of interest (SEQ ID NO: 1) are able to reduce the uptake of aggregated tau species containing this epitope, by human neurons. Such antibodies would therefore be predicted to limit the neuron-to-neuron propagation of toxic tau aggregates that include this epitope (SEQ ID NO: 1) in Alzheimer's disease and tauopathies and thereby reduce/slow the progression of clinical symptoms in patients.

18.1 Production of human iPSC-derived cerebral cortex neurons: As detailed in Example 1.1

18.2 Generation of aggregated (oligomeric) tau species: Tau P301S_10×his-tag_avi-tag was overexpressed in BL21(DE3) bacteria. Cells were lysed using BugBuster (Millipore, Burlington, MA, USA) and clarified lysate was applied to a 5 mL HisTrapHP column (GE Healthcare, Chicago, IL USA) in 2×PBS. Tau was eluted using a 0- to 500-mM imidazole gradient. Peak fractions were pooled and further purified in 2×PBS using a Superdex 200 16/60 gel filtration column (GE Healthcare. Chicago, IL, USA). Pooled fractions were then concentrated to approximately 8 mg/mL using a spin concentrator (Millipore, Burlington, MA, USA). Final protein concentration was determined by Nanodrop analysis. 1 mL tau P301S at 8 mg/mL was incubated with 4 mg/mL heparin (Sigma, St Louis, MO USA) in PBS/30 mM 3-(N-morpholino)propanesulfonic acid (MOPS) (pH 7.2) at 37° C. for 72 h. Aggregated material was diluted in 9 mL PBS plus 1% (v/v) sarkosyl (Sigma, St Louis, MO, USA) and left rocking for 1 h at RT to completely solubilize any non-aggregated material. Insoluble tau was pelleted by ultracentrifugation for 1 h at 4° C. The pellet was resuspended in 1 mL PBS and sonicated at 100 W for 3×20 s (Hielscher UP200St ultrasonicator; Teltow, Germany) to disperse clumps or protein and break large filaments into smaller species.

18.3 Labelling of purified recombinant tau: Aggregated tau was prepared as described above. Recombinant monomeric tau (150 μM) or equivalent aggregated tau concentration (~7 μg/mL) was incubated with 1.5 mM pHrodo Red Maleimide (dissolved in DMSO) and 1.5 mM tris(2-carboxyethyl)phosphine (1:10:10 molar ratio respectively) for 2 h in the dark at RT. Labelled samples were then subjected to size exclusion chromatography at 4° C. (Superdex 200 Increase 10/300 GL; GE Healthcare, Chicago, IL USA) in 50 mM phosphate (pH 7.4) and 150 mM NaCl to remove unreacted dye. Oligomeric state of aggregates was assessed and found to be unaffected by labelling.

18.4 Quantification of tau uptake by human iPSC-derived cortical neurons. Aggregated tau (50 nM) was prepared in N2B27 (Thermo Fisher Scientific, Waltham, MA, USA) and incubated with a 10-fold molar excess of antibody over tau (i.e. 250 and 50 nM IgG) for 90 min at 37° C. 100 μL antibody/tau mix was added to NDC neurons (day 60+) and fluorescence was imaged every 15 min for 4 h at 37° C./5% $CO_2$ from 18 fields per well using the Opera Phenix imaging system (Perkin Elmer, Waltham, MA, USA). Algorithms to identify 'intense spots' in the Alexa 568 channel were used to quantify the number of intense spots of fluorescence per well and these were plotted as mean+/−SEM from n=4 cells over time. One-way ANOVA with Dunnett's multiple comparison test was run vs no antibody control to determine significance.

Example 19. Human AD CSF Contains C-Terminal Tau

In order for an antibody to effectively target tau in vivo/in patients, relevant tau species must be present extracellularly. To demonstrate the presence of extracellular tau species containing the epitope of interest (SEQ ID NO: 1), tau was purified from pooled cerebrospinal fluid (CSF) samples obtained from AD patients using antibody clone #44 (VH of SEQ ID NO 120 and VL of SEQ ID NO: 121, with rabbit IgG Fc) which specifically binds to amino acid sequence KKIETHKLTFREN (SEQ ID NO: 122) corresponding to amino acids 369-381 of 2N4R tau. The bound proteins were then digested using trypsin and resolved by mass spectrometry (FIG. 17). Multiple tau peptides were identified, including the C-terminal peptide (SPWSGDTSPR; corresponding to amino acids 396-406 (SEQ ID NO: 12) of 2N4R tau and which is contained within the peptide that forms the epitope of interest (SEQ ID NO: 1). The detected peptide was not phosphorylated. These data confirm the presence of tau species that include both the non-phosphorylated antibody epitope (SEQ ID NO: 1) and other C-terminal regions in AD CSF, and demonstrate the presence of such species extracellularly. These C-terminal tau-containing species are therefore targetable by therapeutic antibodies and present in fluids that could be exploited for biomarker detection.

19.1 Human CSF samples: 16 de-identified samples of CSF from AD patients leftover from clinical routine were provided by H. Zetterberg (University of Gothenburg, Sweden). Such samples (not traceable back to any individual) may be used for method development and standardization, without specific ethical consent according to Swedish legislation. 16 CSF samples were pooled (total volume 8.5 mL). The final concentration of total tau in the pooled sample (calculated based on mid-region ELISA data from the individual samples) was 700 ng/mL.

19.2 Immunoprecipitation mass spectrometry: Protein A-coated Dynabeads were washed prior to incubation with 150 ng IgG clone #44 (VH of SEQ ID NO: 120 and VL of SEQ ID NO: 121 with rabbit IgG Fc) overnight at 4° C. on a roller. IgG antibody bead mix was then added to pooled CSF samples and incubated for 3 days at 4° C. on a roller. Beads were washed three times with 0.02% tween (PBS) then resuspended in 20 mM Ammonium bicarbonate. An on-bead trypsin digest was performed. Peptide masses were determined using a Bruker ultrafleXtreme Maldi mass spectrometer in reflectron mode and ms/ms fragmentation performed in LIFT mode. Data analysis was with FlexAnalysis. BioTools and ProteinScape software (Bruker, Billerica, MA, USA). Database searches of the combined mass fingerprint-ms/ms data were performed using Mascot (http://www.matrixscience.com).

Example 20. Anti-Tau IgGs Inhibit Uptake of Monomeric and Aggregated Tau into Human IPSC-Derived Astrocytes (FIG. 18

Limited information is available on the uptake of extracellular tau species by human astrocytes, although this is known to occur in rodents (Martini-Stoica et al. J Exp Med 215(9): 2355-2377 (2018)). In addition, a recently described receptor for neuronal tau uptake, lipoprotein receptor-related protein 1 (LRP1), is reported to be expressed in astrocytes (Rauch et al. Nature 580(7803):381-385 (2020)), suggesting that the mechanisms of uptake may be shared. As a major cell type in the central nervous system, with putative roles in the propagation of tau pathology in Alzheimer's disease and tauopathy (reviewed in Sidoryk-Wegrzynowicz & Strutyrdska Biochem J 476(22):3493-3504 (2019)) we explored whether antibodies targeting the sequence corresponding to amino acids 396 to 410 (SEQ ID NO: 2) of 2N4R tau (SEQ ID NO: 1) have any impact on uptake of tau species by astrocytes.

Human iPSC-derived astrocytes readily take up both monomeric and aggregated tau species (FIG. 18). Incubation of tau with anti-tau clone #28, inhibited uptake of monomeric 2N4R tau by 39.8±9.6% and of aggregated tau by 46.3±6.9% compared to uptake in the absence of antibody. Data provide evidence that therapeutic anti-tau antibodies targeting SEQ ID NO: 1, reduce the uptake of extracellular monomeric and aggregated forms of tau by astrocytes when the target sequence (amino acids 396 to 410 (SEQ ID NO: 2) of 2N4R tau; SEQ ID NO: 1) is not phosphorylated, and would thereby reduce the impact of astrocytes in the propagation of tau pathology. This activity is predicted to be therapeutically beneficial.

20.1 Production of human iPSC-derived astrocytes: Differentiation of human iPSC to astrocytes was carried out using iPSC lines from a non-demented control (NDC) background. Neuroepithelial sheets were generated as described for cortical neurons (Shi et al., Nature Protocols 7(10): 1836-46, 2012; protocol followed to step 31). From day 16, cells were passaged with Accutase into new Matrigel-coated plates (1.5× $10^8$ cells/well of a 6 well plate) and transferred into 'Astrocyte differentiation media 1' (neural maintenance media described in Shi et al., Nature Protocols 7(10): 1836-46, 2012; supplemented with 20 ng/mL FGF2, 20 ng/mL EGF) for 7 days, with media changes every other day. Cells were then passaged with Accutase into new Matrigel-coated plates (as before) and transferred into 'Astrocyte differentiation media 2' (Neural maintenance media supplemented with 10 ng/mL BDNF, 10 ng/mL CNTF, 1 µM purmorphamine) for 7 days, with media changes every other day. Astrocytes were then maintained in 'maturation media' (Neurobasal media, 1×B27 supplement, 1% FBS. 50 U/mL penicillin and 50 mg/mL streptomycin. 1× GlutaMAX) until use (at ~day 130+).

20.2 Generation of aggregated (oligomeric) tau species: See Example 18.2

20.3 Labelling of purified recombinant tau: See Example 18.3.

P301S tau was used for both monomeric and aggregated tau preparations.

20.4 Quantification of tau uptake by human iPSC-derived astrocytes: Monomeric tau (25 nM) and aggregated tau (50 nM) were prepared in serum-free Optimem (ThermoFisher) media and incubated with tested antibodies at a 10-fold molar excess concentration (i.e. 250 and 500 nM IgG respectively) for 90 min at 37° C. 200 µL antibody/tau mix was added to iPSC-derived astrocytes and images were taken (bright field and orange channel) every hour for 20 h at 37° C./5% $CO_2$ from 9 fields per well using the Incucyte S3 imaging system (Sartorius, Göttingen, Germany). Algorithms to quantify (per well) the mean area of fluorescence in the orange channel (excitation: 513-568 nm) were normalised to the mean area occupied by cells (phase area), and this was plotted as mean+/−SEM from 4 wells over time.

One-way ANOVA with Tukey's multiple comparison test was run vs no antibody control to determine significance.

Example 21. Monoclonal Anti-Tau Rabbit IgG Expressed as Chimeric Human IgG1 Increase Uptake of Monomeric and Aggregated Tau by Human IPSC-Derived Microglia (FIG. 19)

Microglia play an important role in clearing extracellular material in the central nervous system, to prevent accumulation of debris and enable repair processes to occur. In the context of neurodegenerative disease, phagocytosis of extracellular proteins, including aggregates, oligomers and monomeric forms, helps to reduce the extracellular concentrations of these species. Antibody clone #28 (Clone 1) with effector function (i.e., formatted as human IgG1) significantly increased the uptake of both monomeric (by 61±7%; P<0.001) and aggregated tau (by 96±14%; P<0.001) by human iPSC-derived microglia compared to tau alone. Isotype control human IgG1 has no significant effect on microglial uptake of monomeric (5.9±6% reduction) or aggregated tau (24±9% reduction), compared to baseline tau uptake in the absence of antibody. (FIG. 19). Data demonstrate that therapeutic antibodies with effector function (e.g., formatted as hIgG1) targeting amino acids 396 to 410 (SEQ ID NO: 2) of 2N4R tau (SEQ ID NO: 1) would increase clearance of extracellular tau by microglia when the target sequence (amino acids 396 to 410 of 2N4R tau; SEQ ID NO: 1) is not phosphorylated, and thereby reduce the extracellular concentration and deleterious effects of extracellular forms of tau in the CNS. This activity is predicted to be beneficial therapeutically.

21.1 Production of chimeric hIgG1 antibodies: Chimeric hIgG1 were generated by Absolute Antibody (Oxford, UK) using the rabbit VH and VK sequences of clone 1 (#28, SEQ ID NO: 92 and SEQ ID NO: 93) using proprietary methods (HEXpress™ service). Briefly, antibodies were produced following transient expression in HEK293 cells, affinity purified, buffer exchanged into phosphate buffered saline, sterile filtered and provided at a purity of >98% (based on SDS-PAGE) with <1 EU/mg endotoxin.

21.2 Production of human iPSC-derived microglia: Differentiation of human pluripotent stem cells (iPSC) to microglial cultures was carried out as described by Brownjohn et al. (2018) Stem Cell Rep 10(4): 1294-1307. An iPSC line from a non-demented control (NDC) background was used. Microglial progenitor cells were collected, plated in 96 well plates and maintained in complete microglia media (as described in Brownjohn et al., 2018) for approximately 14 days before use. On the day prior to use, cultures were switched into serum free media (RPMI 1640/Glutamax supplemented with 10 nglmL GM-CSF and 100 ng/mL IL-34 (growth factors from Peprotech, NJ, US)) and phagocytosis experiments were completed in serum-free conditions.

21.3 Generation of aggregated (oligomeric) tau species: See Example 18.2

21.4 Labelling of purified recombinant tau: See Example 18.3.

P301S tau was used for both monomeric and aggregated tau preparations.

21.5 Quantification of tau uptake by human iPSC-derived microglia: Monomeric tau (25 nM) and aggregated tau (50 nM) were prepared in serum-free microglial media and incubated with a 1:10 ratio of antibody:tau (i.e. 2.5 and 5 nM IgG respectively) for 90 min at 37° C. Anti-tau hIgG1 was compared to an isotype control hIgG1 (anti-fluorescein [4-4-20 (enhanced)], Absolute Antibody. Oxford, UK). 100 μL antibody/tau mix was added to iPSC-derived microglia and images were taken (bright field and orange channel) every 60 min for 16 h at 37° C./5% $CO_2$ from 9 fields per well using the Incucyte S3 imaging system (Sartorius, Göttingen, Germany). Algorithms to quantify (per well) the mean area of fluorescence in the orange channel (excitation: 513-568 nm), normalised to the mean area occupied by cells (phase area) and this was plotted as mean+/−SEM from n=4 cells over time. One-way ANOVA with Tukey's multiple comparison test was run vs no antibody control to determine significance.

Example 22: Anti-Tau Antibodies Require the Residues $_{400}SGD_{402}$ for Binding to Tau (FIG. 20

Epitope fine mapping was carried out to identify critical residues within the synthetic peptide (amino acids 396-410 (SEQ ID NO: 2) of 2N4R tau: SEQ ID NO: 1) that are required for antibody binding. In the replacement analysis, each residue was mutated to other amino acids to evaluate the importance of the residue for binding to the antibody. No post-translational modifications were explored in this analysis, so all of the sequences tested were non-phosphorylated.

For antibody clones #28 (Clone 1) and #30 (Clone 2), the replacement analysis showed that amino acid residues in the region, $_{400}SGD_{402}$ (SEQ ID NO: 123) were important for binding, with some contribution from the preceding $V_{399}$, residues $_{399}VSGD_{402}$ (SEQ ID NO: 124) (FIGS. 20A and B respectively). Substitution of these residues resulted in a reduction in binding for all substitutes. Little binding of the isotype control rabbit IgG was detected in this system (FIG. 20C), indicating that the ELISA signal obtained for anti-tau antibody clones #28 and #30 was CDR-specific.

Data demonstrate that clones #28 (Clone 1) and #30 (Clone 2) bind to epitopes in the peptide sequence (amino acids 396-410 of 2N4R tau: SEQ ID NO: 1), in which the critical residues of the epitope, for binding to the antibody paratope, are $_{400}SGD_{402}$, (SEQ ID NO: 123), possibly with some contribution from $V_{399}$, $_{399}VSGD_{402}$ (SEQ ID NO: 124).

22.1 Epitope substitution scan analysis—peptide synthesis: Replacement analysis was conducted by Pepscan Presto BV (Lelystad, The Netherlands) using proprietary methods. Briefly, a library of peptides was synthesised using Fmoc-based solid-phase peptide synthesis. An amino functionalized polypropylene support was obtained by grafting with a proprietary hydrophilic polymer formulation, followed by reaction with t-butyloxycarbonyl-hexamethylenediamine (BocHMDA) using dicyclohexylcarbodiimide (DCC) with N-hydroxybenzotriazole (HOBt) and subsequent cleavage of the Boc-groups using trifluoroacetic acid (TFA). Standard Fmoc-peptide synthesis was used to synthesize peptides on the amino-functionalized solid support by custom modified JANUS liquid handling stations (Perkin Elmer).

Peptides were designed based on the starting epitope ($_{396}SPWSGDTSPRHLSN_{410}$; SEQ ID NO: 1) such that each amino acid was mutated one at a time, to every other natural amino acid. The order of peptides on the mini-cards was randomised and data were compared to that obtained with an isotype control antibody (rabbit IgG; Abcam, Cambridge, UK).

22.2 Epitope substitution scan analysis—ELISA screening: The binding of antibody to each of the synthesized peptides was tested in a Pepscan-based ELISA. The peptide arrays were incubated with primary antibody solution (0.25 µg/mL; overnight at 4° C.). After washing, the peptide arrays were incubated with a 1/1000 dilution of a swine anti-rabbit IgG peroxidase conjugate (DAKO, Jena, Germany) for 1 h at 25° C. After washing, the peroxidase substrate 2,2'-azino-di-3-ethylbenzthiazoline sulfonate (ABTS) and 20 µL/mL of 3% $H_2O_2$ were added. After 1 h, the colour development was measured. The colour development was quantified with a charge coupled device (CCD)—camera and an image processing system. Values obtained from the CCD camera are quoted (range: 0 to 3000 mAU).

Data are presented as letter plots showing ELISA signal obtained for each peptide tested. Observed deviations from the maximum ELISA signal are indicative of mutations associated with altered (reduced) binding of the tested antibody to the target peptide.

Example 23: Humanisation of Antibody Clone #28 (Clone 1)

Rabbit antibody clone #28 (Clone 1) was humanised using Composite Human Antibody Technology™, developed by Antitope and commercialised by Abzena. The aim of the humanisation process is to reduce the potential for immunogenicity associated with using a non-human monoclonal antibody as a chronic therapeutic treatment, while retaining antigen binding affinity of the parental antibody.

A total of six VH (SEQ ID NOS: 127-132) and four VK sequences (SEQ ID NOS: 133-136) were designed (summarised in FIG. 21) and expressed in all possible combinations to create 24 new humanised variants (Table 7). All variants can be expressed in mammalian cells and form antibodies that bind to full length recombinant (non-phosphorylated) 2N4R tau (summarised in FIG. 22). Background ELISA signal was low, demonstrating that antibody-related signal was due to a specific interaction with tau. Expression levels of the humanised variants were variable following transient transfection in HEK293 cells (see Table 7), so ELISA signal obtained from on a single dilution of supernatant does not provide an indication of binding affinity.

Biacore single cycle kinetics (SCK) experiments enable calculation of antibody $K_D$. For the humanised variants. Kos range from 21.2 nM to 222 nM (for VH3VK4 and VH6VK2 respectively). Variants containing VK5 exhibit reduced binding to 2N4R tau (based on a reduced $R_{MAX}$ and binding affinity) indicating that residues mutated in this sequence may be required for binding of the parental antibody to tau. Specifically, mutations present within VK5 CDR1 (SEQ ID NO: 125) (Y29S and N31S; numbered according to Kabat) were associated with reduced binding to tau. Variants containing VH6 exhibit reduced binding to 2N4R tau (based on a 2.7-4.9 fold increase in $K_D$), implicating residues $_{61}SWA_{63}$ (numbered according to Kabat) in VH6 CDR2 (SEQ ID NO: 126) in antibody-tau interactions.

Data demonstrate that humanised variants of clone #28 (Clone 1) that retain the original parental CDR sequences, retain high affinity binding to tau ($K_D$ within 2-fold of the parental antibody). It is predicted that the binding affinity of these antibodies would be equivalent to any tau species containing the epitope of the invention formed by to amino acids 396-410 of 2N4R tau (SEQ ID NO: 1), if this sequence is accessible and is not phosphorylated. This sequence (SEQ ID NO: 1) is 100% conserved within mammalian species so it is predicted that activity described for human tau, will be applicable to other mammalian species of tau. As the CDR sequences of the humanised variants are identical to the parental antibody, and binding to 2N4R tau is equivalent, it is predicted that the CDR-driven biological activity of the new variants will be equivalent to the parental clone #28 (Clone 1).

23.1 Design of Composite Human Antibody variable regions: Structural models of the antibody V regions were produced using Swiss PDB (Guex & Peitsch, Electrophoresis 18, 2714-2722, 1997) and analysed in order to identify important "constraining" amino acids in the V regions that were likely to be essential for the binding properties of the antibody. Most residues contained within the CDRs (using both Kabat and Chothia definitions) together with a number of framework residues were considered to be important.

When compared to human antibodies, the first amino acid of the rabbit heavy chain is absent in clone #28 (in common with the majority of rabbit germline VH genes). It also contains a single amino acid deletion within VH FW3 that is found in a subset of rabbit germline genes (FIG. 21).

Based on this analysis. Composite Human sequences were created with a wide latitude for alternative residues outside of the CDRs but with only a narrow menu of possible residues within the CDR sequences. Preliminary analysis indicated that corresponding sequence segments from several human antibodies could be combined to create CDRs similar or identical to those in the rabbit sequences. For regions outside of, and flanking the CDRs, a wide selection of human sequence segments was identified as possible components of the novel humanised V regions.

23.2 CD4+ T cell epitope avoidance (analysis by iTope™): Based upon the structural analysis, a large preliminary set of sequence segments were identified that could be used to create humanised variants. These segments were selected and analysed using iTope™ technology for in silico analysis of peptide binding to human MHC class II alleles (Perry et al, Drugs R D 9(6):385-96, 2008). The iTope™ software predicts favourable interactions between amino acid side chains of a peptide and specific binding pockets of 34 human MHC class II alleles. These alleles represent the most common HLA-DR alleles found world-wide with no weighting attributed to those found most prevalently in any particular ethnic population. The location of key binding residues is achieved by the in silico generation of 9mer peptides that overlap by eight amino acids spanning the test protein sequence.

Selected sequence segments identified as having a reduced risk of MHC class II binding were assembled into complete V region sequences with reduced T cell epitopes. Variant sequences are shown in FIG. 21.

23.3 Generation of humanised antibody variants: New humanised variants of hIgG1 were generated by Abzena (Cambridge, UK) using proprietary methods, Briefly, DNA encoding variable regions for Composite Human Antibodies were synthesized, cloned onto an expression vector with human constant regions (hIgG1) and transiently transfected into HEK293 or CHO cells. Supernatants containing hIgG1 were collected and analysed.

23.4 Assessment of antibody binding to tau (ELISA): ELISA plates were coated with full length 2N4R tau (SEQ ID NO: 2), 100 ng/well; or 1% BSA in 1×TBS) in 1× carbonate-bicarbonate buffer for 1 hour at 37° C. Antigen was removed from wells and the plates were then blocked for 1 hour at RT with 5% dried milk in 1×TBS. Blocking solution was removed, HEK293 cell supernatant (1:100 in 1% BSA/1×TBS) was added to relevant wells, and plates were incubated for 1 hour at RT with gentle shaking. Plates were then washed four times with TBS/0.1% Tween (TBST). Goat-anti-human IgG-HRP antibody (ThermoFisher Scientific, Waltham, MA USA), diluted 1:2000 in 5% milk/TBS, was added to each well and plates were incubated for 1 hour at RT with gentle shaking before being washed four times with TBST. 3,3',5,5'-tetramethylbenzidine (TMB) ELISA solution was added to each well and plates were incubated for 15 mins at RT. An equal volume of 1 M sulfuric acid was added to each well and OD was measured at 450 nm.

23.5 Assessment of antibody binding to tau (Biacore SCK analysis): Binding of anti-tau hIgG1 to full length recombinant 2N4R tau (Rpeptide; SEQ ID NO: 2) was assessed using the Biacore T200 (GE Healthcare, Chicago, IL, USA) running Biacore T200 Evaluation Software V2.0.1. hIgG1 were immobilised on a Protein A capture sensor chip in running buffer (HBS-EP+ buffer containing 1 mg/mL BSA) at 25° C. captured to ~50 RU at 10 µL/min. For single-cycle kinetics experiments, recombinant 2N4R tau was flowed at concentrations ranging from 5 nM to 40 nM (2-fold dilutions) with an association time of 150 s and a dissociation time of 200 s. Curves were compared to a reference cell that was mock immobilized (no antibody present).

Data were analysed using Langmuir (1:1) binding analysis, describing a 1:1 interaction at the surface:

$$A + B \underset{k_d}{\overset{k_a}{\rightleftharpoons}} AB$$

$$K_D = \frac{k_d}{k_a}$$

Where: $k_a$ is the association rate constant ($M^{-1}s^{-1}$) and $k_d$ is the dissociation rate constant ($s^{-1}$)

Closeness of fit was judged in terms of the Chi square value, which describes the deviation between the experimental and fitted curves:

$$\text{Chi square} = \frac{\sum (r_f - r_x)^2}{n - p}$$

Where: rf is the fitted value at a given point, rx is the experimental value at the same point, n is the number of data points, p is the number of fitted parameters. The fitting algorithm sought to minimise Chi square.

TABLE 7

Summary of binding analysis data for humanised variants of clone #28 (Clone 1) (SCK) binding to full length recombinant 2N4R tau. The parental clone #28 is shown as VH0VK0, and 'relative $K_D$' values are calculated relative to this clone. HEK titres are based on Octet analysis at Day 7 post-transfection.

| Clone | Antibody | $k_a$ (1/Ms) | $k_d$ (1/s) | $K_D$ (M) | Relative $K_D$ | $R_{MAX}$ | Chi² (RU²) | HEK Titer (µg/mL) |
|---|---|---|---|---|---|---|---|---|
| Clone 1 (#8) | VH0Vκ0 SEQ ID NO: 92 & 93 | 7.54E+04 | 3.42E−03 | 4.53E−08 | 1 | 42.9 | 0.0216 | 1.26 |
| Clone 14 | VH1Vκ1 SEQ ID NO: 27 & 133 | 8.40E+04 | 3.08E−03 | 3.66E−08 | 0.81 | 22.1 | 0.00999 | 1.17 |
| Clone 15 | VH1Vκ2 SEQ ID NO: 127 & 134 | 6.68E+04 | 2.94E−03 | 4.41E−08 | 0.97 | 23.9 | 0.00728 | 2.84 |
| Clone 16 | VH1Vκ4 SEQ ID NO: 127 & 135 | 6.63E+04 | 2.07E−03 | 3.12E−08 | 0.69 | 32.2 | 0.00788 | 4.32 |
| Clone 17 | VH1Vκ5 SEQ ID NO: 127 & 136 | 1.04E+05 | 4.28E−03 | 4.11E−08 | 0.91 | 9.1 | 0.00604 | 4.78 |
| Clone 18 | VH2Vκ1 SEQ ID NO: 128 & 133 | 6.71E+04 | 3.30E−03 | 4.92E−08 | 1.09 | 39.4 | 0.0174 | <1.0 |
| Clone 19 | VH2Vκ2 SEQ ID NO: 128 & 134 | 4.81E+04 | 3.24E−03 | 6.73E−08 | 1.49 | 49.6 | 0.0115 | <1.0 |
| Clone 20 | VH2Vκ4 SEQ ID NO: 128 & 135 | 6.15E+04 | 2.34E−03 | 3.80E−08 | 0.84 | 40.4 | 0.0102 | 2.9 |
| Clone 21 | VH2Vκ5 SEQ ID NO: 128 & 136 | 3.85E+04 | 5.23E−03 | 1.36E−07 | 3 | 25 | 0.0128 | 2.07 |
| Clone 22 | VH3Vκ1 SEQ ID NO: 129 & 133 | 5.67E+04 | 2.49E−03 | 4.39E−08 | 0.97 | 41.4 | 0.0128 | <1.0 |
| Clone 23 | VH3Vκ2 SEQ ID NO: 129 & 134 | 4.94E+04 | 2.53E−03 | 5.13E−08 | 1.13 | 53.1 | 0.0156 | 2.41 |
| Clone 24 | VH3Vκ4 SEQ ID NO: 129 & 135 | 6.89E+04 | 1.46E−03 | 2.12E−08 | 0.47 | 42.6 | 0.00613 | 3.21 |
| Clone 25 | VH3Vκ5 SEQ ID NO: 129 & 136 | 8.13E+04 | 3.16E−03 | 3.89E−08 | 0.86 | 17.5 | 0.00356 | 3.42 |
| Clone 26 | VH4Vκ1 SEQ ID NO: 130 & 133 | 5.83E+04 | 3.36E−03 | 5.76E−08 | 1.27 | 46.5 | 0.00792 | <1.0 |
| Clone 27 | VH4Vκ2 SEQ ID NO: 130 & 134 | 4.48E+04 | 3.08E−03 | 6.86E−08 | 1.51 | 32.5 | 0.0051 | <1.0 |
| Clone 28 | VH4Vκ4 SEQ ID NO: 130 & 135 | 4.77E+04 | 2.34E−03 | 4.90E−08 | 1.08 | 41.9 | 0.00734 | <1.0 |
| Clone 29 | VH4Vκ5 SEQ ID NO: 130 & 136 | 3.59E+04 | 4.09E−03 | 1.14E−07 | 2.52 | 30.2 | 0.00588 | <1.0 |
| Clone 30 | VH5Vκ1 SEQ ID NO: 131 & 133 | 4.63E+04 | 3.51E−03 | 7.57E−08 | 1.67 | 32.6 | 0.00723 | <1.0 |
| Clone 31 | VH5Vκ2 SEG ID NO: 131 & 134 | 3.75E+04 | 3.62E−03 | 9.65E−08 | 2.13 | 48 | 0.00924 | 2.07 |
| Clone 32 | VH5Vκ4 SEQ ID NO: 131 & 135 | 3.55E+04 | 2.39E−03 | 6.73E−08 | 1.49 | 37.1 | 0.0046 | 1.91 |
| Clone 33 | VH5Vκ5 SEQ ID NO: 131 & 136 | 5.84E+04 | 3.54E−03 | 6.06E−08 | 1.34 | 17.6 | 0.00464 | 1.6 |
| Clone 34 | VH6Vκ1 SEQ ID NO: 132 & 133 | 3.73E+04 | 5.25E−03 | 1.41E−07 | 3.11 | 40 | 0.0106 | <1.0 |
| Clone 35 | VH6Vκ2 SEQ ID NO: 132 & 134 | 2.40E+04 | 5.33E−03 | 2.22E−07 | 4.9 | 44.6 | 0.00466 | 1.43 |
| Clone 36 | VH6Vκ4 SEQ ID NO: 132 & 135 | 3.31E+04 | 4.06E−03 | 1.23E−07 | 2.72 | 45.2 | 0.00698 | 1.2 |
| Clone 37 | VH6Vκ5 SEQ ID NO: 132 & 136 | 4.43E+04 | 5.44E−03 | 1.23E−07 | 2.72 | 12.7 | 0.00395 | <1.0 |

Example 24. Humanised Anti-Tau IgG Bind to Tau with High Affinity

The top five humanised variants were selected for larger scale expression and further characterisation (based on data summarised in Table 7): VH3VK4 (Clone 24, SEQ ID NOS: 129 & 135); VH4VK2 (Clone 27. SEQ ID NOS: 130 & 134); VH4VK4 (Clone 28, SEQ ID NOS: 130 & 125); VH5VK2 (Clone 31, SEQ ID NOS: 131 & 134); VH5VK4 (Clone 32, SEQ ID NOS: 131 & 135). Yields obtained from transfections in HEK293 cells were lower than expected, so CHO cells were used for this larger scale production.

Biacore multi-cycle kinetics (MCK) analyses for antibody binding to recombinant (non-phosphorylated) 2N4R tau are summarised in FIG. 23 and Table 8. All five variants demonstrate a $K_D$ within 2-fold of the chimeric parent antibody (VH0VK0; $K_D$=24.9 nM). Slight variations in $R_{MAX}$ are considered likely to be due to differences in ligand capture and not reflective of significant variation in antibody binding characteristics.

Data confirm that humanised variants retain the binding characteristics of the parental (rabbit) antibody (VH0VK0), clone #28 (Clone 1), to full length 2N4R tau. As described in Example 23, it is predicted that activity described for human tau, will be applicable to other mammalian species of tau, if the target sequence (SEQ ID NO: 1) is accessible and is not phosphorylated 24.1 Production of Protein A purified hIgG1 antibodies: Clone #28 VH0VK0 parental hIgG1 was generated by Absolute Antibody (Oxford, UK) as described in Example 21.1. New humanised variants of hIgG1 were generated by Abzena (Cambridge, UK) using proprietary methods. Briefly, DNA encoding variable regions for Composite Human Antibodies were synthesized, cloned onto an expression vector with human constant regions (hIgG1) and transiently transfected into CHO cells. Supernatants containing hIgG1 were collected and hIgG1 were affinity purified, buffer exchanged into phosphate buffered saline, sterile filtered, then further purified by size exclusion chromatography (SEC) to achieve a final monomer purify of >99%.

24.2 Assessment of antibody binding to tau (Biacore MCK analysis): Binding of anti-tau hIgG1 to full length recombinant 2N4R tau (Rpeptide; SEQ ID NO: 2) was assessed using the Biacore T200 (GE Healthcare, Chicago, IL, USA) running Biacore T200 Evaluation Software V2.0.1. hIgG1 were immobilised on a Protein A capture sensor chip in running buffer (HBS-EP+ buffer containing 1 mg/mL BSA) at 25° C. captured to ~50 RU at 10 μL/min. For multi-cycle kinetics experiments, recombinant 2N4R tau was flowed at concentrations ranging from 3.12 nM to 200 nM in running buffer at 40 μL/min, with an association time of 180 s and a dissociation time of 420 s. Curves were compared to a reference cell that was mock immobilized (no antibody present).

Data were analysed using Langmuir (1:1) binding analysis, as described in Example 23.4.

TABLE 8

Summary of Biacore MCK analysis for purified humanised variants of clone #28 (Clone 1) binding to full length recombinant 2N4R tau. The parental clone #28 (Clone 1) is shown as VH0VK0 and 'relative $K_D$' values are calculated relative to this clone, VH3Vk4 Clone 24, VH4Vk2 Clone 27, VH4Vk4 Clone 28, VH5Vk2 Clone 31, VH5Vk4 Clone 32.

| Ligand | $k_a$ (1/Ms) | $k_d$ (1/s) | $K_D$ (M) | Relative $K_D$ | $R_{max}$ (RU) | Chi$^2$ (RU$^2$) | Ligand Level (RU) |
|---|---|---|---|---|---|---|---|
| #28 VH0κ0* | 9.99E+04 | 2.49E−03 | 2.49E−08 | 1 | 38.1 | 0.202 | 90.1 |
| #28 VH3κ4 | 7.61E+04 | 1.30E−03 | 1.71E−08 | 0.69 | 28.6 | 0.123 | 60 |
| #28 VH4κ2 | 5.91E+04 | 2.60E−03 | 4.40E−06 | 1.77 | 27.1 | 0 053 | 76.8 |
| #28 VH4κ4 | 6.92E+04 | 1.86E−03 | 2.69E−08 | 1.08 | 31.7 | 0.052 | 86.9 |
| #28 VH5κ2 | 9.24E+04 | 3.21E−03 | 3.48E−08 | 1.4 | 15.4 | 0.045 | 58.3 |
| #28 VH5κ4 | 7.11E+04 | 2.39E−03 | 3.36E−08 | 1.35 | 24.5 | 0.03 | 73.9 |

Example 25. Humanised IgG Variants are Thermodynamically Stable

To assess the potential of humanised variants for development into therapeutic antibodies, the thermal stability of each was assessed. Data are summarised in Table 9 and FIG. 24. Average melting temperature (Tm) ranged from 62.1° C. for VH4Vκ2 to 67.8° C. for VH5Vκ4, which is considered acceptable for a therapeutic antibody.

25.1 Thermal stability analysis: Thermal stability was assessed using SYPRO orange (Lo et al. Analytical Biochem 332(1): 153-9, 2004). Samples were prepared as indicated in Table 10. 9 μL of each sample mixture was loaded in duplicate into Uncle Uni microcuvettes and run with the 'Tm using SYPRO' application. Samples were subjected to a thermal ramp from 15-95° C., with a ramp rate of 0.3° C./min and excitation at 473 nm. Full spectra were collected from 250-720 nm and Uncle software used the area under the curve between 510-880 nm to calculate the infection points of the transition curves. Monitoring static light scattering (SLS) at 473 nm allows the detection of protein aggregation in the same experiment. Onset of aggregation (Tagg) was calculated from the resulting SLS profiles.

TABLE 9

Summary of thermal stability profiling data for humanised variants of clone #28 (Clone 1). Parental clone #28 is shown as VH0VK0 Clone 1; VH3Vk4 Clone 24, VH4Vk2 Clone 27, VH4Vk4 Clone 28, VH5Vk2 Clone 31, VH5Vk4 Clone 32.

| Sample | Tm1 (° C.) | Average Tm1 (° C.) | Tonset (° C.) | Average Tonset (° C.) | Tagg 473 (° C.) | Average Tagg 473 (° C.) |
|---|---|---|---|---|---|---|
| #28 VH0Vκ0 | 66.69 | 66.7 | 56.93 | 58.3 | 64.93 | 64.9 |
|  | 66.68 |  | 59.71 |  | 64.89 |  |
| #28 VH3Vκ4 | 67.58 | 67.6 | 63.06 | 63.1 | 66.59 | 66.6 |
|  | 67.7 |  | 63.2 |  | 66.65 |  |
| #28 VH4Vκ2 | 62.07 | 62.1 | 55.93 | 56 | 61.03 | 61.8 |
|  |  |  | 56.02 |  | 62.47 |  |
| #28 VH4Vκ4 | 62.44 | 62.6 | 58.29 | 56.7 | 61.9 | 61.7 |
|  | 62.81 |  | 55.18 |  | 61.52 |  |
| #28 VH5Vκ2 | 66.55 | 66.7 | 61.67 | 61.8 | 65.06 | 65.3 |
|  | 66.82 |  | 62 |  | 65.45 |  |
| #28 VH5Vκ4 | 67.54 | 67.8 | 62.55 | 62.6 | 66.14 | 66.3 |
|  | 68.01 |  | 62.63 |  | 66.48 |  |

TABLE 10

Details of sample preparation for thermal stability analysis (Example 25.1), VH0VK0 Clone 1, VH3Vk4 Clone 24, VH4Vk2 Clone 27, VH4Vk4 Clone 28, VH5Vk2 Clone 31, VH5Vk4 Clone 32.

|  | Ab | Variants | mg/mL | Ab 0.75 mg/mL | PBS | Sypro @ 80X | Total |
|---|---|---|---|---|---|---|---|
| 0 | #28 | VH0Vκ0 | 1 | 15 | 0 | 5 | 20 |
| 1 | #28 | VH3Vκ4 | 1.33 | 33.7 | 11.3 | 15 | 60 |
| 2 | #28 | VH4Vκ2 | 1.05 | 42.8 | 2.2 | 15 | 60 |
| 3 | #28 | VH4Vκ4 | 1.15 | 39.3 | 5.7 | 15 | 60 |
| 4 | #28 | VH5Vκ2 | 1.43 | 31.5 | 13.5 | 15 | 60 |
| 5 | #28 | VH5Vκ4 | 1.58 | 28.5 | 16.5 | 15 | 60 |
|  | Blank PBS |  | 0 | 0 | 45 | 15 | 60 |

Example 26. Humanised Variants of Anti-Tau Clone #28 Inhibit Uptake of Monomeric and Aggregated Tau into Human IPSC-Derived Neurons (FIG. 25, 26)

As described in Example 18, neuronal uptake of toxic forms of extracellular tau is proposed to play an important role in the pathogenic spreading of tau observed in tauopathies such as Alzheimer's disease. Anti-tau rabbit IgG targeting SEQ ID NO: 1, including antibody clone #28 (Clone 1) are able to reduce uptake of tau species containing this epitope by human neurons (Example 18). Antibodies exhibiting this activity are predicted to limit the neuron-neuron propagation of extracellular tau species in vivo and therefore to be therapeutically useful.

All humanised variants of clone #28 tested, significantly (P<0.001) inhibited uptake of recombinant (non-phosphorylated) monomeric tau into human iPSC-derived neurons (FIG. 25) to a similar extent as the rabbit clone (41.2±4.1%); by 63.3±2.0% (VH3Vκ4), 66.5 t 2.4% (VH4Vκ2). 61.5±2.9% (VH4Vκ4), 57.3±2.9% (VH5Vκ2), 64.2±2.8% (VH5Vκ4). Isotype controls had no significant effect on monomeric tau uptake in this system (inhibition of 16.9±6.9% and 14.5 t 5.3% for human IgG1 and rabbit IgG controls respectively). All humanised variants of clone #28 also significantly (P<0.001) inhibited uptake of recombinant (non-phosphorylated) aggregated tau into human iPSC-derived neurons (FIG. 26); by 61.4±4.2% (VH3Vκ4). 58.7±3.6% (VH4Vκ2), 58.7±3.6% (VH4Vκ4), 57.2±4.5% (VH5Vκ2), 41.3±5.7% (VH5Vκ4), in line with the rabbit IgG clone #28 (65.0±3.1% inhibition).

Data demonstrate that, like the parental rabbit antibody (#28. Clone 1) humanised antibodies targeting the epitope within the amino acid sequence of SEQ ID NO: 1 are able to reduce the uptake of monomeric and aggregated tau species containing this sequence by human neurons, when the target sequence (amino acids 396-410 of 2N4R tau; SEQ ID NO: 1) is not phosphorylated. Such antibodies are therefore predicted to limit the neuron-to-neuron propagation of extracellular tau species that include this sequence (SEQ ID NO: 1) in Alzheimer's disease and tauopathies, and thereby reduce/slow the progression of clinical symptoms in patients.

26.1 Production of human iPSC-derived cerebral cortex neurons: As detailed in Example 1.1.
26.2 Generation of aggregated (oligomeric) tau species: As detailed in Example 18.2.
26.3 Labelling of purified recombinant tau: As detailed in Example 18.3.

P301S tau was used for both monomeric and aggregated tau preparations.

26.4 Quantification of tau uptake by human iPSC-derived cortical neurons: Recombinant monomeric tau (25 nM) or aggregated tau (50 nM) was prepared in N2B27 (Thermo Fisher Scientific, Waltham, MA, USA) and incubated with a 10-fold molar excess of antibody over tau (i.e. 250 and 500 nM IgG) for 90 min at 37° C. Humanised variants of clone #28 were compared to an isotype control (anti-fluorescein [4-4-20 (enhanced)] hIgG1, Absolute Antibody, Oxford, UK), while the rabbit clone #28 was compared to a rabbit IgG control (Abcam, Cambridge. UK). 200 µL antibody/tau mix was added to NDC neurons (day 60+) and images were taken (fluorescence and bright field) every hour for 18 h at 37° C./5% $CO_2$ from 9 fields per well using the Incucyte S3 imaging system (Sartorius. Göttingen, Germany). Algorithms to quantify (per well) the mean area of fluorescence in the orange channel (excitation: 513-568 nm) were normalised to the mean area occupied by cells (phase area), and this was plotted as mean+/−SEM from 4 wells over time. One-way ANOVA with Tukey's multiple comparison test was run vs no antibody control to determine significance.

Example 27 Humanised Variants of Anti-Tau IgG Clone #28 Inhibit Uptake of Monomeric and Aggregated Tau into Human IPSC-Derived Astrocytes (FIG. 27, 28

As described in Example 20, astrocytic uptake of extracellular tau is proposed to play a role in the pathogenic spreading of tau observed in tauopathies such as Alzheimer's disease. Anti-tau rabbit IgG targeting SEQ ID NO: 1, including antibody clone #28 (Clone 1) are able to reduce uptake of monomeric and aggregated tau species containing this epitope by human astrocytes (Example 20). Antibodies exhibiting this activity are predicted to be therapeutically useful.

Humanised variants of clone #28. VH3VK4, VH4VK4, VH5VK2 and VH5VK4, significantly ($P<0.01$) inhibited uptake of recombinant (non-phosphorylated) monomeric tau into human iPSC-derived astrocytes (FIG. 27) to a similar extent to the rabbit clone (39.8±9.6%); by 31.5±5.6% (VH3VK4), 42.0±4.4% (VH4VK4), 26.7±7.3% (VH5VK2), 45.7±3.7% (VH5VK4). These same humanised variants also inhibited uptake of recombinant (non-phosphorylated) aggregated tau into human astrocytes (FIG. 28); by 30.8±9.3% (VH3VK4), 29.1±6.0% (VH4VK4). 27.8±4.4% (VH5VK2), 45.7±7.0% (VH5VK4). Isotype control antibody (anti-fluorescein [4-4-20 (enhanced)] hIgG1, Absolute Antibody, Oxford. UK) had no significant effect on tau uptake in this system (inhibition of −4.3±6.7% and 7.3±7.6% for monomeric and aggregated tau respectively). Inhibition of tau uptake by humanised variant, VH4VK2 was non-significant (24.1±5.0% and 19.9±3.9% for monomeric and aggregated tau respectively) indicating on the basis of this experiment that this humanised variant may not be as effective at inhibiting astrocytic tau uptake.

Data demonstrate that humanised antibodies targeting SEQ ID NO: 1 are able to reduce the uptake of monomeric and aggregated tau species containing this sequence by human astrocytes, when the target sequence (amino acids 396 to 410 of 2N4R tau; SEQ ID NO: 1) is not phosphorylated. This activity is predicted to be therapeutically beneficial.

27.1 Production of human iPSC-derived astrocytes: See Example 20.1

27.2 Generation of aggregated (oligomeric) tau species: See Example 18.2

27.3 Labelling of purified recombinant tau: See Example 18.3.

P301S tau was used for both monomeric and aggregated tau preparations.

27.4 Quantification of tau uptake by human iPSC-derived astrocytes: See Example 20.4. In this experiment, an anti-human IgG1 isotype control was used (anti-fluorescein [4-4-20 (enhanced)], Absolute Antibody, Oxford, UK).

Example 28. Humanised Variants of Monoclonal Anti-Tau Clone #28 Human IgG1 Increase Uptake of Aggregated Tau by Human IPSC-Derived Microglia (FIG. 29)

Microglia play an important role in clearing extracellular material in the central nervous system, to prevent accumulation of debris and enable repair processes to occur. In the context of neurodegenerative disease, phagocytosis of extracellular proteins, including aggregates, oligomers and monomeric forms, helps to reduce the extracellular concentrations of these species. All humanised variants of clone #28 tested as hIgG1, significantly ($P<0.001$) increased uptake of recombinant (non-phosphorylated) aggregated tau into human iPSC-derived microglia (FIG. 29); by 266.6 t 21.2% (VH3VK4), 178.9 t 38.1% (VH4VK2), 245.6±23.1% (VH4VK4), 132.8±27.0% (VH5VK2), 243.1±20.0% (VH5VK4). Isotype control human IgG1 antibody had no significant effect on tau uptake in this system (decrease of 21.5±21.0%).

Data demonstrate that, like the parental antibody (#28, Clone 1, see Example 21), therapeutic antibodies with effector function (e.g., formatted as hIgG1) would increase clearance of extracellular tau by microglia, when the target sequence (epitope present in amino acids 396 to 410 of 2N4R tau; SEQ ID NO: 1) is not phosphorylated. Such antibodies would thereby reduce the extracellular concentration and deleterious effects of extracellular forms of tau in the CNS. This activity is predicted to be beneficial therapeutically.

28.1 Production of hIgG1 antibodies: See Example 24.1.

28.2 Production of human iPSC-denved microglia: See Example 21.2.

28.3 Generation of aggregated (oligomeric) tau species: See Example 18.2.

28.4 Labelling of punfied recombinant tau: See Example 18.3.

28.5 Quantification of tau uptake by human iPSC-derived microglia: See Example 21.5.

In this Example, tau uptake was monitored over an 8 h period.

Example 29. Humanised Variants of Monoclonal Anti-Tau Clone #28 Detect Increased Levels of High and Low MW Tau Species in Familial Alzheimer's Disease but not Non-Demented Control Postmortem Brain Humanised variants of anti-tau antibody clone #28 detect disease-relevant forms of tau in postmortem familial Alzheimer's disease (fAD; Presenilin 1 mutation)) cerebral cortex samples but not in non-demented control (NDC) samples. Western blots demonstrate that five variants: VH3VK4. VH4VK2, VH4VK4, VH5VK2 and VH5VK4, detect increased levels of tau in a representative fAD compared to an NDC sample, including multiple high (>75 kD) and low (<40 kD) molecular weight species that are absent in the NDC samples tested (FIG. 30). Tau species detected show a similar pattern to the parental antibody (#28 VH0VK0) demonstrating that the binding characteristics of the parental rabbit clone #28 have been retained by the humanised variants. Detection of disease-specific tau species was enhanced in samples dephosphorylated with λ-phosphatase (λ-PP), indicating that, like the parental antibody, humanised variants of clone #28 exhibit preferential binding to dephosphorylated tau species.

29.1 Human brain samples: See Example 15.2 for details.
29.2 Western blot: See Example 6 for full details. To minimise the influence of contaminating human IgG present in the postmortem brain samples, Tidyblot (Bio-Rad, Hercules, CA USA) was used at a dilution of 1:200 in place of a standard secondary antibody when using hIgG1 for detection.

Example 30. Humanised Variant #28 VH5VK4 Detects Increased Levels of High and Low MW Tau Species in Familial Alzheimer's Disease, Sporadic Alzheimer's Disease and Dementia with Lewy Bodies Brain Compared to Non-Demented Control Brain In order to confirm that humanised variants of #28 retain the ability of the parental rabbit IgG to detect disease-relevant tau species across a range of tauopathies and across a panel of patient samples (see Examples 15, 16), the humanised variant #28 VH5Vκ4 (hIgG1) was profiled in more detail. As expected, humanised variant #28 VH5Vκ4 performed similarly to the parental clone #28 (rabbit IgG) and detected increased levels of both high and low MW species across a panel of patient samples representing familial Alzheimer's disease (fAD), sporadic Alzheimer's disease (sAD) and Dementia with Lewy bodies (DLB) (FIG. 31). Detection of both high and low MW tau species was enhanced in dephosphorylated (λ-phosphatase treated) samples, confirming a preference for antibody binding to the non-phosphorylated sequence. Actin and neuronal tubulin controls confirm that changes in tau levels are not due to variations in protein and/or neuronal levels in the samples tested. Data confirm that humanised antibody variant VH5Vκ4 detects disease-relevant tau species in a similar manner to that described for the parental antibody clone #28 (clone 1, Examples 15, 16), and suggest that the panel of humanised variants described in Example 23, as well as humanised variants of any other antibody binding to SEQ ID NO: 1, are likely to behave similarly. Binding of #28 VH5Vκ4, or alternative humanised variants, to disease-specific tau species therefore have the potential to be therapeutically useful in the treatment of AD and tauopathy.

In addition, detection of tau species by commercially available mid-region tau antibody, HT7, showed limited detection of disease-specific tau species across fAD, sAD and DLB brain samples (FIG. 31), in both the higher and lower molecular weight range. Data demonstrate that antibodies targeting epitope within the sequence corresponding to amino acids 396-410 of 2N4R tau (SEQ ID NO: 1) bind to disease-specific tau species that are not detected by a range of antibodies targeting mid-region tau, and therefore show unique and beneficial properties related to the targeted sequence.

30.1 Human brain samples: See Examples 15.2 and 16.2 for details
30.2 Western blot: See Example 6 and 29.2 for details.

REFERENCES

Altschul S F, Gish W, Miller W, Myers E W & Lipman D J (1990) Basic local alignment search tool. *J. Mol. Biol.* 215: 405-410
Altschul S F, Madden T L, Schaffer A A, Zhang J, Zhang Z, Miller W & Lipman D J (1997) Gapped BLAST and PSI-BLAST: a new generation of protein database search programs. Nucl. Acids Res. 25 3389-3402
Brownjohn P W, Smith J, Solanki R, Lohmann E, Houlden H, Hardy J, Dietmann S, Livesey F J (2018) Functional studies of missense TREM2 mutations in human stem cell-derived microglia. *Stem Cell Rep* 10(4): 1294-1307
Edgar R C. 2004a. MUSCLE: multiple sequence alignment with high accuracy and high throughput. Nucleic Acids Res 32:1792-7
Edgar R C. 2004b. MUSCLE: a multiple sequence alignment method with reduced time and space complexity. BMC Bioinformatics 5:113
Evans L D, Wassmer T. Fraser G, Smith J. Perkinton M, Billinton A & Livesey F J (2018) Extracellular monomeric and aggregated tau efficiently enter human neurons through overlapping but distinct pathways. *Cell Rep* 22(13): 3612-3624
Guex N & Peitsch M C (1997) SWISS-MODEL and the Swiss-PdbViewer: An environment for comparative protein modelling. *Electrophoresis* 18, 2714-2723
Hancock D C, O'Reilly N J (2005) Production of polyclonal antibodies in rabbits. *Methods Mol Biol* 295: 27-40
Hu S, Shively L, Raubitschek A, Sherman M, Williams L E, Wong J Y, Shively J E & Wu A M (1996) Minibody: A novel engineered anti-carcinoembryonic antigen antibody fragment (single-chain Fv-CH3) which exhibits rapid, high level targeting of xenografts. Cancer Res 56(13): 3055-61
Kabat E A & Wu T T (1991) Identical V region amino acid sequences and segments of sequences in antibodies of different specificities. Relative contributions of VH and VL genes, minigenes, and complementarity-determining regions to binding of antibody-combining sites. *J Immunol* 147(5): 1709-19
Kontermann R E (2012) Dual targeting strategies with bispecific antibodies. Mabs 4(2): 182-97
Lefranc M P, Pommié C, Kaas Q, Duprat E, Bosc N. Guiraudou D, Jean C, Ruiz M, Da Piedade I, Rouard M, Foulquier E, Thouvenin V, Lefranc G (2005) IMGT unique numbering for immunoglobulin and T cell receptor constant domains and Ig superfamily C-like domains. *Dev Comp Immunol* 29(3): 185-203
Lo M C, Aulabaugh A. Jin G, Cowling R, Bard J, Malamas M, Ellestad G (2004) Evaluation of fluorescence-based thermal shift assays for hit identification in drug discovery. *Analytical Biochem* 332(1): 153-9
Martini-Stoica H, Cole A L, Swartzlander D B, Chen F, Wan Y-W, Bajaj L, Bader D A, Lee V M Y, Trojanowski J Q, Liu Z, Sardiello M, Zheng H (2018) TFEB enhances astroglial uptake of extracellular species and reduces tau spreading. *J Exp Med* 215(9): 2355-2377
Moore S, Evans L D B, Andersson T, Portelius E, Smith J, Dias T B, Saurat N, McGlade A, Kirwan P, Blennow K, Hardy J, Zetterberg H, Livesey F J (2015) APP metabolism regulates tau proteostasis in human cerebral cortex neurons. *Cell Reports* 11(5): 689-96
Morris M, Knudsen Gm, Maeda S, Trinidad J C, Ioanoviciu A, Burlingame A L & Mucke L (2015) Tau post-translational modifications in wild-type and human amyloid precursor protein transgenic mice. *Nature Neurosci* 18: 1183-1189
Narat (2003) Production of antibodies in chickens. Food Technol Biotechnol 41(3): 259-267 Pearson W R &

Lipman D J (1988) Improved tools for biological sequence comparison. *Proc Nati Acad Sci USA* 85: 2444-2448

Pedersen J T & Sigurdsson E M (2015) Tau immunotherapy for Alzheimer's disease. *Trends Mol Med* 21(6): 394-402

Perry L C, Jones T D, Baker M P (2008) New approaches to prediction of immune responses to therapeutic proteins during preclinical development. *Drugs R D* 9(6): 385-96

Rauch J N, Luna G, Guzman E, Audouard M. Challis C, Sibih Y E, Leshuk C. Hemandez I, Wegmann S, Hyman B T, Gradinaru V. Kampmann M, Kosik K S (2020) LRP1 is a master regulator of tau uptake and spread. *Nature* 580(7803): 381-385

Roberts M, Sevastou I, Imaizumi Y, Mistry K. Talma S, Dey M, Gartlon J, Ochiai H, Zhou Z, Akasofu S, Tokuhara N, Ogo M, Aoyama M, Aoyagi H. Strand K, Sajedi E. Agarwala K L, Spidel J, Albone E, Horie K, Staddon J M, deSilva R (2020) Pre-clinical characterisation of E2814, a high-affinity antibody targeting the microtubule-binding repeat domain of tau for passive immunotherapy in Alzheimer's disease. *Acta Neuropathologica Comms* 8:13

Sandusky-Beltran L A, Sigurdsson E M (2020) Tau Immunotherapies: lessons Learned, Current Status and Future Considerations. *Neurophamacol.* 175: 108104

Shi Y, Kirwan P, Smith J, Robinson H P C, Livesey F J (2012a) Human cerebral cortex development from pluripotent stem cells to functional excitatory synapses. *Nature Neurosci* 15(3): 477-86

Shi Y. Kirwan P. Livesey F J (2012b) Directed differentiation of human pluripotent stem cells to cerebral cortex neurons and neural networks. *Nature Protocols* 7(10): 1836-46

Shi Y. Kirwan P. Smith J, MacLean G, Orkin S H, Livesey F J (2012c) A human stem cell model of early Alzheimer's disease pathology in Down Syndrome. *Science Trans Med* 4(124): 124ra29

Sidoryk-Wegrzynowicz M & Strużyńska L (2019) Astroglial contribution to tau-dependent neurodegeneration. *Biochem J* 476(22):3493-3504

Smith T F & Waterman M S (1981) Identification of common molecular subsequences. *J. Mol Biol.* 147: 195-197

Spiess C. Zhai Q & Carter P J (2015) Alternative molecular formats and therapeutic applications for bispecific antibodies. *Mol Immunol* 67 (2 Pt A): 95-106

Sposito T, Preza E, Mahoney C J, Seto-Salvia N, Ryan N S, Morris H R, Arber C, Devine M J, Houlden H. Warner T T, Bushell T J, Zagnoni M. Kunath T, Livesey F J, Fox N C, Rossor M N, Hardy J, Wray S (2015) Developmental regulation of tau splicing is disrupted in stem cell-derived neurons from frontotemporal dementia patients with the 10+16 splice-site mutation in MAPT. *Hum Mol Genet* 24(18): 5260-5269

SEQUENCE LISTING INFORMATION

The sequence listing submitted herewith forms part of the specification as filed.

The invention claimed is:

1. An antibody or fragment thereof, comprising an antigen-binding site comprising the CDRs (HCDR1, HCRD2, HCDR3, LCDR1, LCDR2 and LCDR3, respectively) of:
   (a) Clone 1 of SEQ ID NO: 14, SEQ ID NO: 15, SEQ ID NO: 16, SEQ ID NO: 17, SEQ ID NO: 18 and SEQ ID NO: 19;
   (b) Clone 2 of SEQ ID NO: 20, SEQ ID NO: 21, SEQ ID NO: 22, SEQ ID NO: 23, SEQ ID NO: 24 and SEQ ID NO: 25;
   (c) Clone 3 of SEQ ID NO: 26, SEQ ID NO: 27, SEQ ID NO: 28, SEQ ID NO: 29, SEQ ID NO: 30 and SEQ ID NO: 31;
   (d) Clone 4 of SEQ ID NO: 32, SEQ ID NO: 33, SEQ ID NO: 34, SEQ ID NO: 35, SEQ ID NO: 36 and SEQ ID NO: 37;
   (e) Clone 5 of SEQ ID NO: 38, SEQ ID NO: 39, SEQ ID NO: 40, SEQ ID NO: 41, SEQ ID NO: 42 and SEQ ID NO: 43;
   (f) Clone 6 of SEQ ID NO: 44, SEQ ID NO: 45, SEQ ID NO: 46, SEQ ID NO: 47, SEQ ID NO: 48 and SEQ ID NO: 49;
   (g) Clone 7 of SEQ ID NO: 50, SEQ ID NO: 51, SEQ ID NO: 52, SEQ ID NO: 53, SEQ ID NO: 54 and SEQ ID NO: 55;
   (h) Clone 8 of SEQ ID NO: 56, SEQ ID NO: 57, SEQ ID NO: 58, SEQ ID NO: 59, SEQ ID NO: 60 and SEQ ID NO: 61;
   (i) Clone 9 of SEQ ID NO: 62, SEQ ID NO: 63, SEQ ID NO: 64, SEQ ID NO: 65, SEQ ID NO: 66 and SEQ ID NO: 67;
   (j) Clone 10 of SEQ ID NO: 68, SEQ ID NO: 69, SEQ ID NO: 70, SEQ ID NO: 71, SEQ ID NO: 72 and SEQ ID NO: 73;
   (k) Clone 11 of SEQ ID NO: 74, SEQ ID NO: 75, SEQ ID NO: 76, SEQ ID NO: 77, SEQ ID NO: 78 and SEQ ID NO: 79;
   (l) Clone 12 of SEQ ID NO: 80, SEQ ID NO: 81, SEQ ID NO: 82, SEQ ID NO: 83, SEQ ID NO: 84 and SEQ ID NO: 85; or
   (m) Clone 13 of SEQ ID NO: 86, SEQ ID NO: 87, SEQ ID NO: 88, SEQ ID NO: 89, SEQ ID NO: 90 and SEQ ID NO: 91;
   (n) SEQ ID NO: 14, SEQ ID NO: 126 (VH6 HCDR2), SEQ ID NO: 16, SEQ ID NO: 17, SEQ ID NO: 18 and SEQ ID NO: 19;
   (o) SEQ ID NO: 14, SEQ ID NO: 15, SEQ ID NO: 16, SEQ ID NO: 125 (Vk5 CDR1), SEQ ID NO: 18 and SEQ ID NO: 19; or,
   (p) SEQ ID NO: 14, SEQ ID NO: 126 (VH6 HCDR2), SEQ ID NO: 16, SEQ ID NO: 125 (Vk5 CDR1), SEQ ID NO: 18 and SEQ ID NO: 19;
   wherein the sequences are defined according to Kabat nomenclature.

2. The antibody or fragment thereof according to claim 1, wherein the antigen-binding site comprises human framework sequences hFW1, hFW2, hFW3, hFW4 and the CDRs (HCDR1, HCRD2, HCDR3, LCDR1, LCDR2 and LCDR3, respectively) of:
   (a) Clone 1 of SEQ ID NO: 14, SEQ ID NO: 15, SEQ ID NO: 16, SEQ ID NO: 17, SEQ ID NO: 18 and SEQ ID NO: 19;
   (b) SEQ ID NO: 14, SEQ ID NO: 126 (VH6 HCDR2), SEQ ID NO: 16, SEQ ID NO: 17, SEQ ID NO: 18 and SEQ ID NO: 19;
   (c) SEQ ID NO: 14, SEQ ID NO: 15, SEQ ID NO: 16, SEQ ID NO: 125 (Vk5 CDR1), SEQ ID NO: 18 and SEQ ID NO: 19; or,
   (d) SEQ ID NO: 14, SEQ ID NO: 126 (VH6 HCDR2), SEQ ID NO: 16, SEQ ID NO: 125 (Vk5 CDR1), SEQ ID NO: 18 and SEQ ID NO: 19;
   wherein the sequences are defined according to Kabat nomenclature.

3. The antibody or fragment thereof according to claim 1 or 2, wherein the antigen-binding site comprises:
   (a) a VH and/or VL domain sequence of, or
   (b) a VH and/or VL domain sequence with at least 70, 75, 76, 77, 78, 79, 80, 81, 82, 83, 84, 85, 86, 87, 88, 89, 90, 91, 92, 93, 94, 95, 96, 97, 98 or 99% identity to, a clone selected from:
      (i) Clone 32 (VH5Vκ4) of SEQ ID NO: 131 and SEQ ID NO: 135, respectively;
      (ii) Clone 1 of SEQ ID NO: 92 and SEQ ID NO: 93, respectively;
      (iii) Clone 2 of SEQ ID NO: 94 and SEQ ID NO: 95, respectively;
      (iv) Clone 3 of SEQ ID NO: 96 and SEQ ID NO: 97, respectively;
      (v) Clone 4 of SEQ ID NO: 98 and SEQ ID NO: 99, respectively;
      (vi) Clone 5 of SEQ ID NO: 100 and SEQ ID NO: 101, respectively;
      (vii) Clone 6 of SEQ ID NO: 102 and SEQ ID NO: 103, respectively;
      (viii) Clone 7 of SEQ ID NO: 104 and SEQ ID NO: 105, respectively;
      (ix) Clone 8 of SEQ ID NO: 106 and SEQ ID NO: 107, respectively;
      (x) Clone 9 of SEQ ID NO: 108 and SEQ ID NO: 109, respectively;
      (xi) Clone 10 of SEQ ID NO: 110 and SEQ ID NO: 111 respectively;
      (xii) Clone 11 of SEQ ID NO: 112 and SEQ ID NO: 113, respectively;

(xiii) Clone 12 of SEQ ID NO: 114 and SEQ ID NO: 115, respectively; or
(xiv) Clone 13 of SEQ ID NO: 116 and SEQ ID NO: 117, respectively;
(xv) Clone 28 (VH4Vκ4) of SEQ ID NO: 130 and SEQ ID NO: 135, respectively;
(xvi) Clone 24 (VH3Vκ4) of SEQ ID NO: 129 and SEQ ID NO: 135, respectively;
(xvii) Clone 31 (VH5Vκ2) of SEQ ID NO: 131 and SEQ ID NO: 134, respectively;
(xviii) Clone 27 (VH4Vκ2) of SEQ ID NO: 130 and SEQ ID NO: 134, respectively;
(xix) Clone 14 (VH1Vκ1) of SEQ ID NO: 127 and SEQ ID NO: 133, respectively;
(xx) Clone 15 (VH1Vκ2) of SEQ ID NO: 127 and SEQ ID NO: 134, respectively;
(xxi) Clone 16 (VH1Vκ4) of SEQ ID NO: 127 and SEQ ID NO: 135, respectively;
(xxii) Clone 18 (VH2Vκ1) of SEQ ID NO: 128 and SEQ ID NO: 133, respectively;
(xxiii) Clone 19 (VH2Vκ2) of SEQ ID NO: 128 and SEQ ID NO: 134 respectively;
(xxiv) Clone 20 (VH2Vκ4) of SEQ ID NO: 128 and SEQ ID NO: 135, respectively;
(xxv) Clone 22 (VH3Vκ1) of SEQ ID NO: 129 and SEQ ID NO: 133, respectively;
(xxvi) Clone 23 (VH3Vκ2) of SEQ ID NO: 129 and SEQ ID NO: 134, respectively;
(xxvii) Clone 26 (VH4Vκ1) of SEQ ID NO: 130 and SEQ ID NO: 133, respectively;
(xxviii) Clone 29 (VH4Vκ5) of SEQ ID NO: 130 and SEQ ID NO: 136, respectively;
(xxix) Clone 30 (VH5Vκ1) of SEQ ID NO: 131 and SEQ ID NO: 133, respectively;
(xxx) Clone 33 (VH5Vκ5) of SEQ ID NO: 131 and SEQ ID NO: 136, respectively;
(xxxi) Clone 34 (VH6Vκ1) of SEQ ID NO: 132 and SEQ ID NO: 133, respectively;
(xxxii) Clone 35 (VH6Vκ2) of SEQ ID NO: 132 and SEQ ID NO: 134, respectively;
(xxxiii) Clone 36 (VH6Vκ4) of SEQ ID NO: 132 and SEQ ID NO: 135, respectively;
(xxxiv) Clone 37 (VH6Vκ5) of SEQ ID NO: 132 and SEQ ID NO: 136, respectively;
(xxxv) Clone 17 (VH1Vκ5) of SEQ ID NO: 127 and SEQ ID NO: 136, respectively;
(xxxvi) Clone 21 (VH2Vκ5) of SEQ ID NO: 128 and SEQ ID NO: 136, respectively; or
(xxxvii) Clone 25 (VH3Vκ5) of SEQ ID NO: 129 and SEQ ID NO: 136, respectively;
wherein the sequences are defined according to Kabat nomenclature.

4. The antibody or fragment thereof according to claim 1, wherein the antibody comprises a VH and VL domain of
(a) Clone 32 (VH5Vκ4) of SEQ ID NO: 131 and SEQ ID NO: 135, respectively;
(b) Clone 1 (#28, P1-D4) of SEQ ID NO: 92 and SEQ ID NO: 93, respectively;
(c) Clone 24 (VH3Vκ4) of SEQ ID NO: 129 and SEQ ID NO: 135, respectively;
(d) Clone 31 (VH5Vκ2) of SEQ ID NO: 131 and SEQ ID NO: 134, respectively;
(e) Clone 27 (VH4Vκ2) of SEQ ID NO: 130 and SEQ ID NO: 134, respectively;
(f) Clone 28 (VH4Vκ4) of SEQ ID NO: 130 and SEQ ID NO: 135, respectively; or
(g) Clone 2 (#30, P1-F4) of SEQ ID NO: 94 and SEQ ID NO: 95, respectively,
wherein the sequences are defined according to Kabat nomenclature.

5. The antibody or fragment thereof according to claim 1, wherein the antibody is a monoclonal antibody.

6. The antibody or fragment thereof according to claim 1, wherein the antibody comprises a human Ig Fc region, or a human IgG1 Fc region.

7. The antibody or fragment thereof according to claim 1, wherein the antibody comprises an Ig Fc region with effector function or with enhanced effector function.

8. The antibody or fragment thereof according to claim 1, wherein the antibody is a product of expression of a recombinant DNA or RNA sequence.

9. A composition comprising the antibody or fragment thereof, according to claim 1 and a pharmaceutically-acceptable diluent.

10. A method for detecting human tau proteins comprising an epitope comprised within residues 396-410 (SEQ ID NO: 1) of human 2N4R (amino acids 1-441) tau (SEQ ID NO: 2), wherein the epitope is not phosphorylated, comprising:
incubating an antibody or fragment thereof according to claim 1 with a sample of interest; and,
determining binding of the antibody to the epitope in the sample, wherein binding of the antibody indicates the presence of the epitope in the sample.

11. The method of claim 10, wherein the epitope is formed and defined by residues of the amino acid sequence $_{400}SGD_{402}$ (SEQ ID NO 123) of human 2N4R (amino acids 1-441) tau (SEQ ID NO: 2) wherein $S_{400}$ is not phosphorylated wherein the epitope is formed and defined by residues of the amino acid sequence $_{399}VSGD_{402}$ (SEQ ID NO: 124), of human 2N4R (amino acids 1-441) tau (SEQ ID NO: 2), wherein $S_{400}$ is not phosphorylated.

12. The method of claim 10, wherein detecting the human tau protein comprising the epitopes further identifies a tauopathy.

\* \* \* \* \*